United States Patent
Choi et al.

(10) Patent No.: US 12,462,780 B2
(45) Date of Patent: Nov. 4, 2025

(54) DISPLAY APPARATUS

(71) Applicant: LG Display Co., Ltd., Seoul (KR)

(72) Inventors: YeongRak Choi, Paju-si (KR); Sungtae Lee, Paju-si (KR); Sungsu Ham, Paju-si (KR); Joongsup Han, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 27 days.

(21) Appl. No.: 18/431,972

(22) Filed: Feb. 3, 2024

(65) Prior Publication Data

US 2024/0177700 A1    May 30, 2024

Related U.S. Application Data

(63) Continuation of application No. 17/360,074, filed on Jun. 28, 2021, now Pat. No. 11,929,057.

(30) Foreign Application Priority Data

Jun. 30, 2020    (KR) .................. 10-2020-0080647

(51) Int. Cl.
  *G10K 9/122*    (2006.01)
  *G06F 1/16*     (2006.01)
  *G06F 3/16*     (2006.01)

(52) U.S. Cl.
  CPC ........... *G10K 9/122* (2013.01); *G06F 1/1605* (2013.01); *G06F 3/16* (2013.01)

(58) Field of Classification Search
  CPC .......... G10K 9/122; G06F 1/1605; G06F 3/16
  See application file for complete search history.

(56) References Cited

U.S. PATENT DOCUMENTS

| | | |
|---|---|---|
| 2010/0215205 A1 | 8/2010 | Nagao et al. |
| 2012/0140969 A1 | 6/2012 | Fujise et al. |
| | (Continued) | |

FOREIGN PATENT DOCUMENTS

| | | |
|---|---|---|
| CN | 110913319 A | 3/2020 |
| CN | 110971848 A | 4/2020 |
| | (Continued) | |

OTHER PUBLICATIONS

Office Action dated Oct. 1, 2024 issued in corresponding Japanese Patent Application No. 2023-132510. (Note: JP 2020-048194 A cited therein was cited in a prior IDS).

(Continued)

*Primary Examiner* — Sunita Joshi
(74) *Attorney, Agent, or Firm* — Morgan, Lewis & Bockius LLP

(57) ABSTRACT

A display apparatus includes a display device including a display panel configured to display an image and include first to eleventh regions; a first partition between the first region and the third region; a second partition between the second region and the third region; a third partition between the fourth region and the seventh region; a fourth partition between the fifth region and the eighth region; a fifth partition between the sixth region and the seventh region; a sixth partition between the sixth region and the eighth region; and at least one first to eleventh vibration devices respectively at the first to eleventh regions. One or more among the at least one first to eleventh vibration devices are configured with a coil type vibration device, a film type vibration device, or a woofer-integrated vibration device.

41 Claims, 21 Drawing Sheets

(56) References Cited

U.S. PATENT DOCUMENTS

| | | | |
|---|---|---|---|
| 2017/0280234 A1 | 9/2017 | Choi et al. | |
| 2018/0343512 A1 | 11/2018 | Choi et al. | |
| 2019/0182572 A1 | 6/2019 | Kim | |
| 2019/0196247 A1 | 6/2019 | Shin et al. | |
| 2020/0059733 A1 | 2/2020 | Shin et al. | |
| 2020/0092650 A1* | 3/2020 | Ham | H04R 5/02 |
| 2020/0107115 A1 | 4/2020 | Son et al. | |
| 2020/0280796 A1 | 9/2020 | Lee et al. | |
| 2021/0014449 A1 | 1/2021 | Maeshiba et al. | |

FOREIGN PATENT DOCUMENTS

| | | |
|---|---|---|
| JP | 2006-217307 A | 8/2006 |
| JP | 2009-164822 A | 7/2009 |
| JP | 2012-134956 A | 7/2012 |
| JP | 2017-046309 A | 3/2017 |
| JP | 2017-184223 A | 10/2017 |
| JP | 2018-093469 A | 6/2018 |
| JP | 2020-048194 A | 3/2020 |
| WO | 2007/069637 A1 | 6/2007 |
| WO | 2019/131041 A1 | 7/2019 |

OTHER PUBLICATIONS

Office Action dated Mar. 14, 2024, issued in corresponding Chinese Patent Application No. 202110713393.0. (Note: US 2020/0280796 A1 was previously cited in IDS).
Office Action dated Apr. 20, 2023, issued in corresponding Japanese Patent Application No. 2022-124581.

* cited by examiner

DISPLAY APPARATUS

CROSS-REFERENCE TO RELATED APPLICATIONS

This application is a continuation of co-pending U.S. patent application Ser. No. 17/360,074, filed on Jun. 28, 2021, which claims the benefit of and priority to Korean Patent Application No. 10-2020-0080647 filed on Jun. 30, 2020. The entirety of each of the above prior U.S. and Korean patent applications is hereby incorporated by reference.

BACKGROUND

Technical Field

The present disclosure relates to a display apparatus.

Discussion of the Related Art

In display apparatuses, a display panel displays an image, and a separate speaker should be installed for providing a sound generally. When a speaker is disposed in a display apparatus, the speaker occupies a space, and due to this, the design and spatial disposition of the display apparatus are limited.

A display apparatus has a problem in that sound quality is deteriorated due to interference between sounds reflected from a wall or the ground as a sound output from a speaker progresses toward a rear direction or a lower direction of a display apparatus. For this reason, problems occur in that it is difficult to enable exact sound transfer and immersion of a viewer is deteriorated.

SUMMARY

The inventors of the present disclosure have recognized problems described above and have performed various experiments for implementing a vibration device capable of improving the quality of sound and having reliability. Through the various experiments, the inventors have invented a display apparatus having a new structure including a vibration device capable of improving the quality of sound and having reliability.

Accordingly, embodiments of the present disclosure are directed to providing a display apparatus that substantially obviates one or more problems due to limitations and disadvantages of the related art.

An aspect of the present disclosure is to provide a display apparatus including a vibration device which is disposed at a rear surface of a display panel and vibrates the display panel to generate a sound, thereby enhancing a sound pressure characteristic.

An aspect of the present disclosure is to provide a display apparatus including a vibration device capable of implementing a sound of a multi-channel.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display apparatus comprises a display device including a display panel configured to display an image and include first to eleventh regions, at least one first vibration device, at least one second vibration device, and at least one third vibration device respectively at the first to third regions, at least one fourth vibration device, at least one fifth vibration device, at least one sixth vibration device, at least one seventh vibration device, and at least one eighth vibration device respectively at the fourth to eighth regions, at least one ninth vibration device, at least one tenth vibration device, and at least one eleventh vibration device respectively at the ninth to eleventh regions; a first partition between the first region and the third region, a second partition between the second region and the third region, a third partition between the fourth region and the seventh region, a fourth partition between the fourth region and the eighth region, a fifth partition between the sixth region and the seventh region, and a sixth partition between the sixth region and the eighth region. A length of one or more among the first partition and the second partition differs from a length of one or more among the third to sixth partitions.

In another aspect, a display apparatus comprises a display device including a display panel configured to display an image and include first to eleventh regions, at least one first vibration device, at least one second vibration device, and at least one third vibration device respectively at the first to third regions, at least one fourth vibration device, at least one fifth vibration device, at least one sixth vibration device, at least one seventh vibration device, and at least one eighth vibration device respectively at the fourth to eighth regions, at least one ninth vibration device, at least one tenth vibration device, and at least one eleventh vibration device respectively at the ninth to eleventh regions, a first partition at one or more sides of the at least one first vibration device, a second partition at one or more sides of the at least one second vibration device, a third partition at one or more sides of the at least one third vibration device, a fourth partition at one or more sides of the at least one fourth vibration device, a fifth partition at one or more sides of the at least one fifth vibration device, and a sixth partition at one or more sides of the at least one sixth vibration device. A size of one or more among the first partition and the second partition differs from a size of one or more among the third to sixth partitions.

In another aspect, a display apparatus comprises a display device including a display panel configured to display an image; a first vibration device, a second vibration device, and a third vibration device in an upper region of the display device, the first to third vibration devices including three channels; a fourth vibration device, a fifth vibration device, a sixth vibration device, a seventh vibration device, and an eighth vibration device in a center region of the display device, the fourth to eighth vibration devices including five channels; and a ninth vibration device, a tenth vibration device, and an eleventh vibration device in a lower region of the display device, the ninth to eleventh vibration devices including three channels.

According to an embodiment of the present disclosure, a display apparatus comprises a vibration device that vibrates the display panel, so that the display apparatus may generate a sound so that the direction of the sound output from the display apparatus is toward the front surface of the display panel.

According to an embodiment of the present disclosure, a display apparatus including a vibration device capable of implementing a sound of a multi-channel may be provided.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

Figure 1:
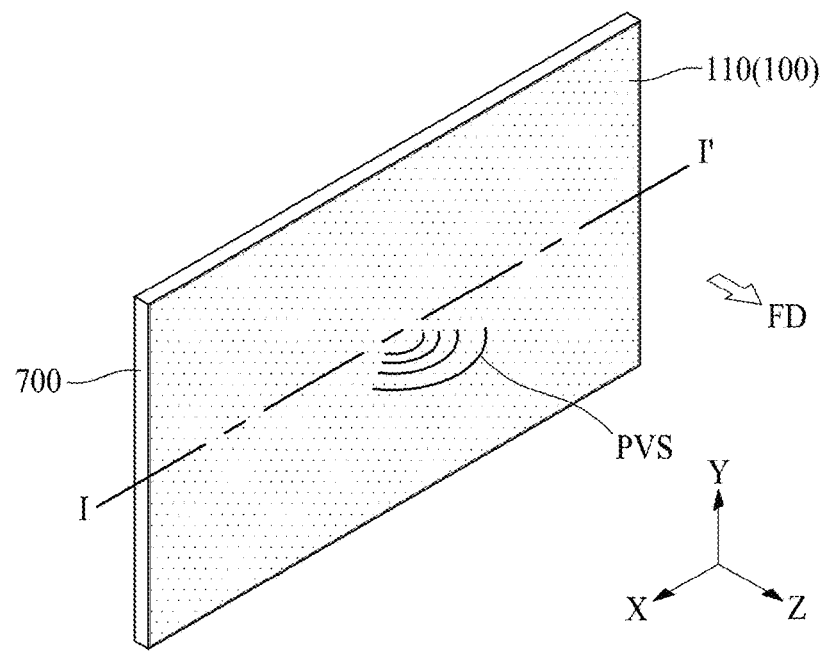
FIG. 1 illustrates a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case which is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, the terms "first," "second," "A," "B," "(a)," "(b)," etc., may be used. These terms are intended to identify the corresponding elements from the other elements, and basis, order, or number of the corresponding elements should not be limited by these terms. The expression that an element is "connected," "coupled," or "adhered" to another element or layer, the element or layer can not only be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more among the associated listed elements. For example, the meaning of "at least one or more of a first element, a second element, and a third element" denotes the combination of all elements proposed from two or more of the first element, the second element, and the third element as well as the first element, the second element, or the third element.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic device such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set device which is a final consumer device or an application product including the LCM or the OLED module.

In some embodiments, an LCM or an OLED module including a display panel and a driver may be referred to as a narrow-sense display apparatus, and an electronic apparatus which is a final product including an LCM or an OLED module may be referred to as a set apparatus. For example, the narrow-sense display apparatus may include a display panel, such as an LCD or an OLED, and a source printed circuit board (PCB) which is a controller for driving the display panel. The set device may further include a set PCB which is a set controller electrically connected to the source PCB to overall control the set apparatus.

A display panel applied to an embodiment of the present disclosure may use all types of display panels such as a liquid crystal display panel, an organic light emitting diode (OLED) display panel, and an electroluminescent display panel, but embodiments of the present disclosure are not limited to a specific display panel which is vibrated by a vibration device according to an embodiment of the present disclosure to output a sound. Also, a shape or a size of a display panel applied to a display apparatus according to an embodiment of the present disclosure is not limited.

For example, if the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another embodiment, the layer provided on the array substrate may include a micro light emitting diode.

The display panel may further include a backing such as a metal plate attached on the display panel. However, embodiments of the present disclosure are not limited to the metal plate, and the display panel may include another structure.

In the present disclosure, the display apparatus including a vibration device may be applied to vehicles as a user interface module such as a central control panel for automobiles. For example, the display panel may be provided between occupants sitting on two front seats in order for a vibration of the display panel to be transferred to the inside of a vehicle. Therefore, an audio experience in a vehicle is improved in comparison with a case where speakers are disposed on interior sides of the vehicle.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a display apparatus according to the present disclosure will be described in detail with reference to the accompanying drawings. Wherever possible, the same reference numbers will be used throughout the drawings to refer to the same or like parts. Since a scale of each of elements shown in the accompanying drawings is different from an actual scale for convenience of description, an embodiment of the present disclosure is not limited to the shown scale.

Figure 2:
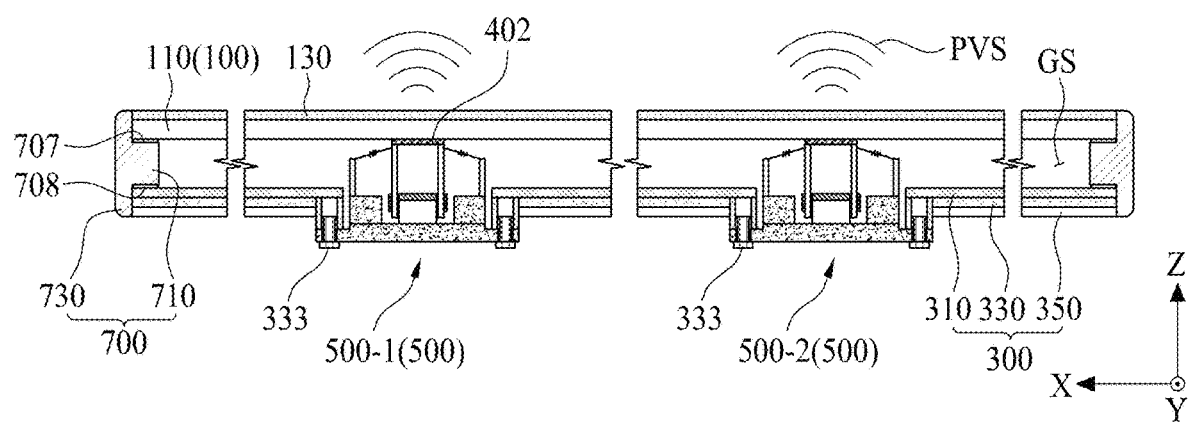
FIG. 2 is a cross-sectional view taken along line I-I' illustrated in FIG. 1

FIG. 1 illustrates a display apparatus according to an embodiment of the present disclosure. FIG. 2 is a cross-sectional view taken along line I-I' illustrated in FIG. 1

With reference to FIGS. 1 and 2, the display apparatus according to an embodiment of the present disclosure may include display device 100, supporting member 300, and at least one or more vibration device 500.

While the display device 100 is displaying an image, the display device 100 may vibrate based on driving of the one or more vibration device 500 to output a sound PVS (or a panel vibration sound) in a forward direction (or a front region) FD thereof. Alternatively, in a state where the display device 100 does not display an image, the display device 100 may vibrate based on driving of the one or more vibration device 500 to output the sound PVS in the forward direction FD thereof. Accordingly, the display device 100 according to an embodiment of the present disclosure may display an image and may generate (or output) the sound PVS. For example, the display device 100 may be referred to as a display member, a display layer, a display module, a display unit, a vibration member, a vibration plate, a vibration object member, or a display speaker, but embodiments of the present disclosure are not limited thereto.

The display device 100 according to an embodiment of the present disclosure may include a display panel 110 that displays an image. For example, the image may include an electronic image, digital image, etc. For example, the display panel 110 may display an image by emitting light. The display panel 110 may be all kinds of display panels or curved display panels such as a liquid crystal display panel, an organic light emitting display panel, a quantum dot light emitting display panel, a micro light emitting diode display panel, and an electrophoresis display panel. The display panel 110 may be a flexible display panel. For example, the display panel 110 may be a flexible light emitting display panel, a flexible electrophoresis display panel, a flexible electrowetting display panel, a flexible micro light emitting diode display panel, or a flexible quantum dot light emitting display panel, but is not limited thereto.

The display panel 110 may vibrate according to the vibration of the vibration device 500 and directly output the sound PVS toward the front direction FD, whereby the display panel 110 may be a vibration member, a vibration plate, or speaker that directly generates sound PVS. For example, when the display device 100 generates sound PVS, the display device 100 may be a vibration plate, a panel speaker, or a plat speaker that directly generates sound (PVS).

According to some embodiments of the present disclosure, the display panel 110 may include a pixel circuit disposed on a substrate (or base substrate), and a pixel array layer (or display part) connected to the pixel circuit and having an anode electrode, a cathode electrode, and a light emitting layer. The anode electrode may be referred to as a first electrode or a pixel electrode, etc., but embodiments of the present disclosure are not limited thereto. The cathode electrode may be referred to as a second electrode or a common electrode, etc., but embodiments of the present disclosure are not limited thereto. The display panel 110 may display an image in a type such as a top emission type, a bottom emission type, or a dual emission type, based on a structure of the pixel array layer. In the top emission type, visible light emitted from the pixel array layer may be irradiated onto a region in front of the substrate to allow an image to be displayed, and in the bottom emission type, the visible light emitted from the pixel array layer may be irradiated onto a rearward region behind the substrate to allow an image to be displayed.

The display panel 110 according to an embodiment of the present disclosure may include a pixel array part disposed in a pixel area which is configured by a plurality of gate lines and/or a plurality of data lines. The pixel array part may include a plurality of pixels which display an image based on a signal supplied through each of signal lines. The signal lines may include a gate line, a data line and a pixel driving power line, etc.

Each of the plurality of pixels may include a pixel circuit layer including a driving thin film transistor (TFT) provided at the pixel area, an anode electrode electrically connected to the driving TFT, a light emitting layer formed on the anode electrode, and a cathode electrode electrically connected to the light emitting layer.

The driving TFT may be provided at a transistor region of each pixel area provided in a substrate. The driving TFT may include a gate electrode, a gate insulation layer, a semiconductor layer, a source electrode, and a drain electrode. The semiconductor layer of the driving TFT may include silicon such as amorphous silicon (a-Si), polysilicon (poly-Si), or low temperature poly-Si or may include oxide such as indium-gallium-zinc-oxide (IGZO), but embodiments of the present disclosure are not limited thereto.

The anode electrode may be provided at an opening region provided at each pixel area and may be electrically connected to the driving TFT.

The light emitting layer according to an embodiment of the present disclosure may include an organic light emitting device provided on the anode electrode. The organic light emitting device may be implemented so that each pixel emits light of the same color, for example, white, or emits light of at least one or more of different colors, for example, red, green, and blue.

According to another embodiment of the present disclosure, the light emitting layer may include a micro light emitting diode device which is electrically connected to each of the anode electrode and the cathode electrode. The micro light emitting diode device may be a light emitting diode implemented as an integrated circuit (IC) type or a chip type and may include a first terminal electrically connected to the anode electrode and a second terminal electrically connected to the cathode electrode. The cathode electrode may be commonly connected to a light emitting device of the light emitting layer provided at each pixel area.

An encapsulation part may be formed on the substrate to surround the pixel array part, and thus, may prevent oxygen or water (or moisture) from penetrating into the light emitting layer of the pixel array part. The encapsulation part according to an embodiment of the present disclosure may be formed in a multi-layer structure where an organic material layer and an inorganic material layer are alternately stacked, but embodiments of the present disclosure are not limited thereto. The inorganic material layer may prevent oxygen or water (or moisture) from penetrating into the light emitting layer of the pixel array part. The organic material layer may be formed to have a thickness which is relatively thicker than the inorganic material layer, so as to cover particles occurring in a manufacturing process. For example, the encapsulation part may include a first inorganic layer, an organic layer on the first inorganic layer, and a second inorganic layer on the organic layer. The organic layer may be a particle covering layer. A touch panel may be disposed on the encapsulation part, or may be disposed on a rear surface of the pixel array part.

The display panel 100 according to an embodiment of the present disclosure may include an upper substrate, a lower substrate, and a liquid crystal layer. The upper substrate may be a first substrate or a thin film transistor (TFT) array substrate and may include a pixel array (or a display part or a display area) including a plurality of pixels which are respectively provided in a plurality of pixel areas by intersections between a plurality of gate lines and/or a plurality of data lines. Each of the plurality of pixels may include a TFT connected to a gate line and/or a data line, a pixel electrode connected to the TFT, and a common electrode which is provided adjacent to the pixel electrode and is supplied with a common voltage.

The upper substrate may further include a pad part provided at a first edge (or a first periphery or a first non-display part) thereof and a gate driving circuit provided at a second edge (or a second periphery or a second non-display part) thereof.

The pad part may transfer a signal, supplied from the outside, to the pixel array and/or the gate driving circuit. For example, the pad part may include a plurality of data pads connected to a plurality of data lines through a plurality of data link lines and/or a plurality of gate input pads connected to the gate driving circuit through a gate control signal line. For example, a size of the upper substrate may be greater than the lower substrate, but embodiments of the present disclosure are not limited thereto.

The gate driving circuit according to an embodiment of the present disclosure may be embedded (or integrated) into a second edge of the upper substrate and may be connected to the plurality of gate lines. For example, the gate driving circuit may be implemented with a shift register including a transistor, which is formed through the same process as the TFT provided at the pixel area. According to another embodiment of the present disclosure, the gate driving circuit may be implemented as an integrated circuit (IC) and may be provided in a panel driving circuit, without being embedded into the upper substrate.

The lower substrate may be a second substrate or a color filter array substrate and may include a pixel pattern, including an opening area overlapping with the pixel area formed in the upper substrate, and a color filter layer formed at the opening area. The lower substrate may have a size which is smaller than the upper substrate, but embodiments of the present disclosure are not limited thereto. For example, the lower substrate may overlap a portion, other than the first edge, of the upper substrate. The lower substrate may be attached to a portion, other than the first edge, of the upper substrate with a liquid crystal layer therebetween using a sealant.

The liquid crystal layer may be interposed between the upper substrate and the lower substrate and may include a liquid crystal including liquid crystal molecules where an alignment direction thereof is changed based on an electric field generated by the common voltage and a data voltage applied to a pixel electrode for each pixel.

A lower polarization member may be attached at a lower surface of the lower substrate and may polarize light which is incident from the backlight and travels to the liquid crystal layer. An upper polarization member may be attached at an upper surface of the upper substrate and may polarize light which passes through the upper substrate and is output to the outside.

The display panel 100 according to an embodiment of the present disclosure may drive the liquid crystal layer based on an electric field which is generated in each pixel by the data voltage and the common voltage applied to each pixel, and thus, may display an image based on light passing through the liquid crystal layer.

According to another embodiment of the present disclosure, in the display panel 100, the upper substrate may be implemented as the color filter array substrate, and the lower substrate may be implemented as the TFT array substrate. For example, the display panel 100 according to another embodiment of the present disclosure may have a type where an upper portion and a lower portion of the display panel 100 according to an embodiment of the present disclosure are reversed therebetween. For example, a pad part of the display panel 100 according to another embodiment of the present disclosure may be covered by a separate mechanism or structure.

The display panel 110 according to an embodiment of the present disclosure may include a bending portion which is bent or curved to have a curved shape or a certain curvature radius.

The bending portion of the display panel 110 may be provided at at least one or more of one periphery and the other periphery of the display panel 110 which are parallel to each other. The one periphery and/or the other periphery, where the bending portion is provided, of the display panel 110 may include only the non-display area, or may include a periphery of the display area and the non-display area. Here, the display panel 110 including the bending portion provided by bending of the non-display area may have a structure where a one-side bezel bending structure or a both-side bezel bending structure. Also, the display panel 110 including the periphery of the display area and the bending portion provided by bending of the non-display area may have a structure where a one-side active bending structure or a both-side active bending structure.

The display device 100 according to some embodiments of the present disclosure may further include a functional film 130 disposed on the display panel 110.

The functional film 130 may be attached on the display panel 110 using a transparent adhesive member. For example, the transparent adhesive member may include a pressure sensitive adhesive (PSA), an optical clear adhesive (OCA), or an optical clear resin (OCR), but embodiments of the present disclosure are not limited thereto.

According to some embodiments, the functional film 130 may include an anti-reflection layer (or an anti-reflection film) for preventing reflection of external light to enhance outdoor visibility and a contrast ratio with respect to an image displayed by the display panel 110. For example, the anti-reflection layer may include a circular polarization layer (or a circular polarization film) which prevents external light, reflected by thin film transistors (TFT)s and/or lines disposed on the pixel array layer of the display panel 110, from traveling to the outside.

According to some embodiments of the present disclosure, the functional film 130 may further include a light path control layer (or a light path control film) for controlling a path of light output from the pixel array layer of the display panel 110 to the outside. The light path control layer may include a stacked structure where a high refraction layer and a low refraction layer are alternately stacked and may change a path of light incident from the pixel array layer to minimize a color shift phenomenon based on a viewing angle, and for example, the low refraction layer may be disposed on an uppermost layer of the light path control layer, but embodiments of the present disclosure are not limited thereto.

The display device 100 according to some embodiments of the present disclosure may further include a touch electrode portion for a user interface using a user touch. The touch electrode portion may be disposed between the display panel 110 and the functional film 130, or may be embedded into the display panel 110 based on an in-cell touch type. For example, the touch electrode portion based on the in-cell touch type may include mutual capacitance type touch electrodes or self-capacitance type touch electrodes.

The display apparatus according to an embodiment of the present disclosure may further include a supporting member 300. The supporting member 300 may be disposed on a rear surface of the display device 100. For example, the supporting member 300 may support or fix the vibration device 500.

The supporting member 300 may be referred to as the other term such as a cover bottom, a plate bottom, a back cover, a set cover, a back cover, a rear surface frame, a base frame, a metal frame, a metal chassis, a chassis base, a chassis, or m-chassis. Therefore, the supporting member 300 may be implemented as an arbitrary type frame or a plate structure disposed on a rear surface of the display device 100. The rear surface of the display device 100 may be referred to as one surface, a rear surface, or lower (or bottom) surface, but embodiments of the present disclosure are not limited thereto.

According to some embodiments of the present disclosure, the supporting member 300 may include a first supporting member 310 and a second supporting member 350.

The first supporting member 310 may be disposed at the rear surface of the display device 100. The first supporting member 310 may cover the display device 100 (for example, a rear surface of the display panel 110). The first supporting member 310 may be spaced apart from a rearmost surface of the display device 100 with a gap space GS therebetween. The first supporting member 310 may support or fix the vibration device 500. The first supporting member 310 may protect the rear surface of the display device 100 from an external impact.

According to some embodiments of the present disclosure, the first supporting member 310 may cover the rearmost surface of the display device 100. For example, the first supporting member 310 may be a plate member which covers the whole rear surface of the display device 100. For example, an edge or a corner of the first supporting member 310 may have an inclined shape or a curved shape through a chamfer process or a corner rounding process.

According to some embodiments of the present disclosure, the first supporting member 310 may include a glass material, a metal material, or a plastic material. For example, the first supporting member 310 including a glass material may include one or more of sapphire glass and gorilla glass or a stacked structure (or a bonded structure) thereof, but embodiments of the present disclosure are not limited thereto. For example, the first supporting member 310 including a metal material may include one or more of aluminum (Al), an Al alloy, a magnesium (Mg), a Mg alloy, an iron (Fe)-nickel (Ni), and stainless steel, or may include an alloy material thereof or a bonded (or a laminated) structure.

The second supporting member 350 may be disposed at a rear surface of the first supporting member 310 and may cover the rear surface of the first supporting member 310.

According to some embodiments of the present disclosure, the second supporting member 350 may be a plate member which covers the whole rear surface of the first supporting member 310. For example, an edge or a corner of the second supporting member 350 may have an inclined shape or a curved shape through a chamfer process or a corner rounding process.

According to some embodiments of the present disclosure, the second supporting member 350 may be formed of one or more of a glass material, a metal material, or a plastic material. The second supporting member 350 may be formed of a material differing from that of the first supporting member 310. For example, the second supporting member 350 may be formed of a glass material, and the first supporting member 310 may be formed of a metal material such as aluminum (Al) which is good in thermal conductivity.

For example, the display apparatus may be improved in appearance design, based on the second supporting member 350 which is disposed at a rearmost surface and includes a glass material, and a rear surface of the display apparatus may use the first supporting member 310 including a metal material as a mirror surface.

According to some embodiments of the present disclosure, the second supporting member 350 according to an embodiment of the present disclosure may have a thickness, which is the same as or relatively thinner than the first supporting member 310. For example, to more stably support the vibration device 500 and reduce a weight of the display apparatus, the first supporting member 310 may have a thickness which is relatively thicker than the second supporting member 350.

One or more vibration devices 500 may generate a sound PVS using the display device 100 as a vibration plate. For example, the at least one vibration device 500 may generate a sound PVS using the display panel 110 as a vibration plate.

The display apparatus according to some embodiments of the present disclosure may include one or more vibration device which is disposed at a rear center portion (or center region) of the display device 100. For example, the one or more vibration device may vibrate the rear center portion of the display device 100 to generate the sound PVS based on a vibration of the display device 100 in the forward direction FD of the display device.

According to another embodiment of the present disclosure, the display apparatus may include a first vibration device 500-1 disposed at a first region (or a left region) of the display device 100 and a second vibration device 500-2 disposed at a second region (or a right region) of the display device 100, with respect to the rear center portion of the display device 100. For example, the first vibration device 500-1 may vibrate a first rear region of the display device 100 to generate a sound PVS based on a vibration of the first region of the display device 100. The second vibration device 500-2 may vibrate a second rear region of the display device 100 to generate a sound PVS based on a vibration of the second region of the display device 100. The display apparatus according to another embodiment of the present disclosure may output a two-channel sound based on left-right sound separation by the first and second vibration devices 500-1 and 500-2. For example, the first vibration device 500-1 may be configured to output a left sound, and the second vibration device 500-2 may be configured to output a right sound.

According to another embodiment of the present disclosure, a connection member 333 may be disposed between the supporting member 300 and one or more the vibration device 500. For example, the supporting member 300 and the one or more vibration device 500 may be connected to each other by the connection member 330. For example, the connection member 330 may be a fourth connection member 333. The fourth connecting member 333 may include a screw and a nut. One or more vibration devices 500 may be disposed at the support member 300 by the fourth connection member 333.

According to another embodiment of the present disclosure, a first adhesive member 402 may be disposed between the display panel 110 and one or more the vibration device 500. For example, the display panel 110 and the one or more vibration devices 500 may be attached to each other by the first adhesive member 402. The first adhesive member 402 may include may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. As illustrated in FIG. 2, the first adhesive member 402 may be formed at a portion with the one or more vibration devices 500 attached thereon. However, embodiments of the present disclosure are not limited thereto. For example, the first adhesive member 402 may be formed on a whole rear surface of the display panel 110. For example, the first adhesive member 402 may be formed on a whole surface between the rear surface of the display panel 110 and the one or more vibration devices 500.

The display apparatus according to an embodiment of the present disclosure may further include a middle frame 700.

The middle frame 700 may be disposed between a rear edge (or rear periphery) of the display device 100 and a front edge (or front periphery) of the supporting member 300. The middle frame 700 may support an edge (or a periphery) of each of the display device 100 and the supporting member 300. The middle frame 700 may surround at least one or more a side surface among each of the display device 100 and the supporting member 300. The middle frame 700 may provide a gap space GS between the display device 100 and the supporting member 300. The gap space GS may be referred to as an air gap, a vibration space, or a vibration device disposition space, but embodiments of the present disclosure are not limited thereto.

According to some embodiments of the present disclosure, the middle frame 700 may include a metal material or a plastic material. For example, the middle frame 700 may be formed of a metal material, for improving a side appearance design of the display apparatus and protecting side surfaces of the display apparatus.

According to some embodiments of the present disclosure, the middle frame 700 may be connected or coupled to a rear edge (or a rear periphery) of the display device 100 by a third adhesive member 707. The middle frame 700 may be connected or coupled to a front edge (or a front periphery) of the supporting member 300 by a fourth adhesive member 708. A front surface of the supporting member 300 may be referred to as the other surface, a second surface, or an upper surface, but embodiments of the present disclosure are not limited thereto. Also, the middle frame 700 may be referred to as a middle cabinet, a middle cover, or a middle chassis, but embodiments of the present disclosure are not limited thereto. Or, the middle frame 700 may be integrally formed with the second supporting member 350, and may be referred to as a second supporting member 350.

The middle frame 700 according to some embodiments of the present disclosure may include a supporting portion 710 and a sidewall portion 730. The supporting portion 710 may be a first portion, and the sidewall portion 730 may be a second portion, but embodiments of the present disclosure are not limited thereto.

According to some embodiments of the present disclosure, the supporting portion 710 may have a single tetragonal (e.g., quadrilateral) picture frame structure, but embodiments of the present disclosure are not limited thereto. For example, the supporting portion 710 may be between the rear edge of the display device 100 and the front edge of the supporting member 300 to have a plurality of division bar shapes.

The supporting portion 710 may be disposed between the rear edge (or the rear periphery) of the display device 100 and the front edge (or the front periphery) of the supporting member 300, and thus, may provide a gap space GS between the display device 100 and the supporting member 300. A front surface of the supporting portion 710 may be coupled or connected to the rear edge of the display device 100 by the third adhesive member 707, and a rear surface of the supporting portion 710 may be coupled or connected to the front edge of the supporting member 300 by the fourth adhesive member 708. The supporting portion 710 may have a thickness (or height) corresponding to a total thickness of the vibration device 500. For example, a thickness of the supporting portion 710 may be adjusted based on a thickness of the vibration device 500 between the display device 100 and the supporting member 300, a thickness of the third adhesive member 707, and a thickness of the fourth adhesive member 708.

The third adhesive member 707 may be between the rear edge of the display device 100 and a front surface of the supporting portion 710. For example, the third adhesive member 707 may be an adhesive resin, a double-sided tape, or a double-sided adhesive foam pad, but embodiments of the present disclosure are not limited thereto.

The fourth adhesive member 708 may be between the front edge of the supporting member 300 and a rear surface of the supporting part 710. For example, the fourth adhesive member 708 may be an adhesive resin, a double-sided tape, or a double-sided adhesive foam pad, but embodiments of the present disclosure are not limited thereto. The fourth adhesive member 708 may be formed of a material differing from that of the third adhesive member 707.

The sidewall portion 730 may be vertically coupled or connected to an outer surface of the supporting portion 710 in parallel with a thickness direction Z of the display apparatus. The sidewall portion 730 may surround all of an outer surface (or an outer sidewall) of the display device 100 and an outer surface (or an outer sidewall) of the supporting member 300, thereby protecting the outer surface of each of the display device 100 and the supporting member 300 and improving an appearance design of a side surface of the display apparatus. The middle frame 700 according to some embodiments of the present disclosure may be coupled or connected to each other such that the supporting portion 710 and sidewall portion 730 form a single body, and thus, may have a picture frame structure having "|"-shaped cross-sectional surface.

The display apparatus according to an embodiment of the present disclosure may include an adhesive member instead of the middle frame 700.

The adhesive member may be between the rear edge of the display device 100 and the front edge of the supporting member 300 and may provide the gap space GS between the display device 100 and the supporting member 300. The adhesive member may have a thickness (or a height) corresponding to a total thickness of the vibration device 500. For example, a thickness of the adhesive member may be adjusted based on the thickness of the vibration device 500 between the display device 100 and the supporting member 300. The adhesive member may perform the same function as that of the supporting portion 710 of the middle frame 700.

When the display apparatus includes the adhesive member instead of the middle frame 700, the supporting member 300 may include a sidewall cover portion which surrounds all of an outer surface (or an outer sidewall) of the display device 100, an outer surface (or an outer sidewall) of the supporting member 300, and an outer surface (or an outer sidewall) of the adhesive member.

The sidewall cover portion may extend from an end of the second supporting member 350 and may be vertically bent to be parallel to a thickness direction Z of the display apparatus. According to some embodiments of the present disclosure, the sidewall cover portion may have a single sidewall structure or a hemming structure. The hemming structure may be a structure where ends of an arbitrary member is bent in a curved shape to overlap each other, or are spaced apart from each other in parallel. For example, the sidewall cover portion having the hemming structure may include a first sidewall, which extends from the end of the second supporting member 350 and is vertically bent to be parallel to the thickness direction Z of the display apparatus, and a second sidewall which extends from an end of a first sidewall and is bent to be parallel to the first sidewall. The second sidewall may be between the outer surface of the display device 100 and the first sidewall. For example, the second sidewall may not be exposed at an outermost side surface of the display apparatus and may be covered by the first sidewall, thereby improving a side appearance design of the display apparatus.

Therefore, the display apparatus according to an embodiment of the present disclosure may output a sound PVS to the forward region FD based on a vibration of the display device 100 (for example, the display panel 110) caused by a vibration of the one or more vibration device 500 disposed between the display device 100 and the supporting member 300, thereby enhancing an immersion experience of a viewer watching an image displayed by the display apparatus.

Moreover, in the display apparatus according to an embodiment of the present disclosure, since a sound PVS is generated based on a vibration of the display device 100 (for example, the display panel 110), a separate speaker may not be provided, thereby enhancing a design of a set apparatus and a degree of freedom in disposition of elements.

Figure 3A:
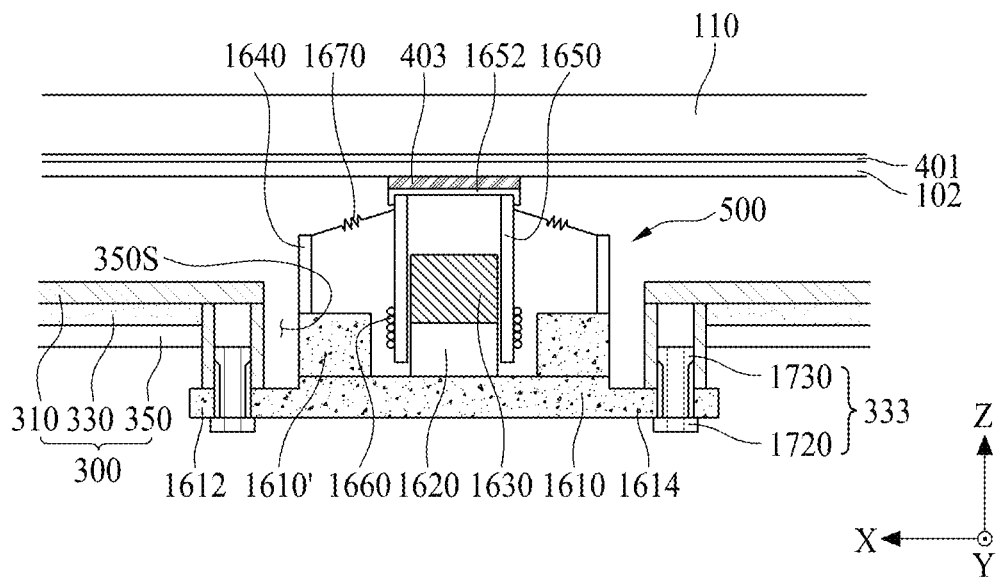
FIGS. 3A to 3C illustrate a vibration device according to an embodiment of the present disclosure.
Figure 3B:
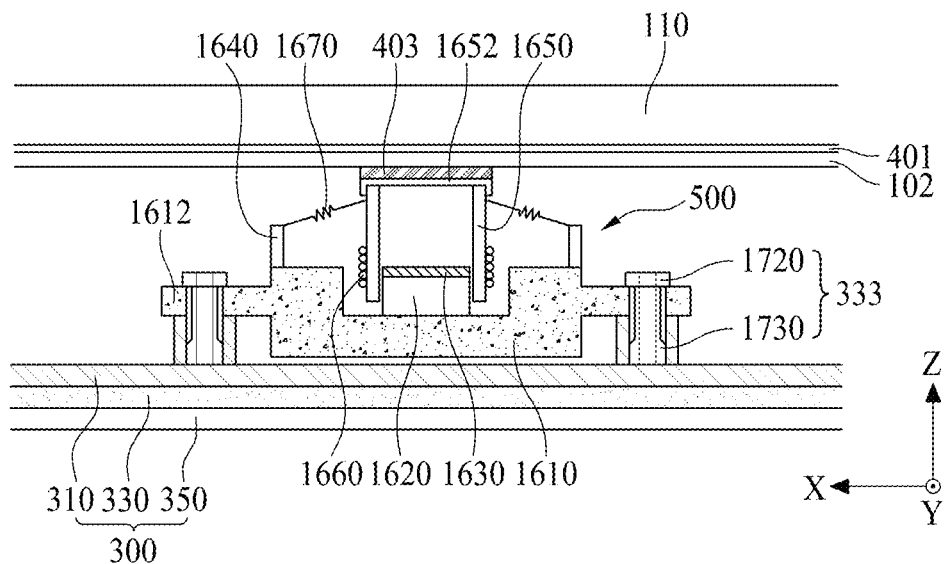
Figure 3C:
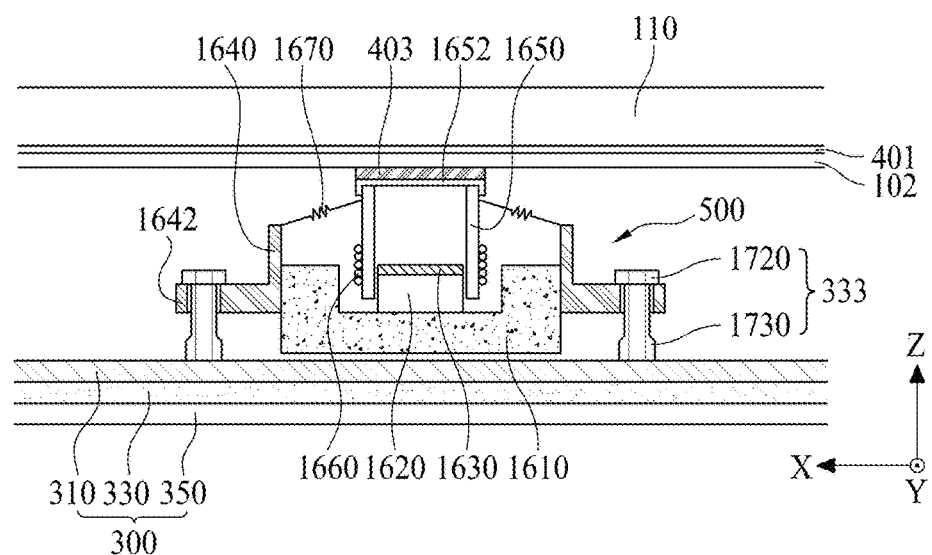

FIGS. 3A to 3C illustrate a vibration device according to an embodiment of the present disclosure.

With reference to FIGS. 3A to 3C, one or more vibration device 500 may include a bobbin 1650 disposed around a magnet 1620, and a coil 1660 disposed around the bobbin 1650.

For example, the magnet 1620 may be disposed on the first plate 1610. The magnet 1620 may use a sintered magnet of barium ferrite, and the magnet 1620 may be formed of iron (III) oxide ($Fe_2O_3$), barium carbonate ($BaCO_3$; "witherite"), neodymium (Nd) magnet, strontium ferrite ($Fc_{12}O_{19}Sr$) with improved magnetic component, an alloy cast magnet including aluminum (Al), nickel (Ni), and cobalt (Co), and/or the like. As another embodiment, the neodymium magnet may be neodymium-iron-boron (Nd—Fe—B). However, embodiments of the present disclosure are not limited to these materials or examples.

A center pole 1630 may be disposed on the magnet 1620. The center pole 1630 may be referred to as pole pieces. As another embodiment, pole pieces may be further disposed on the center pole 1630.

The bobbin 1650 may surround around the magnet 1620. For example, the bobbin 1650 may be disposed on the first plate 1610. The bobbin 1650 may have a circular shape or an oval shape, but embodiments of the present disclosure are not limited thereto. The oval shape may have an elliptical shape, a rectangular shape with rounded corners, or non-circular curved shape having a width different from its height, but an embodiment of the present disclosure is not limited thereto. For example, in the bobbin 1650 having the oval shape, a ratio of a long-axis diameter to a short-axis diameter may be configured to 1.3:1 to 2:1. The bobbin 1650 having the oval shape may more improve a sound of a high-pitched sound band than a circular shape and may decrease the occurrence of heat caused by a vibration, and thus, may have an excellent heat dissipation characteristic.

The coil 1660 according to some embodiments of the present disclosure may be wound to surround an outer circumference surface of the bobbin 1650 and may be supplied with a sound-generating current (or a voice current) from the outside. The coil 1660 may be lowered or raised along with the bobbin 1650. The coil 1660 may be referred to as a voice coil. When a current is applied to the coil 1660, a whole portion of the bobbin 1650 may move upward and downward according to Fleming's left hand rule based on an application magnetic field generated around the coil 1660 and an external magnetic field generated around the magnet 1650, and a sound PVS or a sound wave may be generated based on a vibration of the display device 100 caused by a vertical movement (or vibration) of the bobbin 1650.

The bobbin 1650 according to some embodiments of the present disclosure may be disposed on the first plate 1610 to surround around the magnet 1620. According to an embodiment of the present disclosure, as the coil 1660 is wound to surround an outer circumference surface of the bobbin 1650, heat occurring in the coil 1660 may be transferred to the bobbin 1650, and the coil 1660 may include a material which is relatively good in heat dissipation characteristic, for decreasing an image quality defect affecting the display panel 110 due to the heat of the bobbin 1650.

Since the bobbin 1650 according to some embodiments of the present disclosure vibrates upward and downward, an eccentric vibration (or a horizontal vibration) may occur due to a vertical (or upward and downward) vibration, and an eccentric vibration of the bobbin 1650 may be affected by a weight of the bobbin 1650. A weight of the bobbin 1650 may be affected by a weight of the coil 1660. Therefore, when a weight of the coil 1660 is reduced, the eccentric vibration of the bobbin 1650 may decrease. Therefore, considering heat transferred to the bobbin 1650 and the eccentric vibration of the bobbin 1650, the coil 1660 may have a relatively good heat dissipation characteristic because thermal conductivity thereof is better than copper which is a material of a general coil, and may include an aluminum (Al) material which has a relatively good heat dissipation characteristic and is relatively lightweight compared to copper.

Moreover, in aluminum, since oxide is formed in air, welding may not be easy in manufacturing the vibration device 500, and thus, the coil 1660 according to an embodiment of the present disclosure may include an Al layer (or a first metal layer) for dissipating heat and a metal outer layer (a metal covering layer or a second metal layer) surrounding the Al layer. The metal outer layer may include one of copper (Cu), sliver (Ag), and gold (Au). For example, the coil 1660 may be a copper clad aluminum wire by which copper is covered. The metal outer layer may be formed as a thin film type outside the first metal layer, and thus, may not greatly affect an increase in weight of the coil 1660. Therefore, a weight of the coil 1660 according to an embodiment of the present disclosure may decrease by about 60% compared to a coil including only Cu or a Cu wire.

According to some embodiments of the present disclosure, the bobbin 1650 may include a structure including a material obtained by processing pulp or paper, Al or magnesium (Mg) or an alloy thereof, or synthetic resin such as polyimide. For example, the bobbin 1650 may be implemented with a polyimide film which is relatively good in heat dissipation characteristic and is relatively lightweight, for preventing a local image quality defect of the display panel 110 caused by heat occurring in the coil 1660.

The polyimide film may have physical properties which are not changed within a wide temperature range from −273° C. to 400° C. and may have a heat resistance, electrical insulation, flexibility, and nonflammable. Also, since the polyimide film is good in thermal and mechanical strength, the polyimide film may enhance the reliability of the bobbin 1650, and the occurrence of heat caused by a vibration of the bobbin 1650 may be reduced based on an excellent heat dissipation characteristic. For example, the polyimide film may be KAPTON and may be a condensation of pyromellitic dianhydride and 4,4'-oxydianiline, but embodiments of the present disclosure are not limited thereto.

The center pole 1630 may be accommodated or inserted into the bobbin 1650 and may guide raising or lowering of the bobbin 1650. For example, since the center pole 1630 is accommodated or inserted into the bobbin 1650, an outer circumference surface of the center pole 1630 may be surrounded by the bobbin 1650. The center pole 1630 may be referred to as an elevation guider or pole pieces, but embodiments of the present disclosure are not limited thereto.

A second plate 1610' may be disposed on the first plate 1610. The second plate 1610' may be yoke, but embodiments of the present disclosure are not limited thereto. One or more among the first plate 1610 and the second plate 160' may be formed of a magnetic material such as iron (Fe), but embodiments of the present disclosure are not limited thereto.

A frame 1640 may be disposed at outside around the second plate 1610'. The damper 1670 may be disposed between the frame 1640 and the bobbin 1650. The frame 1640 according to some embodiments of the present disclosure may be provided at the front edge of the second plate 1610' to have a certain height and the same shape as that of the bobbin 1650. According to another embodiment of the present disclosure, the frame 1640 may include a hollow portion that is provided at the front edge of the second plate 1610' to have a certain height and the same shape as that of the bobbin 1650.

The damper 1670 may be connected between the frame 1640 and the vibration device. For example, the damper 1670 may be connected between the frame 1640 and the bobbin 1650. The damper 1670 may be referred to as a spider, a suspension, or an edge, but embodiments of the present disclosure are not limited thereto.

One end or one portion of the damper 1670 according to some embodiments of the present disclosure may be connected to the frame 1640, and the other end or the other portion of the damper 1670 may be connected to an upper outer surface of the bobbin 1650. The damper 1670 may have a creased structure between the one end and the other end thereof and may be contracted and relaxed based on a vertical motion of the bobbin 1650 to control a vibration of the bobbin 1650. The damper 1670 may be connected between the bobbin 1650 and the frame 1640 and may limit a vibration distance of the bobbin 1650 with a restoring force. For example, when the bobbin 1650 vibrates by a certain distance or more or vibrates by a certain distance or less, the bobbin 1650 may be restored to an original position by the restoring force of the damper 1670.

The one or more vibration device 500 according to some embodiments of the present disclosure may further include a bobbin ring 1652.

The bobbin ring 1652 may be disposed at a front surface (or a front end portion) of the bobbin 1650. The bobbin ring 1652 may transfer a rising and lowering motion (or vibration) of the bobbin 1650 to the rear surface of the display device 100. The bobbin ring 1652 according to some embodiments of the present disclosure may have a ring shape disposed at the front surface of the bobbin 1650, a disc shape (or a circular plate shape) covering the whole front surface of the bobbin 1650, or a cap shape surrounding the front surface and the upper outer surface of the bobbin 1650, but the shapes are not limited thereto. For example, the bobbin ring 1652 may be referred to as a bobbin protection member, but embodiments of the present disclosure are not limited thereto.

In the display apparatus according to an embodiment of the present disclosure, the display device 100 may further include a heat dissipation member 102.

The heat dissipation member 102 may be disposed between the one or more vibration device 500 and the display device 100. The heat dissipation member 102 according to an embodiment of the present disclosure may be attached on a rear surface of the display device 100 to overlap the vibration device 500. A first adhesive member 401 may be disposed between the heat dissipation member 102 and the display panel 110. For example, the heat dissipation member 102 may be attached on the display panel 110 by the first adhesive member 401. The first adhesive member 401 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. A second adhesive member 403 may be disposed between the heat dissipation member 102 and the vibration device 500. For example, the heat dissipation member 102 may be attached on the vibration device 500 by the second adhesive member 403. For example, the second adhesive member 403 may be disposed between the heat dissipation member 102 and the bobbin ring 1652. The heat dissipation member 102 may be attached on the bobbin ring 1652 by the second adhesive member 403. The second adhesive member 403 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. As illustrated in FIGS. 3A to 3C, the second adhesive member 403 may be formed at a portion with the heat dissipation member 102 attached thereon. However, embodiments of the present disclosure are not limited thereto, the second adhesive member 403 may be formed at a whole rear surface of the display panel 110 or the heat dissipation member 102. For example, the second adhesive member 403 may be formed at a whole surface between the rear surface of the heat dissipation member 102 and the vibration device 500, or a whole surface between the rear surface of the display panel 110 and the vibration device 500. For example, the second adhesive member 403 may be formed on a whole surface between the rear surface of the heat dissipation member 102 and the bobbin ring 1652, or a whole surface between the rear surface of the display panel 110 and the bobbin ring 1652.

Because the heat dissipation member 102 is disposed on the rear surface of the display device 100 to overlap the vibration device 500, heat occurring in driving of the vibration device 500 may be diffused toward the display device 100, thereby preventing the performance of the vibration device 500 from being reduced by heat. Also, with respect to a center portion of the vibration device 500, the heat dissipation member 102 may have a size which is relatively greater than or equal to the vibration device 500, and thus, heat occurring in driving of the vibration device 500 may be diffused to a wide region, thereby preventing heat from being intensively transferred to a local region of the display device 100 overlapping the vibration device 500. Accordingly, the local non-uniform luminance of the display device 100 may be prevented or minimized.

According to some embodiments of the present disclosure, the heat dissipation member 102 may include a metal material having high heat conductivity, and for example, may include one material of aluminum (Al), copper (Cu), silver (Ag), and magnesium (Mg) or an alloy thereof, but embodiments of the present disclosure are not limited thereto. The heat dissipation member 102 may be referred to as the other term such as a heat diffusion member, a heat diffusion sheet, a heat diffusion layer, a heat diffusion plate, a heat sink, a heat dissipation sheet, or a heat dissipation plate, but embodiments of the present disclosure are not limited thereto.

With reference to FIG. 3A, each of the one or more vibration device 500 may further include a diameter enlargement portion 1614. For example, the diameter enlargement portion 1614 and the first plate 1610 may be provided as one body. For example, the diameter enlargement portion 1614 may be integrally formed with the first plate 1610. The first plate 1610 of the vibration device 500 may not have a cylindrical or cylinder shape. One side of the first plate 1610 may include a protrusion portion having a diameter which is greater than the other portion of the first plate 1610. A protrusion portion region where a diameter thereof is enlarged may be referred to as the diameter enlargement portion 1614. The diameter enlargement portion 1614 may have a ring shape. An extension portion 1612 for the arrangement of the vibration device 500 may be formed at a portion of the diameter enlargement portion 1614.

A fourth connection member 333 may be disposed at the extension portion 1612. The fourth connection member 333 may include a screw 1720 and a nut 1730. For example, the nut 1730 may be disposed at the supporting member 300. The one or more vibration device 500 may be coupled to the second supporting member 350 by the nut 1730 and the screw 1720. Accordingly, the vibration device 500 may be accommodated into a supporting hole 350S which is provided in the second supporting member 350.

The nut 1730 may be, for example, a self-clinching nut. An example of the self-clinching nut may include PEM® nut, but embodiments of the present disclosure are not limited thereto. When the self-clinching nut is used, a vibration generated by the vibration device 500 may be absorbed by a portion of the self-clinching nut which is the nut 1730, and thus, a vibration transferred to the supporting member 300 may be reduced.

In FIGS. 3A to 3C, an example where the supporting member 300 includes the first supporting member 310 and the second supporting member 350 is described, but embodiments of the present disclosure are not limited thereto. For example, the supporting member 300 may include only the second supporting member 350.

FIG. 3B illustrates a vibration device having a thickness which is smaller than the vibration device of FIG. 3A.

With reference to FIG. 3B, a fourth connection member 333 may be disposed in a vibration device 500 so as to place the vibration device 500 inside (or an inner space) of the display apparatus. A first plate 1610 may include an extension portion 1612. The fourth connection member 333 may be disposed in the extension portion 1612 of the first plate 1610. For example, a screw tap may be formed by enlarging a thickness of the first plate 1610, and then, screwing may be performed. Examples of the screw tap may include a manual tap, a machine tap, a gas screw tap, and a master tap, but embodiments of the present disclosure are not limited thereto. For example, the fourth connection member 333 may be disposed in the supporting member 300. For example, the fourth connection member 333 may be disposed in a first supporting member 310. The fourth connection member 333 may include a screw 1720 and a nut 1730. The screw 1720 and the nut 1730 may be disposed in the supporting member 300, and the vibration device 500 may be disposed in the supporting member 300 by the screw 1720 and the nut 1730. For example, the nut 1730 may be a self-clinching nut. An example of the self-clinching nut may include PEM® nut, but embodiments of the present disclosure are not limited thereto.

The vibration device 500 may be coupled to the supporting member 300 by the nut 1730 by a press-fit scheme (or indentation method) without a supporting hole of the supporting member 300 (for example, a second supporting member 350). The press-fit scheme may use a saw-toothed press-fit scheme, but an embodiment of the present disclosure is not limited to a coupling scheme or shape. Therefore, the vibration device 500 may be disposed inside of the display apparatus. For example, the vibration device 500 may be disposed between the display panel 110 and the supporting member 300 by the fourth connection member 333. Therefore, a vibration device may be disposed inside of the display apparatus, and thus, a supporting hole of a supporting member may not be provided, thereby preventing the penetration of particles from the outside through the supporting hole of the supporting member. Also, the vibration device may not be exposed at a rear surface of the supporting member, and thus, a display apparatus having an aesthetic sensibility in external appearance may be provided, and preventing the damage of the vibration device. Also, the vibration device may be disposed inside of the display apparatus, and thus, a sound of a low-pitched sound band of the vibration device may be more enhanced.

With reference to FIG. 3C, a fourth connection member 333 may be disposed in a vibration device 500 so as to place the vibration device 500 inside of the display apparatus. A frame 1640 may include an extension portion 1642. The fourth connection member 333 may be disposed at the extension portion 1642 of the frame 1640. The fourth connection member 333 may include a screw 1720 and a nut 1730. The screw 1720 and the nut 1730 may be disposed in the supporting member 300, and the vibration device 500 may be disposed at the supporting member 300 by the screw 1720 and the nut 1730. For example, the nut 1730 may be a self-clinching nut. An example of the self-clinching nut may include PEM® nut, but embodiments of the present disclosure are not limited thereto.

For example, the vibration device 500 may be coupled to the supporting member 300 by the nut 1730 by the press-fit scheme (or indentation method) without a supporting hole of the supporting member 300. The press-fit scheme may use a saw-toothed press-fit scheme, but an embodiment of the present disclosure is not limited to a coupling scheme or shape. Therefore, the vibration device 500 may be disposed inside of the display apparatus. For example, the vibration device 500 may be disposed between the display panel 110 and the supporting member 300 by the fourth connection member 333. Therefore, a vibration device may be disposed inside of the display apparatus, and thus, a supporting hole of a supporting member may not be provided, thereby preventing the penetration of particles from the outside through the supporting hole of the supporting member. Also, the vibration device may not be exposed at a rear surface of the supporting member, and thus, a display apparatus having an aesthetic sensibility in external appearance may be provided, and preventing the damage of the vibration device. Also, the vibration device may be disposed inside of the display apparatus, and thus, a sound of the low-pitched sound band of the vibration device may be more enhanced.

Figure 4:
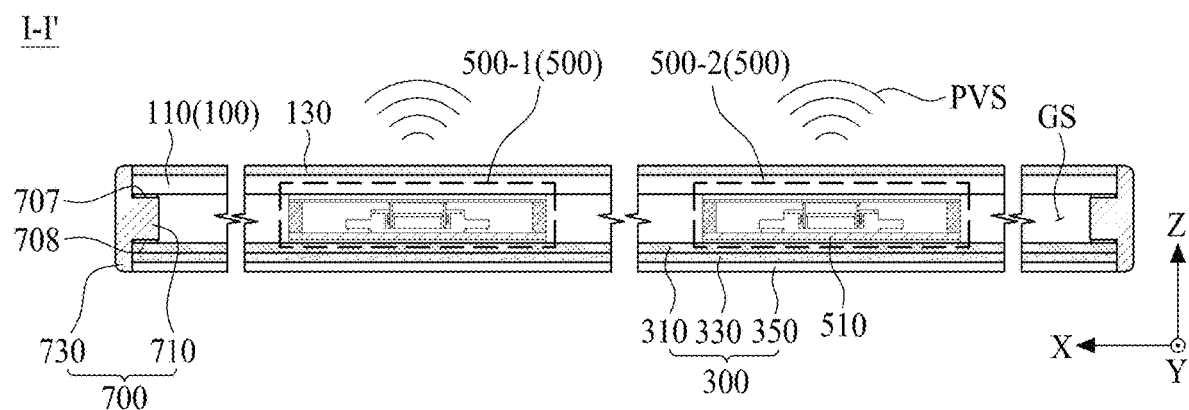
FIG. 4 is another cross-sectional view taken along line I-I' illustrated in FIG. 1.

FIG. 4 is another cross-sectional view taken along line I-I' illustrated in FIG. 1.

With reference to FIGS. 1 and 4, a display apparatus according to an embodiment of the present disclosure may include a display device 100, a supporting member 300, and one or more vibration device 500. Descriptions of the display device 100, the display panel 110, the supporting member 300, and a middle frame 700 are the same as descriptions given above with reference to FIGS. 1 and 2, and thus, repetitive descriptions of elements other than a partition and elements relevant thereto may be omitted or will be briefly given.

The one or more vibration device 500 according to an embodiment of the present disclosure may be disposed at a structure 510 disposed at the supporting member 300. The one or more vibration device 530 disposed at the structure 510 to vibrate the display device 100 may be a single-body structure or a single structure which is modularized as one element (or one component). For example, the structure 510 and the one or more vibration device 500 may be manufactured as a finished product such as a single-body structure or a single structure by a modularization process (or an assembly process) instead of an assembly process performed on a display apparatus. After the structure 510 and the one or more vibration device 500 are manufactured as a finished product, a gap space GS between the display device 100 and the supporting member 300 may be mounted or disposed by a relatively simple component mounting (or placing) process in an assembly process performed on a display apparatus. Accordingly, in a display apparatus according to an embodiment of the present disclosure, the assembly of the one or more vibration device 500 may be improved in a process of assembling modules, thereby enhancing a production yield rate.

According to some embodiments of the present disclosure, the first supporting member 310 and the second supporting member 350 may be coupled or connected to each other by a connection member 330. For example, the connection member 330 may be an adhesive resin, a double-sided tape, or a double-sided adhesive foam pad. The connection member 330 may have elasticity for absorbing an impact.

According to some embodiments of the present disclosure, the connection member 330 may be disposed at a whole region between the first supporting member 310 and the second supporting member 350.

According to some embodiments of the present disclosure, the connection member 330 may be provided in a mesh structure including an air gap between the first supporting member 310 and the second supporting member 350. For example, a portion of the air gap between the first supporting member 310 and the second supporting member 350 may be used as a disposition region of a signal transfer member or a cable connected to the vibration device 500.

The one or more vibration device 500 may generate a sound PVS using the display device 100 as a vibration plate. For example, the one or more vibration device 500 may generate a sound PVS using the display panel 110 as a vibration plate.

The display apparatus according to some embodiments of the present disclosure may include one or more vibration device 500 which is disposed at a rear center portion (or center region) of the display device 100. For example, the one or more vibration device 500 may vibrate the rear center portion of the display device 100 to generate the sound PVS based on a vibration of the display device 100.

According to another embodiment of the present disclosure, the display apparatus may include a first vibration device 500-1 disposed at a first region (or a left region) of the display device 100 and a second vibration device 500-2 disposed at a second region (or a right region) of the display device 100, with respect to the rear center portion of the display device 100. For example, the first vibration device 500-1 may vibrate a first rear region of the display device 100 to generate a sound PVS based on a vibration of the first region of the display device 100. The second vibration device 500-2 may vibrate a second rear region of the display device 100 to generate a sound PVS based on a vibration of the second region of the display device 100. The display apparatus according to another embodiment of the present disclosure may output a two-channel stereo sound based on left-right sound separation by the first and second vibration devices 500-1 and 500-2. For example, the first vibration device 500-1 may be configured to output a left sound, and the second vibration device 500-2 may be configured to output a right sound.

According to some embodiments of the present disclosure, the one or more vibration device 500 may be between the display device 100 and the supporting member 300 and may vibrate the display device 100 to generate a sound PVS. A rear surface of the one or more vibration device 500 may be covered by the supporting member 300, and thus, may be concealed without being directly exposed at an outermost rear surface of the display apparatus. Therefore, since the rear surface of the at least one vibration device 500 is covered by the supporting member 300, the display apparatus according to an embodiment of the present disclosure may have a clean back design where a rear surface or a portion of the at least one vibration device 500 is not exposed or is not seen by eyes of a user, thereby improving an appearance design of a rear surface.

According to some embodiments of the present disclosure, the structure 510 disposed at the supporting member 300 and the one or more vibration device 500 disposed at the structure 510 to vibrate the display device 100 may be a single-body structure or a single structure which is modularized as one element (or one component). For example, the one or more the vibration device 500 may be manufactured as a finished-product type such as a single-body structure or a single structure through a modularization process (or an assembly process) instead of an assembly process performed on the display apparatus, and then, the at least one vibration device 500 may be mounted or disposed at a gap space GS between the display device 100 and the supporting member 300 through a relatively simple part mounting (or placing) process in the assembly process performed on the display apparatus. Accordingly, in the display apparatus according to an embodiment of the present disclosure, the assembly of the one or more vibration device 500 may be improved in a process of assembling modules, thereby enhancing a production yield rate.

The one or more vibration device 500 according to an embodiment of the present disclosure may directly or indirectly vibrate the display device 100. For example, the one or more vibration device 500 may be directly connected to the display panel 110 and may directly vibrate the display panel 110. As another embodiment of the present disclosure, the one or more vibration device 500 may indirectly vibrate the display panel 110 by a vibration transfer member directly connected to the display panel 110. For example, the vibration transfer member may be implemented in a corresponding vibration device 500 or the display device 100. For example, the vibration transfer member implemented in the one or more vibration device 500 may be vibration transfer plate (or a vibration transfer sheet) contacting (or coupled to) the display device 100. Also, the vibration transfer member implemented in the display device 100 may be a backlight part disposed at the rear surface of the display panel 110, or may be a vibration transfer plate (or a heat dissipation plate) coupled to (or attached on) the rear surface of the display panel 110.

Therefore, the display apparatus according to an embodiment of the present disclosure may output a sound PVS to the forward region FD based on a vibration of the display device 100 (for example, the display panel 110) caused by a vibration of the one or more vibration device 500 disposed between the display device 100 and the supporting member 300, thereby enhancing an immersion experience of a viewer watching an image displayed by the display apparatus.

Moreover, in the display apparatus according to an embodiment of the present disclosure, since a sound PVS is generated based on a vibration of the display device 100, a separate speaker may not be provided, thereby enhancing a design of a set apparatus and a degree of freedom in disposition of speaker.

Moreover, since the vibration device 500 is disposed at the gap space GS between the display device 100 and the supporting member 300, a rear surface of the vibration device 500 may be covered by the supporting member 300, and thus, the display apparatus according to an embodiment of the present disclosure may have a clean back design where the rear surface or a portion of the vibration device 500 is not exposed or is not seen by a user, thereby improving an appearance design of a rear surface of the display apparatus.

Moreover, in the display apparatus according to an embodiment of the present disclosure, the structure 510 and the vibration device 500 may be modularized as one element and may be mounted at the gap space GS between the display device 100 and the supporting member 300 through a relatively simple component mounting process, and thus, the assemble of the vibration device 500 may be improved in an assembly process performed on the display apparatus, thereby enhancing a production yield rate.

FIGS. 5A to 5E illustrate a vibration device according to an embodiment of the present disclosure.

Figure 5A:
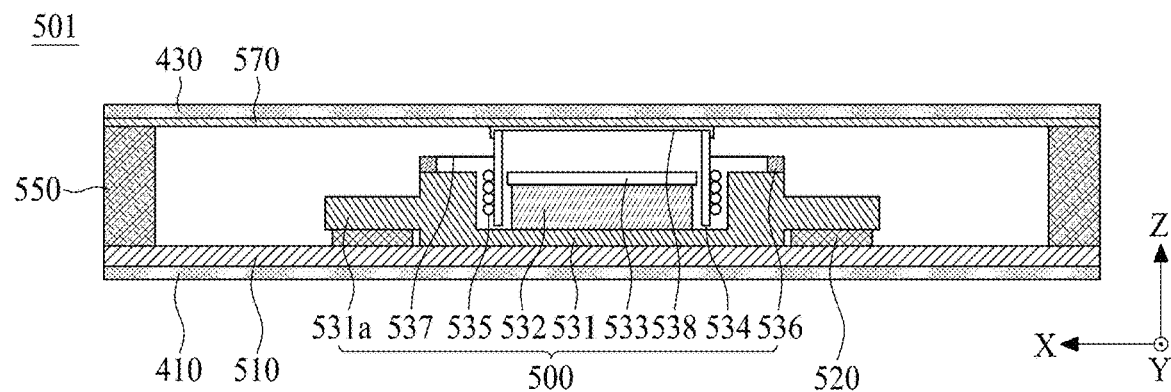
FIGS. 5A to 5E illustrate a vibration device according to an embodiment of the present disclosure.
Figure 5B:
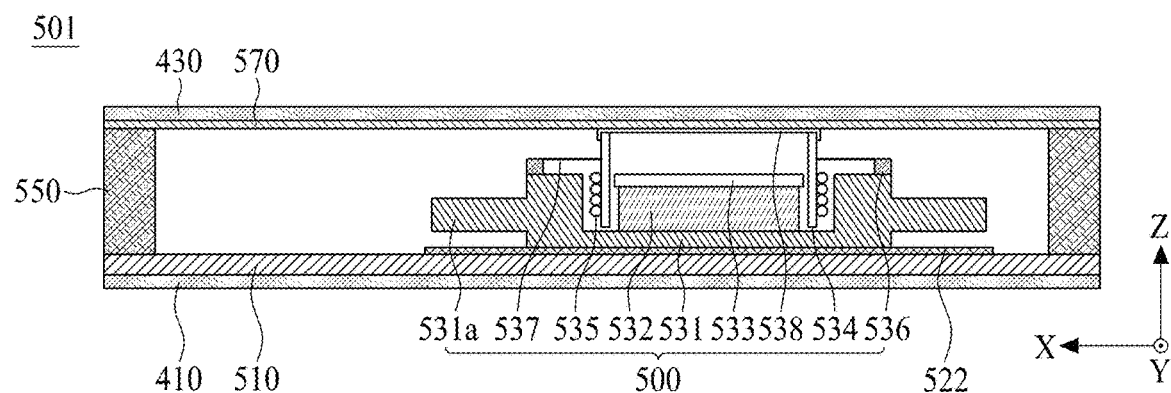
Figure 5C:
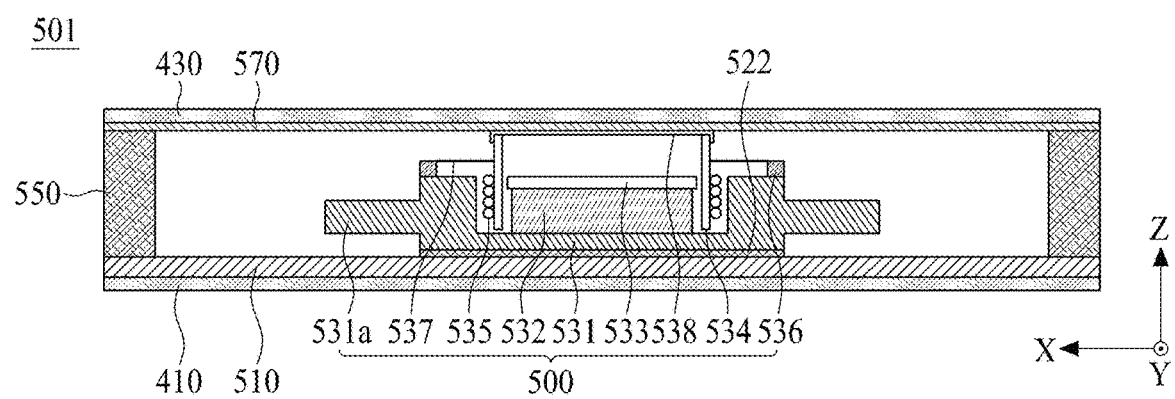
Figure 5D:
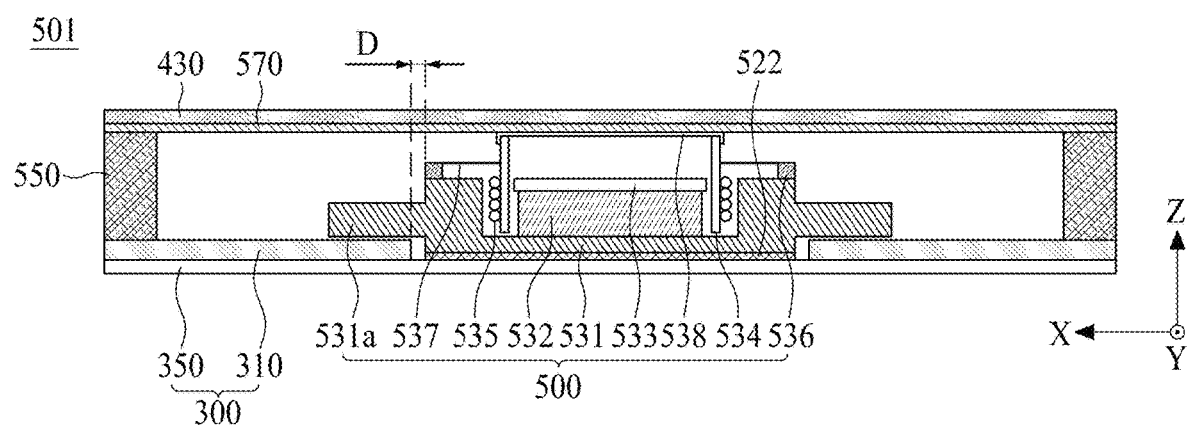
Figure 5E:
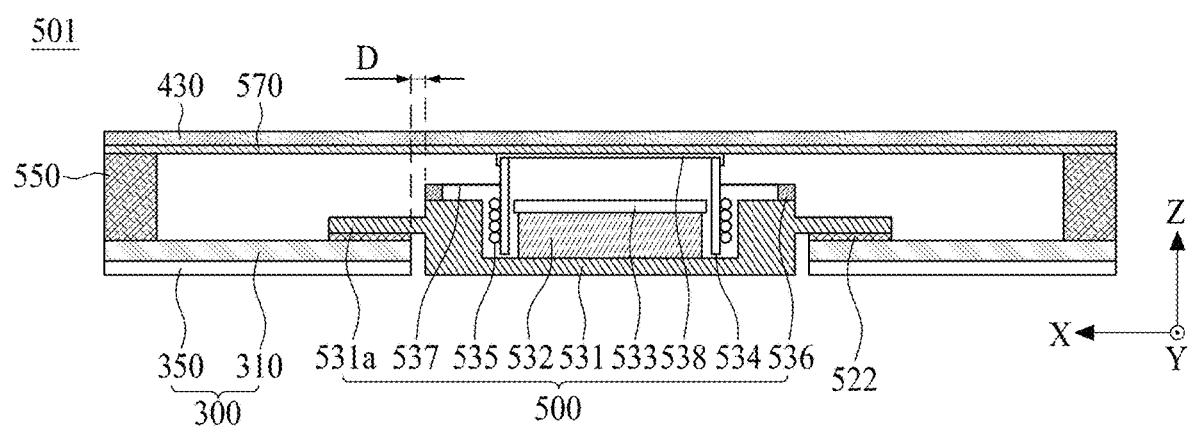

With reference to FIGS. 4 to 5E, a vibration generating device 501 according to an embodiment of the present disclosure may include structure 510 and a vibration device 500.

The structure 510 may be disposed at a supporting member 300. For example, the structure 510 may be disposed at the supporting member 300 and may fix or support the vibration device 500. According to some embodiments of the present disclosure, the structure 510 may be a metal plate which includes a metal material and has a plate shape. The structure 510 may be referred to as a supporting structure, a module structure, a plate mechanism, a base structure, a base mechanism, a module supporting frame, or a module supporting plate, but embodiments of the present disclosure are not limited thereto.

The structure 510 may be disposed at or fixed to the supporting member 300 by a first member 410 (or a module member). A rear surface of the structure 510 may be covered by the supporting member 300, and thus, may be concealed without being directly exposed at an outermost rear surface of a display apparatus. For example, the rear surface of the structure 510 may be fully covered by the supporting member 300, and thus, may be concealed without being directly exposed at the outermost rear surface of the display apparatus.

The first member 410 according to some embodiments of the present disclosure may be a double-sided adhesive member between the structure 510 and the supporting member 300. The double-sided adhesive member may be a double-sided tape or a double-sided foam tape, but embodiments of the present disclosure are not limited thereto. One surface (or a front surface) of the first member 410 may be coupled to or disposed at the rear surface of the structure 510, and the other surface (or a rear surface) of the first member 410 may be disposed at or fixed to the supporting member 300 (for example, a front surface of a first supporting member 310). For example, the other surface of the first member 410 may be fixed to or disposed on the front surface of the first supporting member 310 in a state where a lower protection sheet is delaminated therefrom.

According to some embodiments of the present disclosure, the first member 410 may be coupled (or modularized) to a rearmost surface of a vibration generating device 501 modularized as one element, for convenience of assembly between the vibration generating device 501 and a display device 100, and may be protected by a lower protection sheet. For example, the lower protection sheet may be referred to as a lower delamination sheet or a bottom liner, but embodiments of the present disclosure are not limited thereto.

According to some embodiments of the present disclosure, the double-sided adhesive member which is the first member 410 may further include a heat transfer material. The heat transfer material may quickly transfer heat, occurring in the vibration generating device 501, toward the supporting member 300, and thus, may dissipate the heat of the vibration generating device 501 toward the supporting member 300, thereby preventing or minimizing the local luminance non-uniformity of the display device 100 which occurs because heat occurring in driving of the vibration generating device 501 is locally transferred to a region of the display device 100 overlapping the vibration generating device 501. According to some embodiments of the present disclosure, the heat transfer material may include a conductive particle or a conductive layer, but embodiments of the present disclosure are not limited thereto. For example, the double-sided adhesive member including the heat transfer material may be referred to as a heat transfer tape or a heat dissipation tape, but embodiments of the present disclosure are not limited thereto.

The vibration device 500 may be disposed at the structure 510 and may vibrate the display device 100. For example, the vibration device 500 may be disposed at the structure 510 and may vibrate the display panel 110. An integration member 520 may be disposed between the vibration device 500 and the structure 510. For example, the vibration device 500 may be provided as one body with or disposed at the structure 510 by the integration member 520. For example, the integration member 520 may be referred to as a module integration member, but embodiments of the present disclosure are not limited thereto.

The vibration device 500 may include any sound device or a vibration generator that vibrates the display device 100 according to an electrical signal. For example, the vibration device 500 may be configured to vibrate the display device 100 with a current (or a voice current) applied thereto based on Fleming's Left-Hand Rule. The vibration device 500 may be referred to as a sound generating unit, a sound generating module, a vibration generating module, a vibration generating unit, an actuator, an exciter, or a transducer, but embodiments of the present disclosure are not limited thereto.

The vibration device 500 may include an actuator (or an exciter) disposed to contact a rear surface of the display device 100. For example, the vibration device 500 may include a base plate 531, a magnet 532, a center pole 533, a bobbin 534, a coil 535, an edge frame 536, and a damper 537. For example, the vibration device 500 may be a vibration device including a voice coil, but embodiments of the present disclosure are not limited thereto.

The base plate 531 may be disposed at or fixed to the structure 510 and may be a main body of the vibration device 500. The base plate 531 may support one or more among the magnet 532, the center pole 533, and the edge frame 536. The base plate 531 may include a metal material having magnetism like iron (Fe). The base plate 531 may be referred to as a lower plate, a base frame, or a yoke, but embodiments of the present disclosure are not limited thereto.

The base plate 531 may include a groove portion which accommodates the magnet 532 and the bobbin 534. For example, the groove portion may be provided concavely from an upper surface of the base plate 531 to have a circular shape.

The integration member 520 may be disposed between the base plate 531 and the structure 510. For example, the base plate 531 may be provided as one body with or disposed at the structure 510 by the integration member 520.

The integration member 520 may be an adhesive member. The adhesive member may be disposed between an extension portion (or a placement portion) 531a of the base plate 531 and the structure 510, and thus, the base plate 531 may be disposed at the g structure 510. The integration member 520 may be an adhesive or a double-sided tape, but embodiments of the present disclosure are not limited thereto.

According to another embodiment of the present disclosure, the integration member 520 may include a plurality of screws. The plurality of screws may pass through the extension portion 531a of the base plate 531 and may be fastened to the structure 510, and thus, the base plate 531 may be disposed at the structure 510.

According to another embodiment of the present disclosure, the integration member 520 may include a bolt and a nut. The nut may be disposed at or fixed to the structure 510 overlapping the extension portion 531a of the base plate 531. The bolt may pass through the extension portion 531a of the base plate 531 and may be fastened to the nut. The nut according to some embodiments of the present disclosure may be a self-clinching nut disposed at the structure 510, but embodiments of the present disclosure are not limited thereto. The self-clinching nut may be a PEM® nut.

The magnet 532, the center pole 533, the bobbin 534, and the coil 535 may be referred to as a magnetic circuit device or a magnetic vibration device, which is installed on the base plate 531 to vibrate the display device 100.

The magnetic circuit device according to some embodiments of the present disclosure may have an external or dynamic magnetic type structure where the magnet 532 is disposed outward from the coil 535, or may have an internal magnetic type or micro type structure where the magnet 532 is disposed inward from the coil 535. The vibration device 500 including the magnetic circuit device having the internal magnetic type structure may have a totally small size and a low leakage magnetic flux. The vibration device 500 according to some embodiments of the present disclosure may have an external magnetic type or internal magnetic type structure. Hereinafter, an example where the vibration device 500 has the internal magnetic type will be described. Descriptions of the magnet 532, the center pole 533, the bobbin 534, and the damper 537 may be the same as or similar to descriptions give above with reference to FIGS. 3A to 3C, and thus, their repetitive descriptions may be omitted or will be briefly given.

The magnet 532 according to some embodiments of the present disclosure may be inserted or accommodated into the groove portion of the base plate 531. The magnet 532 may be a permanent magnet capable of being inserted or accommodated into the bobbin 534. For example, the magnet 532 may be a permanent magnet having a cylindrical shape capable of being inserted or accommodated into the bobbin 534.

The bobbin 534 according to some embodiments of the present disclosure may be disposed on the base plate 531 and surround around the magnet 532. The center pole 533 may be accommodated or inserted into the bobbin 534 and may guide raising or lowering of the bobbin 534. The center pole 533 may be referred to as an elevation guider or pole pieces, but embodiments of the present disclosure are not limited thereto.

The edge frame 536 may be disposed at a front edge (or a front periphery) of the base plate 531 and may support the damper 537. The edge frame 536 according to some embodiments of the present disclosure may be provided at the front edge of the base plate 531 to have a certain height and the same shape as that of the bobbin 534. According to another embodiment of the present disclosure, the edge frame 536 may include a hollow portion that is provided at the front edge of the base plate 531 to have a certain height and the same shape as that of the bobbin 534.

The damper 537 may be disposed or connected between the edge frame 536 and the magnetic circuit device. For example, the damper 537 may be disposed or connected between the edge frame 536 and the bobbin 534. The damper 537 may be referred to as a spider, a suspension, or an edge, but embodiments of the present disclosure are not limited thereto.

Since the vibration device 500 is disposed between the display device 100 and the supporting member 300, the vibration device 500 should have a relatively thin thickness so as to thinly reduce a thickness of the display apparatus or slim the display apparatus, and due to this, when a height (or a thickness) of the bobbin 534 is reduced, a sound pressure level may be lowered. Therefore, so as to solve a problem where a sound pressure level is lowered due to a reduction in height of the bobbin 534, the inventors have designed a structure where an area of the damper 537 disposed near the bobbin 534 is wide. When an area of the damper 537 is enlarged, the inventors have recognized that a space where a line for applying a current to the coil 535 is disposed is narrowed, causing interference between the line and the damper 537. Therefore, through various experiments, the inventors have configured the damper 537 which is formed of a conductor and performs a function of the line.

The damper 537 according to some embodiments of the present disclosure may include a metal material electrically connected to the coil 535. For example, the damper 537 may be formed of stainless or copper (Cu), but embodiments of the present disclosure are not limited thereto.

The vibration device 500 according to some embodiments of the present disclosure may further include a bobbin protection member 538.

The bobbin protection member 538 may be disposed on a front surface (or a front end portion) of the bobbin 534 and may transfer a rising and lowering motion (or vibration) of the bobbin 534 to the rear surface of the display device 100. The bobbin protection member 538 according to some embodiments of the present disclosure may have a ring shape disposed on the front surface of the bobbin 534, a disc shape covering the whole front surface of the bobbin 534, or a cap shape surrounding the front surface and the upper outer surface of the bobbin 534, but the shapes are not limited thereto. For example, the bobbin protection member 538 may be referred to as a bobbin ring, but embodiments of the present disclosure are not limited thereto.

The vibration generating device 501 according to an embodiment of the present disclosure may further include a connection member 550.

The connection member 550 may be disposed between the structure 510 and the display device 100. The connection member 550 according to some embodiments of the present disclosure may be disposed between a front edge portion (or a front periphery portion) of the structure 510 and a rear edge portion (or a rear periphery portion) of the display device 100. For example, the connection member 550 may be a double-sided tape or a double-sided foam tape, but embodiments of the present disclosure are not limited thereto. The connection member 550 may provide a vibration space, surrounding the vibration device 500, between the structure 510 and the display device 100. The vibration space may be referred to as a sound pressure space, a sound box, a sound part, a resonance box, or a resonance part, but embodiments of the present disclosure are not limited thereto.

The vibration generating device 501 according to an embodiment of the present disclosure may further include a vibration transfer member 570.

The vibration transfer member 570 may be connected or coupled to each of the connection member 550 and the vibration device 500 and may vibrate based on a vibration of the vibration device 500 to transfer the vibration of the vibration device 500 to the display device 100.

According to some embodiments of the present disclosure, a rear edge portion or rear periphery portion of the vibration transfer member 570 may be connected or coupled to the connection member 550, and a rear center portion of the vibration transfer member 570 may be coupled to a front surface of the bobbin 534 of the vibration device 500, or may be coupled to the bobbin protection member 538 of the vibration device 500.

The vibration transfer member 570 according to some embodiments of the present disclosure may be formed of one or more materials among aluminum (Al), a magnesium (Mg), a Mg alloy, a Mg-lithium (Li) alloy, and an Al alloy, but embodiments of the present disclosure are not limited thereto. For example, the Mg alloy may include one or more materials of Al, zinc (Zn), and manganese (Mn). The Mg alloy may be a lightest material of metal materials usable as a vibration plate of a speaker, may have relatively high non-rigidity (stiffness/specific gravity) and relatively high vibration damping ability (ability to absorb and progressively reduce vibration), and may be good in dimension stability with respect to a variation of a temperature and the elapse of time.

According to some embodiments of the present disclosure, a second member 430 (or a module adhesive member) may be disposed between the vibration transfer member 570 and the display device 100. For example, the front surface of the vibration transfer member 570 may be coupled or connected to the rear surface of the display device 100 by the second member 430.

The second member 430 may be a double-sided adhesive member between the display device 100 and the vibration transfer member 570. The double-sided adhesive member may be a double-sided tape or a double-sided foam tape, but embodiments of the present disclosure are not limited thereto. One surface (or a front surface) of the second member 430 may be disposed on or coupled to the rear surface of the display device 100, and the other surface (or a rear surface) of the second member 430 may be disposed on or coupled to the front surface of the vibration transfer member 570. For example, the one surface of the second member 430 may be disposed on or fixed to the rear surface of the display device 100 in a state where an upper protection sheet is delaminated.

According to some embodiments of the present disclosure, the second member 430 may be coupled (or modularized) to an uppermost surface of the vibration generating device 501 modularized as one element, for convenience of assembly between the vibration generating device 501 and the display device 100, and may be protected by the upper protection sheet. For example, the upper protection sheet may be referred to as an upper delamination sheet or a top liner, but embodiments of the present disclosure are not limited thereto.

For example, all of the vibration transfer member 570 and the second member 430 may be omitted. For example, the vibration generating device 501 may include the upper protection sheet coupled or connected to each of the connection member 550 and the vibration device 500. The upper protection sheet may be coupled or connected to each of the connection member 550 and the vibration device 500 to cover the whole front surface of the vibration generating device 501, and thus, in a transfer process after a modularization process performed on the vibration generating device 501 modularized as one element or one component, each of the vibration device 500 and the connection member 550 of the vibration generating device 501 may be prevented from being externally exposed and penetration of particles such as dust into the vibration generating device 501 may be prevented. The upper protection sheet may be delaminated from the vibration generating device 501 immediately before an assembly process between the vibration generating device 501 and the display device 100.

Therefore, the vibration generating device 501 according to an embodiment of the present disclosure may be disposed between the display device 100 and the supporting member 300 in a state where the structure 510 and the vibration device 500 are modularized as one element, and thus, by the display device 100 as a vibration plate, a sound PVS based on a vibration of the display panel 110 may be output and an outermost rear surface of the display apparatus may not be exposed, thereby improving an appearance design of a rear surface of the display apparatus.

With reference to FIGS. 5B and 5C, an adhesive member 522 may be disposed between the vibration device 500 and the structure 510. The adhesive member 522 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. When the adhesive member 522 is provided, comparing with a screw or a nut and a bolt, an assembly process may be simplified and a hole for fastening with a screw or a nut and a bolt or an extension portion of a plate may not be needed, thereby providing a vibration device which is slimmer. A description of the vibration device is the same as description given above with reference to FIGS. 3A to 3C, and 5A, and thus, the repetitive description thereof may be omitted.

With reference to FIG. 5B, the vibration device 500 may be asymmetrically disposed. When the vibration device 500 is asymmetrically disposed, a dip phenomenon in a specific frequency may be reduced. For example, when a standing wave occurs in upper, lower, left, and right portions with respect to the vibration device 500, the dip phenomenon may occur in the upper, lower, left, and right portions, but when the vibration device 500 is asymmetrically disposed, a phenomenon where the standing wave occurs simultaneously in the upper, lower, left, and right portions may be reduced. Accordingly, the dip phenomenon may be reduced, and thus, a sound characteristic may be more enhanced.

With reference to FIGS. 5D and 5E, a supporting member 300 may include a first supporting member 310 and a second supporting member 350. Descriptions of the first supporting member 310 and the second supporting member 350 are the same as descriptions given above with reference to FIG. 2, and thus, the repetitive description thereof may be omitted.

With reference to FIG. 5D, the vibration device 500 may be accommodated into the first supporting member 310. For example, the vibration device 500 may be disposed at a removed portion of the first supporting member 310. The vibration device 500 may be attached at the second supporting member 350 by an adhesive member 522. The adhesive member 522 may be disposed between the vibration device 500 and the second supporting member 350. The first supporting member 310 and the vibration device 500 may be attached by the adhesive member 522. As another embodiment of the present disclosure, the adhesive member 522 may be further disposed between the vibration device 500 and the first supporting member 310. For example, the adhesive member 522 may be further disposed between an extension portion 531a of a base plate 531 and the first supporting member 310. The adhesive member 522 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. A portion of the first supporting member 310 may be removed and the vibration device 500 may be disposed at a removed region of the first supporting member 310, and thus, a thickness of the vibration device 500 may be reduced, thereby decreasing a thickness of a display apparatus. Also, when the vibration device 500 is disposed adjacent to the first supporting member 310 and/or the second supporting member 350, an abnormal vibration may occur when the vibration device 500 vibrates, and thus, the vibration device 500 may be spaced apart from the first supporting member 310 and/or the second supporting member 350 by an interval or a distance D. For example, the vibration device 500 may be spaced apart from the first supporting member 310 and/or the second supporting member 350 by the interval or the distance D. For example, the interval or the distance D may be 1 mm or more, but embodiments of the present disclosure are not limited thereto.

With reference to FIG. 5E, the vibration device 500 may be accommodated between the first supporting member 310 and between the second supporting member 350. For example, the base plate 531 of the vibration device 500 may have an external appearance. The base plate 531 of the vibration device 500 may be disposed between the first supporting member 310 and between the second supporting member 350. The base plate 531 of the vibration device 500 may be configured to penetrate the first supporting member 310 and the second supporting member 350. The adhesive member 522 may be disposed between the vibration device 500 and the first supporting member 310. For example, the adhesive member 522 may be disposed at the extension portion 531a of the base plate 531 and one side of the first supporting member 310. The adhesive member 522 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. Since the base plate 531 of the vibration device 500 is configured to have an external appearance, a thickness of the vibration device 500 may be reduced, thereby decreasing a thickness of the display apparatus. Also, when the vibration device 500 is disposed adjacent to the first supporting member 310 and the second supporting member 350, an abnormal vibration may occur when the vibration device 500 vibrates, and thus, the vibration device 500 may be spaced apart from the first supporting member 310 and the second supporting member 350 by an interval or a distance D. For example, the vibration device 500 may be spaced apart from the first supporting member 310 and the second supporting member 350 by the interval or the distance D. For example, the interval or the distance D may be 1 mm or more, but embodiments of the present disclosure are not limited thereto.

The one or more vibration device 500 may realize a 2-channel sound including a left sound and a right sound, and thus, the inventors have recognized that it is difficult to reproduce a sound at an upper portion and a lower portion. For example, a multi-channel sound may be reproduced by a sound bar, but a height channel may be an indirect sound which is generated by reproducing a sound through reflection by a ceiling, and thus, the inventors have recognized that there is a problem where it is difficult to reproduce a desired sound due to a position difference between a displayed screen and a sound image. Therefore, the inventors have performed various experiments for reproducing a real sound instead of an indirect sound. Through the various experiments, the inventors have invented a display apparatus having a new structure for realizing a real sound and a multi-channel sound. This will be described below.

FIGS. 6A to 6D illustrate a display apparatus including a vibration device according to an embodiment of the present disclosure.

Figure 6A:
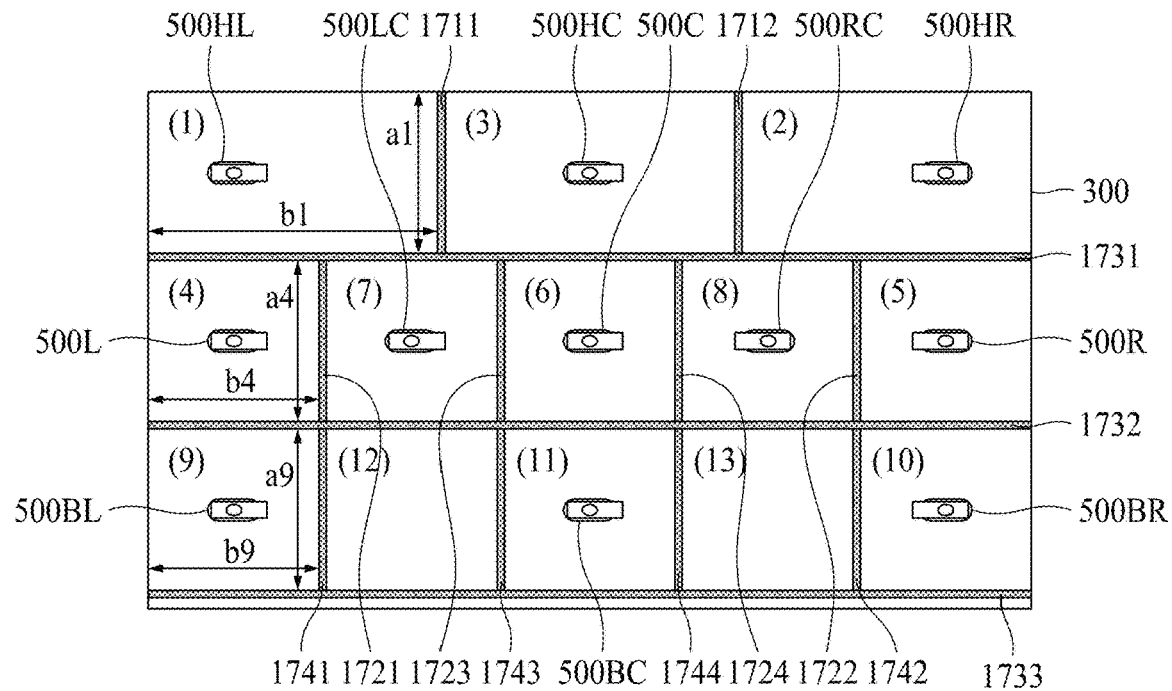
FIGS. 6A to 6D illustrate a display apparatus including a vibration device according to an embodiment of the present disclosure.
Figure 6B:
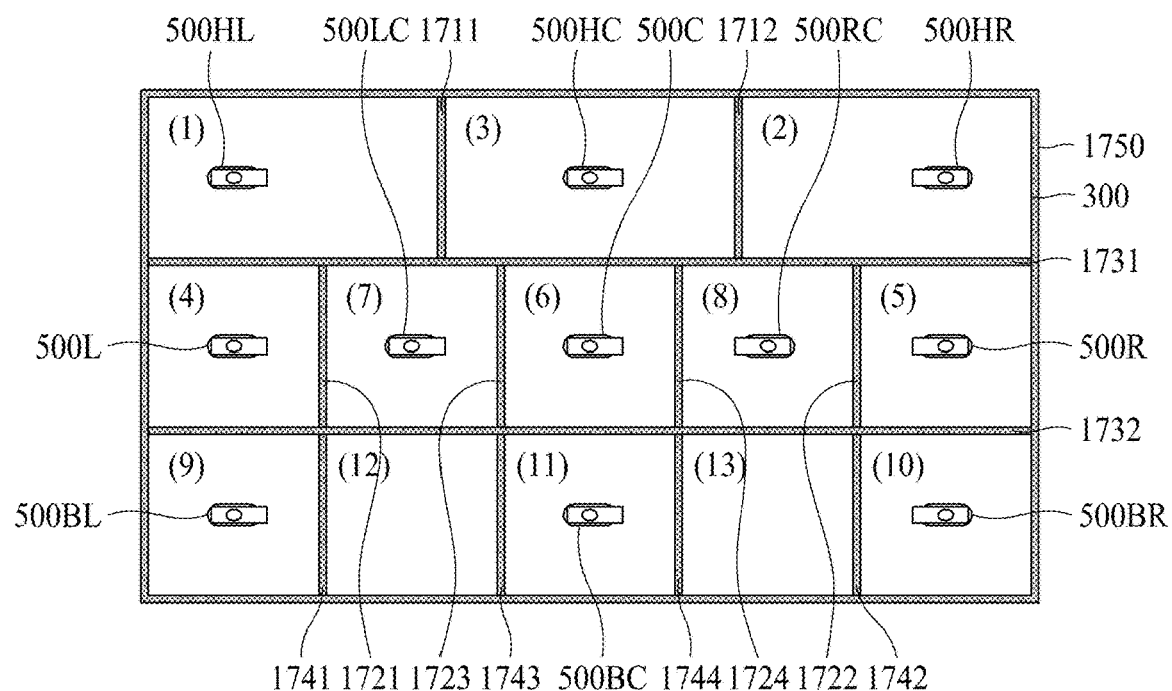

With reference to FIGS. 6A and 6B, the display apparatus may include a display device 100 including a display panel 110 which displays an image and includes first to thirteenth regions (1) to (13). For example, a rear surface of the display device 100 may include the first to thirteenth regions (1) to (13). The first region (1), the second region (2), and the third region (3) may be disposed at an upper portion of the display device 100. For example, the third region (3) may be disposed between the first region (1) and the second region (2). The ninth to thirteenth regions (9) to (13) may be disposed at a lower portion of the display device 100. For example, the twelfth region (12) may be disposed between the ninth region (9) and the eleventh region (11). For example, the thirteenth region (13) may be disposed between the tenth region (10) and the eleventh region (11). The fourth to eighth regions (4) to (8) may be disposed between the first to third regions (1) to (3) and the ninth to thirteenth regions (9) to (13). For example, the fourth to eighth regions (4) to (8) may be disposed between the upper portion and the lower portion of the display device 100. For example, the seventh region (7) may be disposed between the fourth region (4) and the sixth region (6). For example, the eighth region (8) may be disposed between the fifth region (5) and the sixth region (6).

For example, the first region (1), the fourth region (4), and the ninth region (9) may be a left region of a rear surface of the display device 100. For example, the second region (2), the fifth region (5), and the tenth region (10) may be a right region of the rear surface of the display device 100. For example, the fourth to eighth regions (4) to (8) may be a center region of the rear surface of the display unit 100. For example, the third region (3), the sixth region (6), and the eleventh region (11) may be a center region of the display device 100. For example, the third region (3), the sixth region (6), the seventh region (7), the eighth region (8), and the eleventh region (11) may be the center region of the display device 100. For example, the fourth region (4) may be under the first region (1), and the fifth region (5) may be under the second region (2). Reference numerals 1 to 13 illustrating a region in the first to thirteenth regions (1) to (13) may be arbitrary reference numerals, and reference numerals 1 to 13 and the first to thirteenth regions do not limit descriptions of the specification. Such descriptions may be identically or similarly applied to the following embodiments.

At least one or more vibration devices may be disposed at at least one or more among the first to thirteenth regions (1) to (13). In the following embodiments, an example where a vibration device is disposed at a rear surface of the display device 100 (for example, a rear surface of the display panel 110) will be described, but embodiments of the present disclosure are not limited thereto. For example, the vibration device may be disposed between the display panel 110 and a supporting member 300. For example, the vibration device may be disposed between a rear surface of the display panel 110 and an upper surface of the supporting member 300. As another embodiment of the present disclosure, as illustrated in FIGS. 5A to 5E, the vibration device may be configured to be modularized as one element (or one component).

According to some embodiments of the present disclosure, the display apparatus may further include a partition. For example, the partition may be disposed between the display panel 110 and the supporting member 300. The partition may be an air gap or a space where a sound is generated when the display panel 110 is vibrated by the vibration device. An air gap or a space which generates or outputs a sound may be referred to as a partition. The partition may separate a sound or may separate a channel, thereby preventing or decreasing the occurrence of a non-clear sound caused by interference of a sound. The partition may be referred to as an enclosure or a baffle, but embodiments of the present disclosure are not limited thereto. In the following embodiments, an example where a partition is disposed at a supporting member will be described. However, embodiments of the present disclosure are not limited thereto, and the partition may be disposed on a rear surface of a display panel. To illustrate the vibration device and the partition, an example where the vibration device and the partition are disposed at the supporting member will be described. For example, when the partition is disposed at the supporting member, an adverse influence of image quality of the display panel caused by the partition disposed at the display panel may be reduced.

The inventors have recognized that it is difficult to output a desired sound despite a case where a partition is configured to separate a height channel or sound and a bottom channel or sound. Therefore, the inventors have performed various experiments for implementing a desired sound, and have implemented a multi-channel sound through the various experiments.

With reference to FIG. 6A, a partition may be disposed to separate a left sound and a right sound which are output by a vibration device disposed at a rear surface of a display panel 110. For example, the partition may be disposed between the display panel 110, corresponding to first to thirteenth regions (1) to (13) of the display panel 110, and a supporting member 300. For example, a first partition 1711 may be disposed between the first region (1) and the third region (3). A second partition 1712 may be disposed between the second region (2) and the third region (3). A third partition 1721 may be disposed between the fourth region (4) and the seventh region (7). A fourth partition 1722 may be disposed between the fifth region (5) and the eighth region (8). A fifth partition 1723 may be disposed between the sixth region (6) and the seventh region (7). A sixth partition 1724 may be disposed between the sixth region (6) and the eighth region (8). A seventh partition 1741 may be disposed between the ninth region (9) and the eleventh region (11). For example, the seventh partition 1741 may be disposed between the ninth region (9) and the twelfth region (12). A ninth partition 1743 may be disposed between the eleventh region (11) and the twelfth region (12). An eighth partition 1742 may be disposed between the tenth region (10) and the eleventh region (11). For example, the eighth partition 1742 may be disposed between the tenth region (10) and the thirteenth region (13). The tenth partition 1744 may be disposed between the eleventh region (11) and the thirteenth region (13). The first to tenth partitions 1711 to 1744 may separate left and right channels or left and right sounds generated by the vibration device. For example, the first partition 1711 and the second partition 1712 may separate left and right channels or left and right sounds, which are generated by a first vibration device 500HL and a second vibration device 500HR. For example, the third to tenth partitions 1721 to 1744 may separate the left and right channels or the left and right sounds generated by the vibration device.

As another embodiment of the present disclosure, two partitions may be disposed between the ninth region (9) and the eleventh region (11). For example, in FIG. 6A, the seventh partition 1741 and the ninth partition 1743 are illustrated, but two seventh partitions 1741 may be disposed. For example, the two seventh partitions 1741 may be disposed between the ninth region (9) and the eleventh region (11). As another embodiment of the present disclosure, two partitions may be disposed between the tenth region (10) and the eleventh region (11). For example, in FIG. 6A, the eighth partition 1742 and the tenth partition 1744 are illustrated, but two eighth partitions 1742 may be disposed. For example, the two eighth partitions 1742 may be disposed between the tenth region (10) and the eleventh region (11).

The first vibration device 500HL, the second vibration device 500HR, and a third vibration device 500HC may be further configured for implementing a multi-channel sound, and a partition should be configured for separating channels or sounds, generated by the first to third vibration devices 500HL, 500HR, and 500HC, from channels or sounds generated by vibration devices disposed at each of a center portion and a lower portion of the display device. When the first to tenth partitions 1711 to 1744 are disposed, left and right sounds or left and right channels may be separated from one another. A partition for generating a sound in each vibration device should be configured so that an upper portion sound or an upper channel are separated from a lower portion sound or a lower channel and vibration devices disposed at regions of the rear surface of the display panel 110 implement independent sounds for each region.

A partition may be configured to separate an upper channel of the display panel 110 from a center channel of the display panel 110. For example, the eleventh partition 1731 may separate the upper channel of the display panel 110 from the center channel of the display panel 110. For example, the eleventh partition 1731 may separate channels or sounds, generated by a first vibration device 500HL, a second vibration device 500HR, and a third vibration device 500HC disposed at an upper portion of the display panel 110, from channels or sounds generated by a fourth vibration device 500L, a fifth vibration device 500R, a sixth vibration device 500C, a seventh vibration device 500LC, and an eighth vibration device 500RC disposed at a center portion of the display panel 110. For example, the eleventh partition 1731 may be disposed between lower portions of the first to third regions (1) to (3) and upper portions of the fourth to eighth regions (4) to (8). The twelfth partition 1732 may separate the center channel of the display panel 110 from the lower channel of the display panel 110. For example, the twelfth partition 1732 may be disposed under the fourth to eighth vibration devices 500L, 500R 500C, 500LC, and 500RC. For example, the twelfth partition 1732 may be disposed between lower portions of the fourth to eighth regions (4) to (8) and upper portions of the ninth to thirteenth regions (9) to (13). For example, the twelfth partition 1732 may separate the channels or the sounds, generated by the fourth to eighth vibration devices 500L, 500R 500C, 500LC, and 500RC, from channels or sounds generated by a ninth vibration device 500BL, a tenth vibration device 500BR, and an eleventh vibration device 500BC. A thirteenth partition 1733 may be disposed at a lower portion of the display panel 110 and may be separated from a driver for driving the display panel 110. Accordingly, the ninth to eleventh vibration device 500BL, 500BR, and 500BC may decrease an adverse influence of a sound caused by contacting the driver.

The first to thirteenth partitions 1711 to 1733 may be disposed at the supporting member 300. For example, the first to thirteenth partitions 1711 to 1733 may be disposed at an upper surface of the supporting member 300. For example, the first to thirteenth partitions 1711 to 1733 may be disposed between the display panel 110 and the supporting member 300. For example, the first to thirteenth partitions 1711 to 1733 may be disposed between the rear surface of the display panel 110 and the upper surface of the supporting member 300.

With reference to FIG. 6B, the display apparatus may include a first to twelfth partitions 1711 to 1732, and a fourteenth partition 1750 provided between a supporting member 300 and a display panel 110. For example, the fourteenth partition 1750 may be disposed at a periphery of the supporting member 300. For example, the fourteenth partition 1750 may be disposed at a periphery of an upper surface of the supporting member 300. The fourteenth partition 1750 may be a whole region of four sides of an outer portion of the upper surface of the supporting member 300. As another embodiment, the fourteenth partition 1750 may be disposed at a periphery of a rear surface of the display panel 110. For example, the fourteenth partition 1750 may surround a periphery of the display panel 110. The fourteenth partition 1750 may be a whole region of four sides of an outer portion of the rear surface of the display panel 110. The fourteenth partition 1750 may be a whole region of the supporting member 300 or the rear surface of the display panel 110. For example, the fourteenth partition 1750 may be disposed to surround the first to eleventh vibration devices 500HL to 500BC. For example, the fourteenth partition 1750 may be disposed along a region between a rear periphery of the display panel 110 and a front periphery of the supporting member 300 to surround a vibration device. The fourteenth partition 1750 may be referred to as an edge partition, a sound blocking member, an edge enclosure, or an edge baffle, but embodiments of the present disclosure are not limited thereto. The fourteenth partition 1750 may be disposed along a shape of the display device 100 so as to prevent a wave phenomenon of the display device 100. The wave phenomenon may be a phenomenon where a shape of a partition swells to a screen of a display device 100 when a thickness of a substrate configuring the display device is thinned, and moreover, may be a problem where some regions of a display panel is recognized unevenly because the display device is not flat or a supporting member is not flat. For example, when the fourteenth partition 1750 is an adhesive member for attaching the display panel 110 and the supporting member 300 described in FIGS. 1 to 5E, the adhesive member described in FIGS. 1 to 5E may be omitted, and the fourteenth partition 1750 may act as an adhesive member. However, embodiments of the present disclosure are not limited thereto, and the adhesive member for attaching the display panel 110 and the supporting member 300 may be provided at the supporting member 300 or the rear surface of the display panel 110. For example, the fourteenth partition 1750 may be disposed to be adjacent to or to contact a connection member 550 and may be surrounded by the connection member 550. As another embodiment, the fourteenth partition 1750 and the connection member 550 may be provided as one body (or a single body).

Therefore, since the display apparatus according to an embodiment of the present disclosure further include the fourteenth partition 1750, a peak or dip phenomenon may be reduced, and the flatness of a sound characteristic may be improved. For example, the peak phenomenon may be a phenomenon where a sound pressure level bounces in a specific frequency, and the dip phenomenon may be a phenomenon where a lower sound pressure level is generated because a generation of a specific frequency is not suppressed. For example, the flatness of the sound characteristic may be a magnitude of a deviation between a highest sound pressure level and a lowest sound pressure level.

The first to fourteenth partitions 1711 to 1750 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. When the first to fourteenth partitions 1711 to 1750 is configured with a double-sided tape or a double-sided foam pad, an adhesive force may be enhanced in a process of attaching the rear surface of the display panel 110 on the upper surface of the supporting member 300. For example, the first to fourteenth partitions 1711 to 1750 may include a material having elasticity which enables a certain degree of compression. For example, at least one or more of the first to fourteenth partitions 1711 to 1750 may include polyurethane, polyolefin, or polyethylene, but embodiments of the present disclosure are not limited thereto.

According to some embodiments of the present disclosure, at least one first vibration device 500HL may be disposed at a first region (1) of a rear surface of a display panel. At least one second vibration device 500HR may be disposed at a second region (2) of the rear surface of the display panel. At least one third vibration device 500HC may be disposed at a third region (3) of the rear surface of the display panel. For example, the first vibration device 500HL may be an upper left channel or a height left channel. For example, the second vibration device 500HR may be an upper right channel or a height right channel. For example, the third vibration device 500HC may be an upper center channel or height center channel.

According to some embodiments of the present disclosure, at least one fourth vibration device 500L may be disposed at a fourth region (4) of the rear surface of the display panel. At least one fifth vibration device 500R may be disposed at a fifth region (5) of the rear surface of the display panel. At least one sixth vibration device 500C may be disposed at a sixth region (6) of the rear surface of the display panel. At least one seventh vibration device 500LC may be disposed at a seventh region (7) of the rear surface of the display panel. At least one eighth vibration device 500RC may be disposed at an eighth region (8) of the rear surface of the display panel. For example, the fourth vibration device 500L may be a left channel, the fifth vibration device 500R may be a right channel, and the sixth vibration device 500C may be a center channel. For example, the seventh vibration device 500LC may be a left center channel, and the eighth vibration device 500RC may be a right center channel.

According to some embodiments of the present disclosure, at least one ninth vibration device 500BL may be disposed at a ninth region (9) of the rear surface of the display panel. At least one tenth vibration device 500BR may be disposed at a tenth region (10) of the rear surface of the display panel. At least one eleventh vibration device 500BC may be disposed at an eleventh region (11) of the rear surface of the display panel. For example, the ninth vibration device 500BL may be a lower left channel or a bottom left channel. For example, the tenth vibration device 500BR may be a lower right channel or bottom right channel. For example, the eleventh vibration device 500BC may be a lower center channel or bottom center channel.

For example, the first to third vibration devices 500HL to 500HC may each be an upper channel or a height channel.

The fourth to eighth vibration devices 500L to 500RC may each be a center channel. The ninth to eleventh vibration devices 500BL to 500BC may each be a lower channel or a bottom channel. For example, the first to third vibration devices 500HL to 500HC and the ninth to eleventh vibration devices 500BL to 500BC may each be a speaker which notifies an action or a motion of a person or an object. For example, the first to third vibration devices 500HL to 500HC and the ninth to eleventh vibration devices 500BL to 500BC may each be a vibration device which outputs a full-range sound. For example, a pitched sound band of a full range may be about 300 Hz or more, but embodiments of the present disclosure are not limited thereto. For example, the fourth to eighth vibration devices 500L to 500RC may each be a main channel. The fourth to eighth vibration devices 500L to 500RC may each be a vibration device which outputs a full-range sound.

According to some embodiments of the present disclosure, the main channel may be configured with five vibration devices, and each secondary channel may be configured with three channels. For example, the main channel may be configured with five regions, and five vibration devices may be provided at each of the five regions. For example, the main channel may be disposed at a center region of the display device 100. The secondary channels may be disposed at an upper region and a lower region of the display device 100. For example, the fourth to eighth vibration devices 500L to 500RC may be respectively disposed at five regions among the center region of the display device 100. Three vibration devices may be respectively disposed at three regions among the upper region of the display device 100 or three regions of five regions thereof. For example, the first to third vibration devices 500HL to 500HC may be respectively disposed at three regions of the upper region of the display device 100 or three regions of five regions thereof. For example, the ninth to eleventh vibration devices 500BL to 500BC may be respectively disposed at three regions among the lower region of the display device 100 or three regions among five regions thereof.

The number of upper regions of the display device 100 may be configured to differ from the number of lower regions of the display device 100. For example, the number of upper regions of the display device 100 may be three, and the number of lower regions of the display device 100 may be five. Three vibration devices may be respectively provided at three regions among the upper region of the display device 100. For example, the first to third vibration devices 500HL to 500HC may be respectively disposed at three regions. Three vibration devices may be respectively disposed at three regions among five regions of the lower region of the display device 100. For example, the ninth to eleventh vibration devices 500BL to 500BC may be respectively disposed at three regions of five regions. In FIGS. 6A to 6D, the upper region of the display device 100 is illustrated as including three regions, but is not limited thereto and the upper region of the display device 100 may be configured with five regions.

As another embodiment of the present disclosure, the number of upper regions of the display device 100 may be five, and the number of lower regions of the display device 100 may be three. Three vibration devices may be respectively provided at three regions among the lower region of the display device 100. For example, the ninth to eleventh vibration devices 500BL to 500BC may be respectively disposed at three regions. Three vibration devices may be respectively disposed at three regions among five regions of the upper region of the display device 100. For example, the first to third vibration devices 500HL to 500HC may be respectively disposed at three regions of five regions. In FIGS. 6A to 6D, the upper region of the display device 100 is illustrated as including three regions, but is not limited thereto and the upper region of the display device 100 may be configured with five regions. For example, like the first to third regions (1) to (3), the ninth to thirteenth regions (9) to (13) may each be configured with five regions.

Figure 6C:
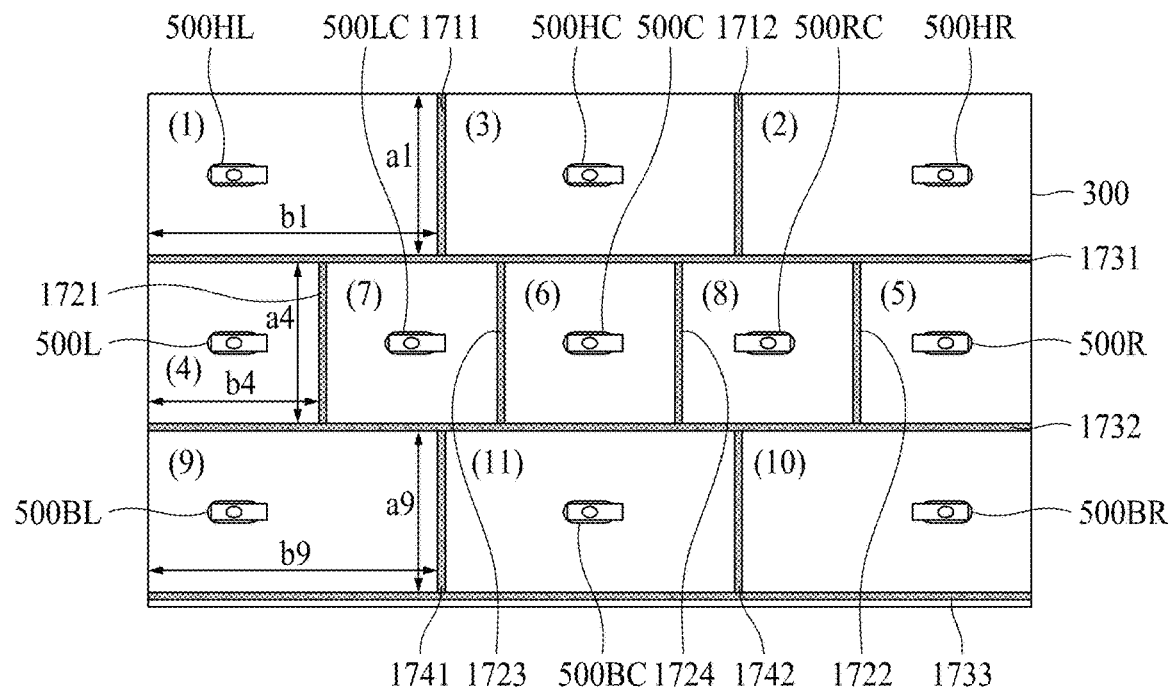
Figure 6D:
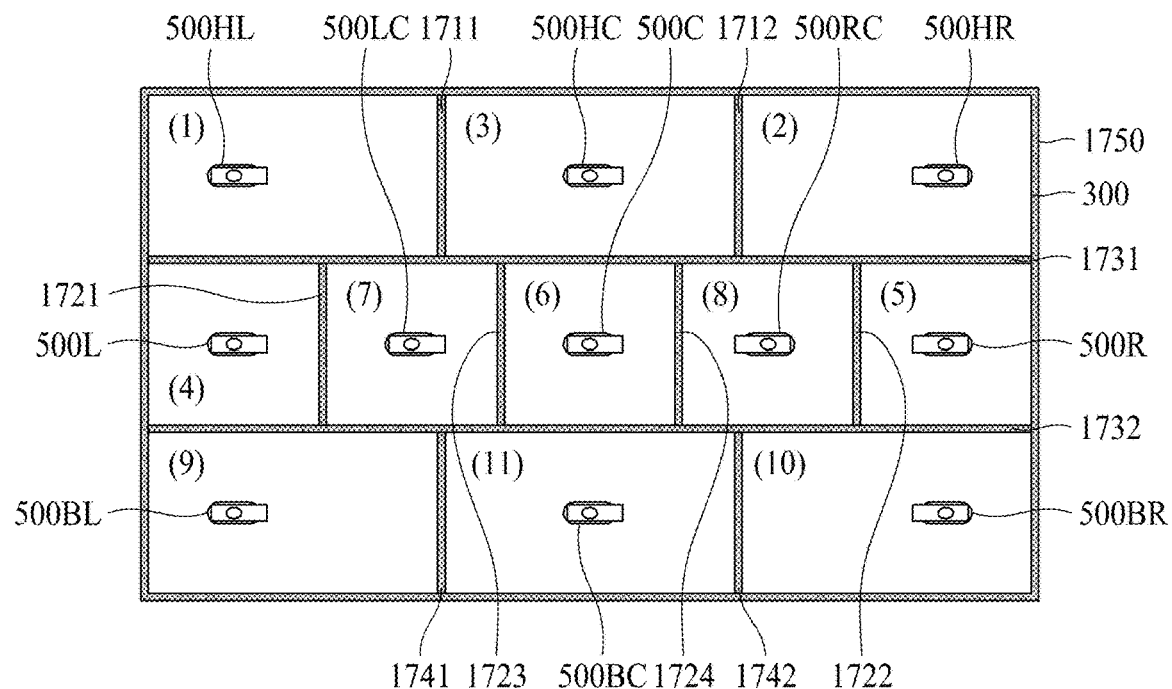

As another embodiment of the present disclosure, with reference to FIGS. 6C and 6D, the number of upper regions of the display device 100 may be three, and the number of lower regions of the display device 100 may be three. Three vibration devices may be respectively provided at three regions among the upper region of the display device 100. For example, the first to third vibration devices 500HL to 500HC may be respectively disposed at three regions. Three vibration devices may be respectively provided at three regions among the lower region of the display device 100. For example, the ninth to eleventh vibration devices 500BL to 500BC may be respectively disposed at three regions.

As another embodiment of the present disclosure, the number of upper regions of the display device 100 and the number of lower regions of the display device 100 may be configured to be equal to the center region of the display device 100. For example, the number of upper regions of the display device 100 may be five, and the number of lower regions of the display device 100 may be five. For example, a size of the upper region and the lower region of the display device 100 may be configured to be equal to the center region of the display device 100. For example, the first to third vibration devices 500HL to 500HC may be respectively disposed at three regions of five regions. For example, the ninth to eleventh vibration devices 500BL to 500BC may be respectively disposed at three regions of five regions.

According to some embodiments of the present disclosure, a size of one or more among the first to third regions (1) to (3) may differ from one or more among the fourth to eighth regions (4) to (8). For example, a size of one or more among the first to third regions (1) to (3) may be greater than or equal to one or more among the fourth to eighth regions (4) to (8). A size of one or more among the first to third regions (1) to (3) may differ from one or more among the ninth to eleventh regions (9) to (11). For example, a size of one or more among the first to third regions (1) to (3) may be greater than or equal to one or more among the ninth to eleventh regions (9) to (11). A size of one or more among the first to third regions (1) to (3) may differ from one or more among the ninth to thirteenth regions (9) to (13). For example, a size of one or more among the first to third regions (1) to (3) may be greater than or equal to one or more among the ninth to thirteenth regions (9) to (13). A size of one or more among the fourth to eighth regions (4) to (8) may differ from one or more among the ninth to eleventh regions (9) to (11). For example, a size of one or more among the fourth to eighth regions (4) to (8) may be smaller than or equal to one or more among the ninth to eleventh regions (9) to (11). A size of one or more among the fourth to eighth regions (4) to (8) may differ from one or more among the ninth to thirteenth regions (9) to (13). For example, a size of one or more among the fourth to eighth regions (4) to (8) may be smaller than or equal to one or more among the ninth to thirteenth regions (9) to (13). For example, sizes of the first to third regions (1) to (3) may be the same. For example, sizes of the fourth to eighth regions (4) to (8) may be the same. For example, sizes of the ninth to eleventh regions (9) to (11) may be the same. For example, sizes of the ninth to thirteenth regions (9) to (13) may be the same.

In the display apparatus according to an embodiment of the present disclosure, because the first to third vibration devices 500HL to 500HC and the seventh to eleventh vibration devices 500LC to 500BC are further provided, there may not be a position difference between a screen and a sound image, and thus, a sound image based on the screen may be implemented, thereby realizing a real sound based on a position. Also, because the vibration device including a center channel and a lower channel as well as a left sound and a right sound is further provided, a display apparatus for outputting a multi-channel sound may be implemented.

According to some embodiments of the present disclosure, as illustrated in FIGS. 6A and 6B, a vibration device may be not configured in twelfth region (12). Therefore, vibrations of the ninth vibration device 500BL and the eleventh vibration device 500BC may be attenuated and absorbed in the twelfth region (12) of the display panel 110, and thus, the transfer of a sound from the ninth region (9) to the eleventh region (11) may be blocked or reduced and the transfer of a sound from the eleventh region (11) to the ninth region (9) may be blocked or reduced. Accordingly, a degradation in sound quality caused by interference of sounds generated in the ninth region (9) and the eleventh region (11) may be reduced, and a sound characteristic of each of a middle-high-pitched sound band may be more enhanced. For example, the middle-pitched sound band may be about 200 Hz to about 3 kHz, the high-pitched sound band may be 3 kHz or more, and the low-pitched sound band may be 200 Hz or less. However, a range of a sound band is not limited thereto.

According to some embodiments of the present disclosure, as illustrated in FIGS. 6A and 6B, a vibration device may be not configured in thirteenth region (13). Therefore, vibrations of the tenth vibration device 500BR and the eleventh vibration device 500BC may be attenuated and absorbed in the thirteenth region (13) of the display panel 110, and thus, the transfer of a sound from the tenth region (10) to the eleventh region (11) may be blocked or reduced and the transfer of a sound from the eleventh region (11) to the tenth region (10) may be blocked or reduced. Accordingly, a degradation in sound quality caused by interference of sounds generated in the tenth region (10) and the eleventh region (11) may be reduced, and a sound characteristic of each of a middle-high-pitched sound band may be more enhanced.

According to some embodiments of the present disclosure, as illustrated in FIGS. 6C and 6D, a vibration device may be not configured in eleventh region (11). Therefore, vibrations of the ninth vibration device 500BL and the tenth vibration device 500BR may be attenuated and absorbed in the eleventh region (11) of the display panel 110, and thus, the transfer of a sound from the ninth region (9) to the tenth region (10) may be blocked or reduced and the transfer of a sound from the tenth region (10) to the ninth region (9) may be blocked or reduced. Accordingly, a degradation in sound quality caused by interference of sounds generated in the ninth region (9) and the tenth region (10) may be reduced, and a sound characteristic of each of a middle-high-pitched sound band may be more enhanced.

Therefore, the display apparatus according to an embodiment of the present disclosure may include eleven vibration devices and may be configured with a plurality of vibration devices including an upper channel, a center channel, and a lower channel, thereby providing eleven channels. Also, the eleven vibration devices may be independently supplied with and driven by a sound signal, and thus, each of the eleven vibration devices may reproduce an independent sound channel.

With reference to FIGS. 6A to 6D, according to an embodiment of the present disclosure, the first vibration device 500HL and the second vibration device 500HR may be configured as the same vibration device, for the left-right symmetricity of a sound. For example, the fourth vibration device 500L and the fifth vibration device 500R may be configured as the same vibration device, for the left-right symmetricity of a sound. For example, the ninth vibration device 500BL and the tenth vibration device 500BR may be configured as the same vibration device, for the left-right symmetricity of a sound.

According to some embodiments of the present disclosure, the first vibration device 500HL may be configured to be disposed on the same plane as one or more among the fourth vibration device 500L and the ninth vibration device 500BL. For example, the first vibration device 500HL may be configured to be disposed on the same plane as one or more among the fourth vibration device 500L and the ninth vibration device 500BL in a lengthwise direction of the display device 100. The first vibration device 500HL may be configured to be disposed on the same plane as the fourth vibration device 500L. For example, the first vibration device 500HL may be configured to be disposed on the same plane as the fourth vibration device 500L in the lengthwise direction of the display device 100. The first vibration device 500HL may be configured to be disposed on the same plane as the ninth vibration device 500BL. For example, the first vibration device 500HL may be configured to be disposed on the same plane as the ninth vibration device 500BL in the lengthwise direction of the display device 100. The first vibration device 500HL may be configured to be disposed on the same plane as the fourth vibration device 500L and the ninth vibration device 500BL. For example, the first vibration device 500HL may be configured to be disposed on the same plane as the fourth vibration device 500L and the ninth vibration device 500BL in the lengthwise direction of the display device 100. Based on this configuration, a sense of sound field output from the first vibration device 500HL, the fourth vibration device 500L, and the ninth vibration device 500BL may be maximized, thereby providing a display apparatus with an enhanced sense of sound field.

According to some embodiments of the present disclosure, the first vibration device 500HL, the fourth vibration device 500L, and the ninth vibration device 500BL may be provided close to a periphery of the display device 100. Based on this configuration, a display apparatus with more enhanced sound output characteristic may be provided.

According to some embodiments of the present disclosure, the second vibration device 500HR may be configured to be disposed on the same plane as one or more among the fifth vibration device 500R and the tenth vibration device 500BR. The second vibration device 500HR may be configured to be disposed on the same plane as the fifth vibration device 500R. For example, the second vibration device 500HR may be configured to be disposed on the same plane as the fifth vibration device 500R in the lengthwise direction of the display device 100. The second vibration device 500HR may be configured to be disposed on the same plane as the tenth vibration device 500BR. For example, the second vibration device 500HR may be configured to be disposed on the same plane as the tenth vibration device 500BR in the lengthwise direction of the display device 100. The second vibration device 500HR may be configured to be disposed on the same plane as the fifth vibration device 500R and the tenth vibration device 500BR. For example, the second vibration device 500HR may be configured to be disposed on the same plane as the fifth vibration device 500R and the tenth vibration device 500BR in the lengthwise direction of the display device 100. Based on this configuration, a sense of sound field output from the second vibration device 500HR, the fifth vibration device 500R, and the tenth vibration device 500BR may be maximized, thereby providing a display apparatus with an enhanced sense of sound field.

According to some embodiments of the present disclosure, the second vibration device 500HR, the fifth vibration device 500R, and the tenth vibration device 500BR may be provided close to the periphery of the display device 100. Based on this configuration, a display apparatus with more enhanced sound output characteristic may be provided.

According to some embodiments of the present disclosure, the third vibration device 500HC may be configured to be disposed on the same plane as one or more among the sixth vibration device 500C and the eleventh vibration device 500BC. The third vibration device 500HC may be configured to be disposed on the same plane as the sixth vibration device 500C. For example, the third vibration device 500HC may be configured to be disposed on the same plane as the sixth vibration device 500C in the lengthwise direction of the display device 100. The third vibration device 500HC may be configured to be disposed on the same plane as the eleventh vibration device 500BC. For example, the third vibration device 500HC may be configured to be disposed on the same plane as the sixth vibration device 500C and the eleventh vibration device 500BC. For example, the third vibration device 500HC may be configured to be disposed on the same plane as the sixth vibration device 500C and the eleventh vibration device 500BC in the lengthwise direction of the display device 100. Based on this configuration, a sense of sound field output from the third vibration device 500HC, the sixth vibration device 500C, and the eleventh vibration device 500BC may be maximized, thereby providing a display apparatus with an enhanced sense of sound field.

With reference to FIG. 6A, a size of one or more among the third to sixth partitions 1721 to 1724 may be configured to differ from one or more among the first partition 1711 and the second partition 1712. For example, a size of one or more among the third to sixth partitions 1721 to 1724 may be configured to be smaller than one or more among the first partition 1711 and the second partition 1712. A length of one or more among the third to sixth partitions 1721 to 1724 may be configured to differ from one or more among the first partition 1711 and the second partition 1712. For example, a length of one or more among the third to sixth partitions 1721 to 1724 may be configured to be smaller than one or more among the first partition 1711 and the second partition 1712. For example, the first region (1) may include a $1$-$1^{st}$ length a1 and a $1$-$2^{nd}$ length b1. For example, at least one or more of the second region (2) and the third region (3) may include a $1$-$1^{st}$ length a1 and a $1$-$2^{nd}$ length b1. For example, the fourth region (4) may include a $2$-$1^{st}$ length a4 and a $2$-$2^{nd}$ length b4. For example, at least one or more of the fifth region (5) to eighth region (8) may include a $2$-$1^{st}$ length a4 and a $2$-$2^{nd}$ length b4. For example, the ninth region (9) may include a $3$-$1^{st}$ length a9 and $3$-$2^{nd}$ length b9. For example, at least one or more of the tenth region (10) to the eleventh region (11) may include a $3$-$1^{st}$ length a9 and $3$-$2^{nd}$ length b9. For example, a $2$-$1^{st}$ length b4 of the twelfth partition 1732 or at the fourth region (3) may be configured to differ from a length 1-$2^{nd}$ b1 of the eleventh partition 1731 or at the first region (1). For example, the 2-$2^{nd}$ length b4 of the twelfth partition 1732 or in the fourth region (4) may be configured to be smaller than the 1-$2^{nd}$ length b1 of the eleventh partition 1731 or at the first region (1). A 2-$1^{st}$ length a4 of the third partition 1721 or at the fourth region (4) may be configured to differ from a 1-$1^{st}$ length a1 of the first partition 1711 or at the first region (1). A 2-$2^{nd}$ length b4 of the twelfth partition 1732 or at the fourth region (4) may be configured to differ from a 1-$2^{nd}$ length b1 of the eleventh partition 1731 or at the first region (1). For example, the 1-$1^{st}$ length a1 of the first partition 1711 or at the first region (1) may be 300 mm or more, but embodiments of the present disclosure are not limited thereto. For example, the 1-$2^{nd}$ length b1 of the eleventh partition 1731 or at the first region (1) may be 300 mm or more, but embodiments of the present disclosure are not limited thereto. For example, the 2-$1^{st}$ length a4 of the third partition 1721 or at the fourth region (4) may be 250 mm or more, but embodiments of the present disclosure are not limited thereto. For example, the 2-$2^{nd}$ length b4 of the twelfth partition 1732 or at the fourth region (4) may be 250 mm or more, but embodiments of the present disclosure are not limited thereto. Therefore, the first to third vibration devices 500HL to 500HC may output a sound band of 300 Hz or more, and the fourth to eleventh vibration devices 500L to 500BC may output a sound band of a full range. Also, a size of the first partition 1711 and the second partition 1712 may be configured to be greater than one or more among the third to sixth partitions 1721 to 1724, thereby providing a display apparatus which enhances a sound of the low-pitched sound band. Because a size of the first partition 1711 and the second partition 1712 is adjusted to be greater than one or more among the seventh to tenth partitions 1741 to 1744, a display apparatus for enhancing a sound of the low-pitched sound band may be implemented. Because a size of the first partition 1711 and the second partition 1712 is adjusted to be greater than one or more among the third to tenth partitions 1721 to 1744, a display apparatus for enhancing a sound of the low-pitched sound band may be implemented.

As another embodiment of the present disclosure, a size of the first partition 1711 and the second partition 1712 may be configured to be equal to one or more among the third to sixth partitions 1721 to 1724. A size of the first partition 1711 and the second partition 1712 may be configured to be equal to one or more among the seventh to tenth partitions 1741 to 1744. A size of the first partition 1711 and the second partition 1712 may be configured to be equal to one or more among the third to tenth partitions 1721 to 1744. Based on this configuration, the 1-$1^{st}$ length a1 of the first partition 1711 or at the first region (1) may be 300 mm or more, but embodiments of the present disclosure are not limited thereto. For example, the 1-$2^{nd}$ length b1 of the eleventh partition 1731 or at the first region (1) may be 300 mm or more, but embodiments of the present disclosure are not limited thereto. For example, the 2-$1^{st}$ length a4 of the third partition 1721 or at the fourth region (4) may be 300 mm or more, but embodiments of the present disclosure are not limited thereto. For example, the 2-$2^{nd}$ length b4 of the twelfth partition 1732 or at the fourth region (4) may be 300 mm or more, but embodiments of the present disclosure are not limited thereto. For example, a 3-$1^{st}$ length a9 of the seventh partition 1741 or at the ninth region (9) may be 300 mm or more, but embodiments of the present disclosure are not limited thereto. For example, a 3-$2^{nd}$ length b9 of the seventh partition 1741 or at the ninth region (9) may be 300 mm or more, but embodiments of the present disclosure are not limited thereto.

For example, the second partition 1712 may have the same size as that of the first partition 1711. The second partition 1712, as in the first partition 1711 illustrated in FIG. 6A, may have the 1-$1^{st}$ length a1 and the 1-$2^{nd}$ length b1. For example, the fourth partition 1722 may have the same size as that of the third partition 1721. The fourth partition 1722, as in the third partition 1721 illustrated in FIG. 6A, may have the 2-$1^{st}$ length a4 and the 2-$2^{nd}$ length b4. For example, the fifth partition 1723 may have the same size as that of the third partition 1721. The fifth partition 1723, as in the third partition 1721 illustrated in FIG. 6A, may have the 2-$1^{st}$ length a4 and the 2-$2^{nd}$ length b4. For example, the sixth partition 1724 may have the same size as that of the third partition 1721. The sixth partition 1724, as in the third partition 1721 illustrated in FIG. 6A, may have the 2-$1^{st}$ length a4 and the 2-$2^{nd}$ length b4.

A size of one or more among the third to sixth partitions 1721 to 1724 may differ from one or more among the seventh partition 1741 and the eighth partition 1742. For example, a size of one or more among the third to sixth partitions 1721 to 1724 may be greater than one or more among the seventh partition 1741 and the eighth partition 1742. For example, a length of one or more among the third to sixth partitions 1721 to 1724 may differ from one or more among the seventh partition 1741 and the eighth partition 1742. For example, a length of one or more among the third to sixth partitions 1721 to 1724 may be greater than one or more among the seventh partition 1741 and the eighth partition 1742. The 2-$1^{st}$ length a4 of the third partition 1721 or at the fourth region (4) may be greater than the 3-$1^{st}$ a9 of the seventh partition 1741 or at the ninth region (9). For example, the 2-$2^{nd}$ length b4 of the twelfth partition 1732 or at the fourth region (4) may be greater than the 3-$2^{nd}$ b9 of the thirteenth partition 1733 or at the ninth region (9). For example, the 3-$1^{st}$ length a9 of the seventh partition 1741 or at the ninth region (9) may be 250 mm or more, but embodiments of the present disclosure are not limited thereto. For example, the 3-$2^{nd}$ length b9 of the thirteenth partition 1733 or at the ninth region (9) may be 250 mm or more, but embodiments of the present disclosure are not limited thereto. The 3-$1^{st}$ length a9 of the seventh partition 1741 or at the ninth region (9) may be smaller than or equal to the 3-$2^{nd}$ length b9 of the thirteenth partition 1733 or at the ninth region (9). For example, the eighth partition 1742 may have the same size as that of the seventh partition 1741. The eighth partition 1742, as in the seventh partition 1741 illustrated in FIG. 6A, may have the 3-$1^{st}$ length a9 and the 3-$2^{nd}$ length b9.

A size of one or more among the third to sixth partitions 1721 to 1724 may be the same as one or more among the seventh partition 1741 and the eighth partition 1742. A length of one or more among the third to sixth partitions 1721 to 1724 may be the same as one or more among the seventh partition 1741 and the eighth partition 1742. For example, the 2-$1^{st}$ length a4 of the third partition 1721 may be the same as the 3-$1^{st}$ a9 of the seventh partition 1741. For example, the 2-$2^{nd}$ length b4 of the twelfth partition 1732 or at the fourth region (4) may be the same as the 3-$2^{nd}$ b9 of the seventh partition 1741. For example, the 2-$1^{st}$ length a4 of the third partition 1721 may be 250 mm or more, but embodiments of the present disclosure are not limited thereto. For example, the 2-$2^{nd}$ length b4 of the twelfth partition 1732 or at the fourth region (4) may be 250 mm or more, but embodiments of the present disclosure are not limited thereto. For example, the 3-1$^{st}$ length a9 of the seventh partition 1741 may be 250 mm or more, but embodiments of the present disclosure are not limited thereto. For example, the 3-2$^{nd}$ length b9 of the thirteenth partition 1733 or at the ninth region (9) may be 250 mm or more, but embodiments of the present disclosure are not limited thereto.

According to some embodiments of the present disclosure, the display apparatus may include the first partition 1711 at one or more sides of the first vibration device 500HL, the second partition 1712 at one or more sides of the second vibration device 500HR, the third partition 1721 at one or more sides of the fourth vibration device 500L, the fourth partition 1722 at one or more sides of the fifth vibration device 500R, the seventh partition 1741 at one or more sides of the ninth vibration device 500BL, and the eighth partition 1742 at one or more sides of the tenth vibration device 500BR. A size of one or more among the first partition 1711 and the second partition 1712 may differ from one or more among the third partition 1721, the fourth partition 1722, the seventh partition 1741, and the eighth partition 1742. A size of one or more among the first partition 1711 and the second partition 1712 may be greater than one or more among the third partition 1721, the fourth partition 1722, the seventh partition 1741, and the eighth partition 1742. For example, a size of the third partition 1721 at one or more sides of the fourth vibration device 500L may differ from the first partition 1711 at one or more sides of the first vibration device 500HL. For example, a size of the third partition 1721 at one or more sides of the fourth vibration device 500L may be smaller than the first partition 1711 at one or more sides of the first vibration device 500HL. For example, a size of the fourth partition 1722 at one or more sides of the fifth vibration device 500R may differ from the first partition 1711 at one or more sides of the first vibration device 500HL. For example, a size of the fourth partition 1722 at one or more sides of the fifth vibration device 500R may be smaller than the first partition 1711 at one or more sides of the first vibration device 500HL. For example, a size of the third partition 1721 at one or more sides of the fourth vibration device 500L may differ from the second partition 1712 at one or more sides of the second vibration device 500HR. For example, a size of the third partition 1721 at one or more sides of the fourth vibration device 500L may be smaller than the second partition 1712 at one or more sides of the second vibration device 500HR. For example, a size of the fourth partition 1722 at one or more sides of the fifth vibration device 500R may differ from the second partition 1712 at one or more sides of the second vibration device 500HR. For example, a size of the fourth partition 1722 at one or more sides of the fifth vibration device 500R may be smaller than the second partition 1712 at one or more sides of the second vibration device 500HR.

For example, a size of the third partition 1721 at one or more sides of the fourth vibration device 500L may be the same as the seventh partition 1741 at one or more sides of the ninth vibration device 500BL. A size of the fourth partition 1722 at one or more sides of the fifth vibration device 500R may be the same as the seventh partition 1741 at one or more sides of the ninth vibration device 500BL. A size of the third partition 1721 at one or more sides of the fourth vibration device 500L may be the same as the eighth partition 1742 at one or more sides of the tenth vibration device 500BR. A size of the fourth partition 1722 at one or more sides of the fifth vibration device 500R may be the same as the eighth partition 1742 at one or more sides of the tenth vibration device 500BR.

According to some embodiments of the present disclosure, a size of one or more among the first partition 1711 and the second partition 1712 may be the same as one or more among the seventh partition 1741 and the eighth partition 1742. A size of the first partition 1711 may be the same as the seventh partition 1741. For example, a size of the first partition 1711 may be the same as the eighth partition 1742. A size of the second partition 1712 may be the same as the seventh partition 1741. For example, a size of the second partition 1712 may be the same as the eighth partition 1742. A size of the first partition 1711 may be the same as the second partition 1712. For example, a size of the seventh partition 1741 may be the same as the eighth partition 1742.

According to some embodiments of the present disclosure, the display apparatus may further include the eleventh partition 1731 at one or more sides of the first vibration device 500HL, the second vibration device 500HR, and the third vibration device 500HC. The display apparatus may further include the twelfth partition 1732 at one or more sides of the fourth vibration device 500L, the fifth vibration device 500R, the sixth vibration device 500C, the seventh vibration device 500LC, and the eighth vibration device 500RC. The display apparatus may further include the thirteenth partition 1733 at one or more sides of the ninth vibration device 500BL, the tenth vibration device 500BR, and the eleventh vibration device 500BC. A size of the eleventh partition 1731 may differ from one or more among the twelfth partition 1732 and the thirteenth partition 1733. For example, a size of the eleventh partition 1731 may be greater than one or more among the twelfth partition 1732 and the thirteenth partition 1733. A length of the eleventh partition 1731 may differ from one or more among the twelfth partition 1732 and the thirteenth partition 1733. For example, a length of the eleventh partition 1731 may be greater than one or more among the twelfth partition 1732 and the thirteenth partition 1733. The length b1 of the eleventh partition 1731 may be 300 mm or more, but embodiments of the present disclosure are not limited thereto. The 2-2$^{nd}$ length b4 of the twelfth partition 1732 may be 250 mm or more, but embodiments of the present disclosure are not limited thereto. The 3-2$^{nd}$ length b9 of the thirteenth partition 1733 may be 250 mm or more, but embodiments of the present disclosure are not limited thereto. For example, a size of the twelfth partition 1732 may be the same as the thirteenth partition 1733.

For example, a size of the eleventh partition 1731 at sides of one or more among the first vibration device 500HL, the second vibration device 500HR, and the third vibration device 500HC may differ from the twelfth partition 1732 at sides of one or more among the fourth vibration device 500L, the fifth vibration device 500R, the sixth vibration device 500C, the seventh vibration device 500LC, and the eighth vibration device 500RC.

A size of the eleventh partition 1731 at sides of one or more among the first vibration device 500HL, the second vibration device 500HR, and the third vibration device 500HC may be greater than the twelfth partition 1732 at sides of one or more among the fourth vibration device 500L, the fifth vibration device 500R, the sixth vibration device 500C, the seventh vibration device 500LC, and the eighth vibration device 500RC. A size of the eleventh partition 1731 at one or more sides of the first vibration device 500HL may be the same as the eleventh partition 1731 at sides of one or more among the second vibration device 500HR and the third vibration device 500HC. For example, a size of the twelfth partition 1732 at one or more sides of the fourth vibration device 500L may be the same as the twelfth partition 1732 at sides of one or more among the fifth vibration device 500R, the sixth vibration device 500C, the seventh vibration device 500LC, and the eighth vibration device 500RC.

For example, a size of the twelfth partition 1732 at sides of one or more among the fourth vibration device 500L, the fifth vibration device 500R, the sixth vibration device 500C, the seventh vibration device 500LC, and the eighth vibration device 500RC may be the same as the thirteenth partition 1733 at sides of one or more among the ninth vibration device 500BL, the tenth vibration device 500BR, and the eleventh vibration device 500BC. A size of the thirteenth partition 1733 at one or more sides of the ninth vibration device 500BL may be the same as the thirteenth partition 1733 at sides of one or more among the tenth vibration device 500BR and the eleventh vibration device 500BC.

For example, a size of the eleventh partition 1731 at sides of one or more among the first vibration device 500HL, the second vibration device 500HR, and the third vibration device 500HC may be greater than or equal to the twelfth partition 1732 at sides of one or more among the fourth vibration device 500L, the fifth vibration device 500R, the sixth vibration device 500C, the seventh vibration device 500LC, and the eighth vibration device 500RC. A size of the eleventh partition 1731 at sides of one or more among the first vibration device 500HL, the second vibration device 500HR, and the third vibration device 500HC may be greater than or equal to the thirteenth partition 1733 at sides of one or more among the ninth vibration device 500BL, the tenth vibration device 500BR, and the eleventh vibration device 500BC.

According to some embodiments of the present disclosure, the display apparatus may include the first partition 1711 and the eleventh partition 1731 at one or more sides of the first vibration device 500HL. The display apparatus may include the third partition 1721 and the twelfth partition 1732 at one or more sides of the fourth vibration device 500L. The display apparatus may include the seventh partition 1741 and the thirteenth partition 1733 at one or more sides of the ninth vibration device 500BL. For example, a size of one or more among the first partition 1711 and the eleventh partition 1731 at one or more sides of the first vibration device 500HL may differ from one or more among the third partition 1721 and the twelfth partition 1732 at one or more sides of the fourth vibration device 500L. For example, a size of one or more among the first partition 1711 and the eleventh partition 1731 at one or more sides of the first vibration device 500HL may be greater than one or more among the third partition 1721 and the twelfth partition 1732 at one or more sides of the fourth vibration device 500L. For example, a size of one or more among the first partition 1711 and the eleventh partition 1731 at one or more sides of the first vibration device 500HL may differ from one or more among the seventh partition 1741 and the thirteenth partition 1733 at one or more sides of the ninth vibration device 500BL. For example, a size of one or more among the first partition 1711 and the eleventh partition 1731 at one or more sides of the first vibration device 500HL may be greater than one or more among the seventh partition 1741 and the thirteenth partition 1733 at one or more sides of the ninth vibration device 500BL. For example, a size of one or more among the third partition 1721 and the twelfth partition 1732 at one or more sides of the fourth vibration device 500L may be the same as one or more among the seventh partition 1741 and the thirteenth partition 1733 at one or more sides of the ninth vibration device 500BL. For example, a size of one or more among the first partition 1711 and the eleventh partition 1731 at one or more sides of the first vibration device 500HL may be the same as one or more among the seventh partition 1741 and the thirteenth partition 1733 at one or more sides of the ninth vibration device 500BL. For example, a size of one or more among the first partition 1711 and the eleventh partition 1731 at one or more sides of the first vibration device 500HL may be the same as one or more among the third partition 1721 and the twelfth partition 1732 at one or more sides of the fourth vibration device 500L.

According to some embodiments of the present disclosure, the display apparatus may include the second partition 1712 and the eleventh partition 1731 at one or more sides of the second vibration device 500HR. The display apparatus may include the fourth partition 1722 and the twelfth partition 1732 at one or more sides of the fifth vibration device 500R. The display apparatus may include the eighth partition 1742 and the thirteenth partition 1733 at one or more sides of the tenth vibration device 500BR. For example, a size of one or more among the second partition 1712 and the eleventh partition 1731 at one or more sides of the second vibration device 500HR may differ from one or more among the fourth partition 1722 and the twelfth partition 1732 at one or more sides of the fifth vibration device 500R. For example, a size of one or more among the second partition 1712 and the eleventh partition 1731 at one or more sides of the second vibration device 500HR may be greater than one or more among the fourth partition 1722 and the twelfth partition 1732 at one or more sides of the fifth vibration device 500R. For example, a size of one or more among the fourth partition 1722 and the twelfth partition 1732 at one or more sides of the fifth vibration device 500R may be the same as one or more among the eighth partition 1742 and the thirteenth partition 1733 at one or more sides of the tenth vibration device 500BR. For example, a size of one or more among the second partition 1712 and the eleventh partition 1731 at one or more sides of the second vibration device 500HR may be the same as one or more among the eighth partition 1742 and the thirteenth partition 1733 at one or more sides of the tenth vibration device 500BR. For example, a size of one or more among the second partition 1712 and the eleventh partition 1731 at one or more sides of the second vibration device 500HR may be the same as one or more among the fourth partition 1722 and the twelfth partition 1732 at one or more sides of the fifth vibration device 500R.

According to some embodiments of the present disclosure, the display apparatus may include the first partition 1711, the second partition 1712, and the eleventh partition 1731 at one or more sides of the third vibration device 500HC. A size of the eleventh partition 1731 at one or more sides of the third vibration device 500HC may be the same as one or more among the first partition 1711 and the second partition 1712.

According to some embodiments of the present disclosure, the display apparatus may include the sixth partition 1724 and the twelfth partition 1732 at one or more sides of the sixth vibration device 500C. A size of the sixth partition 1724 may be the same as one or more among the third partition 1721 and the fourth partition 1722. For example, the display apparatus may include the fifth partition 1723 and the twelfth partition 1732 at one or more sides of the seventh vibration device 500LC. A size of the fifth partition 1723 may be the same as one or more among the third partition 1721 and the fourth partition 1722. For example, the display apparatus may include the fourth partition 1722 and the twelfth partition 1732 at one or more sides of the eighth vibration device 500RC. A size of the fourth partition 1722 may be the same as the third partition 1721.

According to some embodiments of the present disclosure, the display apparatus may include the ninth partition 1743, the tenth partition 1744, and the thirteenth partition 1733 at one or more sides of the eleventh vibration device 500BC. A size of one or more among the ninth partition 1743 and the tenth partition 1744 may be the same as one or more among the seventh partition 1741 and the eighth partition 1742.

According to some embodiments of the present disclosure, the first to third vibration devices 500HL to 500HC disposed at the upper region of the display device 100 may include three channels. The fourth to eighth vibration devices 500L to 500R disposed at the center region of the display device 100 may include five channels. The ninth to eleventh vibration devices 500BL to 500BC disposed at the lower region of the display device 100 may include three channels. The fourth to eighth vibration devices 500L to 500R disposed at the center region of the display device 100 may include five channels which are main channels. The first to third vibration devices 500HL to 500HC disposed at the upper region of the display device 100 and the ninth to eleventh vibration devices 500BL to 500BC disposed at the lower region of the display device 100 may include secondary or auxiliary channels. For example, a size of one or more partitions at one or more sides of vibration devices disposed at the center region of the display device 100 may be configured to differ from one or more partitions at one or more sides of vibration devices disposed at the upper and lower regions of the display device 100. For example, a size of one or more partitions at one or more sides of vibration devices disposed at the center region of the display device 100 may be configured to be greater than one or more partitions at one or more sides of vibration devices disposed at the upper and lower regions of the display device 100. For example, a size of one or more partitions at one or more sides of the vibration devices disposed at the center region of the display device 100 may be configured to be smaller than or equal to one or more partitions at one or more sides of vibration devices disposed at the upper region of the display device 100. For example, a size of one or more partitions at one or more sides of the vibration devices disposed at the center region of the display device 100 may be configured to be smaller than or equal to one or more partitions at one or more sides of vibration devices disposed at the lower region of the display device 100. For example, a size of one or more partitions at one or more sides of the vibration devices disposed at the center region of the display device 100 may be configured to be greater than or equal to one or more partitions at one or more sides of vibration devices disposed at the lower region of the display device 100. Accordingly, a vibration device for outputting a multichannel including eleven channels may be provided. For example, the first to eleventh vibration devices 500HL to 500BC may be provided at the display apparatus, thereby providing a display apparatus for implementing a multichannel capable of outputting a sound based on a motion and/or an action of a viewer or a display image.

For example, a size of partitions disposed at sides of one or more among the fourth to eighth vibration devices 500L to 500R disposed at the center region of the display device 100 may be configured to differ from partitions disposed at sides of one or more among the first to third vibration devices 500HL to 500HC disposed at the upper region of the display device 100 and the ninth to eleventh vibration devices 500BL to 500BC disposed at the lower region of the display device 100. For example, a size of partitions disposed at sides of one or more among the fourth to eighth vibration devices 500L to 500R disposed at the center region of the display device 100 may be configured to be smaller than or equal to partitions disposed at sides of one or more among the first to third vibration devices 500HL to 500HC disposed at the upper region of the display device 100. For example, a size of partitions disposed at sides of one or more among the fourth to eighth vibration devices 500L to 500R disposed at the center region of the display device 100 may be configured to be smaller than or equal to partitions disposed at sides of one or more among the ninth to eleventh vibration devices 500BL to 500BC disposed at the lower region of the display device 100. For example, a size of partitions disposed at sides of one or more among the first to third vibration devices 500HL to 500HC disposed at the upper region of the display device 100 may be configured to be greater than or equal to partitions disposed at sides of one or more among the ninth to eleventh vibration devices 500BL to 500BC disposed at the lower region of the display device 100. Accordingly, a vibration device for outputting a multichannel including eleven channels may be provided. For example, the first to eleventh vibration devices 500HL to 500BC may be provided in the display apparatus, thereby providing a display apparatus for implementing a multichannel capable of outputting a sound based on a motion and/or an action.

With reference to FIGS. 6A and 6B, one or more among the first to third vibration devices 500HL to 500HC may be configured as the same vibration device as one or more among the fourth to eleventh vibration devices 500L to 500BC. For example, one or more among the first to third vibration devices 500HL to 500HC may be configured as a coil type vibration device. One or more among the first to third vibration devices 500HL to 500HC may be configured as the same vibration device as one or more among the fourth to eighth vibration devices 500L to 500RC. One or more among the first to third vibration devices 500HL to 500HC may be configured as the same vibration device as one or more among the ninth to eleventh vibration devices 500BL to 500BC. For example, one or more among the ninth to eleventh vibration devices 500BL to 500BC may be configured as a coil type vibration device. One or more among the fourth to eighth vibration devices 500L to 500RC may be configured as a coil type vibration device. A coil type vibration device may be configured as the vibration device described above with reference to FIGS. 2 to 5E.

With reference to FIGS. 6A and 6B, a size of one or more among the first to third regions (1) to (3) may differ from one or more among the fourth to eighth regions (4) to (8). For example, a size of one or more among the first to third regions (1) to (3) may be greater than one or more among the fourth to eighth regions (4) to (8). A size of one or more among the ninth to thirteenth regions (9) to (13) may differ from one or more among the first to third regions (1) to (3). A size of one or more among the ninth to thirteenth regions (9) to (13) may be smaller than one or more among the first to third regions (1) to (3). A size of one or more among the fourth to eighth regions (4) to (8) may be the same as one or more among the ninth to thirteenth regions (9) to (13). As another embodiment of the present disclosure, a size of one or more among the first to third regions (1) to (3) may be the same as one or more among the fourth to eighth regions (4) to (8). As another embodiment of the present disclosure, a size of one or more among the first to third regions (1) to (3) may be the same as one or more among the ninth to thirteenth regions (9) to (13). As another embodiment of the present disclosure, a size of one or more among the ninth to thirteenth regions (9) to (13) may be the same as one or more among the fourth to eighth regions (4) to (8).

With reference to FIGS. 6C and 6D, a display apparatus according to some embodiments of the present disclosure may include a display device 100 including a display panel 110 which displays an image and includes first to eleventh regions (1) to (11). One or more vibration devices may be disposed at one or more among the first to eleventh regions (1) to (11). A ninth vibration device 500BL may be disposed at the ninth region (9). A tenth vibration device 500BR may be disposed at the tenth region (10). An eleventh vibration device 500BC may be disposed at the eleventh region (11). Descriptions of a first partition 1711, first to eleventh vibration devices 500HL to 500BC, a second partition 1712, and third to sixth partitions 1721 to 1724 may be the same as descriptions given above with reference to FIGS. 6A and 6B, and thus, repetitive descriptions are omitted or will be briefly given below.

According to some embodiments of the present disclosure, a seventh partition 1741 may be disposed between the ninth region (9) and the eleventh region (11). An eighth partition 1742 may be disposed between the tenth region (10) and the eleventh region (11). With reference to FIG. 6C, a size of one or more among the seventh partition 1741 and the eighth partition 1742 may be configured to differ from one or more among the third to sixth partitions 1721 to 1724. For example, a size of one or more among the seventh partition 1741 and the eighth partition 1742 may be greater than one or more among the third to sixth partitions 1721 to 1724. A length of one or more among the seventh partition 1741 and the eighth partition 1742 may differ from one or more among the third to sixth partitions 1721 to 1724. For example, a length of one or more among the seventh partition 1741 and the eighth partition 1742 may be greater than one or more among the third to sixth partitions 1721 to 1724. For example, a $3\text{-}2^{nd}$ length b9 of the thirteenth partition 1733 or at the ninth region (9) may be configured to differ from a $2\text{-}2^{nd}$ length b4 of the twelfth partition 1732 or at the fourth region (4). For example, a $2\text{-}2^{nd}$ length b4 of the twelfth partition 1732 or at the fourth region (4) may be smaller than the $3\text{-}2^{nd}$ length b9 of the thirteenth partition 1733 or at the ninth region (9). A $2\text{-}1^{st}$ length a4 of the third partition 1721 may be smaller than a $3\text{-}1^{st}$ length a9 of the seventh partition 1741. A $2\text{-}2^{nd}$ length b4 of the twelfth partition 1732 or at the fourth region (4) may be smaller than a $3\text{-}2^{nd}$ length b9 of the thirteenth partition 1733 or at the ninth region (9). For example, the $2\text{-}1^{st}$ length a4 of the third partition 1721 may be 250 mm or more, but embodiments of the present disclosure are not limited thereto. For example, the $2\text{-}2^{nd}$ length b4 of the twelfth partition 1732 or at the fourth region (4) may be 250 mm or more, but embodiments of the present disclosure are not limited thereto. For example, the $3\text{-}1^{st}$ length a9 of the seventh partition 1741 may be 300 mm or more, but embodiments of the present disclosure are not limited thereto. For example, the $3\text{-}2^{nd}$ length b9 of the thirteenth partition 1733 or at the ninth region (9) may be 300 mm or more, but embodiments of the present disclosure are not limited thereto.

For example, a size of one or more among the first partition 1711 and the second partition 1712 may be the same as one or more among the seventh partition 1741 and the eighth partition 1742. For example, a $1\text{-}1^{st}$ length a1 of the first partition 1711 may be 300 mm or more, but embodiments of the present disclosure are not limited thereto. For example, a $1\text{-}2^{nd}$ length b1 of the eleventh partition 1731 or at the first region (1) may be 300 mm or more, but embodiments of the present disclosure are not limited thereto.

Therefore, the first to third vibration devices 500HL to 500HC and the ninth to eleventh vibration devices 500BL to 500BC may output a sound band of 300 Hz or more, and the fourth to eighth vibration devices 500L to 500RC may output a sound band of a full range. Also, a size of one or more among the first partition 1711, the second partition 1712, the seventh partition 1741, and the eighth partition 1742 may be configured to be greater than one or more among the third to sixth partitions 1721 to 1724, thereby providing a display apparatus for enhancing a sound of the low-pitched sound band.

With reference to FIGS. 6C and 6D, a size of one or more among the first to third regions (1) to (3) may differ from one or more among the fourth to eighth regions (4) to (8). For example, a size of one or more among the first to third regions (1) to (3) may be greater than one or more among the fourth to eighth regions (4) to (8). A size of one or more among the ninth to eleventh regions (9) to (11) may differ from one or more among the fourth to eighth regions (4) to (8). A size of one or more among the ninth to eleventh regions (9) to (11) may be greater than one or more among the fourth to eighth regions (4) to (8). A size of one or more among the first to third regions (1) to (3) may be the same as one or more among the ninth to eleventh regions (9) to (11). As another embodiment of the present disclosure, a size of one or more among the first to third regions (1) to (3) may be the same as one or more among the fourth to eighth regions (4) to (8). As another embodiment of the present disclosure, a size of one or more among the first to third regions (1) to (3) may be the same as one or more among the ninth to eleventh regions (9) to (11). As another embodiment, a size of one or more among the ninth to eleventh regions (9) to (11) may be the same as one or more among the fourth to eighth regions (4) to (8).

With reference to FIG. 6D, a display apparatus according to some embodiments of the present disclosure may include first to twelfth partitions 1711 to 1732 and a fourteenth partition 1750 between a supporting member 300 and a display panel 110. Descriptions of the elements may be the same as the descriptions of FIG. 6B, and thus, their repetitive descriptions may be omitted or will be briefly given.

According to some embodiments of the present disclosure, the ninth to eleventh regions (9) to (11) may be covered by a set cover. For example, the set cover may include a set rear cover and a set back cover, but embodiments of the present disclosure are not limited thereto. For example, because the ninth to eleventh regions (9) to (11) are covered by the set cover, the display apparatus according to an embodiment of the present disclosure may have a clean back design where a rear surface or a portion of the at least one vibration device disposed on a rear surface of the display apparatus is not exposed or is not seen by eyes of a user, thereby improving a rear appearance design of the display apparatus. For example, the ninth to eleventh vibration devices 500BL to 500BC disposed at the ninth to eleventh regions (9) to (11) may be covered by the set cover, and thus, the display apparatus according to an embodiment of the present disclosure may have a clean back design where a rear surface or a portion of each of the ninth to eleventh vibration devices 500BL to 500BC is not exposed or is not seen by eyes of a user, thereby improving a rear appearance design of the display apparatus.

According to some embodiments of the present disclosure, the ninth to thirteenth regions (9) to (13) may be covered by a set cover. For example, the set cover may include a set rear cover and a set back cover, but embodiments of the present disclosure are not limited thereto. For example, because the ninth to thirteenth regions (9) to (13) are covered by the set cover, the display apparatus according to an embodiment of the present disclosure may have a clean back design where a rear surface or a portion of the at least one vibration device disposed on a rear surface of the display apparatus is not exposed or is not seen by eyes of a user, thereby improving a rear appearance design of the display apparatus. For example, the ninth to eleventh vibration devices 500BL to 500BC disposed at the ninth to eleventh regions (9) to (11) may be covered by the set cover, and thus, the display apparatus according to an embodiment of the present disclosure may have a clean back design where a rear surface or a portion of each of the ninth to eleventh vibration devices 500BL to 500BC is not exposed or is not seen by eyes of a user, thereby improving a rear appearance design of the display apparatus.

According to some embodiments of the present disclosure, a set cover may cover up to the ninth to eleventh regions (9) to (11) from lower portions of the fourth to eighth regions (4) to (8). For example, the set cover may cover up to the ninth to eleventh vibration devices 500BL to 500BC from lower portions of the fourth to eighth vibration devices 500L to 500RC. The fourth to eighth vibration devices 500L to 500RC may not be covered by the set cover. For example, the set cover may cover up to the ninth to eleventh vibration devices 500BL to 500BC from the lower portions of the fourth to eighth regions (4) to (8). For example, the set cover may cover up to the ninth to thirteenth regions (9) to (13) from the lower portions of the fourth to eighth vibration devices 500L to 500RC. The fourth to eighth vibration devices 500L to 500RC may not be covered by the set cover. Accordingly, the display apparatus according to an embodiment of the present disclosure may have a clean back design where a rear surface or a portion of the at least one vibration device disposed on the rear surface of the display apparatus is not exposed or is not seen by eyes of a user, thereby improving a rear appearance design of the display apparatus.

Therefore, according to an embodiment of the present disclosure, a size of a partition near a vibration device may be configured differently, thereby providing a display apparatus including a vibration device for outputting a sound band of 180 Hz or more and/or a sound band of a full range. Also, according to an embodiment of the present disclosure, a display apparatus where eleven channels are provided in a display apparatus may be implemented. According to an embodiment of the present disclosure, a vibration device including eleven channels for realizing a sound based on upward, downward, left, and right actions or motions in addition to a sound based on simple left and right actions may be implemented. For example, a stereo sound and a vivid sound may be provided at upward, downward, left, and right sides based on a position of an object or a person in a displayed screen.

FIGS. 7A to 7D illustrate a display apparatus including a vibration device according to another embodiment of the present disclosure.

Figure 7A:
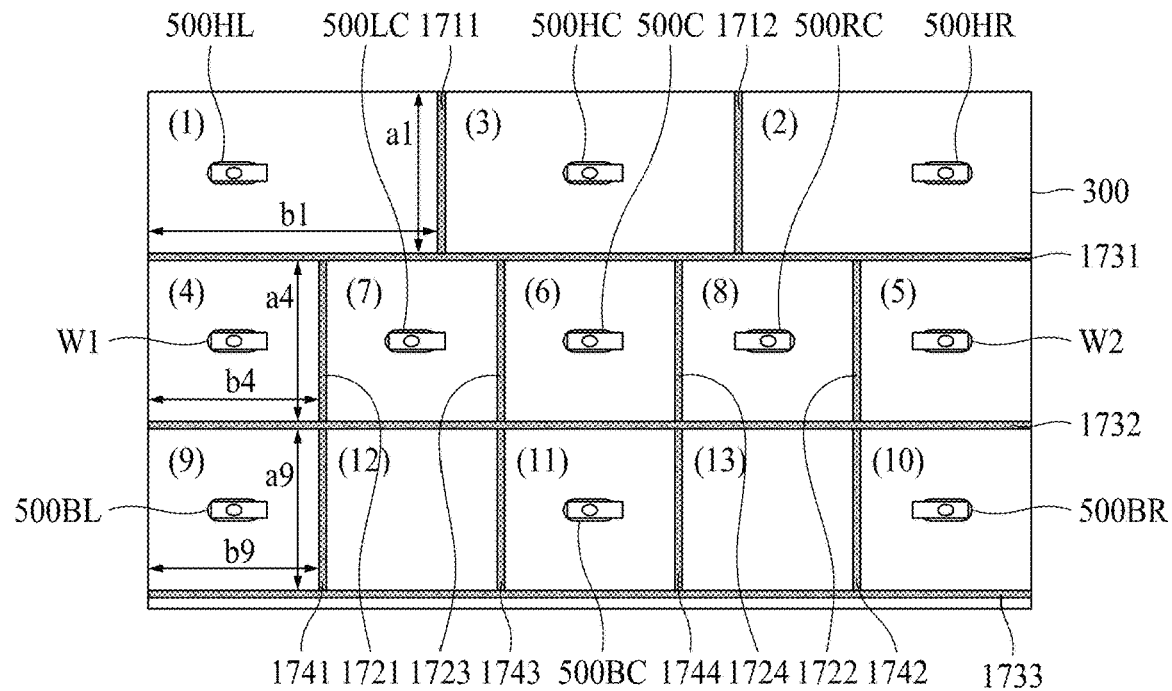
FIGS. 7A to 7D illustrate a display apparatus including a vibration device according to another embodiment of the present disclosure.
Figure 7B:
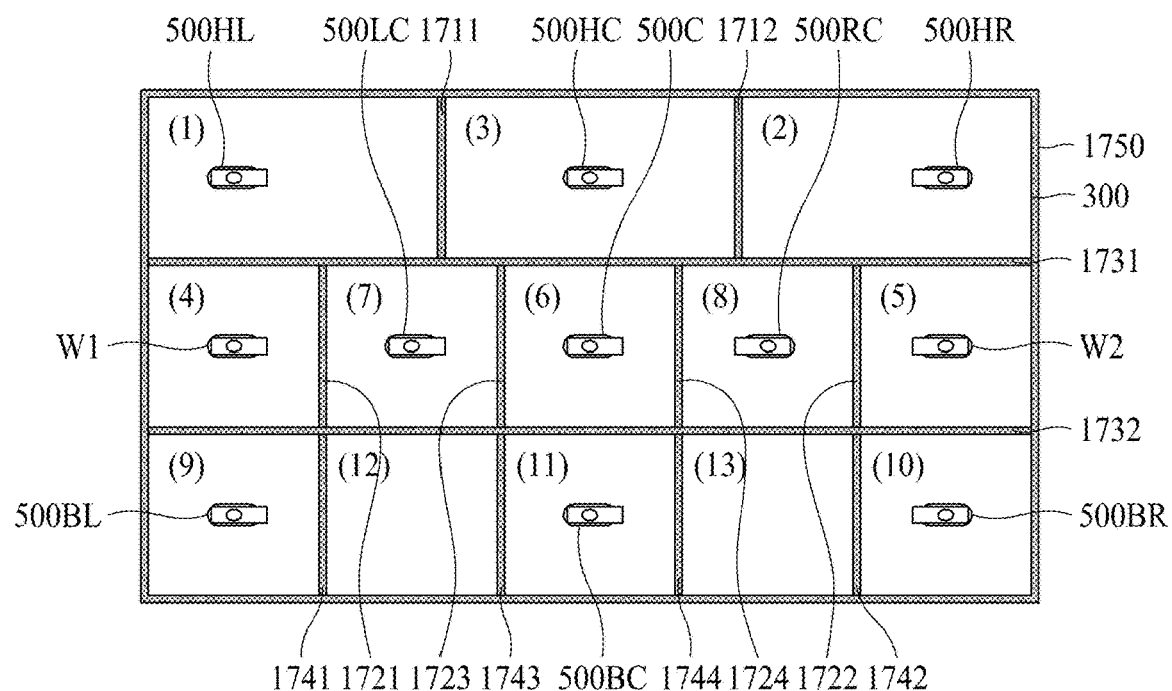

With reference to FIGS. 7A and 7B, the display apparatus may include a display device 100 including a display panel 110 including first to thirteenth regions (1) to (13). One or more vibration devices may be disposed at one or more among the first to thirteenth regions (1) to (13).

According to some embodiments of the present disclosure, a fourth vibration device W1 and a fifth vibration device W2 may be configured as the same vibration device, for the left-right symmetricity of a sound. For example, a fourth vibration device W1 and a fifth vibration device W2 may include a woofer-integrated vibration device. For example, one or more among the first to third vibration devices 500HL to 500HC may be configured as a vibration device which differs from one or more among the fourth vibration device W1 and the fifth vibration device W2. For example, one or more among the sixth to eighth vibration devices 500C to 500RC may be configured as a vibration device which differs from one or more among the fourth vibration device W1 and the fifth vibration device W2. For example, one or more among the ninth to eleventh vibration devices 500BL to 500BC may be configured as a vibration device which differs from one or more among the fourth vibration device W1 and the fifth vibration device W2. For example, one or more among the first to eleventh vibration devices 500HL to 500BC may be configured as two or more different vibration devices. Descriptions of the first to third vibration devices 500HL to 500HC and the sixth to eleventh vibration devices 500C to 500BC may be the same as the descriptions of FIGS. 6A and 6B, and thus, their repetitive descriptions may be omitted. Descriptions of first to fourteenth partitions 1711 to 1750 may be the same as the descriptions of FIGS. 6A and 6B, and thus, their repetitive descriptions may be omitted or will be briefly given. A woofer-integrated vibration device will be described below with reference to FIGS. 8A and 8B.

For example, because each of the fourth vibration device W1 and the fifth vibration device W2 is configured as a woofer-integrated vibration device or a vibration device including a woofer, it is not needed to separately place a woofer for reproducing a sound of the low-pitched sound band.

Therefore, according to an embodiment of the present disclosure, a size of a partition near a vibration device may be configured differently, and a vibration device including a woofer may be provided, thereby providing a display apparatus including a vibration device for outputting a sound band of 180 Hz or more and/or a sound band of a full range.

With reference to FIG. 7B, a display apparatus according to some embodiments of the present disclosure may include the first to twelfth partitions 1711 to 1732, and a fourteenth partition 1750 provided between a supporting member 300 and a display panel 110.

Descriptions of the elements may be the same as the descriptions of FIG. 6B, and thus, their repetitive descriptions may be omitted or will be briefly given.

Figure 7C:
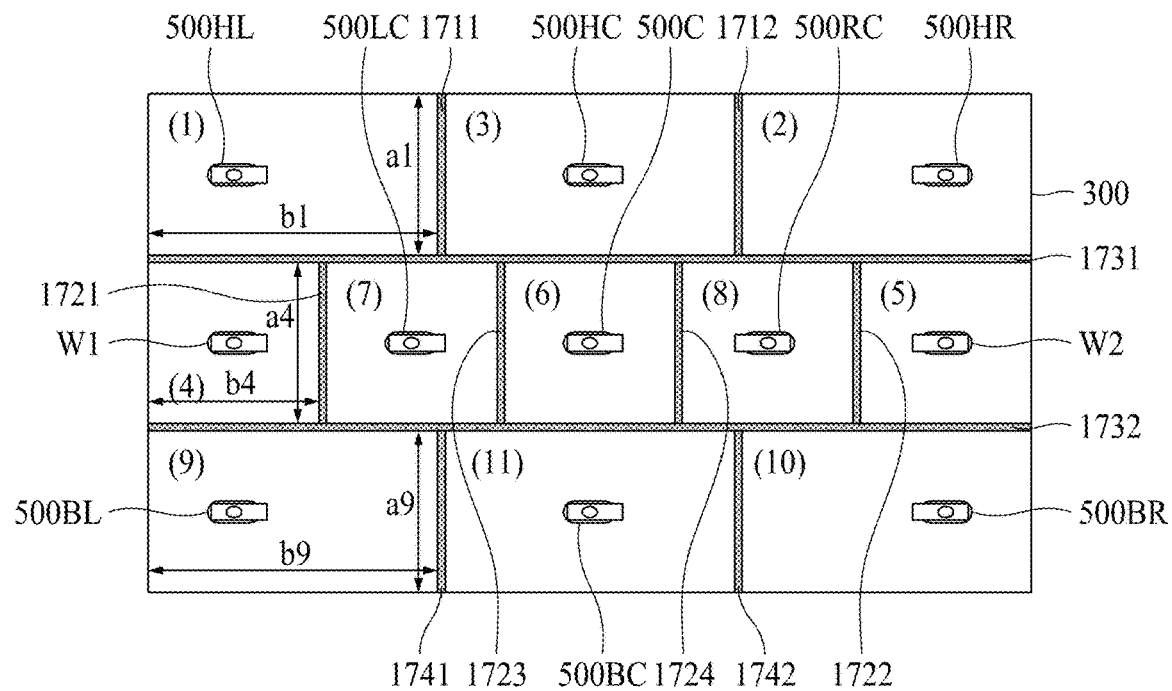
Figure 7D:
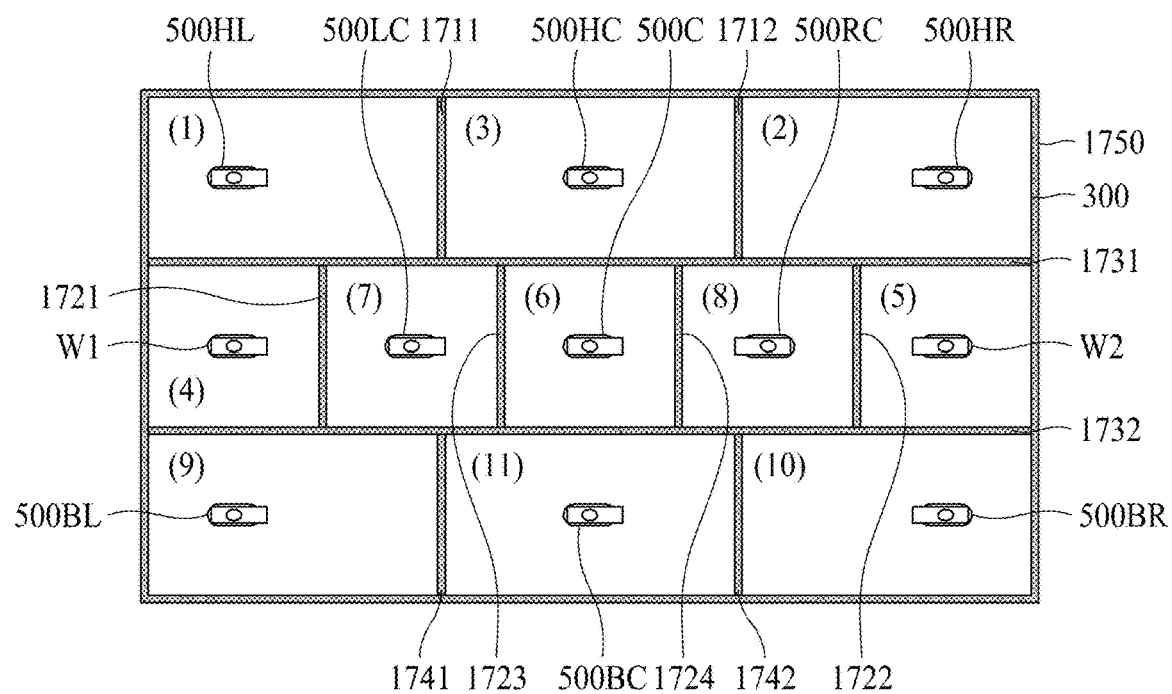

With reference to FIGS. 7C and 7D, a display apparatus according to some embodiments of the present disclosure may include a display device 100 including a display panel 110 which displays an image and includes first to eleventh regions (1) to (11). At least one or more vibration devices may be disposed at at least one or more among the first to eleventh regions (1) to (11). A ninth vibration device 500BL may be disposed at the ninth region (9). A tenth vibration device 500BR may be disposed at the tenth region (10). An eleventh vibration device 500BC may be disposed at the eleventh region (11). Descriptions of a first partition 1711, first to eleventh vibration devices 500HL to 500BC, a second partition 1712, and third to sixth partitions 1721 to 1724 may be the same as descriptions given above with reference to FIGS. 6A and 6B, and thus, repetitive descriptions are omitted or will be briefly given below.

According to some embodiments of the present disclosure, a seventh partition 1741 may be disposed between the ninth region (9) and the eleventh region (11). An eighth partition 1742 may be disposed between the tenth region

(10) and the eleventh region (11). With reference to FIG. 7C, a size of one or more among the seventh partition 1741 and the eighth partition 1742 may be configured to differ from one or more among the third to sixth partitions 1721 to 1724. For example, a size of one or more among the seventh partition 1741 and the eighth partition 1742 may be greater than one or more among the third to sixth partitions 1721 to 1724.

A length of one or more among the seventh partition 1741 and the eighth partition 1742 may differ from one or more among the third to sixth partitions 1721 to 1724. For example, a length of one or more among the seventh partition 1741 and the eighth partition 1742 may be greater than one or more among the third to sixth partitions 1721 to 1724. For example, a $3\text{-}2^{nd}$ length b9 of the thirteenth partition 1733 or at the ninth region (9) may be configured to differ from a $2\text{-}2^{nd}$ length b4 of the twelfth partition 1732 or at the fourth region (4). For example, a $2\text{-}2^{nd}$ length b4 of the twelfth partition 1732 or at the fourth region (4) may be smaller than the $3\text{-}2^{nd}$ length b9 of the seventh partition 1741 or at the ninth region (9). A $2\text{-}1^{st}$ length a4 of the third partition 1721 or at the fourth region (4) may be smaller than a $3\text{-}1^{st}$ length a9 of the seventh partition 1741 or at the ninth region (9). A $2\text{-}2^{nd}$ length b4 of the twelfth partition 1732 or at the fourth region (4) may be smaller than a $3\text{-}2^{nd}$ length b9 of the seventh partition 1741 or at the ninth region (9). For example, the $2\text{-}1^{st}$ length a4 of the third partition 1721 may be 250 mm or more, but embodiments of the present disclosure are not limited thereto. For example, the $2\text{-}2^{nd}$ length b4 of the twelfth partition 1732 or at the fourth region (4) may be 250 mm or more, but embodiments of the present disclosure are not limited thereto. For example, the $3\text{-}1^{st}$ length a9 of the seventh partition 1741 may be 300 mm or more, but embodiments of the present disclosure are not limited thereto. For example, the $3\text{-}2^{nd}$ length b9 of the seventh partition 1741 or at the ninth region (9) may be 300 mm or more, but embodiments of the present disclosure are not limited thereto. For example, a size of one or more among the first partition 1711 and the second partition 1712 may be the same as one or more among the seventh partition 1741 and the eighth partition 1742. For example, a $1\text{-}1^{st}$ length a1 of the first partition 1711 may be 300 mm or more, but embodiments of the present disclosure are not limited thereto. For example, a $1\text{-}2^{nd}$ length b1 of the eleventh partition 1731 or at the first region (1) may be 300 mm or more, but embodiments of the present disclosure are not limited thereto.

Therefore, the first to third vibration devices 500HL to 500HC and the ninth to eleventh vibration devices 500BL to 500BC may output a sound band of 300 Hz or more, and the fourth to eighth vibration devices 500L to 500RC may output a sound band of a full range. Also, a size of one or more among the first partition 1711, the second partition 1712, the seventh partition 1741, and the eighth partition 1742 may be configured to be greater than one or more among the third to sixth partitions 1721 to 1724 and a vibration device including a woofer may be provided, thereby providing a display apparatus for more enhancing a sound of the low-pitched sound band.

With reference to FIGS. 7C and 7D, a size of one or more among the first to third regions (1) to (3) may differ from one or more among the fourth to eighth regions (4) to (8). For example, a size of one or more among the first to third regions (1) to (3) may be greater than one or more among the fourth to eighth regions (4) to (8). A size of one or more among the ninth to eleventh regions (9) to (11) may differ from one or more among the fourth to eighth regions (4) to (8). A size of one or more among the ninth to eleventh regions (9) to (11) may be greater than one or more among the fourth to eighth regions (4) to (8). A size of one or more among the first to third regions (1) to (3) may be the same as one or more among the ninth to eleventh regions (9) to (11). As another embodiment of the present disclosure, a size of one or more among the first to third regions (1) to (3) may be the same as one or more among the fourth to eighth regions (4) to (8). As another embodiment of the present disclosure, a size of one or more among the first to third regions (1) to (3) may be the same as one or more among the ninth to eleventh regions (9) to (11). As another embodiment of the present disclosure, a size of one or more among the ninth to eleventh regions (9) to (11) may be the same as one or more among the fourth to eighth regions (4) to (8).

With reference to FIG. 7D, a display apparatus according to some embodiments of the present disclosure may include first to twelfth partitions 1711 to 1732, and a fourteenth partition 1750 between a supporting member 300 and a display panel 110. Descriptions of the elements may be the same as the descriptions of FIG. 6B, and thus, their repetitive descriptions may be omitted or will be briefly given.

Therefore, according to an embodiment of the present disclosure, a size of a partition near a vibration device may be configured differently, thereby providing a display apparatus including a vibration device for outputting a sound band of 180 Hz or more and/or a sound band of a full range. Also, according to an embodiment of the present disclosure, a display apparatus where eleven channels are provided in a display device may be implemented. According to an embodiment of the present disclosure, a vibration device including eleven channels for realizing a sound based on upward, downward, left, and right actions or motions in addition to a sound based on simple left and right actions may be implemented. For example, a stereo sound and a vivid sound may be provided at upward, downward, left, and right sides based on a position of an object or a person in a displayed screen.

Figure 8A:
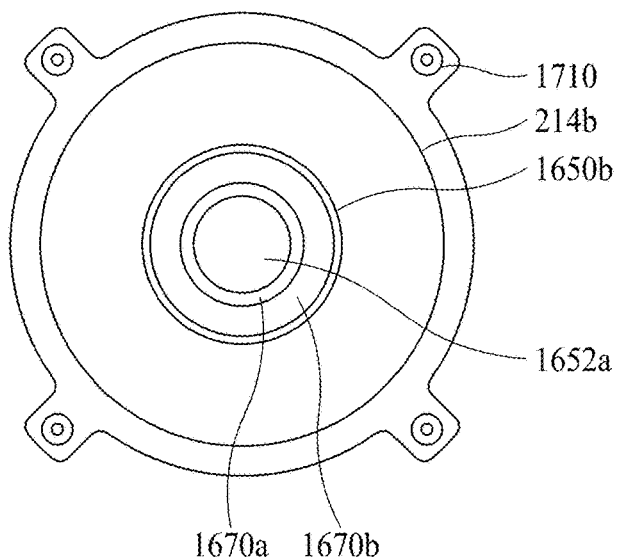
FIGS. 8A and 8B illustrate a vibration device according to another embodiment of the present disclosure.
Figure 8B:
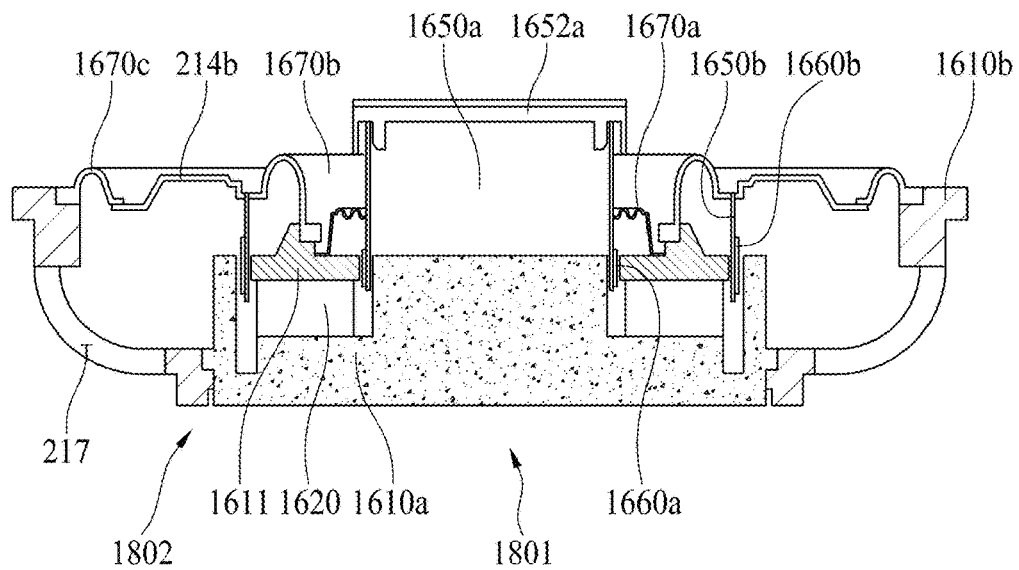

FIGS. 8A and 8B illustrate a vibration device according to another embodiment of the present disclosure.

A vibration device 1800 according to another embodiment of the present disclosure may be a woofer-integrated vibration device, a hybrid vibration device, and a vibration device having a woofer, but embodiments of the present disclosure are not limited thereto. FIG. 8A is a front view of a vibration device, and FIG. 8B is a cross-sectional view of a vibration device.

With reference to FIGS. 8A and 8B, the vibration device 1800 may include a first vibration generating portion 1801 and a second vibration generating portion 1802. For example, the first vibration generating portion 1801 may be disposed on a rear surface of a display panel, and the second vibration generating portion 1802 may be spaced apart from the rear surface of the display panel.

The vibration device 1800 may include a frame for accommodating the first vibration generating portion 1801 and the second vibration generating portion 1802. The frame may include a lower frame 1610a that supports a lower portion of the first and second vibration generating portions 1801 and 1802 and a side frame 1610b connected or coupled to the lower frame 1610a. The frame may be a yoke, but embodiments of the present disclosure are not limited thereto.

The lower frame 1610a may support a rear surface of a magnet 1620. For example, the lower frame 1610a may support a magnet 1620. The magnet 1620 may share the first vibration generating portion 1801 and the second vibration generating portion 1802. For example, a bobbin 1650a of the first vibration generating portion 1801 and a coil 1660a near the bobbin 1650a may be disposed near the magnet 1620. For example, a second bobbin 1650b of the second vibration generating portion 1802 and a second coil 1660b near the second bobbin 1650b may be disposed near the magnet 1620. For example, the lower frame 1610a and a plate 1611 may be respectively disposed a lower portion and an upper portion of the magnet 1620, and may increase a magnet flux density generated through the magnet 1620, the coil 1660a, and the second coil 1660b, thereby enhancing a vibration characteristic. The lower frame 1610a may be a yoke, but embodiments of the present disclosure are not limited thereto.

The side frame 1610b may be connected or coupled to the lower frame 1610a, and may include at least one hole 217 to output a sound or a vibration. For example, the hole 217 may a vent hole. For example, the hole 217 may output sound of a low-pitched sound band, generated by a vibration plate 214b of the second vibration generating portion 1802 in an air gap inside of the vibration device 1800, to a rearward region behind a display panel 110.

The side frame 1610b may include a conductive material, and may control a magnetic flux generated by the magnet 1620. For example, the side frame 1610b may surround the magnet 1620 with being apart therefrom, and thus, may allow a magnetic flux generated by the magnet 1620 to concentrate on the inside of the second bobbin 1650b, thereby preventing a leakage magnetic flux. The side frame 1610b may be a yoke, but embodiments of the present disclosure are not limited thereto. The hole 217 may be provided at the side frame 1610b, and moreover, may be provided at the lower frame 1610a and may be provided at a region connected to the side frame 1610b and the lower frame 1610a. The side frame 1610b may be connected to a supporting member by a connection member 1710 such as a nut or bolt, or may be disposed between the display panel.

The first vibration generating portion 1801 may include the magnet 1620 disposed on the frame, the bobbin 1650a near the magnet 1620, and a coil 1660a and a damper 1670a near the bobbin 1650a. For example, their descriptions are similar to descriptions given above with reference to FIGS. 2 to 5E, and thus, their repetitive descriptions may be omitted or will be briefly given.

The magnet 1620 may be disposed on the lower frame 1610a. For example, the magnet 1620 may be disposed between a plate 1611 and the lower frame 1610a. The lower frame 1610a and the plate 1611 may control a magnetic flux generated by the magnet 1620. For example, the magnet 1620 may be surrounded by the lower frame 1610a and the plate 1611, and thus, the magnetic flux generated by the magnet 1620 may concentrate on the inside of the bobbin 1650a and may be controlled.

The bobbin 1650a may be attached at a rear surface of a bobbin ring 1652a. For example, when a sound generating current (or a vibration generating current) is applied to the coil 1660a wound around an outer circumference surface of the bobbin 1650a and thus a magnetic field is generated in the first vibration generating portion 1801, the display device, for example, the display panel may vibrate based on the magnetic field by the bobbin ring 1652a. The bobbin ring 1652a may be between the bobbin 1650a and the display panel, and may transfer a vibration of the bobbin 1650a to the display panel. The first vibration generating portion 1801 may output a sound of a middle-high-pitched sound band.

The second vibration generating portion 1802 may include the magnet 1620 disposed on the frame, the plate 1611 on the magnet 1620, the second bobbin 1650b near the magnet 1620, and a second coil 1660b and a second damper 1670b near the second bobbin 1650b.

A vibration plate 214b may be disposed on the second bobbin 1650b. For example, the vibration plate 214b may be spaced apart from the rear surface of the display panel, and may prevent heat occurring in the second bobbin 1650b from being transferred to the display panel.

When the sound generating current (or a vibration generating current) is applied to the second coil 1660b wound around an outer circumference surface of the second bobbin 1650b and thus a magnetic field is generated in the second vibration generating portion 1802, the second bobbin 1650b may vibrate an air layer or an air gap of a vibration plate peripheral portion by the vibration plate 214b based on the magnetic field to output a sound.

For example, a front surface of the second bobbin 1650b may contact the vibration plate 214b, and may vibrate the vibration plate 214b based on a state where a current is applied thereto or not. The second vibration generating portion 1802 may output sound to a forward region and a rearward region with respect to the vibration plate 214b. For example, the second vibration generating portion 1802 may output a sound of a low-pitched sound band.

For example, a sound generated by the vibration plate 214b of the second vibration generating portion 1802 may include a first low-pitched sound propagated to an upper portion of the vibration plate 214b and a second low-pitched sound propagated to a lower portion of the vibration plate 214b. For example, the second vibration generating portion 1802 may be a woofer, but embodiments of the present disclosure are not limited thereto.

The magnet 1620 may be disposed on the lower frame 1610a. The plate 1611 may be spaced apart from the vibration plate 214b. The second bobbin 1650b may be disposed at a rear surface of the vibration plate 214b. For example, the second bobbin 1650b may surround the magnet 1620 and the plate 1611.

The second damper 1670b may be disposed between the first vibration generating portion 1801 and the second vibration generating portion 1802. For example, the second damper 1670b may be disposed between the damper 1670a of the first vibration generating portion 1801 and the second bobbin 1650b of the second vibration generating portion 1802. For example, the second damper 1670b may be disposed between the first vibration generating portion 1801 and the vibration plate 214b of the second vibration generating portion 1802. The vibration plate 214b may not physically contact the first vibration generating portion 1801. For example, the second damper 1670b may prevent sound interference between the first vibration generating portion 1801 and the second vibration generating portion 1802. An edge 1670c may be disposed on the vibration plate 214b. The edge 1670c may prevent deformation such as distortion of the vibration plate 214b when the vibration plate 214b performs a vertical motion, and thus, may provide clean sound quality and may enhance the reliability of the vibration device 1800. The second damper 1670b may be a first suspension, and the edge 1670c may be a second suspension, but embodiments of the present disclosure are not limited thereto.

The magnet 1620 of the first vibration generating portion 1801 and the magnet 1620 of the second vibration generating portion 1802 may have magnetic fields in opposite directions. The first vibration generating portion 1801 may vibrate (or directly vibrate) the display panel to output sound of a high-pitched sound band to a forward region of the display panel, and the second vibration generating portion 1802 may output sound of a low-pitched sound band to a rearward region of the display panel. Accordingly, because the first vibration generating portion 1801 and the second vibration generating portion 1802 have the magnetic fields in opposite directions, a vibration of the first vibration generating portion 1801 and the second vibration generating portion 1802 may be independently driven or controlled.

Therefore, the woofer-integrated vibration device may include a woofer disposed near the vibration device. The vibration device may be disposed at the rear surface of the display panel and may generate a sound of a middle-high-pitched sound band, and the woofer may be spaced apart from the rear surface of the display panel and may perform a vertical vibration to generate a sound of a low-pitched sound band. For example, the vibration device and the woofer may be driven based on different sound signals or voice signals applied thereto. Accordingly, the sound of the low-pitched sound band may be enhanced by the woofer-integrated vibration device.

Figure 9A:
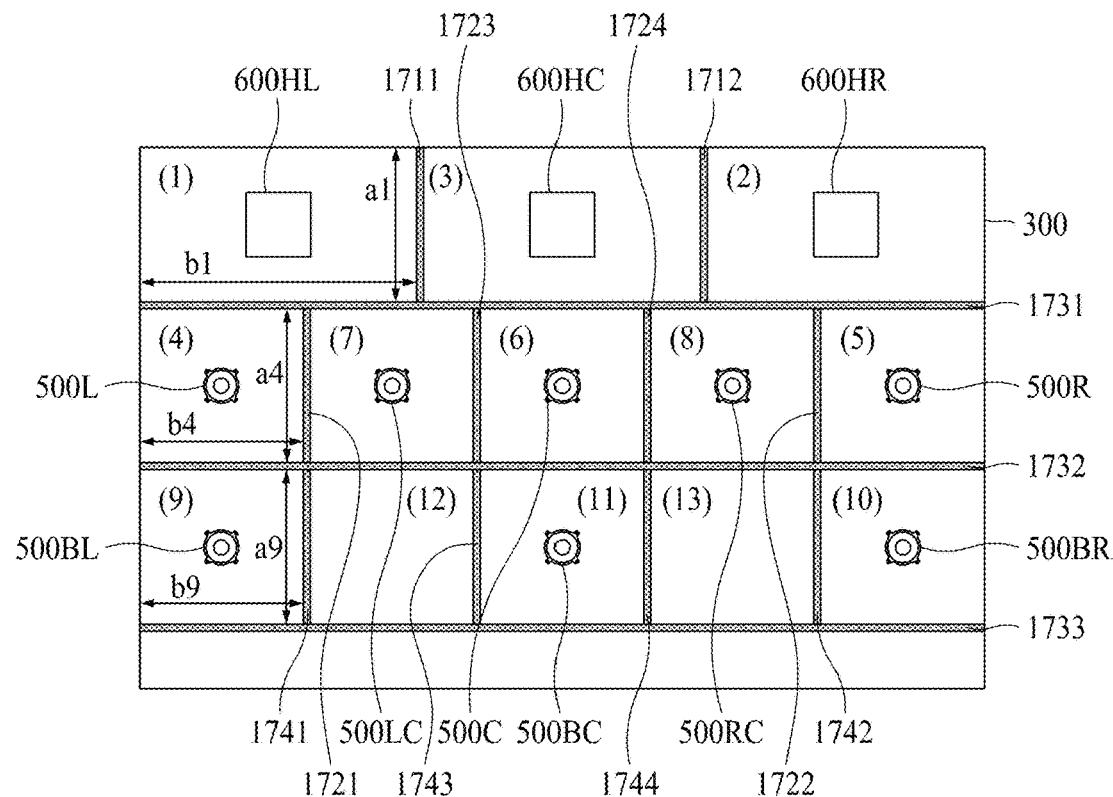
FIGS. 9A and 9B illustrate a display apparatus including a vibration device according to another embodiment of the present disclosure.
Figure 9B:
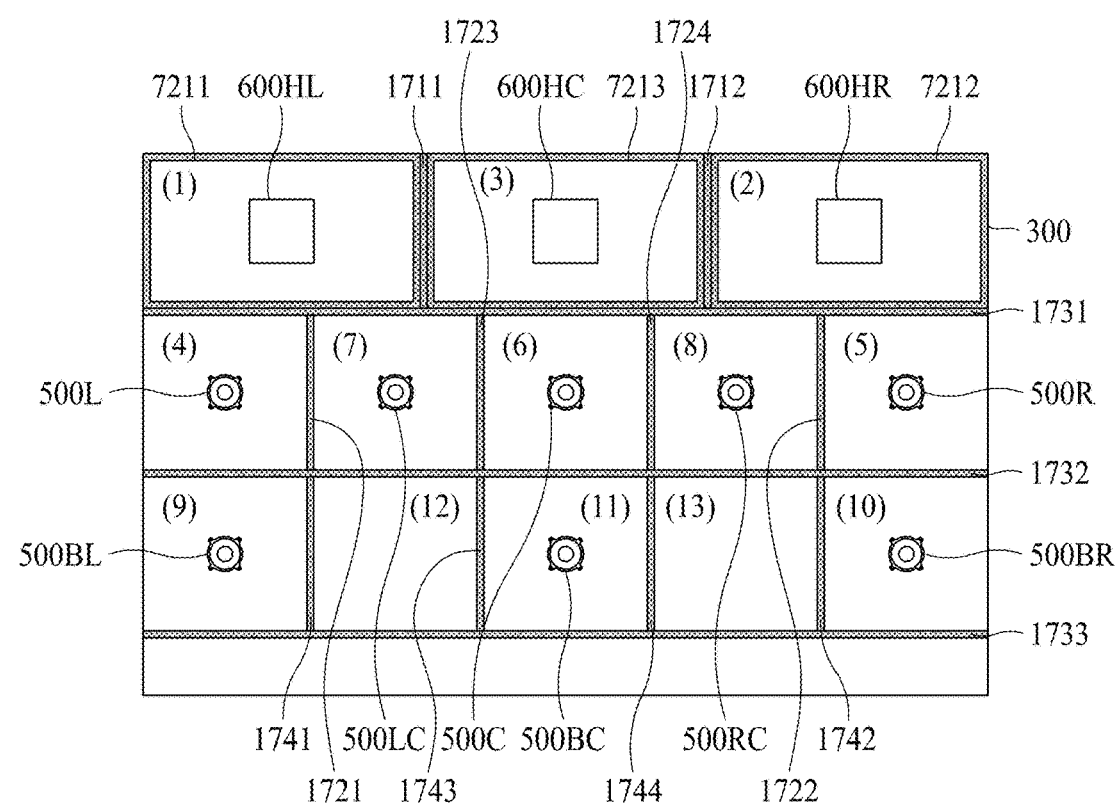

FIGS. 9A and 9B illustrate a display apparatus including a vibration device according to another embodiment of the present disclosure.

With reference to FIGS. 9A and 9B, the display apparatus according to another embodiment of the present disclosure may include a display device 100 including a display panel 110 including first to thirteenth regions (1) to (13). One or more vibration devices may be disposed at one or more among the first to thirteenth regions (1) to (13).

According to some embodiments of the present disclosure, one or more among first to third vibration devices 600HL to 600HC may be configured as a vibration device which differs from one or more among fourth to eighth vibration devices 500L to 500RC. For example, one or more among the first to third vibration devices 600HL to 600HC may be configured as a vibration device which differs from one or more of ninth to eleventh vibration devices 500BL to 500BC. For example, one or more among the first to third vibration devices 600HL to 600HC may be configured as a film type vibration device. A film type vibration device will be described below with reference to FIGS. 14 to 19. For example, the fourth to eleventh vibration devices 500L to 500BC may be configured as a coil type vibration device. For example, the first to eleventh vibration devices 600HL to 500BC may be configured as two or more different vibration devices.

With reference to FIGS. 9A and 9B, a size of one or more among third to sixth partitions 1721 to 1724 may be configured to differ from one or more among a first partition 1711 and a second partition 1712. For example, a size of one or more among the third to sixth partitions 1721 to 1724 may be smaller than one or more among the first partition 1711 and the second partition 1712. For example, a length of one or more among the third to sixth partitions 1721 to 1724 may differ from one or more among the first partition 1711 and the second partition 1712. For example, a length of one or more among the third to sixth partitions 1721 to 1724 may be smaller than one or more among the first partition 1711 and the second partition 1712. For example, a $2\text{-}1^{st}$ length a4 of the third partition 1721 may be smaller than a $1\text{-}1^{st}$ length a1 of the first partition 1711. For example, a $2\text{-}2^{nd}$ length b4 at the fourth region (4) may be smaller than a $1\text{-}2^{nd}$ length b1 of the first partition 1711. For example, the $1\text{-}1^{st}$ length a1 of the first partition 1711 may be 400 mm or more, but embodiments of the present disclosure are not limited thereto. For example, the $1\text{-}2^{nd}$ length b1 of the first partition 1711 may be 400 mm or more, but embodiments of the present disclosure are not limited thereto. For example, the $2\text{-}1^{st}$ length a4 of the third partition 1721 may be 300 mm or more, but embodiments of the present disclosure are not limited thereto. For example, the $2\text{-}2^{nd}$ length b4 at the fourth region (4) may be 300 mm or more, but embodiments of the present disclosure are not limited thereto.

For example, the second partition 1712 may have the same size as that of the first partition 1711. The second partition 1712, as in the first partition 1711 illustrated in FIG. 9A, may have the $1\text{-}1^{st}$ length a1 and the $1\text{-}2^{nd}$ length b1. For example, a size of the fourth partition 1722 may have the same as the third partition 1721. The fourth partition 1722, as in the third partition 1721 illustrated in FIG. 9A, may have the $2\text{-}1^{st}$ length a4 and the $2\text{-}2^{nd}$ length b4. For example, a size of the fifth partition 1723 may have the same as the third partition 1721. The fifth partition 1723, as in the third partition 1721 illustrated in FIG. 9A, may have the $2\text{-}1^{st}$ length a4 and the $2\text{-}2^{nd}$ length b4. For example, the sixth partition 1724 may have the same size as that of the third partition 1721. The sixth partition 1724, as in the third partition 1721 illustrated in FIG. 9A, may have the $2\text{-}1^{st}$ length a4 and the $2\text{-}2^{nd}$ length b4.

A size of one or more among the third to sixth partitions 1721 to 1724 may be greater than or equal to one or more among the seventh partition 1741 and the eighth partition 1742. For example, a length of one or more among the third to sixth partitions 1721 to 1724 may be greater than or equal to one or more among the seventh partition 1741 and the eighth partition 1742. The $2\text{-}1^{st}$ length a4 of the third partition 1721 may be greater than or equal to the $3\text{-}1^{st}$ a9 of the seventh partition 1741. For example, the $2\text{-}2^{nd}$ length b4 at the fourth region (4) may be greater than or equal to the $3\text{-}2^{nd}$ b9 at the ninth region (9). For example, the $3\text{-}1^{st}$ length a9 of the seventh partition 1741 may be 250 mm or more or 300 mm or more, but embodiments of the present disclosure are not limited thereto. For example, the $3\text{-}2^{nd}$ length b9 at the ninth region (9) may be 250 mm or more or 300 mm or more, but embodiments of the present disclosure are not limited thereto. For example, the eighth partition 1742 may have the same size as that of the seventh partition 1741. The eighth partition 1742, as in the seventh partition 1741 illustrated in FIG. 9A, may have the $3\text{-}1^{st}$ length a9 and the $3\text{-}2^{nd}$ length b9.

A size of one or more among the first partition 1711 and the second partition 1712 may differ from one or more among the third partition 1721, the fourth partition 1722, the seventh partition 1741, and the eighth partition 1742. For example, a length of one or more among the first partition 1711 and the second partition 1712 may be greater than one or more among the third partition 1721, the fourth partition 1722, the seventh partition 1741, and the eighth partition 1742. The $1\text{-}1^{st}$ length a1 of the first partition 1711 may be greater than the $2\text{-}1^{st}$ length a4 of the third partition 1721. The $1\text{-}2^{nd}$ length b1 of the first partition 1711 may be greater than the $2\text{-}2^{nd}$ length b4 at the fourth region (4). For example, the $1\text{-}1^{st}$ length a1 of the first partition 1711 may be 400 mm or more, but embodiments of the present disclosure are not limited thereto. For example, the $1\text{-}2^{nd}$ length b1 of the first partition 1711 may be 400 mm or more, but embodiments of the present disclosure are not limited thereto. For example, the $2\text{-}1^{st}$ length a4 of the third partition 1721 may be 300 mm or more, but embodiments of the present disclosure are not limited thereto. For example, the $2\text{-}2^{nd}$ length b4 at the fourth region (4) may be 300 mm or more, but embodiments of the present disclosure are not limited thereto. The fifth partition 1723, as in the third partition 1721 illustrated in FIG. 9A, may have the $2\text{-}1^{st}$ length a4 and the 2-2$^{nd}$ length b4. The sixth partition 1724, as in the third partition 1721 illustrated in FIG. 9A, may have the 2-1$^{st}$ length a4 and the 2-2$^{nd}$ length b4. The 1-1$^{st}$ length a1 of the first partition 1711 may be greater than the 3-1$^{st}$ length a9 of the seventh partition 1741. For example, the 1-2$^{nd}$ length b1 of the first partition 1711 may be greater than the 3-2$^{nd}$ length b9 at the ninth region (9). For example, the 1-1$^{st}$ length a1 of the first partition 1711 may be 400 mm or more, but embodiments of the present disclosure are not limited thereto. For example, the 1-2$^{nd}$ length b1 at the first region (1) may be 400 mm or more, but embodiments of the present disclosure are not limited thereto. For example, the 3-1$^{st}$ length a9 of the seventh partition 1741 may be 250 mm or more or 300 mm or more, but embodiments of the present disclosure are not limited thereto. For example, the 3-2$^{nd}$ length b9 at the ninth region (9) may be 250 mm or more or 300 mm or more, but embodiments of the present disclosure are not limited thereto. The ninth partition 1743, as in the seventh partition 1741 illustrated in FIG. 9A, may have the 3-1$^{st}$ length a9 and the 3-2$^{nd}$ length b9. The tenth partition 1744, as in the seventh partition 1741 illustrated in FIG. 9A, may have the 3-1$^{st}$ length a9 and the 3-2$^{nd}$ length b9.

A size of one or more among the first partition 1711 and the second partition 1712 may differ from one or more among the third to tenth partitions 1721 to 1744. For example, a length of one or more among the first partition 1711 and the second partition 1712 may be greater than one or more among the third to tenth partitions 1721 to 1744. The 1-1$^{st}$ length a1 of the first partition 1711 may be greater than the 2-1$^{st}$ length a4 of the third partition 1721. For example, the 1-2$^{nd}$ length b1 at the first region (1) may be greater than the 2-2$^{nd}$ length b4 at the fourth region (4). For example, the 1-1$^{st}$ length a1 of the first partition 1711 may be 400 mm or more, but embodiments of the present disclosure are not limited thereto. For example, the 1-2$^{nd}$ length b1 at the first region (1) may be 400 mm or more, but embodiments of the present disclosure are not limited thereto. For example, the 2-1$^{st}$ length a4 of the third partition 1721 may be 300 mm or more, but embodiments of the present disclosure are not limited thereto. For example, the 2-2$^{nd}$ length b4 at the fourth region (4) may be 300 mm or more, but embodiments of the present disclosure are not limited thereto. The 1-1$^{st}$ length a1 of the first partition 1711 may be greater than the 3-1$^{st}$ length a9 of the seventh partition 1741. For example, the 1-2$^{nd}$ length b1 of the first partition 1711 may be greater than the 3-2$^{nd}$ length b9 at the ninth region (9). For example, the 1-1$^{st}$ length a1 of the first partition 1711 may be 400 mm or more, but embodiments of the present disclosure are not limited thereto. For example, the 1-2$^{nd}$ length b1 at the first region (1) may be 400 mm or more, but embodiments of the present disclosure are not limited thereto. For example, the 3-1$^{st}$ length a9 of the seventh partition 1741 may be 250 mm or more or 300 mm or more, but embodiments of the present disclosure are not limited thereto. For example, the 3-2$^{nd}$ length b9 at the ninth region (9) may be 250 mm or more or 300 mm or more, but embodiments of the present disclosure are not limited thereto. Accordingly, because a size of one or more among the first partition 1711 and the second partition 1712 differs from that of one or more among the third to tenth partitions 1721 to 1744, a vibration space of the first to third vibration devices 600HL to 600HC may be more secured, and thus, a sound characteristic may be more enhanced.

According to some embodiments of the present disclosure, the display apparatus may include the first partition 1711 at one or more sides of the first vibration device 600HL, the second partition 1712 at one or more sides of the second vibration device 600HR, the third partition 1721 at one or more sides of the fourth vibration device 500L, the fourth partition 1722 at one or more sides of the fifth vibration device 500R, the seventh partition 1741 at one or more sides of the ninth vibration device 500BL, and the eighth partition 1742 at one or more sides of the tenth vibration device 500BR.

A size of one or more among the first partition 1711 and the second partition 1712 may differ from one or more among the third partition 1721, the fourth partition 1722, the seventh partition 1741, and the eighth partition 1742. For example, a size of one or more among the first partition 1711 and the second partition 1712 may be greater than one or more among the third partition 1721, the fourth partition 1722, the seventh partition 1741, and the eighth partition 1742.

For example, a size of the third partition 1721 at one or more sides of the fourth vibration device 500L may differ from the first partition 1711 at one or more sides of the first vibration device 600HL. For example, a size of the third partition 1721 at one or more sides of the fourth vibration device 500L may be smaller than the first partition 1711 at one or more sides of the first vibration device 600HL. For example, a size of the fourth partition 1722 at one or more sides of the fifth vibration device 500R may differ from the first partition 1711 at one or more sides of the first vibration device 600HL. For example, a size of the fourth partition 1722 at one or more sides of the fifth vibration device 500R may be smaller than the first partition 1711 at one or more sides of the first vibration device 600HL. For example, a size of the third partition 1721 at one or more sides of the fourth vibration device 500L may differ from the second partition 1712 at one or more sides of the second vibration device 600HR. For example, a size of the third partition 1721 at one or more sides of the fourth vibration device 500L may be smaller than the second partition 1712 at one or more sides of the second vibration device 600HR. For example, a size of the fourth partition 1722 at one or more sides of the fifth vibration device 500R may differ from the second partition 1712 at one or more sides of the second vibration device 600HR. For example, a size of the fourth partition 1722 at one or more sides of the fifth vibration device 500R may be smaller than the second partition 1712 at one or more sides of the second vibration device 600HR.

For example, a size of the third partition 1721 at one or more sides of the fourth vibration device 500L may be greater than or equal to the seventh partition 1741 at one or more sides of the ninth vibration device 500BL. For example, a size of the fourth partition 1722 at one or more sides of the fifth vibration device 500R may be greater than or equal to the seventh partition 1741 at one or more sides of the ninth vibration device 500BL. For example, a size of the third partition 1721 at one or more sides of the fourth vibration device 500L may be greater than or equal to the eighth partition 1742 at one or more sides of the tenth vibration device 500BR. For example, a size of the fourth partition 1722 at one or more sides of the fifth vibration device 500R may be greater than or equal to the eighth partition 1742 at one or more sides of the tenth vibration device 500BR.

With reference to FIGS. 9A and 9B, the twelfth region (12) may be further disposed between the ninth region (9) and the eleventh region (11). The ninth partition 1743 may be further disposed between the ninth region (9) and the eleventh region (11). As another embodiment of the present disclosure, two partitions 1741 and 1743 may be further disposed between the ninth region (9) and the eleventh region (11). For example, in FIG. 9A, the seventh partition 1741 and the ninth partition 1743 are illustrated, but two seventh partitions 1741 may be disposed. For example, the two seventh partitions 1741 may be disposed between the ninth region (9) and the eleventh region (11). The thirteenth region (13) may be further disposed between the tenth region (10) and the eleventh region (11). The tenth partition 1744 may be further disposed between the tenth region (10) and the eleventh region (11). As another embodiment of the present disclosure, two partitions 1742 and 1744 may be disposed between the tenth region (10) and the eleventh region (11). For example, in FIG. 9A, the eighth partition 1742 and the tenth partition 1744 are illustrated, but two eighth partitions 1742 may be disposed. For example, two eighth partitions 1742 may be disposed between the tenth region (10) and the eleventh region (11).

According to some embodiments of the present disclosure, the display apparatus may further include the eleventh partition 1731 at one or more sides of the first to third vibration devices 600HL to 600HC. The display apparatus may further include the twelfth partition 1732 at one or more sides of the fourth to the eighth vibration devices 500L to 500RC. The display apparatus may further include the thirteenth partition 1733 at one or more sides of the ninth to the eleventh vibration devices 500BL to 500BC. A size of the eleventh partition 1731 may differ from one or more among the twelfth partition 1732 and the thirteenth partition 1733. For example, a size of the eleventh partition 1731 may be greater than one or more among the twelfth partition 1732 and the thirteenth partition 1733. A length of the eleventh partition 1731 may differ from one or more among the twelfth partition 1732 and the thirteenth partition 1733. For example, a length of the eleventh partition 1731 may be greater than one or more among the twelfth partition 1732 and the thirteenth partition 1733. The 2-$2^{nd}$ length b4 of the twelfth partition 1732 may be 300 mm or more, but embodiments of the present disclosure are not limited thereto. The 1-$2^{nd}$ length b1 of the eleventh partition 1731 may be 400 mm or more, but embodiments of the present disclosure are not limited thereto. The 3-$2^{nd}$ length b9 of the thirteenth partition 1733 may be 250 mm or more or 300 mm or more, but embodiments of the present disclosure are not limited thereto. For example, a size of the twelfth partition 1732 may be the same as the thirteenth partition 1733.

For example, a size of the eleventh partition 1731 at sides of one or more among the first to third vibration devices 600HL to 600HC may differ from the twelfth partition 1732 at sides of one or more among the fourth to eighth vibration devices 500L to 500RC. A size of the eleventh partition 1731 at sides of one or more among the first to third vibration devices 600HL to 600HC may be greater than the twelfth partition 1732 at sides of one or more among the fourth to eighth vibration devices 500L to 500RC. For example, a size of the eleventh partition 1731 at one or more sides of the first vibration device 600HL may be the same as the eleventh partition 1731 at sides of one or more among the second vibration device 600HR and the third vibration device 600HC. A size of the twelfth partition 1732 at one or more sides of the fourth vibration device 500L may be the same as the twelfth partition 1732 at sides of one or more among the fifth to eighth vibration devices 500R to 500RC.

For example, a size of the twelfth partition 1732 at sides of one or more among the fourth to the eighth vibration devices 500L to 500RC may be greater than or equal to the thirteenth partition 1733 at sides of one or more among the ninth to eleventh vibration devices 500BL to 500BC. A size of the thirteenth partition 1733 at one or more sides of the ninth vibration device 500BL may be the same as the thirteenth partition 1733 at sides of one or more among the tenth vibration device 500BR and the eleventh vibration device 500BC.

For example, a size of the eleventh partition 1731 at sides of one or more among the first to third vibration devices 600HL to 600HC may differ from the twelfth partition 1732 at sides of one or more among the ninth to eleventh vibration devices 500BL to 500BC. For example, a size of the eleventh partition 1731 at sides of one or more among the first to third vibration devices 600HL to 600HC may be greater than the twelfth partition 1732 at sides of one or more among the ninth to eleventh vibration devices 500BL to 500BC.

According to some embodiments of the present disclosure, the display apparatus may include the first partition 1711 and the eleventh partition 1731 at one or more sides of the first vibration device 600HL. The display apparatus may include the third partition 1721 and the twelfth partition 1732 at one or more sides of the fourth vibration device 500L. The display apparatus may include the seventh partition 1741 and the thirteenth partition 1733 at one or more sides of the ninth vibration device 500BL.

For example, a size of one or more among the first partition 1711 and the eleventh partition 1731 at one or more sides of the first vibration device 600HL may differ from one or more among the third partition 1721 and the twelfth partition 1732 at one or more sides of the fourth vibration device 500L. For example, a size of one or more among the first partition 1711 and the eleventh partition 1731 at one or more sides of the first vibration device 600HL may be greater than one or more among the third partition 1721 and the twelfth partition 1732 at one or more sides of the fourth vibration device 500L. For example, a size of one or more among the third partition 1721 and the twelfth partition 1732 at one or more sides of the fourth vibration device 500L may be greater than or equal to one or more among the seventh partition 1741 and the thirteenth partition 1733 at one or more sides of the ninth vibration device 500BL. For example, a size of one or more among the first partition 1711 and the eleventh partition 1731 at one or more sides of the first vibration device 600HL may be greater than one or more among the seventh partition 1741 and the thirteenth partition 1733 at one or more sides of the ninth vibration device 500BL.

According to some embodiments of the present disclosure, the display apparatus may include the second partition 1712 and the eleventh partition 1731 at one or more sides of the second vibration device 600HR. The display apparatus may include the fourth partition 1722 and the twelfth partition 1732 at one or more sides of the fifth vibration device 500R. The display apparatus may include the eighth partition 1742 and the thirteenth partition 1733 at one or more sides of the tenth vibration device 500BR. For example, a size of one or more among the second partition 1712 and the eleventh partition 1731 at one or more sides of the second vibration device 600HR may differ from one or more among the fourth partition 1722 and the twelfth partition 1732 at one or more sides of the fifth vibration device 500R. For example, a size of one or more among the second partition 1712 and the eleventh partition 1731 at one or more sides of the second vibration device 600HR may be greater than one or more among the fourth partition 1722 and the twelfth partition 1732 at one or more sides of the fifth vibration device 500R. For example, a size of one or more among the fourth partition 1722 and the twelfth partition 1732 at one or more sides of the fifth vibration device 500R may be greater than or equal to one or more among the eighth partition 1742 and the thirteenth partition 1733 at one or more sides of the tenth vibration device 500BR. For example, a size of one or more among the second partition 1712 and the eleventh partition 1731 at one or more sides of the second vibration device 600HR may be greater than one or more among the eighth partition 1742 and the thirteenth partition 1733 at one or more sides of the tenth vibration device 500BR.

According to some embodiments of the present disclosure, the display apparatus may include the first partition 1711, the second partition 1712, and the eleventh partition 1731 at one or more sides of the third vibration device 600HC. A size of the eleventh partition 1731 may be the same as one or more among the first partition 1711 and the second partition 1712.

According to some embodiments of the present disclosure, the display apparatus may include the sixth partition 1724 and the twelfth partition 1732 at one or more sides of the sixth vibration device 500C. A size of the sixth partition 1724 may be the same as one or more among the third partition 1721 and the fourth partition 1722. For example, the display apparatus may include the fifth partition 1723 and the twelfth partition 1732 at one or more sides of the seventh vibration device 500LC. A size of the fifth partition 1723 may be the same as one or more among the third partition 1721 and the fourth partition 1722. For example, the display apparatus may include the fourth partition 1722 and the twelfth partition 1732 at one or more sides of the eighth vibration device 500RC. A size of the fourth partition 1722 may be the same as the third partition 1721.

According to some embodiments of the present disclosure, the display apparatus may include the ninth partition 1743, the tenth partition 1744, and the thirteenth partition 1733 at one or more sides of the eleventh vibration device 500BC. A size of one or more among the ninth partition 1743 and the tenth partition 1744 may be the same as one or more among the seventh partition 1741 and the eighth partition 1742.

According to some embodiments of the present disclosure, as described above with reference to FIG. 6B, the display apparatus according to an embodiment of the present disclosure may further include a fourteenth partition 1750.

With reference to FIGS. 9A and 9B, a size of one or more among the first to third regions (1) to (3) may differ from one or more among the fourth to eighth regions (4) to (8). For example, a size of one or more among the first to third regions (1) to (3) may be greater than one or more among the fourth to eighth regions (4) to (8). A size of one or more among the first to third regions (1) to (3) may differ from one or more among the ninth to thirteenth regions (9) to (13). For example, a size of one or more among the first to third regions (1) to (3) may be greater than one or more among the ninth to thirteenth regions (9) to (13). A size of one or more among the ninth to thirteenth regions (9) to (13) may differ from one or more among the fourth to eighth regions (4) to (8). For example, a size of one or more among the ninth to thirteenth regions (9) to (13) may be smaller than or equal to one or more among the fourth to eighth regions (4) to (8).

With reference to FIG. 9B, a fifteenth partition 7211 may be further provided near the first vibration device 600HL. The fifteenth partition 7211 may be configured to be smaller than or equal to a size of the first partition 1711 and/or the eleventh partition 1731. For example, the fifteenth partition 7211 may be disposed to surround the first vibration device 600HL.

Because the fifteenth partition 7211 surrounds the first vibration device 600HL along with the first partition 1711 and/or the eleventh partition 1731, a vibration space of the first vibration device 600HL may be secured, thereby increasing a sound pressure level characteristic. Also, the fifteenth partition 7211 may prevent a sound or a sound pressure level from being leaked to the outside through a side surface between the display panel 110 and the supporting member 300, and thus, a sound output characteristic of the display apparatus may be more enhanced. The fifteenth partition 7211 may have a tetragonal shape which surrounds the first vibration device 600HL. However, embodiments of the present disclosure are not limited thereto, and the fifteenth partition 7211 may have a shape which is the same as or different from a whole shape of the first vibration device 600HL. For example, when the first vibration device 600HL has a square shape, the fifteenth partition 7211 may have a square shape, a circular shape, or an oval shape which is relatively greater in size than the first vibration device 600HL. The fifteenth partition 7211 may limit (or define) a vibration region (or a vibration area) of the display panel 110 based on the first vibration device 600HL. For example, as a size of the fifteenth partition 7211 increases, a vibration region of the first region (1) may increase, and thus, a sound characteristic of a low-pitched sound band of a left sound may be enhanced.

With reference to FIG. 9B, a sixteenth partition 7212 may be further provided near the second vibration device 600HR. The sixteenth partition 7212 may be configured to be smaller than or equal to a size of the second partition 1712 and/or the eleventh partition 1731. For example, the sixteenth partition 7212 may be disposed to surround the second vibration device 600HR. Because the sixteenth partition 7212 surrounds the second vibration device 600HR along with the second partition 1712 and/or the eleventh partition 1731, a vibration space of the second vibration device 600HR may be secured, thereby increasing a sound pressure level characteristic. Also, the sixteenth partition 7212 may prevent a sound or a sound pressure level from being leaked to the outside through the side surface between the display panel 110 and the supporting member 300, and thus, a sound output characteristic of the display apparatus may be more enhanced. The sixteenth partition 7212 may have a tetragonal shape which surrounds the second vibration device 600HR. However, embodiments of the present disclosure are not limited thereto, and the sixteenth partition 7212 may have a shape which is the same as or different from a whole shape of the second vibration device 600HR. For example, when the second vibration device 600HR has a square shape, the sixteenth partition 7212 may have a square shape, a circular shape, or an oval shape which is relatively greater in size than the second vibration device 600HR. The sixteenth partition 7212 may limit (or define) a vibration region (or a vibration area) of the display panel 110 based on the second vibration device 600HR. For example, as a size of the sixteenth partition 7212 increases, a vibration region of the second region (2) may increase, and thus, a sound characteristic of a low-pitched sound band of a right sound may be enhanced.

With reference to FIG. 9B, a seventeenth partition 7213 may be further provided near the third vibration device 600HC. The seventeenth partition 7213 may be configured to be smaller than or equal to a size of the first partition 1711 and the second partition 1712 and/or the eleventh partition 1731. For example, the seventeenth partition 7213 may be disposed to surround the third vibration device 600HC. Because the seventeenth partition 7213 surrounds the third vibration device 600HC along with the second partition 1712 and/or the eleventh partition 1731, a vibration space of the third vibration device 600HC may be secured, thereby increasing a sound pressure level characteristic. Also, the seventeenth partition 7213 may prevent a sound or a sound pressure level from being leaked to the outside through the side surface between the display panel 110 and the supporting member 300, and thus, a sound output characteristic of the display apparatus may be more enhanced. The seventeenth partition 7213 may have a tetragonal shape which surrounds the third vibration device 600HC. However, embodiments of the present disclosure are not limited thereto, and the seventeenth partition 7213 may have a shape which is the same as or different from a whole shape of the third vibration device 600HC. For example, when the third vibration device 600HC has a square shape, the seventeenth partition 7213 may have a square shape, a circular shape, or an oval shape which is relatively greater in size than the third vibration device 600HC. The seventeenth partition 7213 may limit (or define) a vibration region (or a vibration area) of the display panel 110 based on the third vibration device 600HC. For example, as a size of the seventeenth partition 7213 increases, a vibration region of the third region (3) may increase, and thus, a sound characteristic of a low-pitched sound band of a center sound may be enhanced.

The fifteenth to seventeenth partitions 7211 to 7213 may include one or more among a double-sided tape, a double-sided foam tape, a double-sided foam pad, a single-sided tape, a single-sided foam tape, a single-sided foam pad, an adhesive, and a bond, but embodiments of the present disclosure are not limited thereto. When the fifteenth to seventeenth partitions 7211 to 7213 is configured with a double-sided tape or a double-sided foam pad, an adhesive force may be enhanced in a process of attaching a rear surface of the display panel 110 on an upper surface of the supporting member 300. For example, the fifteenth to seventeenth partitions 7211 to 7213 may include a material having elasticity which enables a certain degree of compression. For example, at least one or more of the fifteenth to seventeenth partitions 7211 to 7213 may include polyurethane, polyolefin, or polyethylene, but embodiments of the present disclosure are not limited thereto.

Therefore, according to an embodiment of the present disclosure, a size of a partition near a vibration device may be configured differently, thereby providing a display apparatus including a vibration device for outputting a sound band of 180 Hz or more and/or a sound band of a full range. Also, according to an embodiment of the present disclosure, a display apparatus where eleven channels are provided in a display device may be implemented. According to an embodiment of the present disclosure, a vibration device including eleven channels for realizing a sound based on upward, downward, left, and right actions or motions in addition to a sound based on simple left and right actions may be implemented. For example, a stereo sound and a vivid sound may be provided at upward, downward, left, and right sides based on a position of an object or a person in a displayed screen.

Figure 10A:
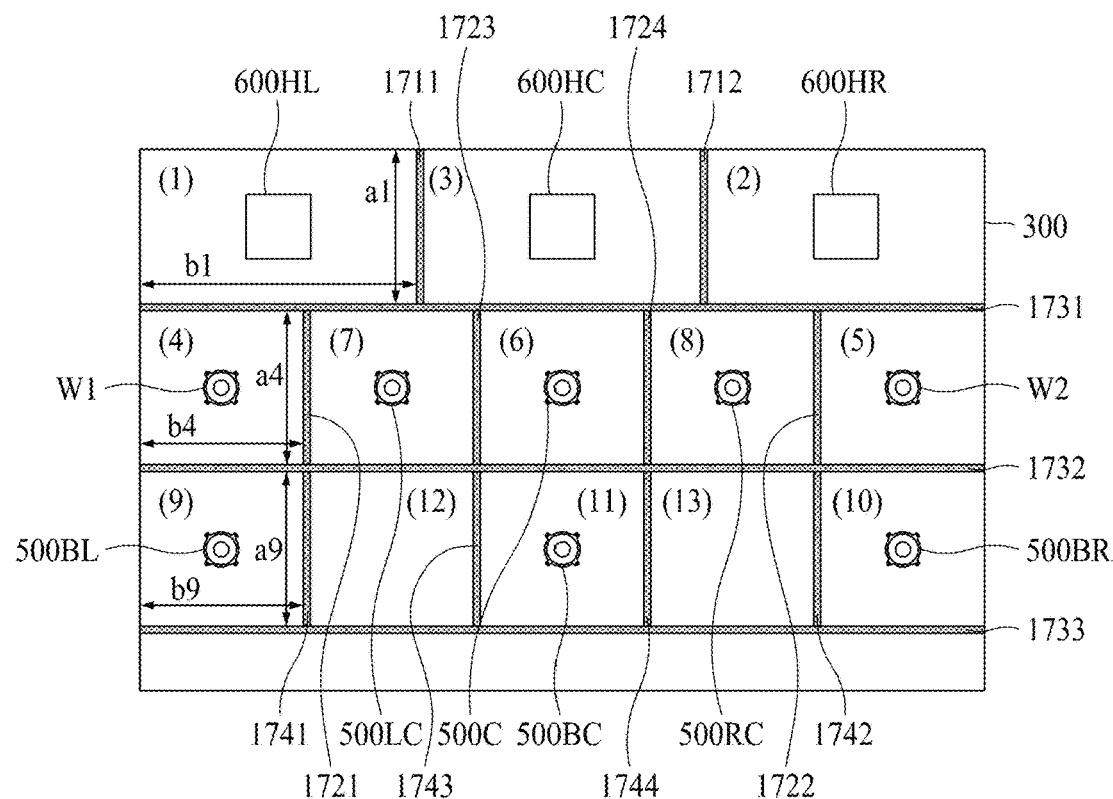
FIGS. 10A and 10B illustrate a display apparatus including a vibration device according to another embodiment of the present disclosure.
Figure 10B:
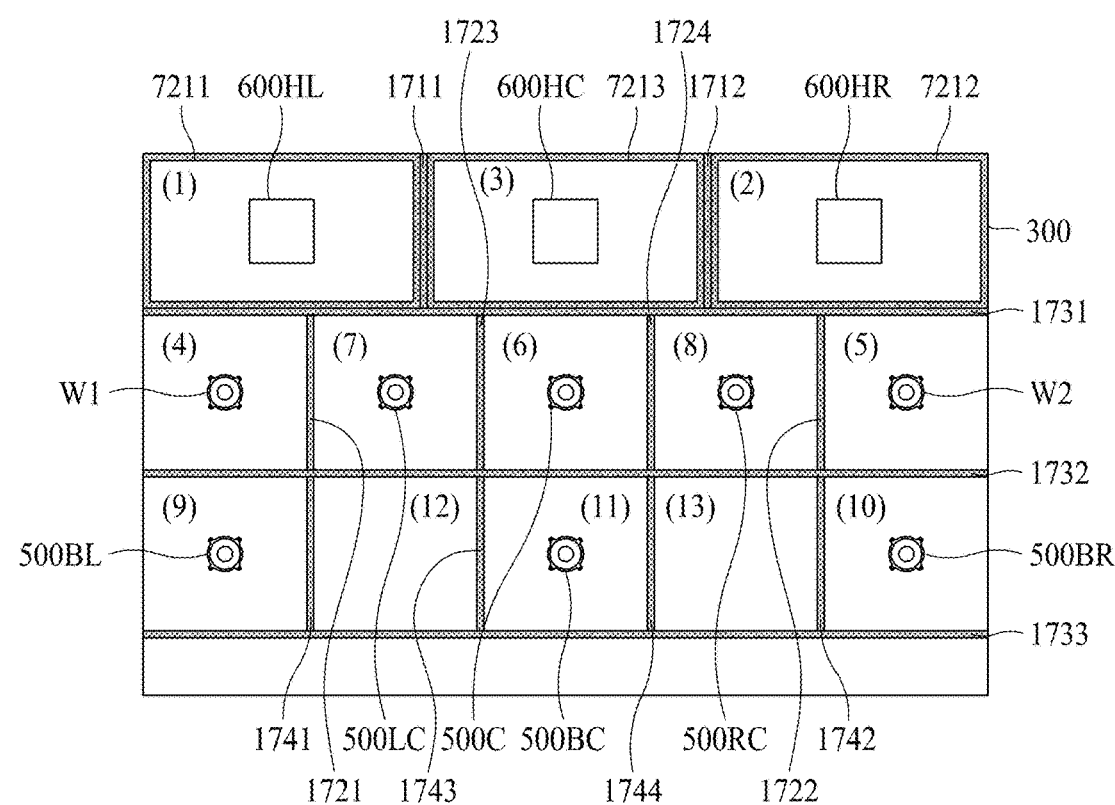

FIGS. 10A and 10B illustrate a display apparatus including a vibration device according to another embodiment of the present disclosure.

With reference to FIGS. 10A and 10B, the display apparatus according to some embodiments of the present disclosure may include a display device 100 including a display panel 110 including first to thirteenth regions (1) to (13). One or more vibration devices may be disposed at one or more among the first to thirteenth regions (1) to (13).

According to some embodiments of the present disclosure, a fourth vibration device W1 and a fifth vibration device W2 may be configured as the same vibration device, for the left-right symmetricity of a sound. For example, the fourth vibration device W1 and the fifth vibration device W2 may include a woofer-integrated vibration device or a vibration device including a woofer. For example, one or more of first to third vibration devices 600HL to 600HC may be configured as a vibration device which differs from one or more among the fourth vibration device W1 and the fifth vibration device W2. For example, one or more of sixth to eighth vibration devices 500C to 500RC may be configured as a vibration device which differs from one or more among the fourth vibration device W1 and the fifth vibration device W2. The sixth to eighth vibration devices 500C to 500RC may be configured as a coil type vibration. For example, one or more of ninth to eleventh vibration devices 500BL to 500BC may be configured as a vibration device which differs from one or more among the fourth vibration device W1 and the fifth vibration device W2. The ninth to eleventh vibration devices 500BL to 500BC may be configured as a coil type vibration. For example, one or more among the first to eleventh vibration devices 600HL to 500BC may be configured as two or more different vibration devices. Descriptions of the sixth to eleventh vibration devices 500C to 500BC may be the same as the descriptions of FIGS. 6A to 9B, and thus, their repetitive descriptions may be omitted. Descriptions of first to seventeenth partitions 1711 to 7213 may be the same as the descriptions of FIGS. 6A to 9B, and thus, their repetitive descriptions may be omitted. A woofer-integrated vibration device is as described above with reference to FIGS. 8A and 8B, and thus, their repetitive descriptions may be omitted or will be briefly given.

For example, because each of the fourth vibration device W1 and the fifth vibration device W2 is configured as a woofer-integrated vibration device, it is not needed to separately place a woofer for reproducing a sound of the low-pitched sound band.

Therefore, according to an embodiment of the present disclosure, a size of a partition near a vibration device may be configured differently, and a vibration device including a woofer may be provided, thereby providing a display apparatus including a vibration device for outputting a sound band of 180 Hz or more and/or a sound band of a full range.

Descriptions of sizes of the first to thirteenth regions (1) to (13) may be the same as the descriptions of FIGS. 6A to 9B, and thus, their repetitive descriptions may be omitted.

Therefore, according to an embodiment of the present disclosure, a size of a partition near a vibration device may be configured differently, thereby providing a display apparatus including a vibration device for outputting a sound band of 180 Hz or more and/or a sound band of a full range. For example, one or more among the first to third vibration devices 600HL to 600HC may be configured as a film type vibration device, thereby providing a display apparatus for more enhancing a sound pressure level characteristic. Also, a vibration device including a woofer may be provided, thereby providing a display apparatus including a vibration device for outputting a sound band of 180 Hz or more and/or a sound band of a full range.

Figure 11A:
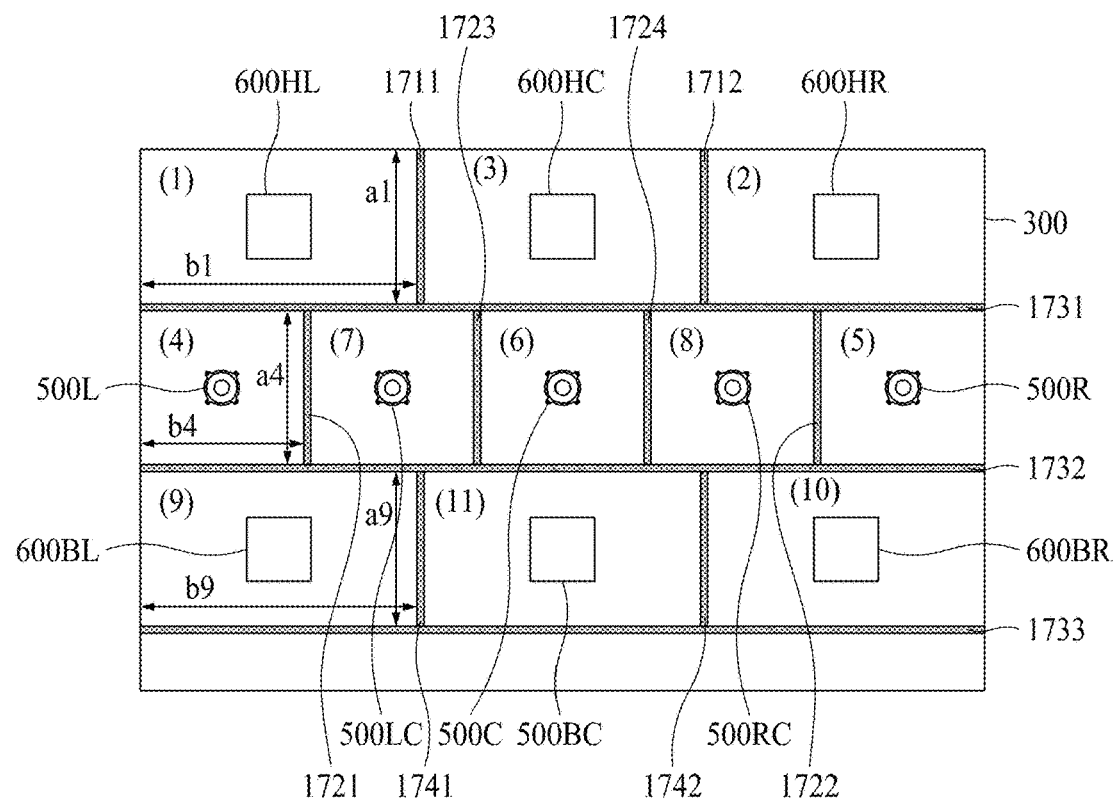
FIGS. 11A and 11B illustrate a display apparatus including a vibration device according to another embodiment of the present disclosure.
Figure 11B:
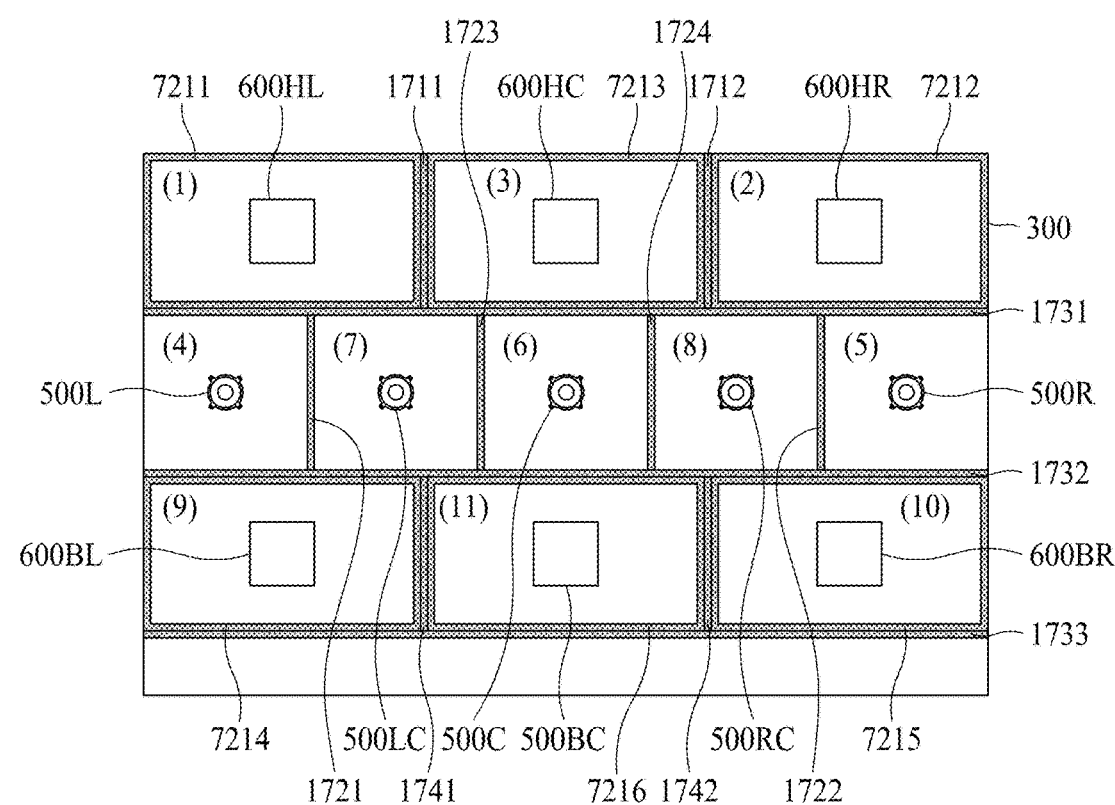

FIGS. 11A and 11B illustrate a display apparatus including a vibration device according to another embodiment of the present disclosure.

With reference to FIGS. 11A and 11B, the display apparatus according to some embodiments of the present disclosure may include a display device 100 including a display panel 110 including first to eleventh regions (1) to (11). One or more vibration devices may be disposed at one or more among the first to eleventh regions (1) to (11).

According to some embodiments of the present disclosure, one or more of first to third vibration devices 600HL to 600HC may be configured as a vibration device which differs from one or more of fourth to eighth vibration devices 500L to 500RC. One or more among the fourth to eighth vibration devices 500L to 500RC may be configured as a vibration device which differs from one or more of ninth to eleventh vibration devices 600BL to 600BC. For example, the first to third vibration devices 600HL to 600HC may be configured as a film type vibration device. For example, the ninth to eleventh vibration devices 600BL to 600BC may be configured as a film type vibration device. A film type vibration device will be described below with reference to FIGS. 14 to 19. For example, the fourth to eighth vibration devices 500L to 500RC may be configured as a coil type vibration device. For example, the first to eleventh vibration devices 600HL to 500BC may be configured as two or more different vibration devices.

Descriptions of the fourth to eighth vibration devices 500L to 500RC may be the same as the descriptions of FIGS. 6A to 9B, and thus, their repetitive descriptions may be omitted or will be briefly given. Descriptions of the first to seventeenth partitions 1711 to 7213 may be the same as the descriptions of FIGS. 6A to 9B, and thus, their repetitive descriptions may be omitted or will be briefly given and other elements will be described below.

With reference to FIGS. 11A and 11B, a size of one or more among third to sixth partitions 1721 to 1724 may be configured to differ from one or more among a first partition 1711 and a second partition 1712. For example, a size of one or more among the third to sixth partitions 1721 to 1724 may be smaller than one or more among the first partition 1711 and the second partition 1712. For example, a length of one or more among the third to sixth partitions 1721 to 1724 may differ from one or more among the first partition 1711 and the second partition 1712. For example, a length of one or more among the third to sixth partitions 1721 to 1724 may be smaller than one or more among the first partition 1711 and the second partition 1712. For example, a 2-$1^{nd}$ length a4 of the third partition 1721 may be smaller than a 1-$1^{st}$ length a1 of the first partition 1711. For example, a 2-$2^{nd}$ length b4 at the fourth region (4) may be smaller than a 1-$2^{nd}$ length b1 at the first region (1). For example, the 1-$1^{st}$ length a1 of the first partition 1711 may be 400 mm or more, but embodiments of the present disclosure are not limited thereto. For example, the 1-$2^{nd}$ length b1 at the first region (1) may be 400 mm or more, but embodiments of the present disclosure are not limited thereto. For example, the 2-$1^{st}$ length a4 of the third partition 1721 may be 300 mm or more, but embodiments of the present disclosure are not limited thereto. For example, the 2-$2^{nd}$ length b4 at the fourth region (4) may be 300 mm or more, but embodiments of the present disclosure are not limited thereto.

For example, a size of the second partition 1712 may be the same as a size of the first partition 1711. The second partition 1712, as in the first partition 1711 illustrated in FIG. 11A, may have the 1-$1^{st}$ length a1 and the 1-$2^{nd}$ length b1. For example, a size of the fourth partition 1722 may have the same as the third partition 1721. The fourth partition 1722, as in the third partition 1721 illustrated in FIG. 11A, may have the 2-$1^{st}$ length a4 and the 2-$2^{nd}$ length b4. For example, a size of the fifth partition 1723 may have the same as the third partition 1721. The fifth partition 1723, as in the third partition 1721 illustrated in FIG. 11A, may have the 2-$1^{st}$ length a4 and the 2-$2^{nd}$ length b4. For example, the sixth partition 1724 may have the same size as the third partition 1721. The sixth partition 1724, as in the third partition 1721 illustrated in FIG. 11A, may have the 2-$1^{st}$ length a4 and the 2-$2^{nd}$ length b4.

A size of one or more among the third to sixth partitions 1721 to 1724 may differ from one or more among the seventh partition 1741 and the eighth partition 1742. For example, a size of one or more among the third to sixth partitions 1721 to 1724 may be smaller than one or more among the seventh partition 1741 and the eighth partition 1742. A length of one or more among the third to sixth partitions 1721 to 1724 may differ from one or more among the seventh partition 1741 and the eighth partition 1742. For example, a length of one or more among the third to sixth partitions 1721 to 1724 may be smaller than one or more among the seventh partition 1741 and the eighth partition 1742. The 2-$1^{st}$ length a4 of the third partition 1721 may be smaller than the 3-$1^{st}$ a9 of the seventh partition 1741. For example, the 2-$2^{nd}$ length b4 at the fourth region (4) may be smaller than the 3-$2^{nd}$ b9 of the seventh partition 1741. For example, the 3-$1^{st}$ length a9 of the seventh partition 1741 may be 400 mm or more, but embodiments of the present disclosure are not limited thereto. For example, the 3-$2^{nd}$ length b9 at the ninth region (9) may be 400 mm or more, but embodiments of the present disclosure are not limited thereto. For example, the eighth partition 1742 may have the same size as the seventh partition 1741. The eighth partition 1742, as in the seventh partition 1741 illustrated in FIG. 11A, may have the 3-$1^{st}$ length a9 and the 3-$2^{nd}$ length b9.

A size of one or more among the first partition 1711 and the second partition 1712 may differ from one or more among the third partition 1721, the fourth partition 1722, the seventh partition 1741, and the eighth partition 1742. For example, a length of one or more among the first partition 1711 and the second partition 1712 may be greater than one or more among the third partition 1721, the fourth partition 1722, the seventh partition 1741, and the eighth partition 1742. The 1-$1^{st}$ length a1 of the first partition 1711 may be greater than the 2-$1^{st}$ length a4 of the third partition 1721. For example, the 1-$2^{nd}$ length b1 at the first region (1) may be greater than the 2-$2^{nd}$ length b4 of the third partition 1721. For example, the 1-$1^{st}$ length a1 of the first partition 1711 may be 400 mm or more, but embodiments of the present disclosure are not limited thereto. For example, the 1-$2^{nd}$ length b1 at the first region (1) may be 400 mm or more, but embodiments of the present disclosure are not limited thereto. For example, the 2-$1^{st}$ length a4 of the third partition 1721 may be 300 mm or more, but embodiments of the present disclosure are not limited thereto. For example, the 2-$2^{nd}$ length b4 at the fourth region (4) may be 300 mm or more, but embodiments of the present disclosure are not limited thereto. The fifth partition 1723, as in the third partition 1721 illustrated in FIG. 11A, may have the 2-$1^{st}$ length a4 and the 2-$2^{nd}$ length b4. The sixth partition 1724, as in the third partition 1721 illustrated in FIG. 11A, may have the 2-$1^{st}$ length a4 and the 2-$2^{nd}$ length b4. The 1-$1^{st}$ length a1 of the first partition 1711 may be greater than the 3-$1^{st}$ length a9 of the seventh partition 1741. For example, the 1-$2^{st}$ length b1 of the first partition 1711 may be greater than the 3-$2^{nd}$ length b9 of the seventh partition 1741. For example, the 1-$1^{st}$ length a1 of the first partition 1711 may be 400 mm or more, but embodiments of the present disclosure are not limited thereto. For example, the 1-$2^{nd}$ length b1 at the first region (1) may be 400 mm or more, but embodiments of the present disclosure are not limited thereto. For example, the 3-$1^{st}$ length a9 of the seventh partition 1741 may be 400 mm or more, but embodiments of the present disclosure are not limited thereto. For example, the 3-2$^{nd}$ length b9 at the ninth region (9) may be 400 mm or more, but embodiments of the present disclosure are not limited thereto. The ninth partition 1743, as in the seventh partition 1741 illustrated in FIG. 11A, may have the 3-1$^{st}$ length a9 and the 3-2$^{nd}$ length b9. The tenth partition 1744, as in the seventh partition 1741 illustrated in FIG. 11A, may have the 3-1$^{st}$ length a9 and the 3-2$^{nd}$ length b9.

A size of one or more among the first partition 1711 and the second partition 1712 may be the same as one or more among the seventh partition 1741 and the eighth partition 1742. For example, a length of one or more among the first partition 1711 and the second partition 1712 may be the same as one or more among the seventh partition 1741 and the eighth partition 1742. The 1-1$^{st}$ length a1 of the first partition 1711 may be the same as the 3-1$^{st}$ length a9 of the seventh partition 1741. For example, the 1-2$^{nd}$ length b1 at the first region (1) may be the same as the 3-2$^{nd}$ length b9 at the ninth region (9). For example, the 1-1$^{st}$ length a1 of the first partition 1711 may be 400 mm or more, but embodiments of the present disclosure are not limited thereto. For example, the 1-2$^{nd}$ length b1 at the first region (1) may be 400 mm or more, but embodiments of the present disclosure are not limited thereto. For example, the 3-1$^{st}$ length a9 of the seventh partition 1741 may be 400 mm or more, but embodiments of the present disclosure are not limited thereto. For example, the 3-2$^{nd}$ length b9 at the ninth region (9) may be 400 mm or more, but embodiments of the present disclosure are not limited thereto. Accordingly, because a size of one or more among the first partition 1711 and the second partition 1712 differs from that of one or more among the third to sixth partitions 1721 to 1724, a vibration space of the first to third vibration devices 600HL to 600HC may be more secured, and thus, a sound characteristic may be more enhanced. Also, because a size of one or more among the seventh partition 1741 and the eighth partition 1742 differs from that of one or more among the third to sixth partitions 1721 to 1724, a vibration space of the ninth to eleventh vibration devices 600BL to 600BC may be more secured, and thus, a sound characteristic may be more enhanced.

According to some embodiments of the present disclosure, the display apparatus may include the first partition 1711 at one or more sides of the first vibration device 600HL, the second partition 1712 at one or more sides of the second vibration device 600HR, the third partition 1721 at one or more sides of the fourth vibration device 500L, the fourth partition 1722 at one or more sides of the fifth vibration device 500R, the seventh partition 1741 at one or more sides of the ninth vibration device 500BL, and the eighth partition 1742 at one or more sides of the tenth vibration device 500BR. A size of one or more among the first partition 1711 and the second partition 1712 may differ from one or more among the third partition 1721 and the fourth partition 1722. For example, a size of one or more among the first partition 1711 and the second partition 1712 may be greater than one or more among the third partition 1721 and the fourth partition 1722. For example, a size of the third partition 1721 at one or more sides of the fourth vibration device 500L may differ from the first partition 1711 at one or more sides of the first vibration device 600HL. For example, a size of the third partition 1721 at one or more sides of the fourth vibration device 500L may be smaller than the first partition 1711 at one or more sides of the first vibration device 600HL. For example, a size of the fourth partition 1722 at one or more sides of the fifth vibration device 500R may differ from the first partition 1711 at one or more sides of the first vibration device 600HL. For example, a size of the fourth partition 1722 at one or more sides of the fifth vibration device 500R may be smaller than the first partition 1711 at one or more sides of the first vibration device 600HL. For example, a size of the third partition 1721 at one or more sides of the fourth vibration device 500L may differ from the second partition 1712 at one or more sides of the second vibration device 600HR. For example, a size of the third partition 1721 at one or more sides of the fourth vibration device 500L may be smaller than the second partition 1712 at one or more sides of the second vibration device 600HR. For example, a size of the fourth partition 1722 at one or more sides of the fifth vibration device 500R may differ from the second partition 1712 at one or more sides of the second vibration device 600HR. For example, a size of the fourth partition 1722 at one or more sides of the fifth vibration device 500R may be smaller than the second partition 1712 at one or more sides of the second vibration device 600HR.

For example, a size of the third partition 1721 at one or more sides of the fourth vibration device 500L may differ from the seventh partition 1741 at one or more sides of the ninth vibration device 600BL. A size of the third partition 1721 at one or more sides of the fourth vibration device 500L may smaller than the seventh partition 1741 at one or more sides of the ninth vibration device 600BL. For example, a size of the fourth partition 1722 at one or more sides of the fifth vibration device 500R may differ from the seventh partition 1741 at one or more sides of the ninth vibration device 600BL. A size of the fourth partition 1722 at one or more sides of the fifth vibration device 500R may be smaller than the seventh partition 1741 at one or more sides of the ninth vibration device 600BL. A size of the third partition 1721 at one or more sides of the fourth vibration device 500L may differ from the eighth partition 1742 at one or more sides of the tenth vibration device 600BR. For example, a size of the third partition 1721 at one or more sides of the fourth vibration device 500L may be smaller than the eighth partition 1742 at one or more sides of the tenth vibration device 600BR. A size of the fourth partition 1722 at one or more sides of the fifth vibration device 500R may differ from the eighth partition 1742 at one or more sides of the tenth vibration device 600BR. For example, a size of the fourth partition 1722 at one or more sides of the fifth vibration device 500R may be smaller than the eighth partition 1742 at one or more sides of the tenth vibration device 600BR.

According to some embodiments of the present disclosure, the display apparatus may further include the eleventh partition 1731 at one or more sides of the first to third vibration devices 600HL to 600HC. The display apparatus may further include the twelfth partition 1732 at one or more sides of the fourth to the eighth vibration devices 500L to 500RC. The display apparatus may further include the thirteenth partition 1733 at one or more sides of the ninth to the eleventh vibration devices 600BL to 600BC. A size of the eleventh partition 1731 may differ from one or more among the twelfth partition 1732 and the thirteenth partition 1733. For example, a size of the eleventh partition 1731 may be greater than the twelfth partition 1732. For example, a size of the thirteenth partition 1733 may be greater than the eleventh partition 1731. For example, a length of the twelfth partition 1732 may differ from one or more among the eleventh partition 1731 and the thirteenth partition 1733. For example, a length of the eleventh partition 1731 may be greater than the twelfth partition 1732. For example, a length of the thirteenth partition 1733 may be greater than the eleventh partition 1731. The 2-$2^{nd}$ length b4 of the twelfth partition 1732 may be 300 mm or more, but embodiments of the present disclosure are not limited thereto. The 1-$2^{nd}$ length b1 of the eleventh partition 1731 may be 400 mm or more, but embodiments of the present disclosure are not limited thereto. The 3-$2^{nd}$ length b9 of the thirteenth partition 1733 may be 400 mm or more, but embodiments of the present disclosure are not limited thereto. For example, a size of the eleventh partition 1731 may be the same as the thirteenth partition 1733. For example, a length of the eleventh partition 1731 may be the same as the thirteenth partition 1733.

For example, a size of the eleventh partition 1731 at sides of one or more among first to third vibration devices 600HL to 600HC may differ from the twelfth partition 1732 at sides of one or more among the fourth to eighth vibration devices 500L to 500RC. A size of the eleventh partition 1731 at sides of one or more among first to third vibration devices 600HL to 600HC may be greater than the twelfth partition 1732 at sides of one or more among the fourth to eighth vibration devices 500L to 500RC. For example, a size of the eleventh partition 1731 at one or more sides of the first vibration device 600HL may be the same as the eleventh partition 1731 at sides of one or more among the second vibration device 600HR and the third vibration device 600HC. A size of the twelfth partition 1732 at one or more sides of the fourth vibration device 500L may be the same as the twelfth partition 1732 at sides of one or more among the fifth to eighth vibration devices 500R to 500RC.

For example, a size of the twelfth partition 1732 at sides of one or more among the fourth to the eighth vibration devices 500L to 500RC may differ from the thirteenth partition 1733 at sides of one or more among the ninth to eleventh vibration devices 500BL to 500BC. For example, a size of the twelfth partition 1732 at sides of one or more among the fourth to the eighth vibration devices 500L to 500RC may be smaller than the thirteenth partition 1733 at sides of one or more among the ninth to eleventh vibration devices 500BL to 500BC. For example, a size of the thirteenth partition 1733 at one or more sides of the ninth vibration device 500BL may be the same as the thirteenth partition 1733 at sides of one or more among the tenth vibration device 500BR and the eleventh vibration device 500BC.

For example, a size of the eleventh partition 1731 at sides of one or more among the first to third vibration devices 600HL to 600HC may differ from the twelfth partition 1732 at sides of one or more among the ninth to eleventh vibration devices 500BL to 500BC. For example, a size of the eleventh partition 1731 at sides of one or more among the first to third vibration devices 600HL to 600HC may be greater than the twelfth partition 1732 at sides of one or more among the ninth to eleventh vibration devices 500BL to 500BC.

According to some embodiments of the present disclosure, the display apparatus may include the first partition 1711 and the eleventh partition 1731 at one or more sides of the first vibration device 600HL. The display apparatus may include the third partition 1721 and the twelfth partition 1732 at one or more sides of the fourth vibration device 500L. The display apparatus may include the seventh partition 1741 and the thirteenth partition 1733 at one or more sides of the ninth vibration device 500BL. For example, a size of one or more among the first partition 1711 and the eleventh partition 1731 at one or more sides of the first vibration device 600HL may differ from one or more among the third partition 1721 and the twelfth partition 1732 at one or more sides of the fourth vibration device 500L. For example, a size of one or more among the first partition 1711 and the eleventh partition 1731 at one or more sides of the first vibration device 600HL may be greater than one or more among the third partition 1721 and the twelfth partition 1732 at one or more sides of the fourth vibration device 500L. A size of one or more among the third partition 1721 and the twelfth partition 1732 at one or more sides of the fourth vibration device 500L may differ from one or more among the seventh partition 1741 and the thirteenth partition 1733 at one or more sides of the ninth vibration device 500BL. For example, a size of one or more among the third partition 1721 and the twelfth partition 1732 at one or more sides of the fourth vibration device 500L may be greater than one or more among the seventh partition 1741 and the thirteenth partition 1733 at one or more sides of the ninth vibration device 500BL. A size of one or more among the first partition 1711 and the eleventh partition 1731 at one or more sides of the first vibration device 600HL may be the same as one or more among the seventh partition 1741 and the thirteenth partition 1733 at one or more sides of the ninth vibration device 500BL.

According to some embodiments of the present disclosure, the display apparatus may include the second partition 1712 and the eleventh partition 1731 at one or more sides of the second vibration device 600HR. The display apparatus may include the fourth partition 1722 and the twelfth partition 1732 at one or more sides of the fifth vibration device 500R. The display apparatus may include the eighth partition 1742 and the thirteenth partition 1733 at one or more sides of the tenth vibration device 500BR. For example, a size of one or more among the second partition 1712 and the eleventh partition 1731 at one or more sides of the second vibration device 600HR may differ from one or more among the fourth partition 1722 and the twelfth partition 1732 at one or more sides of the fifth vibration device 500R. For example, a size of one or more among the second partition 1712 and the eleventh partition 1731 at one or more sides of the second vibration device 600HR may be greater than one or more among the fourth partition 1722 and the twelfth partition 1732 at one or more sides of the fifth vibration device 500R. For example, a size of one or more among the fourth partition 1722 and the twelfth partition 1732 at one or more sides of the fifth vibration device 500R may differ from one or more among the eighth partition 1742 and the thirteenth partition 1733 at one or more sides of the tenth vibration device 500BR. For example, a size of one or more among the fourth partition 1722 and the twelfth partition 1732 at one or more sides of the fifth vibration device 500R may be smaller than one or more among the eighth partition 1742 and the thirteenth partition 1733 at one or more sides of the tenth vibration device 500BR. For example, a size of one or more among the second partition 1712 and the eleventh partition 1731 at one or more sides of the second vibration device 600HR may be the same as one or more among the eighth partition 1742 and the thirteenth partition 1733 at one or more sides of the tenth vibration device 500BR.

According to some embodiments of the present disclosure, the display apparatus may include the first partition 1711, the second partition 1712, and the eleventh partition 1731 at one or more sides of the third vibration device 600HC. A size of the eleventh partition 1731 may be the same as one or more among the first partition 1711 and the second partition 1712.

According to some embodiments of the present disclosure, the display apparatus may include the sixth partition 1724 and the twelfth partition 1732 at one or more sides of the sixth vibration device 500C. A size of the sixth partition 1724 may be the same as one or more among the third partition 1721 and the fourth partition 1722. For example, the display apparatus may include the fifth partition 1723 and the twelfth partition 1732 at one or more sides of the seventh vibration device 500LC. A size of the fifth partition 1723 may be the same as one or more among the third partition 1721 and the fourth partition 1722. For example, the display apparatus may include the fourth partition 1722 and the twelfth partition 1732 at one or more sides of the eighth vibration device 500RC. A size of the fourth partition 1722 may be the same as the third partition 1721.

According to some embodiments of the present disclosure, the display apparatus may include the ninth partition 1743, the tenth partition 1744, and the thirteenth partition 1733 at one or more sides of the eleventh vibration device 500BC. A size of one or more among the ninth partition 1743 and the tenth partition 1744 may be the same as one or more among the seventh partition 1741 and the eighth partition 1742.

According to some embodiments of the present disclosure, as described above with reference to FIG. 6B, the display apparatus according to an embodiment of the present disclosure may further include a fourteenth partition 1750.

With reference to FIGS. 11A and 11B, a size of one or more among the first to third regions (1) to (3) may differ from one or more among the fourth to eighth regions (4) to (8). For example, a size of one or more among the first to third regions (1) to (3) may be greater than one or more among the fourth to eighth regions (4) to (8). A size of one or more among the fourth to eighth regions (4) to (8) may differ from one or more among the ninth to eleventh regions (9) to (11). For example, a size of one or more among the fourth to eighth regions (4) to (8) may be smaller than one or more among the ninth to eleventh regions (9) to (11). For example, a size of one or more among the first to third regions (1) to (3) and the ninth to eleventh regions (9) to (11) may be greater than one or more among the fourth to eighth regions (4) to (8). For example, a size of one or more among the first to third regions (1) to (3) may be the same as one or more among the ninth to eleventh regions (9) to (11).

With reference to FIG. 11B, a fifteenth partition 7211 may be further provided near the first vibration device 600HL. The fifteenth partition 7211 may be configured to be smaller than or equal to a size of the first partition 1711 and/or the eleventh partition 1731. A sixteenth partition 7212 may be further provided near the second vibration device 600HR. The sixteenth partition 7212 may be configured to be smaller than or equal to a size of the second partition 1712 and/or the eleventh partition 1731. A seventeenth partition 7213 may be further provided near the third vibration device 600HC. The seventeenth partition 7213 may be configured to be smaller than or equal to a size of the first partition 1711 and the second partition 1712 and/or the eleventh partition 1731. Descriptions of the fifteenth to seventeenth partitions 7211 to 7213 may be the same as the descriptions of FIG. 9B, and thus, their repetitive descriptions may be omitted.

An eighteenth partition 7214 may be further provided near the ninth vibration device 600HL. The eighteenth partition 7214 may be configured to be smaller than or equal to a size of the seventh partition 1741 and/or the thirteenth partition 1733. For example, the eighteenth partition 7214 may be disposed to surround the ninth vibration device 600BL. Because the eighteenth partition 7214 surrounds the ninth vibration device 600BL along with the seventh partition 1741 and/or the thirteenth partition 1733, a vibration space of the ninth vibration device 600BL may be secured, thereby increasing a sound pressure level characteristic. Also, the eighteenth partition 7214 may prevent a sound or a sound pressure level from being leaked to the outside through a side surface between the display panel 110 and a supporting member 300, and thus, a sound output characteristic of the display apparatus may be more enhanced. The eighteenth partition 7214 may have a tetragonal shape which surrounds the ninth vibration device 600BL. However, embodiments of the present disclosure are not limited thereto, and the eighteenth partition 7214 may have a shape which is the same as or different from a whole shape of the ninth vibration device 600BL. For example, when the ninth vibration device 600BL has a square shape, the eighteenth partition 7214 may have a square shape, a circular shape, or an oval shape which is relatively greater in size than the ninth vibration device 600BL. The eighteenth partition 7214 may limit (or define) a vibration region (or a vibration area) of the display panel 110 based on the ninth vibration device 600BL. For example, as a size of the eighteenth partition 7214 increases, a vibration region of the ninth region (9) may increase, and thus, a sound characteristic of a low-pitched sound band of a left sound may be enhanced.

A nineteenth partition 7215 may be further provided near the tenth vibration device 600BR. The nineteenth partition 7215 may be configured to be smaller than or equal to a size of the eighth partition 1742 and/or the thirteenth partition 1733. For example, the nineteenth partition 7215 may be disposed to surround the tenth vibration device 600BR. Because the nineteenth partition 7215 surrounds the tenth vibration device 600BR along with the eighth partition 1742 and/or the thirteenth partition 1733, a vibration space of the tenth vibration device 600BR may be secured, thereby increasing a sound pressure level characteristic. Also, the nineteenth partition 7215 may prevent a sound or a sound pressure level from being leaked to the outside through the side surface between the display panel 110 and the supporting member 300, and thus, a sound output characteristic of the display apparatus may be more enhanced. The nineteenth partition 7215 may have a tetragonal shape which surrounds the tenth vibration device 600BR. However, embodiments of the present disclosure are not limited thereto, and the nineteenth partition 7215 may have a shape which is the same as or different from a whole shape of the tenth vibration device 600BR. For example, when the tenth vibration device 600BR has a square shape, the nineteenth partition 7215 may have a square shape, a circular shape, or an oval shape which is relatively greater in size than the tenth vibration device 600BR. The nineteenth partition 7215 may limit (or define) a vibration region (or a vibration area) of the display panel 110 based on the tenth vibration device 600BR. For example, as a size of the nineteenth partition 7215 increases, a vibration region of the tenth region (10) may increase, and thus, a sound characteristic of a low-pitched sound band of a right sound may be enhanced.

A twentieth partition 7216 may be further provided near the eleventh vibration device 600BC. The twentieth partition 7216 may be configured to be smaller than or equal to a size of the seventh partition 1741 and the eighth partition 1742 and/or the thirteenth partition 1733. For example, the twentieth partition 7216 may be disposed to surround the eleventh vibration device 600BC. Because the twentieth partition 7216 surrounds the eleventh vibration device 600BC along with the seventh partition 1741 and the eighth partition 1742 and/or the thirteenth partition 1733, a vibration space of the eleventh vibration device 600BC may be secured, thereby increasing a sound pressure level characteristic. Also, the twentieth partition 7216 may prevent a sound or a sound pressure level from being leaked to the outside through the side surface between the display panel 110 and the supporting member 300, and thus, a sound output characteristic of the display apparatus may be more enhanced. The twentieth partition 7216 may have a tetragonal shape which surrounds the eleventh vibration device 600BC. However, embodiments of the present disclosure are not limited thereto, and the twentieth partition 7216 may have a shape which is the same as or different from a whole shape of the eleventh vibration device 600BC. For example, when the eleventh vibration device 600BC has a square shape, the twentieth partition 7216 may have a square shape, a circular shape, or an oval shape which is relatively greater in size than the eleventh vibration device 600BC. The twentieth partition 7216 may limit (or define) a vibration region (or a vibration area) of the display panel 110 based on the eleventh vibration device 600BC. For example, as a size of the twentieth partition 7216 increases, a vibration region of the eleventh region (11) may increase, and thus, a sound characteristic of a low-pitched sound band of a center sound may be enhanced.

The eighteenth to twentieth partitions 7214 to 7216 may include one or more among a double-sided tape, a double-sided foam tape, a double-sided foam pad, a single-sided tape, a single-sided foam tape, a single-sided foam pad, an adhesive, and a bond, but embodiments of the present disclosure are not limited thereto. When the eighteenth to twentieth partitions 7214 to 7216 is configured with a double-sided tape or a double-sided foam pad, an adhesive force may be enhanced in a process of attaching a rear surface of the display panel 110 on an upper surface of the supporting member 300. For example, the eighteenth to twentieth partitions 7214 to 7216 may include a material having elasticity which enables a certain degree of compression. For example, at least one or more of the eighteenth to twentieth partitions 7214 to 7216 may include polyurethane, polyolefin, or polyethylene, but embodiments of the present disclosure are not limited thereto.

Therefore, according to an embodiment of the present disclosure, a size of a partition near a vibration device may be configured differently, thereby providing a display apparatus including a vibration device for outputting a sound band of 180 Hz or more and/or a sound band of a full range. Also, according to an embodiment of the present disclosure, a display apparatus where eleven channels are provided in a display device may be implemented. According to an embodiment of the present disclosure, a vibration device including eleven channels for realizing a sound based on upward, downward, left, and right actions or motions in addition to a sound based on simple left and right actions may be implemented. For example, a stereo sound and a vivid sound may be provided at upward, downward, left, and right sides based on a position of an object or a person in a displayed screen.

Figure 12A:
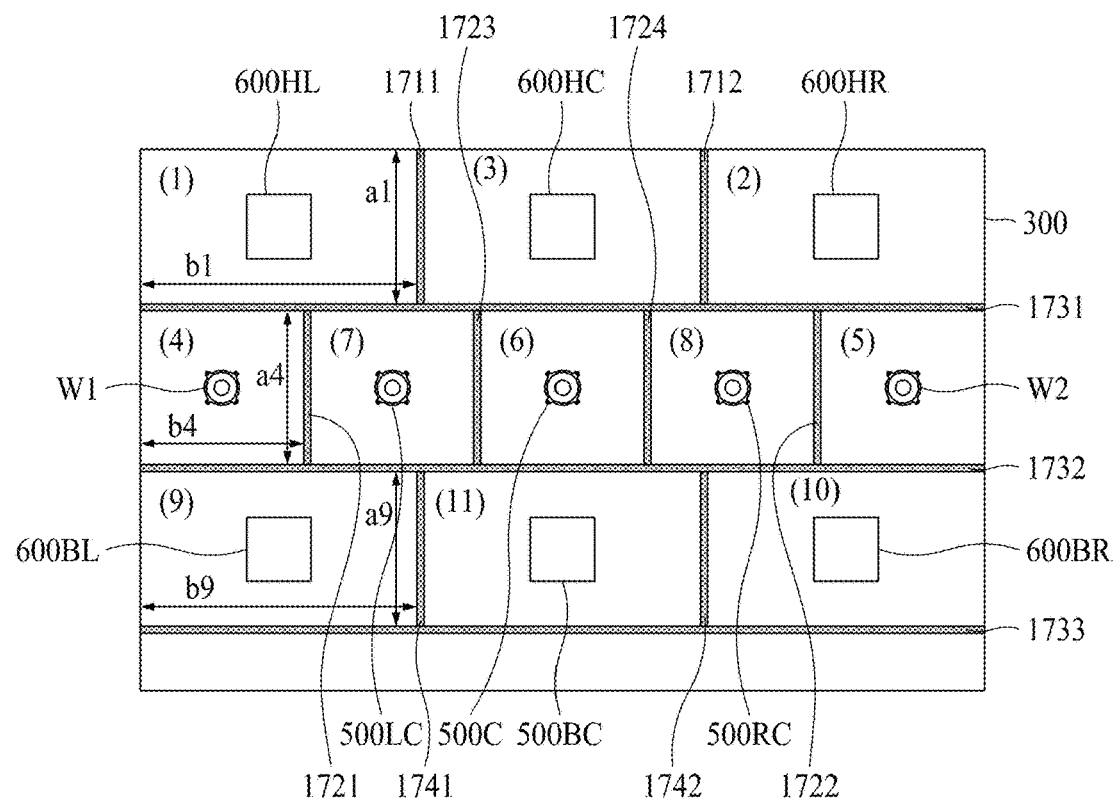
FIGS. 12A and 12B illustrate a display apparatus including a vibration device according to another embodiment of the present disclosure.
Figure 12B:
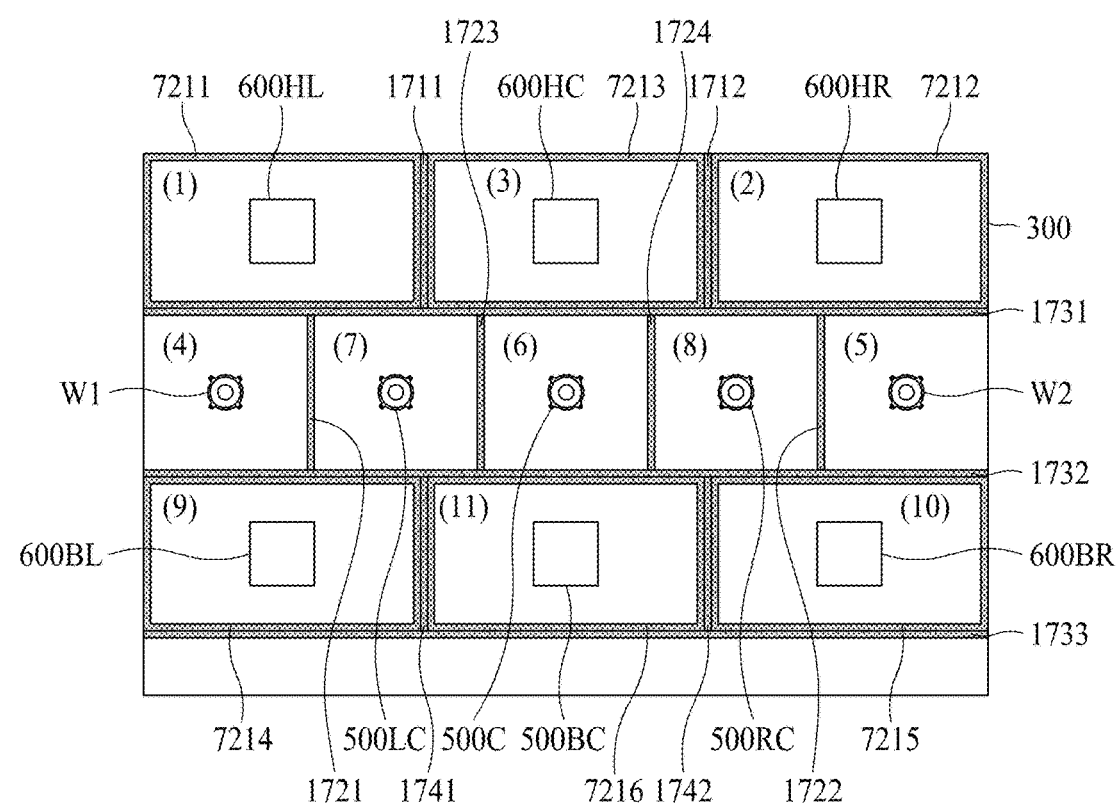

FIGS. 12A and 12B illustrate a display apparatus including a vibration device according to another embodiment of the present disclosure.

With reference to FIGS. 12A and 12B, the display apparatus according to some embodiments of the present disclosure may include a display device 100 including a display panel 110 including first to eleventh regions (1) to (11). One or more vibration devices may be disposed at one or more among the first to eleventh regions (1) to (11).

According to some embodiments of the present disclosure, a fourth vibration device W1 and a fifth vibration device W2 may be configured as the same vibration device, for the left-right symmetricity of a sound. For example, the fourth vibration device W1 and the fifth vibration device W2 may include a woofer-integrated vibration device. For example, one or more of first to third vibration devices 600HL to 600HC may be configured as a vibration device which differs from one or more among the fourth vibration device W1 and the fifth vibration device W2. For example, one or more of sixth to eighth vibration devices 500C to 500RC may be configured as a vibration device which differs from one or more among the fourth vibration device W1 and the fifth vibration device W2. The sixth to eighth vibration devices 500C to 500RC may be configured as a coil type vibration. For example, one or more of ninth to eleventh vibration devices 600BL to 600BC may be configured as a vibration device which differs from one or more among the fourth vibration device W1 and the fifth vibration device W2. The ninth to eleventh vibration devices 600BL to 600BC may be configured as a film type vibration device. For example, one or more among the first to eleventh vibration devices 600HL to 500BC may be configured as two or more different vibration devices. Descriptions of the fourth to eighth vibration devices 500L to 500C may be the same as the descriptions of FIGS. 6A to 9B, and thus, their repetitive descriptions may be omitted. Descriptions of first to twentieth partitions 1711 to 7216 may be the same as the descriptions of FIGS. 6A to 11B, and thus, their repetitive descriptions may be omitted. A woofer-integrated vibration device is as described above with reference to FIGS. 8A and 8B, and thus, their repetitive descriptions may be omitted or will be briefly given.

For example, because each of the fourth vibration device W1 and the fifth vibration device W2 is configured as a woofer-integrated vibration device, it is not needed to separately place a woofer for reproducing a sound of the low-pitched sound band.

Therefore, according to an embodiment of the present disclosure, a size of a partition near a vibration device may be configured differently, and a vibration device including a woofer may be provided, thereby providing a display apparatus including a vibration device for outputting a sound band of 180 Hz or more and/or a sound band of a full range.

Descriptions of sizes of the partition and the first to thirteenth regions (1) to (13) may be the same as the descriptions of FIGS. 6A to 11B, and thus, their repetitive descriptions may be omitted.

Therefore, according to an embodiment of the present disclosure, a size of a partition near a vibration device may be configured differently, thereby providing a display apparatus including a vibration device for outputting a sound band of 180 Hz or more and/or a sound band of a full range. For example, one or more among the first to third vibration devices 600HL to 600HC and the ninth to eleventh vibration devices 600BL to 600BC may be configured as a film type vibration device, thereby providing a display apparatus for more enhancing a sound pressure level characteristic.

FIGS. 13A to 13F illustrate a display apparatus including a vibration device according to another embodiment of the present disclosure.

FIGS. 13A to 13D will be described below with reference to the display apparatus of FIG. 6A for example, and the display apparatus of FIGS. 6B to 7D may also be identically applied thereto. FIGS. 13E and 13F will be described below with reference to the display apparatus of FIG. 9A, for example, and the display apparatus of FIGS. 9B to 12B may also be identically applied thereto. However, embodiments of the present disclosure are not limited thereto, and one or more of a partition, a pad portion, and a bent portion illustrated in FIGS. 13A to 13F may be applied in common (or in combination).

A sound wave which is generated when a display device 100 (for example, a display panel 110) vibrates by a vibration device 500 may be spread radially from a center of a vibration device and may travel. The sound wave may be referred to as a progressive wave. The progressive wave may be reflected at one side of a partition to generate a reflected wave, and the reflected wave may travel in a direction opposite to the progressive wave. The reflected wave overlaps and interferes with the progressive wave and does not travel, thereby generating a standing wave that stands at a certain position. A sound pressure level is reduced by the standing wave, and for this reason, a sound output characteristic is deteriorated.

When a partition is provided in the display device 100, it is unable to control a peak or dip phenomenon caused by a standing wave. The peak phenomenon may be a phenomenon where a sound pressure level bounces in a specific frequency, and the dip phenomenon may be a phenomenon where generating of a specific frequency is suppressed, and thus, a low sound pressure level is generated. A sound output characteristic of the vibration device 500 may be reduced by the peak or dip phenomenon. A structure for controlling or adjusting the peak or dip phenomenon is not simply implemented but has been implemented through various experiments. Therefore, the pad portion may be provided at the partition so as to decrease the peak or dip phenomenon that are caused by a standing wave occurring in a lengthwise direction of the vibration device. The phenomenon of sound pressure reduction caused by the standing wave generated by interference between the reflected wave and the progressive wave may be reduced by the pad portion. However, a phenomenon may occur where a shape of the partition swells to a screen of the display device 100 (for example, the display panel 110) due to a shape of the pad portion, and there may occur a problem where the display panel is recognized unevenly because the display device or the display panel is not flat or a supporting member is not flat. Such a phenomenon may be an uneven phenomenon or a wave phenomenon (hereinafter referred to as a wave phenomenon) of the display device 100 (for example, the display panel 110) or the supporting member 300, but embodiments of the present disclosure are not limited thereto. Therefore, the partition should be implemented to prevent the wave phenomenon and to easily control the peak or dip phenomenon caused by a standing wave. Accordingly, the inventors have performed various experiments on a shape of the partition. Through the various experiments, the inventors have recognized that the partition should be disposed based on a shape or a perimeter shape of the display device 100 (for example, the display panel 110). For example, the partition may have a tetragonal shape, but is not limited thereto and a shape of the partition may be changed based on a shape of the display panel 110. When the display device 100 (for example, the display panel 110) is a curved display panel module or a curved display panel module having a curved shape or the like, the partition may have a curved shape or a curve shape. Therefore, because the partition is disposed along a shape of the display device 100 (for example, the display panel 110), the attraction of the display device 100 (for example, the display panel 110) may decrease in a process of attaching the supporting member 300 on the display device 100 (for example, the display panel 110), and thus, the wave phenomenon may be prevented.

A shape of the pad portion may be configured to prevent the wave phenomenon from occurring when the display device 100 is pulled in a process of attaching to the supporting member by the pad portion disposed at the supporting member.

Alternatively, a shape of the pad portion may be configured to prevent the wave phenomenon from occurring when the display device 100 is pulled in a process of attaching to the supporting member by the pad portion disposed at the display device 100. For example, the pad portion should be implemented to easily control the peak or dip phenomenon caused by a standing wave of the vibration device and to prevent the wave phenomenon.

In the following embodiments, an example where a partition is disposed at a supporting member will be described, and the embodiments of the present disclosure are not limited thereto, and the partition may be disposed at a rear surface of a display panel. In order to illustrate a vibration device and a partition, an example where the partition is disposed at a supporting member will be described. For example, when the partition is disposed at the supporting member, an adverse influence of image quality of the display panel caused by the partition disposed at the display panel may be reduced.

With reference to FIGS. 13A to 13F, a standing wave causing a reduction in a sound pressure level may much occur at a point at which a magnitude of each of a progressive wave and a reflected wave is large. Therefore, the pad portion may be disposed at a position at which a sound wave transferred from a vibration device is largest. For example, the pad portion may be disposed at one or more sides, to which a strongest sound wave is transferred, among four sides of a partition and may be implemented toward the vibration device.

Figure 13A:
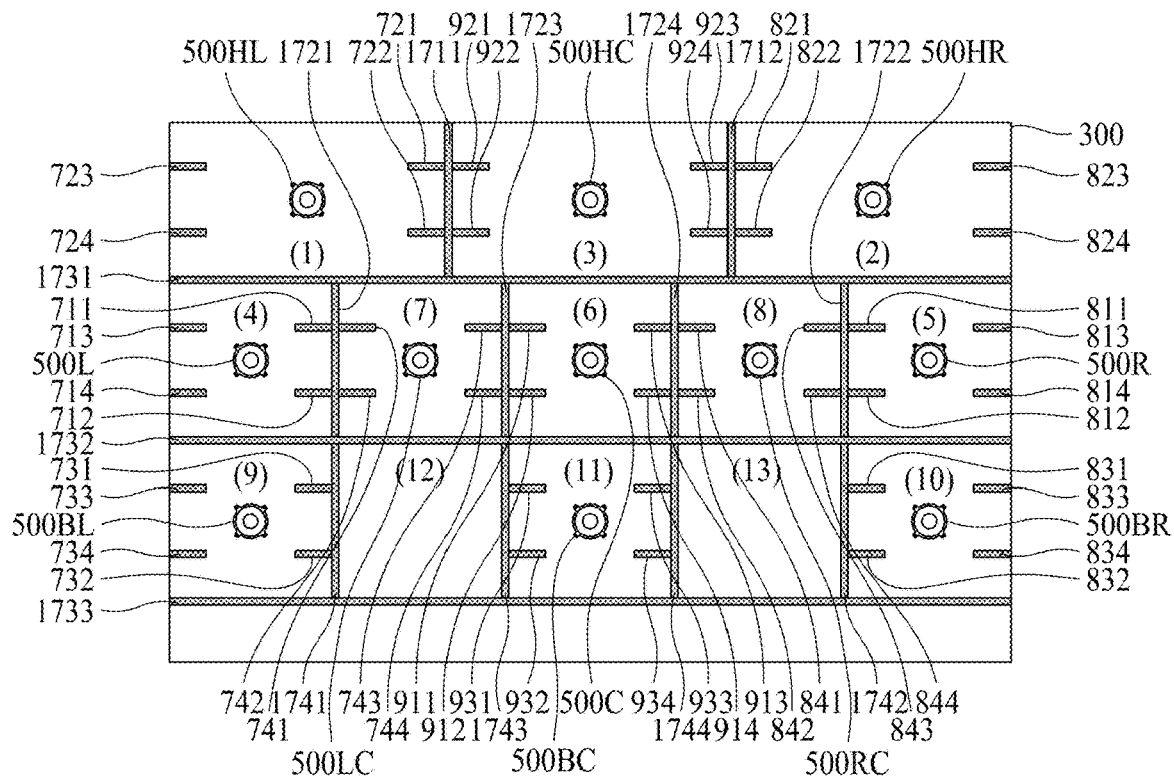
FIGS. 13A to 13F illustrate a display apparatus including a vibration device according to another embodiment of the present disclosure.
Figure 13B:
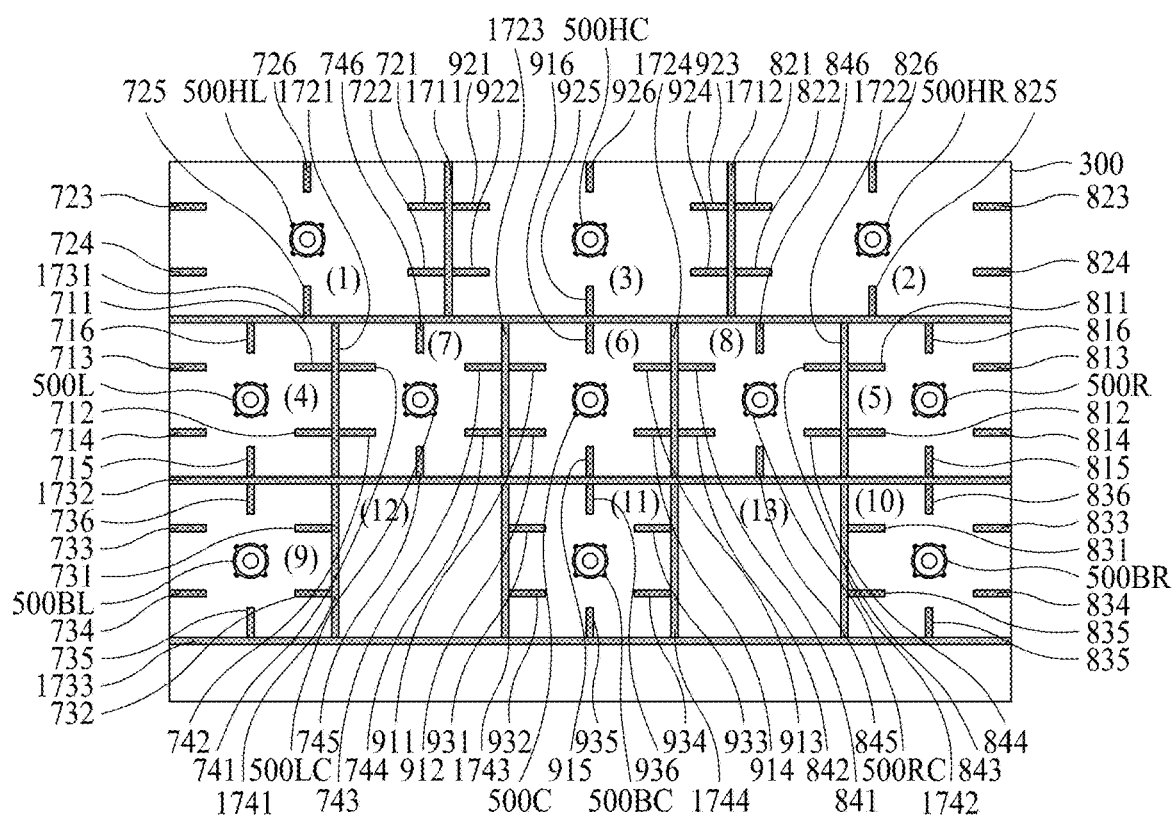

With reference to FIGS. 13A and 13B, one or more pad portions may be disposed at one or more sides of the first partition 1711. For example, a $1\text{-}1^{st}$ pad portion 721 and a $1\text{-}2^{nd}$ pad portion 722 may be disposed at one or more sides of the first partition 1711. For example, the $1\text{-}1^{st}$ pad portion 721 and the $1\text{-}2^{nd}$ pad portion 722 may be disposed toward a first vibration device 500HL. The $1\text{-}1^{st}$ pad portion 721 and the $1\text{-}2^{nd}$ pad portion 722 may be configured as one body or a single body, but embodiments of the present disclosure are not limited thereto. For example, one or more among the $1\text{-}1^{st}$ pad portion 721 and the $1\text{-}2^{nd}$ pad portion 722 may be configured as two or more elements. One or more pad portions may be further disposed at a side facing a side on which the $1\text{-}1^{st}$ pad portion 721 and the $1\text{-}2^{nd}$ pad portion 722 are disposed. For example, a $1\text{-}3^{rd}$ pad portion 723 and a $1\text{-}4^{th}$ pad portion 724 may be further disposed at a side facing the side on which the $1\text{-}1^{st}$ pad portion 721 and the $1\text{-}2^{nd}$ pad portion 722 are disposed. The $1\text{-}3^{rd}$ pad portion 723 and the $1\text{-}4^{th}$ pad portion 724 may be disposed toward the first vibration device 500HL. The $1\text{-}3^{rd}$ pad portion 723 and the $1\text{-}4^{th}$ pad portion 724 may be configured as one body or a single body, but embodiments of the present disclosure are not limited thereto. For example, one or more among the $1\text{-}3^{rd}$ pad portion 723 and the $1\text{-}4^{th}$ pad portion 724 may be configured as two or more elements. The $1\text{-}1^{st}$ to $1\text{-}4^{th}$ pad portions 721 to 724 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the $1\text{-}1^{st}$ to $1\text{-}4^{th}$ pad portions 721 to 724 may be disposed at a first region (1). For example, the $1\text{-}1^{th}$ to $1\text{-}4^{th}$ pad portions 721 to 724 may be disposed at the first region (1) and may be disposed toward the first vibration device 500HL.

With reference to FIGS. 13A and 13B, one or more pad portions may be disposed at one or more sides of a second partition 1712. For example, a 2-1$^{st}$ pad portion 821 and a 2-2$^{nd}$ pad portion 822 may be disposed at one or more sides of the second partition 1712. For example, the 2-1$^{st}$ pad portion 821 and the 2-2$^{nd}$ pad portion 822 may be disposed toward a second vibration device 500HR. The 2-1$^{st}$ pad portion 821 and the 2-2$^{nd}$ pad portion 822 may be configured as one body or a single body, but embodiments of the present disclosure are not limited thereto. For example, one or more among the 2-1$^{st}$ pad portion 821 and the 2-2$^{nd}$ pad portion 822 may be configured as two or more elements. One or more pad portions may be further disposed at a side facing a side on which the 2-1$^{st}$ pad portion 821 and the 2-2$^{nd}$ pad portion 822 are disposed. For example, a 2-3$^{rd}$ pad portion 823 and a 2-4$^{th}$ pad portion 824 may be further disposed at a side facing the side on which the 2-1$^{st}$ pad portion 821 and the 2-2$^{nd}$ pad portion 822 are disposed. The 2-3$^{rd}$ pad portion 823 and the 2-4$^{th}$ pad portion 824 may be disposed toward the second vibration device 500HR. The 2-3$^{rd}$ pad portion 823 and the 2-4$^{th}$ pad portion 824 may be configured as one body or a single body, but embodiments of the present disclosure are not limited thereto. For example, one or more among the 2-3$^{rd}$ pad portion 823 and the 2-4$^{th}$ pad portion 824 may be configured as two or more elements. The 2-1$^{st}$ to 2-4$^{th}$ pad portions 821 to 824 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 2-1$^{st}$ to 2-4$^{th}$ pad portions 821 to 824 may be disposed at a second region (2). For example, the 2-1$^{st}$ to 2-4$^{th}$ pad portions 821 to 824 may be disposed at the second region (2) and may be disposed toward the second vibration device 500HR.

One or more pad portions may be further disposed at one or more other sides of the first partition 1711. For example, a 3-1$^{st}$ pad portion 921 and a 3-2$^{nd}$ pad portion 922 may be disposed at one or more other sides of the first partition 1711. One or more pad portions may be further disposed at another side of the side on which the 1-1$^{st}$ pad portion 721 and the 1-2$^{nd}$ pad portion 722 are disposed. For example, the 3-1$^{st}$ pad portion 921 and the 3-2$^{nd}$ pad portion 922 may be further disposed at another side of the side on which the 1-1$^{st}$ pad portion 721 and the 1-2$^{nd}$ pad portion 722 are disposed. The 3-1$^{st}$ pad portion 921 and the 3-2$^{nd}$ pad portion 922 may be disposed toward a third vibration device 500HC. The 3-1$^{st}$ pad portion 921 and the 3-2$^{nd}$ pad portion 922 may be configured as one body or a single body, but embodiments of the present disclosure are not limited thereto. For example, one or more among the 3-1$^{st}$ pad portion 921 and the 3-2$^{nd}$ pad portion 922 may be configured as two or more elements. The 3-1$^{st}$ pad portion 921 and the 3-2$^{nd}$ pad portion 922 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 1-1$^{st}$ pad portion 721, the 1-2$^{nd}$ pad portion 722, the 3-1$^{st}$ pad portion 921, and the 3-2$^{nd}$ pad portion 922 may be disposed at one or more sides of the first partition 1711. For example, one or more pad portions facing two or more vibration devices may be disposed at one or more sides of the first partition 1711. For example, one or more pad portions facing the first vibration device 500HL and the third vibration device 500HC may be disposed at one or more sides of the first partition 1711.

One or more pad portions may be further disposed at one or more other sides of the second partition 1712. For example, a 3-3$^{rd}$ pad portion 923 and a 3-4$^{th}$ pad portion 924 may be disposed at one or more other sides of the second partition 1712. One or more pad portions may be further disposed at another side of the side on which the 2-1$^{st}$ pad portion 821 and the 2-2$^{nd}$ pad portion 822 are disposed. For example, the 3-3$^{rd}$ pad portion 923 and the 3-4$^{th}$ pad portion 924 may be further disposed at another side of the side on which the 2-1$^{st}$ pad portion 821 and the 2-2$^{nd}$ pad portion 822 are disposed. The 3-3$^{rd}$ pad portion 923 and the 3-4$^{th}$ pad portion 924 may be disposed toward the third vibration device 500HC. The 3-3$^{rd}$ pad portion 923 and the 3-4$^{th}$ pad portion 924 may be configured as one body or a single body, but embodiments of the present disclosure are not limited thereto. For example, one or more among the 3-3$^{rd}$ pad portion 923 and the 3-4$^{th}$ pad portion 924 may be configured as two or more elements. The 3-3$^{rd}$ pad portion 923 and the 3-4$^{th}$ pad portion 924 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 2-1$^{st}$ pad portion 821, the 2-2$^{nd}$ pad portion 822, the 3-3$^{rd}$ pad portion 923, the 3-4$^{th}$ pad portion 924 may be disposed at one or more sides of the second partition 1712. For example, one or more pad portions facing two or more vibration devices may be disposed at one or more sides of the second partition 1712. For example, one or more pad portions facing the second vibration device 500HR and the third vibration device 500HC may be disposed at one or more sides of the second partition 1712.

According to an embodiment of the present disclosure, the 3-1$^{st}$ pad portion 921 and the 3-2$^{nd}$ pad portion 922 may be disposed at one or more other sides of the first partition 1711. The 3-3$^{rd}$ pad portion 923 and the 3-4$^{th}$ pad portion 924 may be disposed at one or more other sides of the second partition 1712. For example, the 3-1$^{st}$ to 3-4$^{th}$ pad portions 921 to 922 may be disposed toward the third vibration device 500HC. The 3-1$^{st}$ to 3-4$^{th}$ pad portions 921 to 924 may be configured as one body or a single body, but embodiments of the present disclosure are not limited thereto. For example, one or more among the 3-1$^{st}$ to 3-4$^{th}$ pad portions 921 to 924 may be configured as two or more elements. The 3-1$^{st}$ to 3-4$^{th}$ pad portions 921 to 924 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 3-1$^{st}$ to 3-4$^{th}$ pad portions 921 to 924 may be disposed at a third region (3). For example, the 3-1$^{st}$ to 3-4$^{th}$ pad portions 921 to 924 may be disposed at the third region (3) and may be disposed toward the third vibration device 500HC.

With reference to FIGS. 13A and 13B, one or more pad portions may be disposed at one or more sides of a third partition 1721. For example, a 4-1$^{st}$ pad portion 711 and a 4-2$^{nd}$ pad portion 712 may be disposed at one or more sides of the third partition 1721. For example, the 4-1$^{st}$ pad portion 711 and the 4-2$^{nd}$ pad portion 712 may be disposed toward a fourth vibration device 500L. The 4-1$^{st}$ pad portion 711 and the 4-2$^{nd}$ pad portion 712 may be configured as one body or a single body, but embodiments of the present disclosure are not limited thereto. For example, one or more among the 4-1$^{st}$ pad portion 711 and the 4-2$^{nd}$ pad portion 712 may be configured as two or more elements. One or more pad portions may be further disposed at a side facing a side on which the 4-1$^{st}$ pad portion 711 and the 4-2$^{nd}$ pad portion 712 are disposed. For example, a 4-3$^{rd}$ pad portion 713 and a 4-4$^{th}$ pad portion 714 may be further disposed at a side facing the side on which the 4-1$^{st}$ pad portion 711 and the 4-2$^{nd}$ pad portion 712 are disposed. The 4-3$^{th}$ pad portion 713 and the 4-4$^{th}$ pad portion 714 may be disposed toward the fourth vibration device 500L. The 4-3$^{rd}$ pad portion 713 and the 4-4$^{th}$ pad portion 714 may be configured as one body or a single body, but embodiments of the present disclosure are not limited thereto. For example, one or more among the 4-3$^{rd}$ pad portion 713 and the 4-4$^{th}$ pad portion 714 may be configured as two or more elements. The 4-1$^{st}$ to 4-4$^{th}$ pad portions 711 to 714 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 4-1$^{st}$ to 4-4$^{th}$ pad portions 711 to 714 may be disposed at a fourth region (4). For example, the 4-1$^{st}$ to 4-4$^{th}$ pad portions 711 to 714 may be disposed at the fourth region (4) and may be disposed toward the fourth vibration device 500L.

One or more pad portions may be further disposed at one or more other sides of the third partition 1721. For example, a 7-1$^{st}$ pad portion 741 and a 7-2$^{nd}$ pad portion 742 may be further disposed at one or more other sides of the third partition 1721. One or more pad portions may be further disposed at another side of a side on which the 7-1$^{st}$ pad portion 741 and the 7-2$^{nd}$ pad portion 742 are disposed. For example, the 7-1$^{st}$ pad portion 741 and the 7-2$^{nd}$ pad portion 742 may be further disposed at another side of the side on which the 4-1$^{st}$ pad portion 711 and the 4-2$^{nd}$ pad portion 712 are disposed. The 7-1$^{st}$ pad portion 741 and the 7-2$^{nd}$ pad portion 742 may be disposed toward a seventh vibration device 500LC. The 7-1$^{st}$ pad portion 741 and the 7-2$^{nd}$ pad portion 742 may be configured as one body or a single body, but embodiments of the present disclosure are not limited thereto. For example, one or more among the 7-1$^{st}$ pad portion 741 and the 7-2$^{nd}$ pad portion 742 may be configured as two or more elements. The 7-1$^{st}$ pad portion 741 and the 7-2$^{nd}$ pad portion 742 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 4-1$^{st}$ pad portion 711, the 4-2$^{nd}$ pad part 712, the 7-1$^{st}$ pad portion 741, and the 7-2$^{nd}$ pad portion 742 may be disposed at one or more sides of the third partition 1721. For example, one or more pad portions facing two or more vibration devices may be disposed at one or more sides of the third partition 1721. For example, one or more pad portions facing the fourth vibration device 500L and the seventh vibration device 500LC may be disposed at one or more sides of the third partition 1721.

With reference to FIGS. 13A and 13B, one or more pad portions may be disposed at one or more other sides of the third partition 1721. For example, a 7-1$^{st}$ pad portion 741 and a 7-2$^{nd}$ pad portion 742 may be disposed at one or more other sides of the third partition 1721. For example, the 7-1$^{st}$ pad portion 741 and the 7-2$^{nd}$ pad portion 742 may be disposed toward a sixth vibration device 500C. The 7-1$^{st}$ pad portion 741 and the 7-2$^{nd}$ pad portion 742 may be configured as one body or a single body, but embodiments of the present disclosure are not limited thereto. For example, one or more among the 7-1$^{st}$ pad portion 741 and the 7-2$^{nd}$ pad portion 742 may be configured as two or more elements. One or more pad portions may be further disposed at a side facing a side on which the 7-1$^{st}$ pad portion 741 and the 7-2$^{nd}$ pad portion 742 are disposed. For example, a 7-3$^{rd}$ pad portion 743 and a 7-4$^{th}$ pad portion 744 may be further disposed at a side facing the side on which the 7-1$^{st}$ pad portion 741 and the 7-2$^{nd}$ pad portion 742 are disposed. The 7-3$^{rd}$ pad portion 743 and the 7-4$^{th}$ pad portion 744 may be disposed toward the seventh vibration device 500LC. The 7-3$^{rd}$ pad portion 743 and the 7-4$^{th}$ pad portion 744 may be configured as one body or a single body, but embodiments of the present disclosure are not limited thereto. For example, one or more among the 7-3$^{rd}$ pad portion 743 and the 7-4$^{th}$ pad portion 744 may be configured as two or more elements. The 7-3$^{rd}$ pad portion 743 and the 7-4$^{th}$ pad portion 744 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 7-1$^{st}$ to 7-4$^{th}$ pad portions 741 to 744 may be disposed at a seventh region (7). For example, the 7-1$^{st}$ to 7-4$^{th}$ pad portion 741 to 744 may be disposed at the seventh region (7) and may be disposed toward the seventh vibration device 500LC.

With reference to FIGS. 13A and 13B, one or more pad portions may be disposed at one or more sides of the fourth partition 1722. For example, a 5-1$^{st}$ pad portion 811 and a 5-2$^{nd}$ pad portion 812 may be disposed at one or more sides of the fourth partition 1722. For example, the 5-1$^{st}$ pad portion 811 and the 5-2$^{nd}$ pad portion 812 may be disposed toward a fifth vibration device 500R. The 5-1$^{st}$ pad portion 811 and the 5-2$^{nd}$ pad portion 812 may be configured as one body or a single body, but embodiments of the present disclosure are not limited thereto. For example, one or more among the 5-1$^{st}$ pad portion 811 and the 5-2$^{nd}$ pad portion 812 may be configured as two or more elements. One or more pad portions may be further disposed at a side facing a side on which the 5-1$^{st}$ pad portion 811 and the 5-2$^{nd}$ pad portion 812 are disposed. For example, a 5-3$^{rd}$ pad portion 813 and a 5-4$^{th}$ pad portion 814 may be further disposed at a side facing the side on which the 5-1$^{st}$ pad portion 811 and the 5-2$^{nd}$ pad portion 812 are disposed. The 5-3$^{rd}$ pad portion 813 and the 5-4$^{th}$ pad portion 814 may be disposed toward the fifth vibration device 500R. The 5-3$^{rd}$ pad portion 813 and the 5-4$^{th}$ pad portion 814 may be configured as one body or a single body, but embodiments of the present disclosure are not limited thereto. For example, one or more among the 5-3$^{rd}$ pad portion 813 and the 5-4$^{th}$ pad portion 814 may be configured as two or more elements. The 5-1$^{st}$ to 5-4$^{th}$ pad portions 811 to 814 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 5-1$^{st}$ to 5-4$^{th}$ pad portion 811 to 814 may be disposed at a fifth region (5). For example, the 5-1$^{st}$ to 5-4$^{th}$ pad portion 811 to 814 may be disposed at the fifth region (5) and may be disposed toward the fifth vibration device 500R.

One or more pad portions may be further disposed at one or more other sides of the fourth partition 1722. For example, an 8-3$^{rd}$ pad portion 843 and an 8-4$^{th}$ pad portion 844 may be disposed at one or more sides of the fourth partition 1722. One or more pad portions may be further disposed at another side of the side on which the 5-1$^{st}$ pad portion 811 and the 5-2$^{nd}$ pad part 812 are disposed. For example, the 8-3$^{rd}$ pad portion 843 and the 8-4$^{th}$ pad portion 844 may be further disposed at another side of the side on which the 5-1$^{st}$ pad portion 811 and the 5-2$^{nd}$ pad portion 812 are disposed. The 8-3$^{rd}$ pad portion 843 and the 8-4$^{th}$ pad portion 844 may be disposed toward an eighth vibration device 500RC. The 8-3$^{rd}$ pad portion 843 and the 8-4$^{th}$ pad portion 844 may be configured as one body or a single body, but embodiments of the present disclosure are not limited thereto. For example, one or more among the 8-3$^{rd}$ pad portion 843 and the 8-4$^{th}$ pad portion 844 may be configured as two or more elements. The 8-3$^{rd}$ pad portion 843 and the 8-4$^{th}$ pad portion 844 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, one or more pad portions facing two or more vibration devices may be disposed at one or more sides of the fourth partition 1722. For example, one or more pad portion facing the fifth vibration device 500R and the eighth vibration device 500RC may be disposed at one or more sides of the fourth partition 1722.

With reference to FIGS. 13A and 13B, one or more pad portions may be disposed at one or more sides of the fifth partition 1723. For example, a 6-1$^{st}$ pad portion 911 and a 6-2$^{nd}$ pad portion 912 may be disposed at one or more sides of the fifth partition 1723. For example, the 6-1$^{st}$ pad portion 911 and the 6-2$^{nd}$ pad portion 912 may be disposed toward a sixth vibration device 500C. The 6-1$^{st}$ pad portion 911 and the 6-2$^{nd}$ pad portion 912 may be configured as one body or a single body, but embodiments of the present disclosure are not limited thereto. For example, one or more among the 6-1$^{st}$ pad portion 911 and the 6-2$^{nd}$ pad portion 912 may be configured as two or more elements. One or more pad portions may be further disposed at a side facing a side on which the 6-1$^{st}$ pad portion 911 and the 6-2$^{nd}$ pad portion 912 are disposed. For example, a 6-3$^{rd}$ pad portion 913 and a 6-4$^{th}$ pad portion 914 may be further disposed at a side facing the side on which the 6-1$^{st}$ pad portion 911 and the 6-2$^{nd}$ pad portion 912 are disposed. The 6-3$^{rd}$ pad portion 913 and the 6-4$^{th}$ pad portion 914 may be disposed toward the sixth vibration device 500C. The 6-3$^{rd}$ pad portion 913 and the 6-4$^{th}$ pad portion 914 may be configured as one body or a single body, but embodiments of the present disclosure are not limited thereto. For example, one or more among the 6-3$^{rd}$ pad portion 913 and the 6-4$^{th}$ pad portion 914 may be configured as two or more elements. The 6-3$^{rd}$ pad portion 913 and the 6-4$^{th}$ pad portion 914 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 6-1$^{st}$ to 6-4$^{th}$ pad portions 911 to 914 may be disposed at a sixth region (6). For example, the 6-1$^{st}$ to 6-4$^{th}$ pad portions 911 to 914 may be disposed at the sixth region (6) and may be disposed toward the sixth vibration device 500C.

According to an embodiment of the present disclosure, the 6-1$^{st}$ pad portion 911 and the 6-2$^{nd}$ pad portion 912 may be disposed at one or more other sides of the fifth partition 1723. The 7-3$^{rd}$ pad portion 743 and the 7-4$^{th}$ pad portion 744 may be disposed at one or more other sides of the fifth partition 1723. For example, the 6-1$^{st}$ pad portion 911 and the 6-2$^{nd}$ pad portion 912 may be disposed toward the sixth vibration device 500C. For example, the 7-3$^{rd}$ pad portion 743 and the 7-4$^{th}$ pad portion 744 may be disposed toward the seventh vibration device 500LC. For example, one or more pad portions facing two or more vibration devices may be disposed at one or more sides of the fifth partition 1723. For example, one or more pad portions facing the sixth vibration device 500C and the seventh vibration device 500LC may be disposed at one or more sides of the fifth partition 1723.

With reference to FIGS. 13A and 13B, one or more pad portions may be disposed at one or more sides of the sixth partition 1724. For example, an 8-1$^{st}$ pad portion 841 and an 8-2$^{nd}$ pad portion 842 may be disposed at one or more sides of the sixth partition 1724. For example, the 8-1$^{st}$ pad portion 841 and the 8-2$^{nd}$ pad portion 842 may be disposed toward an eighth vibration device 500RC. The 8-1$^{st}$ pad portion 841 and the 8-2$^{nd}$ pad portion 842 may be configured as one body or a single body, but embodiments of the present disclosure are not limited thereto. For example, one or more among the 8-1$^{st}$ pad portion 841 and the 8-2$^{nd}$ pad portion 842 may be configured as two or more elements. One or more pad portions may be further disposed at a side facing a side on which the 8-1$^{st}$ pad portion 841 and the 8-2$^{nd}$ pad portion 842 are disposed. For example, an 8-3$^{rd}$ pad portion 843 and an 8-4$^{th}$ pad portion 844 may be further disposed at a side facing the side on which the 8-1$^{st}$ pad portion 841 and the 8-2$^{nd}$ pad portion 842 are disposed. The 8-3$^{rd}$ pad portion 843 and the 8-4$^{th}$ pad portion 844 may be disposed toward the eighth vibration device 500RC. The 8-3$^{rd}$ pad portion 843 and the 8-4$^{th}$ pad portion 844 may be configured as one body or a single body, but embodiments of the present disclosure are not limited thereto. For example, one or more among the 8-3$^{rd}$ pad portion 843 and the 8-4$^{th}$ pad portion 844 may be configured as two or more elements. The 8-3$^{rd}$ pad portion 843 and the 8-4$^{th}$ pad portion 844 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 8-1$^{st}$ to 8-4$^{th}$ pad portions 841 to 844 may be disposed at an eighth region (8). For example, the 8-1$^{st}$ to 8-4$^{th}$ pad portions 841 to 844 may be disposed at the eighth region (8) and may be disposed toward the eighth vibration device 500RC.

According to an embodiment of the present disclosure, the 6-3$^{rd}$ pad portion 913 and the 6-4$^{th}$ pad portion 914 may be disposed at one or more other sides of the sixth partition 1724. The 8-1$^{st}$ pad portion 841 and the 8-2$^{nd}$ pad portion 842 may be disposed at one or more other sides of the sixth partition 1724. For example, the 6-3$^{rd}$ pad portion 913 and the 6-4$^{th}$ pad portion 914 may be disposed toward the sixth vibration device 500C. For example, the 8-1$^{st}$ pad portion 841 and the 8-2$^{nd}$ pad portion 842 may be disposed toward the eighth vibration device 500RC. For example, one or more pad portions facing two or more vibration devices may be disposed at one or more sides of the sixth partition 1724. For example, one or more pad portions facing the sixth vibration device 500C and the eighth vibration device 500RC may be disposed at one or more sides of the sixth partition 1724.

With reference to FIGS. 13A and 13B, one or more pad portions may be disposed at one or more sides of the seventh partition 1741. For example, a 9-1$^{st}$ pad portion 731 and a 9-2$^{nd}$ pad portion 732 may be disposed at one or more sides of the seventh partition 1741. For example, the 9-1$^{st}$ pad portion 731 and the 9-2$^{nd}$ pad portion 732 may be disposed toward a ninth vibration device 500BL. The 9-1$^{st}$ pad portion 731 and the 9-2$^{nd}$ pad portion 732 may be configured as one body or a single body, but embodiments of the present disclosure are not limited thereto. For example, one or more among the 9-1$^{st}$ pad portion 731 and the 9-2$^{nd}$ pad portion 732 may be configured as two or more elements. One or more pad portions may be further disposed at a side facing a side on which the 9-1$^{st}$ pad portion 731 and the 9-2$^{nd}$ pad part 732 are disposed. For example, a 9-3$^{rd}$ pad portion 733 and a 9-4$^{th}$ pad portion 734 may be further disposed at a side facing the side on which the 9-1$^{st}$ pad portion 731 and the 9-2$^{nd}$ pad portion 732 are disposed. The 9-3$^{rd}$ pad portion 733 and the 9-4$^{th}$ pad portion 734 may be disposed toward the ninth vibration device 500BL. The 9-3$^{rd}$ pad portion 733 and the 9-4$^{th}$ pad portion 734 may be configured as one body or a single body, but embodiments of the present disclosure are not limited thereto. For example, one or more among the 9-3$^{rd}$ pad portion 733 and the 9-4$^{th}$ pad portion 734 may be configured as two or more elements. The 9-3$^{rd}$ pad portion 733 and the 9-4$^{th}$ pad portion 734 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 9-1$^{st}$ to 9-4$^{th}$ pad portions 731 to 734 may be disposed at a ninth region (9). For example, the 9-1$^{st}$ to 9-4$^{th}$ pad portions 731 to 734 may be disposed at the ninth region (9) and may be disposed toward the ninth vibration device 500BL.

With reference to FIGS. 13A and 13B, one or more pad portions may be disposed at one or more sides of the eighth partition 1742. For example, a 10-1$^{st}$ pad portion 831 and a 10-2$^{nd}$ pad portion 832 may be disposed at one or more sides of the eighth partition 1742. For example, the 10-1$^{st}$ pad portion 831 and the 10-2$^{nd}$ pad portion 832 may be disposed toward a tenth vibration device 500BR. The 10-1$^{st}$ pad portion 831 and the 10-2$^{nd}$ pad portion 832 may be configured as one body or a single body, but embodiments of the present disclosure are not limited thereto. For example, one or more among the 10-1$^{st}$ pad portion 831 and the 10-2$^{nd}$ pad portion 832 may be configured as two or more elements. One or more pad portions may be further disposed at a side facing a side on which the 10-1$^{st}$ pad portion 831 and the 10-2$^{nd}$ pad portion 832 are disposed. For example, a 10-3$^{rd}$ pad portion 833 and a 10-4$^{th}$ pad portion 834 may be further disposed at a side facing the side on which the 10-1$^{st}$ pad portion 831 and the 10-2$^{nd}$ pad portion 832 are disposed. The 10-3$^{rd}$ pad portion 833 and the 10-4$^{th}$ pad portion 834 may be disposed toward the tenth vibration device 500BR. The 10-3$^{rd}$ pad portion 833 and the 10-4$^{th}$ pad portion 834 may be configured as one body or a single body, but embodiments of the present disclosure are not limited thereto. For example, one or more among the 10-3$^{rd}$ pad portion 833 and the 10-4$^{th}$ pad portion 834 may be configured as two or more elements. The 10-1$^{st}$ to 10-4$^{th}$ pad portions 831 to 834 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 10-1$^{st}$ to 10-4$^{th}$ pad portions 831 to 834 may be disposed at a tenth region (10). For example, the 10-1$^{st}$ to 10-4$^{th}$ pad portions 831 to 834 may be disposed at the tenth region (10) and may be disposed toward the tenth vibration device 500BR.

With reference to FIGS. 13A and 13B, one or more pad portions may be disposed at one or more sides of the ninth partition 1743. For example, an 11-1$^{st}$ pad portion 931 and an 11-2$^{nd}$ pad portion 932 may be disposed at one or more sides of the ninth partition 1743. For example, the 11-1$^{st}$ pad portion 931 and the 11-2$^{nd}$ pad portion 932 may be disposed toward an eleventh vibration device 500BC. The 11-1$^{st}$ pad portion 931 and the 11-2$^{nd}$ pad portion 932 may be configured as one body or a single body, but embodiments of the present disclosure are not limited thereto. For example, one or more among the 11-1$^{st}$ pad portion 931 and the 11-2$^{nd}$ pad portion 932 may be configured as two or more elements. One or more pad portions may be further disposed at one or more sides of the tenth partition 1744. For example, an 11-3$^{rd}$ pad portion 933 and an 11-4$^{th}$ pad portion 934 may be further disposed at one or more sides of the tenth partition 1744. The 11-3$^{rd}$ pad portion 933 and the 11-4$^{th}$ pad portion 934 may be disposed toward the eleventh vibration device 500BC. The 11-3$^{rd}$ pad portion 933 and the 11-4$^{th}$ pad portion 934 may be configured as one body or a single body, but embodiments of the present disclosure are not limited thereto. For example, one or more among the 11-3$^{rd}$ pad portion 933 and the 11-4$^{th}$ pad portion 934 may be configured as two or more elements. The 11-1$^{st}$ to 11-4$^{th}$ pad portions 931 to 934 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 11-1$^{st}$ to 11-4$^{th}$ pad portions 931 to 934 may be disposed at an eleventh region (11). For example, the 11-1$^{st}$ to 11-4$^{th}$ pad portions 931 to 934 may be disposed at the eleventh region (11) and may be disposed toward the eleventh vibration device 500BC.

As another embodiment of the present disclosure, an example where the ninth region (9) and the eleventh region (11) are provided will be described. For example, a twelfth region (12) and a thirteenth region (13) may not be provided. For example, the ninth to eleventh vibration devices 500BL to 500BC may be respectively provided at the ninth to eleventh regions (9) to (11). The seventh partition 1741 may be disposed between the ninth region (9) and the eleventh region (11). The eighth partition 1742 may be disposed between the tenth region (10) and the eleventh region (11). For example, the 9-1$^{st}$ pad portions 731 and the 9-2$^{nd}$ pad portions 732 may be disposed at one or more sides of the seventh partition 1741. The 9-3$^{rd}$ pad portions 733 and the 9-4$^{th}$ pad portions 734 may be disposed at a side facing a side on which the 9-1$^{st}$ pad portion 731 and the 9-2$^{nd}$ pad portion 732 are disposed. The 9-1$^{st}$ to 9-4$^{th}$ pad portions 731 to 734 may be disposed toward the ninth vibration device 500BL. The 11-1$^{st}$ pad portions 931 and the 11-2$^{nd}$ pad portions 932 may be disposed at one or more other sides of the seventh partition 1741. The 11-3$^{rd}$ pad portions 933 and the 11-4$^{th}$ pad portions 934 may be disposed at a side facing a side on which the 11-1$^{st}$ pad portions 931 and the 11-2$^{nd}$ pad portions 932 are disposed. The 11-1$^{st}$ to 11-4$^{th}$ pad portions 931 to 934 may be disposed toward the eleventh vibration device 500BC. For example, the 10-1$^{st}$ pad portion 831 and the 10-2$^{nd}$ pad portions 832 may be disposed at one or more sides of the eighth partition 1742. The 10-3$^{rd}$ pad portions 833 and the 10-4$^{th}$ pad portion 834 may be disposed at a side facing a side on which the 10-1$^{st}$ pad portions 831 and the 10-2$^{nd}$ pad portion 832 are disposed. The 10-1$^{st}$ to 10-4$^{th}$ pad portions 831 to 834 may be disposed toward the tenth vibration device 500BR. For example, one or more pad portions facing the ninth vibration device 500BL and the eleventh vibration device 500BC may be disposed at one or more sides of the seventh partition 1741. For example, one or more pad portions facing the tenth vibration device 500BR and the eleventh vibration device 500BC may be disposed at one or more sides of the eighth partition 1742.

With reference to FIG. 13B, a 1-5$^{th}$ pad portion 725 may be further disposed at one or more sides of the eleventh partition 1731. The 1-5$^{th}$ pad portion 725 may be disposed toward the first vibration device 500HL. The 1-5$^{th}$ pad portion 725 may be configured as one element, but embodiments of the present disclosure are not limited thereto. For example, the 1-5$^{th}$ pad portion 725 may be configured as two or more elements. One or more pad portions may be disposed at a side facing a side on which the 1-5$^{th}$ pad portion 725 is disposed. For example, a 1-6$^{th}$ pad portion 726 may be further disposed at a side facing the side on which the 1-5$^{th}$ pad portion 725 is disposed. The 1-6$^{th}$ pad portion 726 may be disposed toward the first vibration device 500HL. The 1-6$^{th}$ pad portion 726 may be configured as one element, but embodiments of the present disclosure are not limited thereto. For example, the 1-6$^{th}$ pad portion 726 may be configured as two or more elements. The 1-5$^{th}$ pad portion 725 and the 1-6$^{th}$ pad portion 726 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 1-1$^{st}$ to 1-6$^{th}$ pad portions 721 to 726 may be disposed at the first region (1). For example, the 1-1$^{st}$ to 1-6$^{th}$ pad portions 721 to 726 may be disposed at the first region (1) and may be disposed toward the first vibration device 500HL. Because the 1-5$^{th}$ pad portion 725 and the 1-6$^{th}$ pad portion 726 are further provided, a reduction in a sound wave caused by a standing wave may more decrease, and a sound output characteristic of a vibration device may be more enhanced.

A 2-5$^{th}$ pad portion 825 may be further disposed at one or more sides of the eleventh partition 1731. The 2-5$^{th}$ pad portion 825 may be disposed toward the second vibration device 500HR. The 2-5$^{th}$ pad portion 825 may be configured as one element, but embodiments of the present disclosure are not limited thereto. For example, the 2-5$^{th}$ pad portion 825 may be configured as two or more elements. One or more pad portions may be disposed at a side facing a side on which the 2-5$^{th}$ pad portion 825 is disposed. For example, a 2-6$^{th}$ pad portion 826 may be further disposed at a side facing the side on which the 2-5$^{th}$ pad portion 825 is disposed. The 2-6$^{th}$ pad portion 826 may be disposed toward the second vibration device 500HR. The 2-6$^{th}$ pad portion 826 may be configured as one element, but embodiments of the present disclosure are not limited thereto. For example, the 2-6$^{th}$ pad portion 726 may be configured as two or more elements. The 2-5$^{th}$ pad portion 825 and the 2-6$^{th}$ pad portion 826 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 2-1$^{st}$ to 2-6$^{th}$ pad portions 821 to 826 may be disposed at the second region (2). For example, the 2-1$^{st}$ to 2-6$^{th}$ pad portions 821 to 826 may be disposed at the second region (2) and may be disposed toward the second vibration device 500HR. Because the 2-5$^{th}$ pad portion 825 and the 2-6$^{th}$ pad portion 826 are further provided, a reduction in a sound wave caused by a standing wave may more decrease, and a sound output characteristic of a vibration device may be more enhanced.

A 3-5$^{th}$ pad portion 925 may be further disposed at one or more sides of the eleventh partition 1731. The 3-5$^{th}$ pad portion 925 may be disposed toward the third vibration device 500HC. The 3-5$^{th}$ pad portion 925 may be configured as one element, but embodiments of the present disclosure are not limited thereto. For example, the 3-5$^{th}$ pad portion 925 may be configured as two or more elements. One or more pad portions may be disposed at a side facing a side on which the 3-5$^{th}$ pad portion 925 is disposed. For example, a 3-6$^{th}$ pad portion 926 may be further disposed at a side facing the side on which the 3-5$^{th}$ pad portion 925 is disposed. The 3-6$^{th}$ pad portion 926 may be disposed toward the third vibration device 500HC. The 3-6$^{th}$ pad portion 926 may be configured as one element, but embodiments of the present disclosure are not limited thereto. For example, the 3-6$^{th}$ pad portion 926 may be configured as two or more elements. The 3-5$^{th}$ pad portion 925 and the 3-6$^{th}$ pad portion 926 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 3-151 to 3-6$^{th}$ pad portions 921 to 926 may be disposed at the third region (3). For example, the 3-1$^{st}$ to 3-6$^{th}$ pad portions 921 to 926 may be disposed at the third region (3) and may be disposed toward the third vibration device 500HC. Because the 3-5$^{th}$ pad portion 925 and the 3-6$^{th}$ pad portion 926 are further provided, a reduction in a sound wave caused by a standing wave may more decrease, and a sound output characteristic of a vibration device may be more enhanced.

With reference to FIG. 13B, a 4-5$^{th}$ pad portion 715 may be further disposed at one or more sides of the twelfth partition 1732. The 4-5$^{th}$ pad portion 715 may be disposed toward the fourth vibration device 500L. The 4-5$^{th}$ pad portion 715 may be configured as one element, but embodiments of the present disclosure are not limited thereto. For example, the 4-5$^{th}$ pad portion 715 may be configured as two or more elements.

One or more pad portions may be disposed at a side facing a side on which the 4-5$^{th}$ pad portion 715 is disposed. For example, a 4-6$^{th}$ pad portion 716 may be further disposed at a side facing the side on which the 4-5$^{th}$ pad portion 715 is disposed. For example, the 4-6$^{th}$ pad portion 716 may be further disposed at another side of the eleventh partition 1731. The 4-6$^{th}$ pad portion 716 may be disposed toward the fourth vibration device 500L. The 4-6$^{th}$ pad portion 716 may be configured as one element, but embodiments of the present disclosure are not limited thereto. For example, the 4-6$^{th}$ pad portion 716 may be configured as two or more elements. The 4-5$^{th}$ pad portion 715 and the 4-6$^{th}$ pad portion 716 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 4-1$^{st}$ to 4-6$^{th}$ pad portions 711 to 716 may be disposed at the fourth region (4). For example, the 4-1$^{st}$ to 4-6$^{th}$ pad portions 711 to 716 may be disposed at the fourth region (4) and may be disposed toward the fourth vibration device 500L. Because the 4-5$^{th}$ pad portion 715 and the 4-6$^{th}$ pad portion 716 are further provided, a reduction in a sound wave caused by a standing wave may more decrease, and a sound output characteristic of a vibration device may be more enhanced.

A 5-5$^{th}$ pad portion 815 may be further disposed at one or more sides of the twelfth partition 1732. The 5-5$^{th}$ pad portion 815 may be disposed toward the fifth vibration device 500R. The 5-5$^{th}$ pad portion 815 may be configured as one element, but embodiments of the present disclosure are not limited thereto. For example, the 5-5$^{th}$ pad portion 815 may be configured as two or more elements. One or more pad portions may be disposed at a side facing a side on which the 5-5$^{th}$ pad portion 815 is disposed. For example, a 5-6$^{th}$ pad portion 816 may be further disposed at a side facing the side on which the 5-5$^{th}$ pad portion 815 is disposed. For example, the 5-6$^{th}$ pad portion 816 may be further disposed at another side of the eleventh partition 1731. The 5-6$^{th}$ pad portion 816 may be disposed toward the fifth vibration device 500R. The 5-6$^{th}$ pad portion 816 may be configured as one element, but embodiments of the present disclosure are not limited thereto. For example, the 5-6$^{th}$ pad portion 816 may be configured as two or more elements. The 5-5$^{th}$ pad portion 815 and the 5-6$^{th}$ pad part 816 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 5-1$^{st}$ to 5-6$^{th}$ pad portions 811 to 816 may be disposed at the fifth region (5). For example, the 5-1$^{st}$ to 5-6$^{th}$ pad portion 811 to 816 may be disposed at the fifth region (5) and may be disposed toward the fifth vibration device 500R. Because the 5-5$^{th}$ pad portion 815 and the 5-6$^{th}$ pad portion 816 are further provided, a reduction in a sound wave caused by a standing wave may more decrease, and a sound output characteristic of a vibration device may be more enhanced.

A 6-5$^{th}$ pad portion 915 may be further disposed at one or more sides of the twelfth partition 1732. The 6-5$^{th}$ pad portion 915 may be disposed toward the sixth vibration device 500C. The 6-5$^{th}$ pad portion 915 may be configured as one element, but embodiments of the present disclosure are not limited thereto. For example, the 6-5$^{th}$ pad portion 915 may be configured as two or more elements. One or more pad parts may be disposed at a side facing a side on which the 6-5$^{th}$ pad portion 915 is disposed. For example, a 6-6$^{th}$ pad portion 916 may be further disposed at a side facing the side on which the 6-5$^{th}$ pad portion 915 is disposed. For example, the 6-6$^{th}$ pad portion 916 may be further disposed at another side of the eleventh partition 1731. The 6-6$^{th}$ pad portion 916 may be disposed toward the sixth vibration device 500C. The 6-6$^{th}$ pad portion 916 may be configured as one element, but embodiments of the present disclosure are not limited thereto. For example, the 6-6$^{th}$ pad portion 916 may be configured as two or more elements. The 6-5$^{th}$ pad portion 915 and the 6-6$^{th}$ pad portion 916 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 6-1$^{st}$ to 6-6$^{th}$ pad portions 911 to 916 may be disposed at the sixth region (6). For example, the 6-1$^{st}$ to 6-6$^{th}$ pad portions 911 to 916 may be disposed at the sixth region (6) and may be disposed toward the sixth vibration device 500C. Because the 6-5$^{th}$ pad portion 915 and the 6-6$^{th}$ pad portion 916 are further provided, a reduction in a sound wave caused by a standing wave may more decrease, and a sound output characteristic of a vibration device may be more enhanced.

A 7-5$^{th}$ pad portion 745 may be further disposed at one or more sides of the twelfth partition 1732. The 7-5$^{th}$ pad portion 745 may be disposed toward the seventh vibration device 500LC. The 7-5$^{th}$ pad portion 745 may be configured as one element, but embodiments of the present disclosure are not limited thereto. For example, the 7-5$^{th}$ pad portion 745 may be configured as two or more elements. One or more pad portions may be disposed at a side facing a side on which the 7-5$^{th}$ pad portion 745 is disposed. For example, a 7-6$^{th}$ pad portion 746 may be further disposed at a side facing the side on which the 7-5$^{th}$ pad portion 745 is disposed. For example, the 7-6$^{th}$ pad portion 746 may be further disposed at another side of the eleventh partition 1731. The 7-6$^{th}$ pad portion 746 may be disposed toward the seventh vibration device 500LC. The 7-6$^{th}$ pad portion 746 may be configured as one element, but embodiments of the present disclosure are not limited thereto. For example, the 7-6$^{th}$ pad portion 746 may be configured as two or more elements. The 7-5$^{th}$ pad portion 745 and the 7-6$^{th}$ pad portion 746 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 7-1$^{st}$ to 7-6$^{th}$ pad portions 741 to 746 may be disposed at the seventh region (7). For example, the 7-1$^{st}$ to 7-6$^{th}$ pad portion 741 to 746 may be disposed at the seventh region (7) and may be disposed toward the seventh vibration device 500LC. Because the 7-5$^{th}$ pad portion 745 and the 7-6$^{th}$ pad portion 746 are further provided, a reduction in a sound wave caused by a standing wave may more decrease, and a sound output characteristic of a vibration device may be more enhanced.

An 8-5$^{th}$ pad portion 845 may be further disposed at one or more sides of the twelfth partition 1732. The 8-5$^{th}$ pad portion 845 may be disposed toward the eighth vibration device 500RC. The 8-5$^{th}$ pad portion 845 may be configured as one element, but embodiments of the present disclosure are not limited thereto. For example, the 8-5$^{th}$ pad portion 845 may be configured as two or more elements. One or more pad portions may be disposed at a side facing a side on which the 8-5$^{th}$ pad portion 845 is disposed. For example, an 8-6$^{th}$ pad portion 846 may be further disposed at a side facing the side on which the 8-5$^{th}$ pad portion 845 is disposed. For example, the 8-6$^{th}$ pad portion 846 may be further disposed at another side of the eleventh partition 1731. The 8-6$^{th}$ pad portion 846 may be disposed toward the eighth vibration device 500RC. The 8-6$^{th}$ pad portion 846 may be configured as one element, but embodiments of the present disclosure are not limited thereto. For example, the 8-6$^{th}$ pad portion 846 may be configured as two or more elements. The 8-5$^{th}$ pad portion 845 and the 8-6$^{th}$ pad portion 846 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 8-1$^{st}$ to 8-6$^{th}$ pad portions 841 to 846 may be disposed at the eighth region (8). For example, the 8-1$^{st}$ to 8-6$^{th}$ pad portions 841 to 846 may be disposed at the eighth region (8) and may be disposed toward the eighth vibration device 500RC. Because the 8-5$^{th}$ pad portion 845 and the 8-6$^{th}$ pad portion 846 are further provided, a reduction in a sound wave caused by a standing wave may more decrease, and a sound output characteristic of a vibration device may be more enhanced.

A 9-5$^{th}$ pad portion 735 may be further disposed at one or more sides of the thirteenth partition 1733. The 9-5$^{th}$ pad portion 735 may be disposed toward the ninth vibration device 500BL. The 9-5$^{th}$ pad portion 735 may be configured as one element, but embodiments of the present disclosure are not limited thereto. For example, the 9-5$^{th}$ pad portion 735 may be configured as two or more elements. One or more pad portions may be disposed at a side facing a side on which the 9-5$^{th}$ pad portion 735 is disposed. For example, a 9-6$^{th}$ pad portion 736 may be further disposed at a side facing the side on which the 9-5$^{th}$ pad portion 735 is disposed. For example, the 9-6$^{th}$ pad portion 736 may be further disposed at another side of the twelfth partition 1732. The 9-6$^{th}$ pad portion 736 may be disposed toward the ninth vibration device 500BL. The 9-6$^{th}$ pad portion 736 may be configured as one element, but embodiments of the present disclosure are not limited thereto. For example, the 9-6$^{th}$ pad portion 736 may be configured as two or more elements. The 9-5$^{th}$ pad portion 735 and the 9-6$^{th}$ pad portion 736 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 9-1$^{st}$ to 9-6$^{th}$ pad portions 731 to 736 may be disposed at the ninth region (9). For example, the 9-1$^{st}$ to 9-6$^{th}$ pad portions 731 to 736 may be disposed at the ninth region (9) and may be disposed toward the ninth vibration device 500BL. Because the 9-5$^{th}$ pad portion 735 and the 9-6$^{th}$ pad portion 736 are further provided, a reduction in a sound wave caused by a standing wave may more decrease, and a sound output characteristic of a vibration device may be more enhanced.

A 10-5$^{th}$ pad portion 835 may be further disposed at one or more sides of the thirteenth partition 1733. The 10-5$^{th}$ pad portion 835 may be disposed toward the tenth vibration device 500BR. The 10-5$^{th}$ pad portion 835 may be configured as one element, but embodiments of the present disclosure are not limited thereto. For example, the 10-5$^{th}$ pad portion 835 may be configured as two or more elements. One or more pad portions may be disposed at a side facing a side on which the 10-5$^{th}$ pad portion 835 is disposed. For example, a 10-6$^{th}$ pad portion 836 may be further disposed at a side facing the side on which the 10-5$^{th}$ pad portion 835 is disposed. For example, the 10-6$^{th}$ pad portion 836 may be further disposed at another side of the twelfth partition 1732. The 10-6$^{th}$ pad portion 836 may be disposed toward the tenth vibration device 500BR. The 10-6$^{th}$ pad portion 836 may be configured as one element, but embodiments of the present disclosure are not limited thereto. For example, the 10-6$^{th}$ pad portion 836 may be configured as two or more elements. The 10-5$^{th}$ pad portion 835 and the 10-6$^{th}$ pad portion 836 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 10-1$^{st}$ to 10-6$^{th}$ pad portions 831 to 836 may be disposed at the tenth region (10). For example, the 10-1$^{st}$ to 10-6$^{th}$ pad portions 831 to 836 may be disposed at the tenth region (10) and may be disposed toward the tenth vibration device 500BR. Because the 10-5$^{th}$ pad portion 835 and the 10-6$^{th}$ pad portion 836 are further provided, a reduction in a sound wave caused by a standing wave may more decrease, and a sound output characteristic of a vibration device may be more enhanced.

An 11-5$^{th}$ pad portion 935 may be further disposed at one or more sides of the thirteenth partition 1733. The 11-5$^{th}$ pad portion 935 may be disposed toward the eleventh vibration device 500BC. The 11-5$^{th}$ pad portion 935 may be configured as one element, but embodiments of the present disclosure are not limited thereto. For example, the 11-5$^{th}$ pad portion 935 may be configured as two or more elements. One or more pad portions may be disposed at a side facing a side on which the 11-5$^{th}$ pad portion 935 is disposed. For example, an 11-6$^{th}$ pad portion 936 may be further disposed at a side facing the side on which the 11-5$^{th}$ pad portion 935 is disposed. For example, the 11-6$^{th}$ pad portion 936 may be further disposed at another side of the twelfth partition 1732. The 11-6$^{th}$ pad portion 936 may be disposed toward the eleventh vibration device 500BC. The 11-6$^{th}$ pad portion 936 may be configured as one element, but embodiments of the present disclosure are not limited thereto. For example, the 11-6$^{th}$ pad portion 936 may be configured as two or more elements. The 11-5$^{th}$ pad portion 935 and the 11-6$^{th}$ pad portion 936 may include one or more among a double-sided tape, a double-sided foam tape, a double-sided pad, a double-sided foam pad, a single-sided tape, a single-sided foam tape, a single-sided pad, a single-sided foam pad, an adhesive, and a bond, but embodiments of the present disclosure are not limited thereto. For example, the 11-1$^{st}$ to 11-6$^{th}$ pad portions 931 to 936 may be disposed at the eleventh region (11). For example, the 11-1$^{st}$ to 11-6$^{th}$ pad portions 931 to 936 may be disposed at the eleventh region (11) and may be disposed toward the eleventh vibration device 500BC. Because the 11-5$^{th}$ pad portion 935 and the 11-6$^{th}$ pad portion 936 are further provided, a reduction in a sound wave caused by a standing wave may more decrease, and a sound output characteristic of a vibration device may be more enhanced.

Figure 13C:
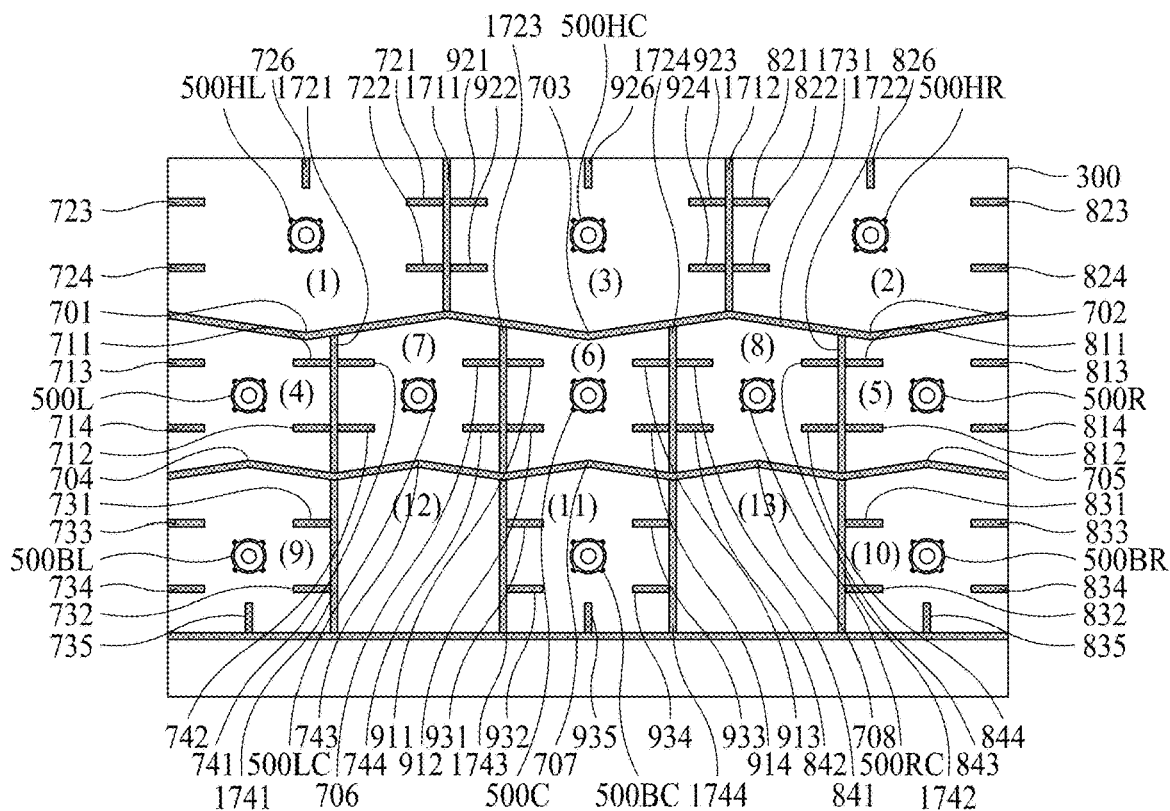

With reference to FIG. 13C, one or more bent portions may be further provided at one or more sides of a partition. The bent portion may be disposed to decrease a reduction in a sound wave caused by a standing wave which occurs due to interference of a reflected wave and a progressive wave. The bent portion may be disposed at one or more sides, to which a strongest sound wave is transferred, of four sides of the partition and may be configured toward a vibration device. The other elements may be the same as or similar to the elements described above with reference to FIGS. 13A and 13B, and thus, their repetitive descriptions may be omitted or will be briefly given.

One or more bent portions may be further provided at one or more sides of an eleventh partition 1731 toward one or more vibration device. For example, a first bent portion 701 may be provided at one or more sides of the eleventh partition 1731 toward a fourth vibration device 500L. A second bent portion 702 may be provided at one or more sides of the eleventh partition 1731 toward a fifth vibration device 500R. A third bent portion 703 may be provided at one or more sides of the eleventh partition 1731 toward a sixth vibration device 500C.

One or more bent portions may be further provided at one or more sides of a twelfth partition 1732 toward one or more vibration device. For example, the twelfth partition 1732 may include a fourth bent portion 704 disposed toward the fourth vibration device 500L. The twelfth partition 1732 may include a fifth bent portion 705 disposed toward the fifth vibration device 500R. The twelfth partition 1732 may include a sixth bent portion 707 disposed toward the sixth vibration device 500C. The twelfth partition 1732 may include a seventh bent portion 706 disposed toward a seventh vibration device 500LC. The twelfth partition 1732 may include an eighth bent portion 708 disposed toward an eighth vibration device 500RC.

Figure 13D:
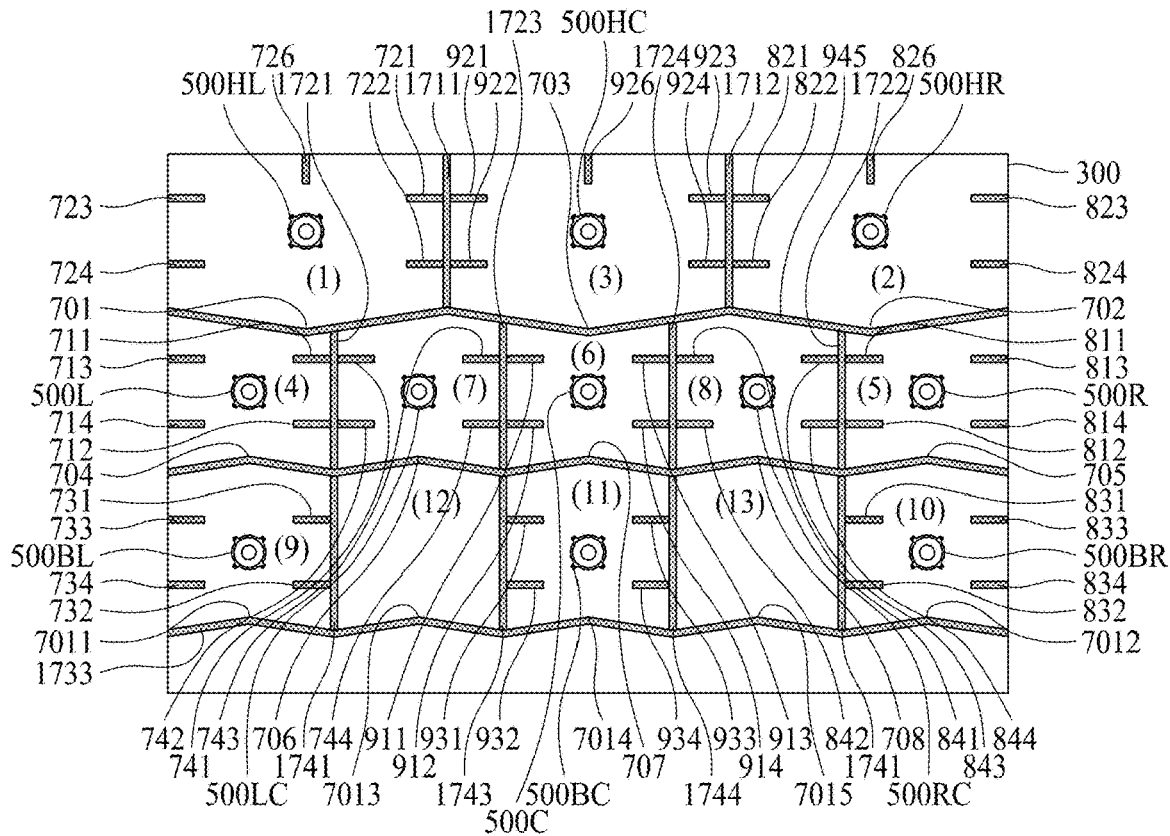
Figure 13E:
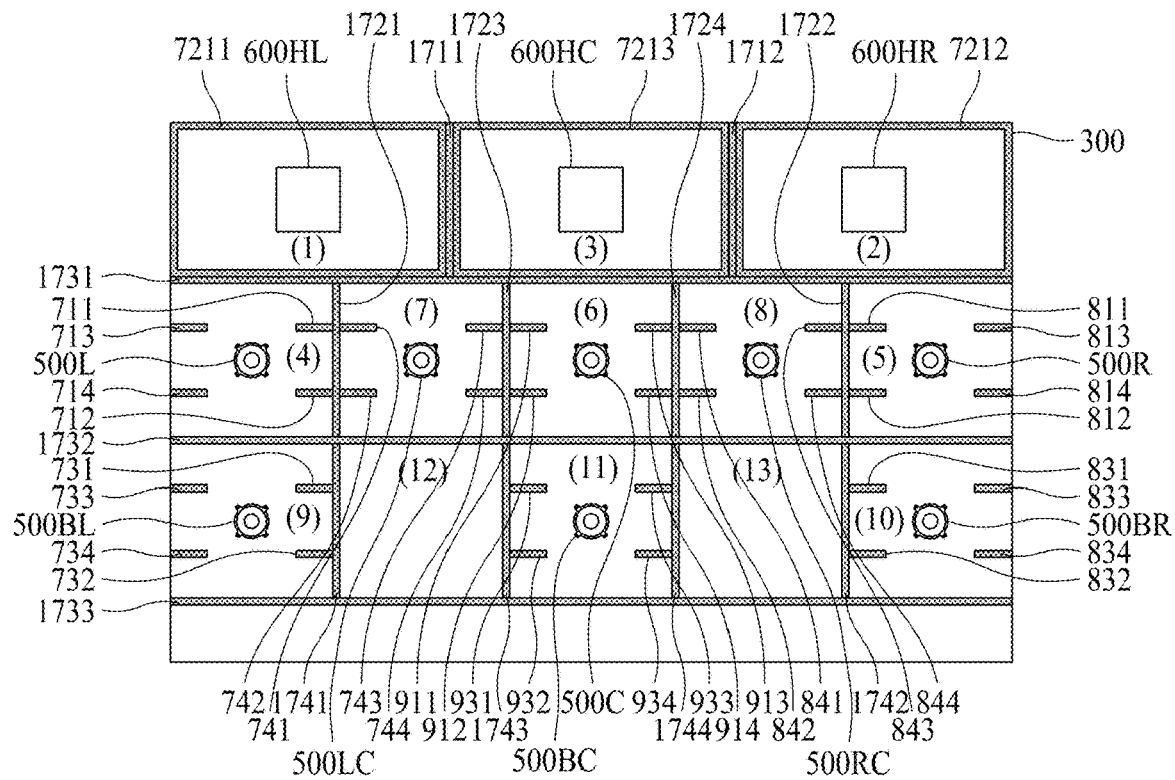
Figure 13F:
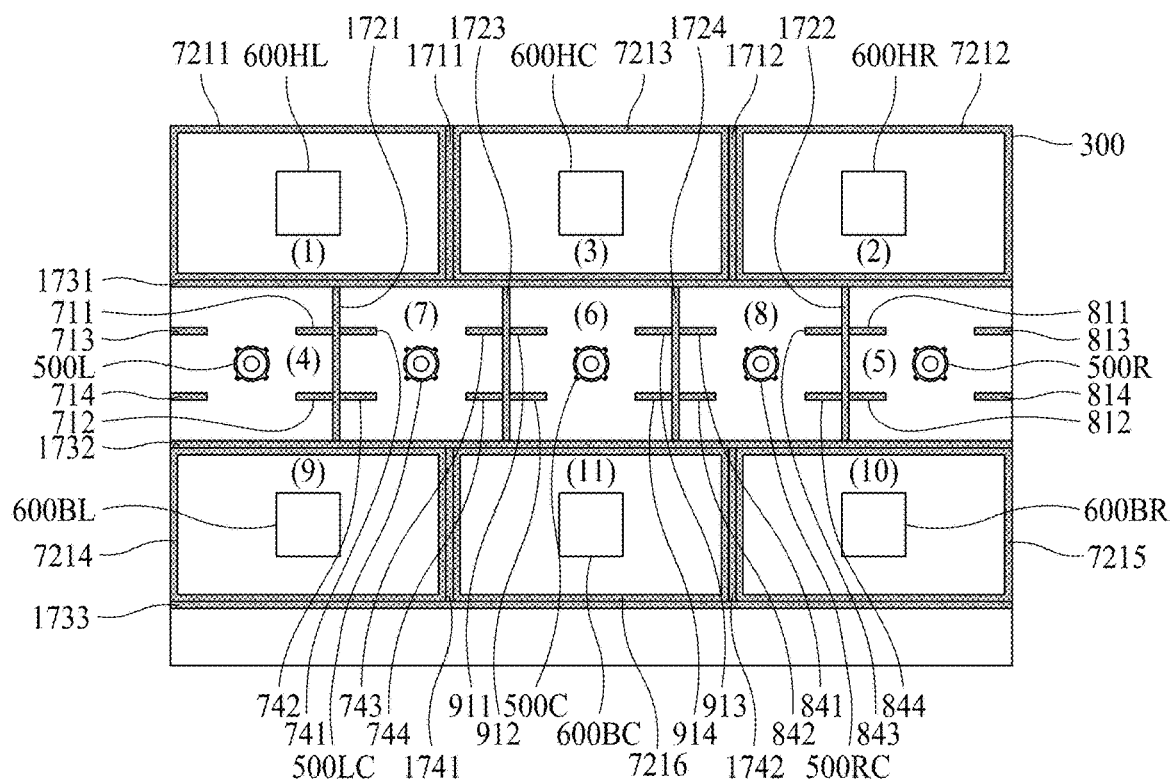

With reference to FIG. 13D, one or more of eleventh to thirteenth partitions 1731 to 1733 may include a bent portion. One or more bent portions disposed at the eleventh partition 1731 and the twelfth partition 1732 are as described above with reference to FIG. 13C, and thus, their repetitive descriptions may be omitted. One or more bent portions may be provided at one or more sides of the thirteenth partition 1733. For example, the thirteenth partition 1733 may include a ninth bent portion 7011 disposed toward a ninth vibration device 500BL. The thirteenth partition 1733 may include a tenth bent portion 7012 disposed toward a tenth vibration device 500BR. The thirteenth partition 1733 may include an eleventh bent portion 7014 disposed toward an eleventh vibration device 500BC. A twelfth bent portion 7013 may be provided in a twelfth region (12). A thirteenth bent portion 7015 may be provided at a thirteenth region (13).

A bent portion may have an open structure at a center portion of a vibration device. However, embodiments of the present disclosure are not limited thereto, and the bent portion may have a V-shaped closed structure at the center portion of the vibration device. When the bent portion has the open structure at the center portion of the vibration device, the material cost may be reduced compared to the closed structure. According to a sound characteristic experiment, when the bent portion has the open structure at the center portion of the vibration device and a case where the bent portion has the closed structure at the center portion of the vibration device, the inventors have confirmed that a sound characteristic difference is very small or there is no sound characteristic difference. Accordingly, because one or more bent portions are provided in one or more among the eleventh to thirteenth partitions 1731 to 1733, a reduction in a sound wave caused by a standing wave of the vibration device may decrease.

With reference to FIGS. 13A to 13D, a fourteenth partition 1750 described above with reference to FIGS. 6B, 6D, 7B, and 7D may be applied. When the fourteenth partition 1750 is applied, the pad portion described above with reference to FIGS. 13A to 13D may be provided at one or more sides of the fourteenth partition 1750. This will be described with reference to FIG. 13A, and the description of FIG. 13A may be applied to FIGS. 13B to 13D. For example, a 1-$3^{rd}$ pad portion 723 and a 1-$4^{th}$ pad portion 724 may be disposed at one or more sides of the fourteenth partition 1750. The 1-$3^{rd}$ pad portion 723 and the 1-$4^{th}$ pad portion 724 may be disposed toward a first vibration device 500HL. For example, a 2-$3^{rd}$ pad portion 823 and a 2-$4^{th}$ pad portion 824 may be disposed at one or more sides of the fourteenth partition 1750. The 2-$3^{rd}$ pad portion 823 and the 2-$4^{th}$ pad portion 824 may be disposed toward a second vibration device 500HR. For example, a 4-$3^{rd}$ pad portion 713 and a 4-$4^{th}$ pad portion 714 may be disposed at one or more sides of the fourteenth partition 1750. The 4-$3^{rd}$ pad portion 713 and the 4-$4^{th}$ pad portion 714 may be disposed toward a fourth vibration device 500L. For example, a 5-$3^{rd}$ pad portion 813 and a 5-$4^{th}$ pad portion 814 may be disposed at one or more sides of the fourteenth partition 1750. The 5-$3^{rd}$ pad portion 813 and the 5-$4^{th}$ pad portion 814 may be disposed toward a fifth vibration device 500R. For example, a 9-$3^{rd}$ pad portion 733 and a 9-$4^{th}$ pad portion 734 may be disposed at one or more sides of the fourteenth partition 1750. The 9-$3^{rd}$ pad portion 733 and the 9-$4^{th}$ pad portion 734 may be disposed toward a ninth vibration device 500BL. For example, a 10-$3^{rd}$ pad portion 833 and a 10-$4^{th}$ pad portion 834 may be disposed at one or more sides of the fourteenth partition 1750. The 10-$3^{rd}$ pad portion 833 and the 10-$4^{th}$ pad portion 834 may be disposed toward a tenth vibration device 500BR.

With reference to FIGS. 13E and 13F, a fifteenth partition 7211 may be further provided near a first vibration device 600HL. The fifteenth partition 7211 may be configured to be smaller than or equal to a size of a first partition 1711 and/or an eleventh partition 1731. For example, the fifteenth partition 7211 may be disposed to surround the first vibration device 600HL. The fifteenth partition 7211 may surround the first vibration device 600HL along with the first partition 1711 and/or the eleventh partition 1731, and thus, a vibration space of the first vibration device 600HL may be secured, thereby increasing a sound pressure level characteristic. Also, the fifteenth partition 7211 may prevent a sound or a sound pressure level from being leaked to the outside through a side surface between a display device 100 and a supporting member 300, and thus, a sound output characteristic of a display apparatus may be more enhanced. The fifteenth partition 7211 may have a tetragonal shape which surrounds the first vibration device 600HL. However, embodiments of the present disclosure are not limited thereto, and the fifteenth partition 7211 may have a shape or a perimeter shape which is the same as or different from a whole shape of the first vibration device 600HL. For example, when the first vibration device 600HL has a square shape, the fifteenth partition 7211 may have a square shape, a circular shape, or an oval shape which is relatively greater in size than the first vibration device 600HL. The fifteenth partition 7211 may limit (or define) a vibration region (or a vibration area) of the display device 100 (for example, a display panel 110) based on the first vibration device 600HL. For example, as a size of the fifteenth partition 7211 increases, a vibration region of a first region (1) may increase, and thus, a sound characteristic of a low-pitched sound band of a left sound may be enhanced.

A sixteenth partition 7212 may be further provided near a second vibration device 600HR. The sixteenth partition 7212 may be configured to be smaller than or equal to a size of the second partition 1712 and/or the eleventh partition 1731. For example, the sixteenth partition 7212 may be disposed to surround the second vibration device 600HR. The sixteenth partition 7212 may surround the second vibration device 600HR along with the second partition 1712 and/or the eleventh partition 1731, and thus, a vibration space of the second vibration device 600HR may be secured, thereby increasing a sound pressure level characteristic. Also, the sixteenth partition 7212 may prevent a sound or a sound pressure level from being leaked to the outside through the side surface between the display device 100 and the supporting member 300, and thus, a sound output characteristic of the display apparatus may be more enhanced. The sixteenth partition 7212 may have a tetragonal shape which surrounds the second vibration device 600HR. However, embodiments of the present disclosure are not limited thereto, and the sixteenth partition 7212 may have a shape or a perimeter shape which is the same as or different from a whole shape of the second vibration device 600HR. For example, when the second vibration device 600HR has a square shape, the sixteenth partition 7212 may have a square shape, a circular shape, or an oval shape which is relatively greater in size than the second vibration device 600HR. The sixteenth partition 7212 may limit (or define) a vibration region (or a vibration area) of the display device 100 (for example, the display panel 110) based on the second vibration device 600HR. For example, as a size of the sixteenth partition 7212 increases, a vibration region of a second region (2) may increase, and thus, a sound characteristic of a low-pitched sound band of a right sound may be enhanced.

A seventeenth partition 7213 may be further provided near a third vibration device 600HC. The seventeenth partition 7213 may be configured to be smaller than or equal to a size of the first partition 1711 and the second partition 1712 and/or the eleventh partition 1731. For example, the seventeenth partition 7213 may be disposed to surround the third vibration device 600HC. The seventeenth partition 7213 may surround the third vibration device 600HC along with the first partition 1711 and the second partition 1712 and/or the eleventh partition 1731, and thus, a vibration space of the third vibration device 600HC may be secured, thereby increasing a sound pressure level characteristic. Also, the seventeenth partition 7213 may prevent a sound or a sound pressure level from being leaked to the outside through the side surface between the display device 100 and the supporting member 300, and thus, a sound output characteristic of the display apparatus may be more enhanced. The seventeenth partition 7213 may have a tetragonal shape which surrounds the third vibration device 600HC. However, embodiments the present disclosure are not limited thereto, and the seventeenth partition 7213 may have a shape or a perimeter shape which is the same as or different from a whole shape of the third vibration device 600HC. For example, when the third vibration device 600HC has a square shape, the seventeenth partition 7213 may have a square shape, a circular shape, or an oval shape which is relatively greater in size than the third vibration device 600HC. The seventeenth partition 7213 may limit (or define) a vibration region (or a vibration area) of the display device 100 (for example, the display panel 110) based on the third vibration device 600HC. For example, as a size of the seventeenth partition 7213 increases, a vibration region of a third region (3) may increase, and thus, a sound characteristic of a low-pitched sound band of a center sound may be enhanced.

With reference to FIG. 13F, an eighteenth partition 7214 may be further provided near a ninth vibration device 600BL. The eighteenth partition 7214 may be configured to be smaller than or equal to a size of the seventh partition 1741 and/or the twelfth partition 1732 and/or the thirteenth partition 1733. For example, the eighteenth partition 7214 may be disposed to surround the ninth vibration device 600BL. The eighteenth partition 7214 may surround the ninth vibration device 600BL along with the seventh partition 1741 and/or the twelfth partition 1732 and/or the thirteenth partition 1733, a vibration space of the ninth vibration device 600BL may be secured, thereby increasing a sound pressure level characteristic. Also, the eighteenth partition 7214 may be prevent a sound or a sound pressure level from being leaked to the outside through a side surface between the display device 100 and the supporting member 300, and thus, a sound output characteristic of the display apparatus may be more enhanced. The eighteenth partition 7214 may have a tetragonal shape which surrounds the ninth vibration device 600BL. However, embodiments of the present disclosure are not limited thereto, and the eighteenth partition 7214 may have a shape or a perimeter shape which is the same as or different from a whole shape of the ninth vibration device 600BL. For example, when the ninth vibration device 600BL has a square shape, the eighteenth partition 7214 may have a square shape, a circular shape, or an oval shape which is relatively greater in size than the ninth vibration device 600BL. The eighteenth partition 7214 may limit (or define) a vibration region (or a vibration area) of the display device 100 (for example, the display panel 110) based on the ninth vibration device 600BL. For example, as a size of the eighteenth partition 7214 increases, a vibration region of the ninth region (9) may increase, and thus, a sound characteristic of a low-pitched sound band of a left sound may be enhanced.

A nineteenth partition 7215 may be further provided near a tenth vibration device 600BR. The nineteenth partition 7215 may be configured to be smaller than or equal to a size of the eighth partition 1742 and/or the twelfth partition 1732 and/or the thirteenth partition 1733. For example, the nineteenth partition 7215 may be disposed to surround the tenth vibration device 600BR. The nineteenth partition 7215 may surround the tenth vibration device 600BR along with the eighth partition 1742 and/or the twelfth partition 1732 and/or the thirteenth partition 1733, a vibration space of the tenth vibration device 600BR may be secured, thereby increasing a sound pressure level characteristic. Also, the nineteenth partition 7215 may prevent a sound or a sound pressure level from being leaked to the outside through the side surface between the display device 100 and the supporting member 300, and thus, a sound output characteristic of the display apparatus may be more enhanced. The nineteenth partition 7215 may have a tetragonal shape which surrounds the tenth vibration device 600BR. However, embodiments of the present disclosure are not limited thereto, and the nineteenth partition 7215 may have a shape or a perimeter shape which is the same as or different from a whole shape of the tenth vibration device 600BR. For example, when the tenth vibration device 600BR has a square shape, the nineteenth partition 7215 may have a square shape, a circular shape, or an oval shape which is relatively greater in size than the tenth vibration device 600BR. The nineteenth partition 7215 may limit (or define) a vibration region (or a vibration area) of the display device 100 (for example, the display panel 110) based on the tenth vibration device 600BR. For example, as a size of the nineteenth partition 7215 increases, a vibration region of a tenth region (10) may increase, and thus, a sound characteristic of a low-pitched sound band of a right sound may be enhanced.

A twentieth partition 7216 may be further provided near an eleventh vibration device 600BC. The twentieth partition 7216 may be configured to be smaller than or equal to a size of the seventh partition 1741 and the eighth partition 1742, and/or the twelfth partition 1732, and/or the thirteenth partition 1733. For example, the twentieth partition 7216 may be disposed to surround the eleventh vibration device 600BC. The twentieth partition 7216 may surround the eleventh vibration device 600BC along with the seventh partition 1741 and the eighth partition 1742, and/or the twelfth partition 1732, and/or the thirteenth partition 1733, a vibration space of the eleventh vibration device 600BC may be secured, thereby increasing a sound pressure level characteristic. Also, the twentieth partition 7216 may prevent a sound or a sound pressure level from being leaked to the outside through the side surface between the display device 100 and the supporting member 300, and thus, a sound output characteristic of the display apparatus may be more enhanced. The twentieth partition 7216 may have a tetragonal shape which surrounds the eleventh vibration device 600BC. However, embodiments of the present disclosure are not limited thereto, and the twentieth partition 7216 may have a shape or a perimeter shape which is the same as or different from a whole shape of the eleventh vibration device 600BC. For example, when the eleventh vibration device 600BC has a square shape, the twentieth partition 7216 may have a square shape, a circular shape, or an oval shape which is relatively greater in size than the eleventh vibration device 600BC. The twentieth partition 7216 may limit (or define) a vibration region (or a vibration area) of the display device 100 (for example, the display panel 110) based on the eleventh vibration device 600BC. For example, as a size of the twentieth partition 7216 increases, a vibration region of an eleventh region (11) may increase, and thus, a sound characteristic of a low-pitched sound band of a center sound may be enhanced.

The fifteenth to twentieth partitions 7211 to 7216 may include one or more among a double-sided tape, a double-sided foam tape, a double-sided foam pad, a single-sided tape, a single-sided foam tape, a single-sided foam pad, an adhesive, and a bond, but embodiments of the present disclosure are not limited thereto. When the fifteenth to twentieth partitions 7211 to 7216 is configured with a double-sided tape or a double-sided foam pad, an adhesive force may be enhanced in a process of attaching a rear surface of the display device 100 on an upper surface of the supporting member 300. For example, the fifteenth to twentieth partitions 7211 to 7216 may include a material having elasticity which enables a certain degree of compression. For example, at least one or more of the fifteenth to twentieth partitions 7211 to 7216 may include polyurethane, polyolefin, or polyethylene, but embodiments of the present disclosure are not limited thereto.

A description of a bent portion is the same as the descriptions of FIGS. 13A to 13D, and thus, is omitted. In FIGS. 13E and 13F, an example where a bent portion is not provided is illustrated, but embodiments of the present disclosure are not limited thereto. For example, the bent portion described above with reference to FIGS. 13C and 13D may be applied.

With reference to FIGS. 13E and 13F, the fourteenth partition 1750 described above with reference to FIGS. 6B, 6D, 7B, and 7D may be provided. When the fourteenth partition 1750 is applied, the pad portion described above with reference to FIGS. 13A to 13F may be provided at one or more sides of the fourteenth partition 1750. This will be described with reference to FIG. 13E, and the description of FIG. 13E may be applied to FIG. 13F. For example, a 4-$3^{rd}$ pad portion 713 and a 4-$4^{th}$ pad portion 714 may be disposed at one or more sides of the fourteenth partition 1750. The 4-$3^{rd}$ pad portion 713 and the 4-$4^{th}$ pad portion 714 may be disposed toward a fourth vibration device 500L. For example, a 5-$3^{rd}$ pad portion 813 and a 5-$4^{th}$ pad portion 814 may be disposed at one or more sides of the fourteenth partition 1750. The 5-$3^{rd}$ pad portion 813 and the 5-$4^{th}$ pad portion 814 may be disposed toward a fifth vibration device 500R.

To provide a sound in a display apparatus, a speaker may be implemented as a film type in a case which implements the speaker, and thus, a thickness of the display apparatus may be configured to be thin. A film type vibration device may be manufactured to have a large area, and thus, may be applied to a large-area display apparatus. However, the film type vibration device may be low in piezoelectric characteristic, and thus, due to a low vibration, there may be a problem where it is difficult to apply the film type vibration device to the large-area display apparatus. When the film type vibration device is implemented by applying ceramic so as to enhance a piezoelectric characteristic, there may be a problem where durability is weak and a size of ceramic is limited.

When a vibration device including a piezoelectric composite including piezoelectric ceramic is applied to a display apparatus, the piezoelectric composite may vibrate in a lateral direction with respect to a widthwise direction (for example, in a lateral direction with respect to a widthwise direction of the display apparatus), and thus, it may be unable to sufficiently vibrate the display apparatus in an upward-downward (or forward-rearward) direction, whereby it may be difficult to apply the vibration device to the display apparatus and it may be unable to output a desired sound in a forward direction of the display apparatus. When a film type piezoelectric element is applied to a display apparatus, there may be a problem where a sound pressure level characteristic is low compared to a speaker such as an exciter. When a stack type piezoelectric element, where a plurality of films including a film type piezoelectric element formed of a plurality of layers are stacked, is applied to a display apparatus so as to improve a sound pressure level, there may be a problem where power consumption increases and a thickness of the display apparatus is thickened. Also, when one vibration device is disposed on a rear surface of a display panel (for example, a mobile display apparatus), the inventors have recognized that a mono sound is output, but there is a problem where it is difficult to output a multi-channel sound.

Therefore, a vibration device may be further disposed at a periphery of a display panel or a display device so as to implement a multi-channel sound, but it may be difficult to place an exciter in a flexible display apparatus where a curved portion is provided at the display panel. Also, in a case where a speaker including piezoelectric ceramic is provided, there may be a problem where piezoelectric ceramic is easily broken. According to an embodiment of the present disclosure, a vibration device applicable to a display apparatus which realizes a sound characteristic of a multi-channel and includes the flexible display apparatus may be provided. This will be described below with reference to FIGS. 14 to 19.

Figure 14:
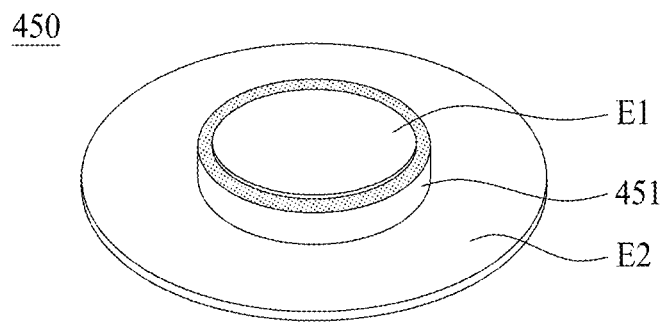
FIG. 14 illustrates a vibration device according to other embodiment of the present disclosure.

FIG. 14 illustrates a vibration device according to other embodiment of the present disclosure.

With reference to FIG. 14, the vibration device 450 according to an embodiment of the present disclosure may include a piezoelectric vibration portion 451, a first electrode portion E1, and a second electrode portion E2.

The piezoelectric vibration portion 451 may include a piezoelectric material (or an electroactive material) having a piezoelectric effect. For example, the piezoelectric material may have a characteristic where pressure or twisting (or bending) is applied to a crystalline structure by an external force, a potential difference occurs due to dielectric polarization caused by a relative position change of a positive (+) ion and a negative (−) ion, and a vibration is generated by an electric field based on a voltage applied thereto. The piezoelectric vibration portion 451 may be referred to as a vibration layer, a piezoelectric layer, a piezoelectric material layer, an electroactive layer, a vibration portion, a piezoelectric material portion, an electroactive portion, a piezoelectric structure, an inorganic material layer, or an inorganic material portion, but embodiments of the present disclosure are not limited thereto.

The piezoelectric vibration portion 451 may be formed of a transparent, semitransparent, or opaque piezoelectric material (or an electroactive material), and may be transparent, semitransparent, or opaque. The piezoelectric vibration portion 451 may be formed of a ceramic-based material for generating a relatively high vibration, or may be formed of piezoelectric ceramic having a perovskite-based crystalline structure. The perovskite crystalline structure may have a piezoelectric effect and an inverse piezoelectric effect and may be a plate-shaped structure having orientation. The perovskite crystalline structure may be represented by a chemical formula "$ABO_3$". Here, A may include a divalent metal element, and B may include a tetravalent metal element. For example, in the chemical formula "$ABO_3$", A and B may be cations, and O may be anions. For example, the perovskite crystalline structure may include at least one or more of $PbTiO_3$, $PbZrO_3$, $PbZrTiO_3$, $BaTiO_3$, and $SrTiO_3$, but embodiments of the present disclosure are not limited thereto.

The piezoelectric vibration portion 451 according to an embodiment of the present disclosure may include a lead zirconate titanate (PZT)-based material including lead (Pb), zirconium (Zr), and titanium (Ti) or may include a lead zirconate nickel niobate (PZNN)-based material including lead (Pb), zirconium (Zr), nickel (Ni), and niobium (Nb), but embodiments of the present disclosure are not limited thereto. Also, the piezoelectric vibration portion 451 may include at least one or more of $CaTiO_3$, $BaTiO_3$, and $SrTiO_3$ without Pb, but embodiments of the present disclosure are not limited thereto.

The piezoelectric vibration portion 451 according to an embodiment of the present disclosure may be configured in a circular shape, an ellipse shape, or a polygonal shape, but embodiments of the present disclosure are not limited thereto.

The first electrode portion E1 may be disposed at a first surface (or a top surface or an upper surface or a front surface) of the piezoelectric vibration portion 451, and electrically connected to the first surface of the piezoelectric vibration portion 451. For example, the first electrode portion E1 may have a single-body electrode type which is disposed at a whole first surface of the piezoelectric vibration portion 451. For example, the first electrode portion may have the same shape as the piezoelectric vibration portion 451, but embodiments of the present disclosure are not limited thereto. The first electrode portion E1 according to an embodiment of the present disclosure may be formed of a transparent conductive material, a semitransparent conductive material, or an opaque conductive material. For example, examples of the transparent conductive material or the semitransparent conductive material may include indium tin oxide (ITO) or indium zinc oxide (IZO), but embodiments of the present disclosure are not limited thereto. Examples of the opaque conductive material may include aluminum (Al), copper (Cu), gold (Au), silver (Ag), molybdenum (Mo), and Mg or an alloy thereof, but embodiments of the present disclosure are not limited thereto.

The second electrode portion E2 may be disposed at a second surface (or a bottom surface or a lower surface or a rear surface), which is opposite to the first surface, of the piezoelectric vibration portion 451, and electrically connected to the second surface of the piezoelectric vibration portion 451. For example, the second electrode portion E2 may have a single-body electrode type which is disposed at a whole second surface of the piezoelectric vibration portion 451. For example, the second electrode portion E2 may have a larger size than that of the piezoelectric vibration portion 451, and may have the same shape as the piezoelectric vibration portion 451, but embodiments of the present disclosure are not limited thereto. The second electrode portion E2 according to an embodiment of the present disclosure may be formed of a transparent conductive material, a semitransparent conductive material, or an opaque conductive material. For example, the second electrode portion E2 may be formed of the same material as the first electrode portion E1, but embodiments of the present disclosure are not limited thereto. In another example, the second electrode portion E2 may be formed of a different material than the first electrode portion E1.

The piezoelectric vibration portion 451 may be polarized (or poling) by a certain voltage applied to the first electrode portion E1 and the second electrode portion E2 in a certain temperature atmosphere, or a temperature atmosphere that may be changed from a high temperature to a room temperature. Embodiments of the present disclosure are not limited to these examples. The piezoelectric vibration portion 451 may vibrate by alternately and/or repeatedly contract and expand based on a piezoelectric effect (or a piezoelectric characteristic) according to a sound signal (or a voice signal) applied to the first electrode portion E1 and the second electrode portion E2 from the outside.

The vibration device 450 according to an embodiment of the present disclosure may further include a first protection member and a second protection member.

The first protection member may be disposed at the first electrode portion E1 and protect the first electrode portion E1. For example, the first protection member may be formed of a plastic material, a fiber material, or wood material, but embodiments of the present disclosure are not limited thereto.

The second protection member may be disposed at the second electrode portion E2 and protect the second electrode portion E2. For example, the second protection member may be formed of a plastic material, a fiber material, or wood material, but embodiments of the present disclosure are not limited thereto. For example, the first protection member may be formed of the same or different material as the second protection member. Any one of the first protection member and the second protection member may be attached to or coupled to the display panel via an adhesive member.

Figure 15:
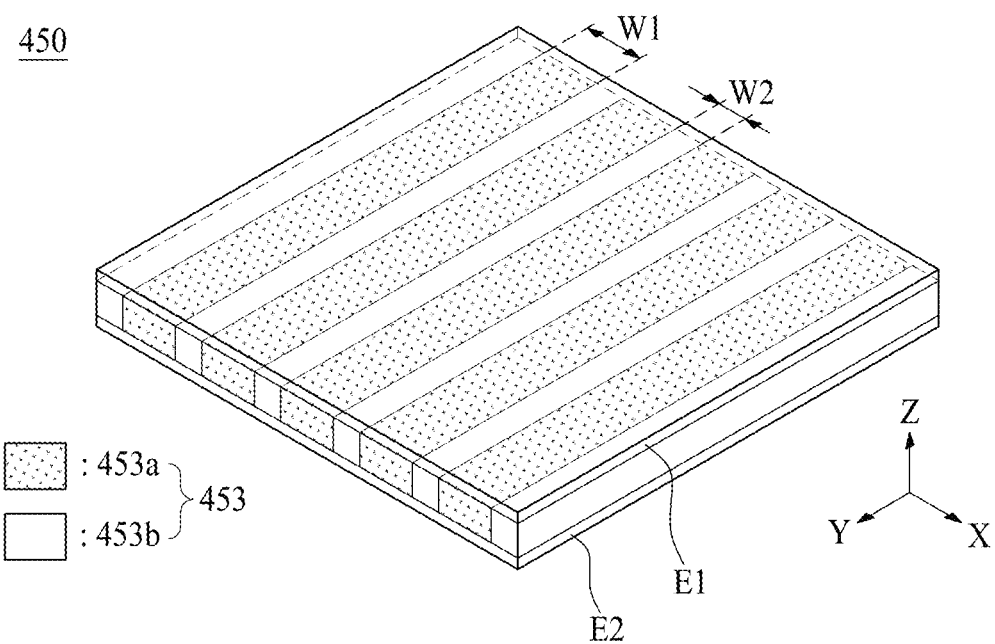
FIG. 15 illustrates a vibration device according to other embodiment of the present disclosure.

FIG. 15 illustrates a vibration device according to other embodiment of the present disclosure.

With reference to FIG. 15, the vibration device 450 according to other embodiment of the present disclosure may be referred to as a flexible sound generator, a flexible actuator, a flexible speaker, a flexible piezoelectric speaker, a film actuator, a film piezoelectric composite actuator, a film speaker, a film piezoelectric speaker, or film piezoelectric composite speaker, but embodiments of the present disclosure are not limited thereto.

The vibration device 450 according to an embodiment of the present disclosure may include a piezoelectric vibration portion 453, a first electrode portion E1, and a second electrode portion E2.

The piezoelectric vibration portion 453 may include a piezoelectric material, a composite piezoelectric material, or an electroactive material, and each of the piezoelectric material, the composite piezoelectric material and the electroactive material may have a piezoelectric effect. The piezoelectric vibration portion 453 may be referred to as a vibration layer, a piezoelectric layer, a piezoelectric material layer, an electroactive layer, a vibration portion, a piezoelectric material portion, an electroactive portion, a piezoelectric structure, a piezoelectric composite layer, a piezoelectric composite, or a piezoelectric ceramic composite, but embodiments of the present disclosure are not limited thereto. The piezoelectric vibration portion 453 may be formed of a transparent, semitransparent, or opaque piezoelectric material, and may be transparent, semitransparent, or opaque.

The piezoelectric vibration portion 453 according to an embodiment of the present disclosure may include a plurality of first portions 453a and a plurality of second portions 453b. For example, the plurality of first portions 453a and the plurality of second portions 453b may be alternately and repeatedly arranged in a first direction X (or a second direction Y). For example, the first direction X may be a widthwise direction or a first horizontal direction of the piezoelectric vibration portion 453. The second direction Y may be a lengthwise direction or a second horizontal direction of the piezoelectric vibration portion 453. An embodiment of the present disclosure is not limited thereto, and the first direction X may be the lengthwise direction or the second horizontal direction of the piezoelectric vibration portion 453, and the second direction Y may be the widthwise direction or the first horizontal direction of the piezoelectric vibration portion 453.

Each of the plurality of first portions 453a may be configured as an inorganic material portion. The inorganic material portion may include the above-described piezoelectric material. For example, each of the plurality of first portions 453a may include a piezoelectric material which is be substantially the same as the piezoelectric vibration portion 453 described above with reference to FIG. 14, and thus, their repetitive descriptions may be omitted.

Each of the plurality of first portions 453a according to an embodiment of the present disclosure may be disposed between the plurality of second portions 453b. For example, the plurality of first portions 453a may have a first width W1 parallel to the first direction X (or the second direction Y) and a length parallel to the second direction Y (or the first direction X). Each of the plurality of second portions 453b may have a second width W2 parallel to the first direction X (or the second direction Y) and may have a length parallel to the second direction Y (or the first direction X). The first width W1 may be the same as or different from the second width W2. For example, the first width W1 may be greater than the second width W2. For example, the first portion 453a and the second portion 453b may include a line shape or a stripe shape which has the same size or different sizes. Therefore, the piezoelectric vibration portion 453 may include a 2-2 composite structure and thus may have a resonance frequency of 20 kHz or less, but embodiments of the present disclosure are not limited thereto and a resonance frequency of the piezoelectric vibration portion 453 may vary based on one or more of a shape, a length, and a thickness.

In the piezoelectric vibration portion 453, each of the plurality of first portions 453a and the plurality of second portions 453b may be disposed (or arranged) at the same plane (or the same layer) in parallel. Each of the plurality of second portions 453b may be connected or attached to a second portion 453b adjacent thereto. For example, each of the plurality of second portions 453b may be configured to fill a gap between two adjacent first portions of the plurality of first portions 453a and may be connected or attached to a second portion 453b adjacent thereto. The piezoelectric vibration portion 453 may extend by a desired size or length based on the side coupling (or connection) of the first portion 453a and the second portion 453b.

In the piezoelectric vibration portion 453, a width (or a size) W2 of each of the plurality of second portions 453b may progressively decrease in a direction from a center portion to both peripheries (or both ends) of the piezoelectric vibration portion 453 or the vibration device 450.

According to an embodiment of the present disclosure, a second portion 453b, having a largest width W2 among the plurality of second portions 453b, may be located at a portion at which a highest stress may concentrate when the piezoelectric vibration portion 453 or the vibration device 450 is vibrating in a vertical direction Z (or a thickness direction). A second portion 453b, having a smallest width W2 among the plurality of second portions 453b, may be located at a portion where a relatively low stress may occur when the piezoelectric vibration portion 453 or the vibration device 450 is vibrating in the vertical direction Z.

For example, the second portion 453b, having the largest width W2 among the plurality of second portions 453b, may be disposed at the center portion of the piezoelectric vibration portion 453, and the second portion 453b, having the smallest width W2 among the plurality of second portions 453b may be disposed at each of the both edges or peripheries of the piezoelectric vibration portion 453. Therefore, when the piezoelectric vibration portion 453 or the vibration device 450 is vibrating in the vertical direction Z, interference of a sound wave or overlapping of a resonance frequency, each occurring in the portion on which the highest stress concentrates, may be reduced or minimized. Thus, dipping phenomenon of a sound pressure level occurring in the low-pitched sound band may be reduced, thereby improving flatness of a sound characteristic in the low-pitched sound band. For example, flatness of a sound characteristic may be a level of a deviation between a highest sound pressure and a lowest sound pressure.

In the piezoelectric vibration portion 453, each of the plurality of first portions 453a may have different sizes (or widths). For example, a size (or a width) of each of the plurality of first portions 453a may progressively decrease or increase in a direction from the center portion to the both peripheries (or both ends) of the piezoelectric vibration portion 453 or the vibration device 450. For example, in the piezoelectric vibration portion 453, a sound pressure level characteristic of a sound may be enhanced and a sound reproduction band may increase, based on various natural vibration frequencies according to a vibration of each of the plurality of first portions 453a having different sizes.

The plurality of second portions 453b may be disposed between the plurality of first portions 453a. Therefore, in the piezoelectric vibration portion 453 or the vibration device 450, vibration energy by a link in a unit lattice of each first portion 453a may increase by a corresponding second portion 453b. Thus, a vibration may increase, and a piezoelectric characteristic and flexibility may be secured. For example, the second portion 453b may include at least one or more of an epoxy-based polymer, an acryl-based polymer, and a silicone-based polymer, but embodiments of the present disclosure are not limited thereto.

The plurality of second portions 453b according to an embodiment of the present disclosure may be configured as an organic material portion. For example, the organic material portion may be disposed between the inorganic material portions and may absorb an impact applied to the inorganic material portion (or the first portion), may release a stress concentrating on the inorganic material portion to enhance the total durability of the piezoelectric vibration portion 453 or the vibration device 450, and may provide flexibility to the piezoelectric vibration portion 453 or the vibration device 450.

The plurality of second portions 453b according to an embodiment of the present disclosure may have modulus and viscoelasticity that are lower than those of each first portion 453a, and thus, the second portion 453b may enhance the reliability of each first portion 453a vulnerable to an impact due to a fragile characteristic. For example, the second portion 453b may include a material having a loss coefficient of about 0.01 to about 1.0 and modulus of about 0.1 [GPa] to about 10 [GPa].

The organic material portion included in the second portion 453b may include one or more of an organic material, an organic polymer, an organic piezoelectric material, and an organic non-piezoelectric material that has a flexible characteristic in comparison with the inorganic material portion of the first portions 453a. For example, the second portion 453b may be referred to as an adhesive portion, an elastic portion, a bending portion, a damping portion, or a flexible portion each having flexibility, but embodiments of the present disclosure are not limited thereto.

The plurality of first portions 453a and the second portion 453b may be disposed on (or connected to) the same plane, and thus, the piezoelectric vibration portion 453 of the vibration array 210 according to various embodiments of the present disclosure may have a single thin film-type. For example, the piezoelectric vibration portion 453 may have a structure in which a plurality of first portions 453a is connected to one side of the piezoelectric vibration portion 453. For example, the plurality of first portions 453a may have a structure connected to a whole the piezoelectric vibration portion 453. For example, the piezoelectric vibration portion 453 may have a structure in which a plurality of first portions 453a extends to one side of the piezoelectric vibration portion 453. For example, the plurality of first portions 453a may have a structure extended to a whole the piezoelectric vibration portion 453. For example, the piezoelectric vibration portion 453 may be vibrated in a vertical direction (or a thickness direction) by the first portion 453a having a vibration characteristic and may be bent in a curved shape by the second portion 453b having flexibility. Also, in the piezoelectric vibration portion 453 according to various embodiments of the present disclosure, a size of the first portion 453a and a size of the second portion 453b may be adjusted based on a piezoelectric characteristic and flexibility needed for the piezoelectric vibration portion 453 or the vibration device 450. For example, when the piezoelectric vibration portion 453 needs a piezoelectric characteristic rather than flexibility, a size of the first portion 453a may be adjusted to be greater than that of the second portion 453b. As another example, when the piezoelectric vibration portion 453 needs flexibility rather than a piezoelectric characteristic, a size of the second portion 453b may be adjusted to be greater than that of the first portion 453a. For example, the size of the second portion 453b and the size of the first portion 453a may be one or more of a width, a length, and a thickness. Accordingly, a size of the piezoelectric vibration portion 453 may be adjusted based on a characteristic needed therefor, and thus, the piezoelectric vibration portion 453 may be easy to design.

The first electrode portion E1 may be disposed at a first surface (or an upper surface) of the piezoelectric vibration portion 453. The first electrode portion E1 may be disposed at or coupled to a first surface of each of a plurality of first portions 453a and a first surface of each of a plurality of second portions 453b in common and may be electrically connected to the first surface of each of the plurality of first portions 453a. For example, the first electrode portion E1 may be a single-body electrode type which is disposed at a whole first surface of the piezoelectric vibration portion 453. For example, the first electrode portion E1 may have the same shape as that of the piezoelectric vibration portion 453, but embodiments of the present disclosure are not limited thereto. The first electrode portion E1 according to an embodiment of the present disclosure, as described above with reference to FIG. 14, may include a transparent conductive material, a semitransparent conductive material, or an opaque conductive material.

The second electrode portion E2 may be disposed at a second surface (or a rear surface) opposite to the first surface of the piezoelectric vibration portion 453. The second electrode portion E2 may be disposed at or coupled to a second surface of each of a plurality of first portions 453a and the second surface of each of a plurality of second portions 453b in common and may be electrically connected to a second surface of each of the plurality of first portions 453a. For example, the second electrode portion E2 may be a single-body electrode type which is disposed on a whole second surface of the piezoelectric vibration portion 453. For example, the second electrode portion E2 may have the same shape as that of the piezoelectric vibration portion 453, but embodiments of the present disclosure are not limited thereto. The second electrode portion E2 according to an embodiment of the present disclosure, as described above with reference to FIG. 14, may include a transparent conductive material, a semitransparent conductive material, or an opaque conductive material.

The piezoelectric vibration portion 453 may be polarized (or poling) by a certain voltage applied to the first electrode portion E1 and the second electrode portion E2 in a certain temperature atmosphere, or a temperature atmosphere that may be changed from a high temperature to a room temperature, but embodiments of the present disclosure are not limited thereto. For example, the piezoelectric vibration portion 453 may alternately and repeatedly contract and expand based on an inverse piezoelectric effect according to a sound signal (or voice signal) applied to the first electrode portion E1 and the second electrode portion E2 from the outside to vibrate.

For example, the piezoelectric vibration portion 453 may vibrate based on a vertical-direction (or a thickness direction Z) vibration d33 and a horizontal-direction (or a planar direction) vibration d31 by the first electrode portion E1 and the second electrode portion E2. The piezoelectric vibration portion 453 may increase the displacement of the display device by contraction and expansion in the horizontal-direction, thereby further improving the vibration.

According to an embodiment of the present disclosure, the vibration device 450 may include a plurality of inorganic material portion having a piezoelectric characteristic and an organic material portion between the plurality of inorganic material portion. For example, the vibration device 450 may include a plurality of inorganic material portion having a piezoelectric characteristic and an organic material portion connected between the plurality of inorganic material portion.

According to an embodiment of the present disclosure, any one of the first electrode portion E1 and the second electrode portion E2 may be attached or coupled to the display device by an adhesive member.

The vibration device 450 according to an embodiment of the present disclosure may further include a first protection member and a second protection member.

The first protection member may be disposed on the first electrode portion E1 and may protect the first electrode portion E1. For example, the first protection member may include a plastic material, a fiber material, or a wood material.

The second protection member may be disposed on the second electrode portion E2 and may protect the second electrode portion E2. For example, the second protection member may include a plastic material, a fiber material, or a wood material. For example, the first protection member may include a material which is the same as or different from that of the second protection member. Any one of the first protection member and the second protection member may be attached or coupled to the display device by an adhesive member.

Figure 16:
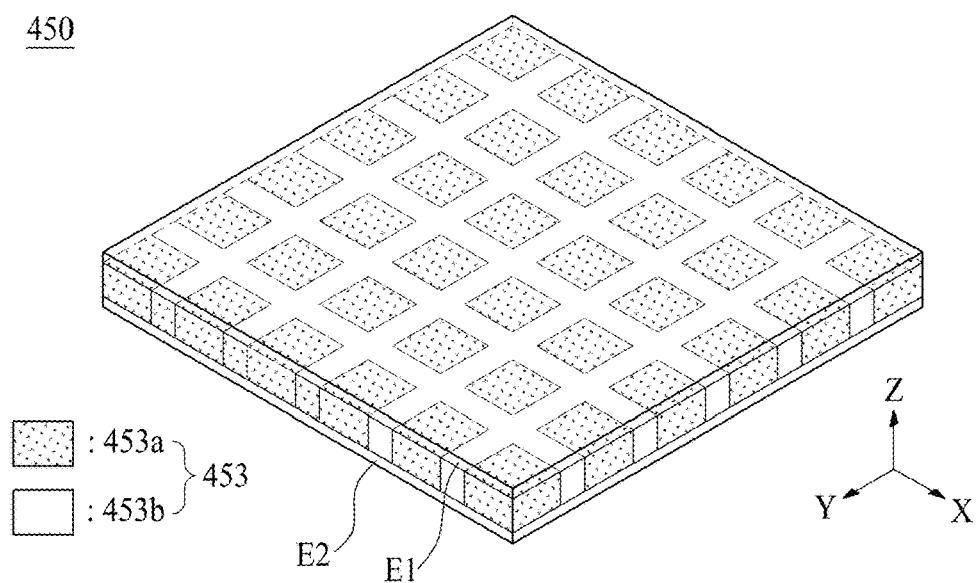
FIG. 16 illustrates a vibration device according to other embodiment of the present disclosure.

FIG. 16 illustrates a vibration device according to other embodiment of the present disclosure. FIG. 16 illustrates an embodiment where the piezoelectric vibration portion illustrated in FIG. 14 is modified. Hereinafter, therefore, repetitive descriptions of elements other than the piezoelectric vibration portion may be omitted or will be briefly given.

With reference to FIG. 16, in the vibration device 450 according to another embodiment of the present disclosure, the piezoelectric vibration portion 453 according to an embodiment of the present disclosure may include a plurality of first portions 453a, which are spaced apart from one another along a first direction X and a second direction Y, and a second portion 453b disposed between the plurality of first portions 453a.

Each of the plurality of first portions 453a may be disposed to be spaced apart from one another along each of the first direction X and the second direction Y. For example, each of the plurality of first portions 453a may have a hexahedral shape (or a six-sided object shape) having the same size and may be disposed in a lattice shape. For example, each of the plurality of first portions 453a may include a piezoelectric material which is be substantially the same as the first portion 453a described above with reference to FIG. 15, and thus, like reference numerals refer to like elements and their repetitive descriptions may be omitted.

The second portion 453b may be disposed between the plurality of first portions 453a along each of the first direction X and the second direction Y. The second portion 453b may be configured to fill a gap or a space between two adjacent first portions 453a or to surround each of the plurality of first portions 453a, and thus, may be connected or attached to an adjacent first portion 453a. According to an embodiment of the present disclosure, a width of a second portion 453b disposed between two first portions 453a adjacent to each other along the first direction X may be the same as or different from that of the first portion 453a, and a width of a second portion 453b disposed between two first portions 453a adjacent to each other along the second direction Y may be the same as or different from that of the first portion 453a. For example, the second portion 453b may include an organic material which is be substantially the same as the second portion 453b described above with reference to FIG. 15, and thus, like reference numerals refer to like elements and their repetitive descriptions may be omitted.

Therefore, the piezoelectric vibration portion 453 of the vibration device 450 may include a 1-3 composite structure and thus may have a resonance frequency of 30 MHz or less, but embodiments of the present disclosure are not limited thereto and a resonance frequency of the piezoelectric vibration portion 453 may vary based on one or more of a shape, a length, and a thickness.

Figure 17:
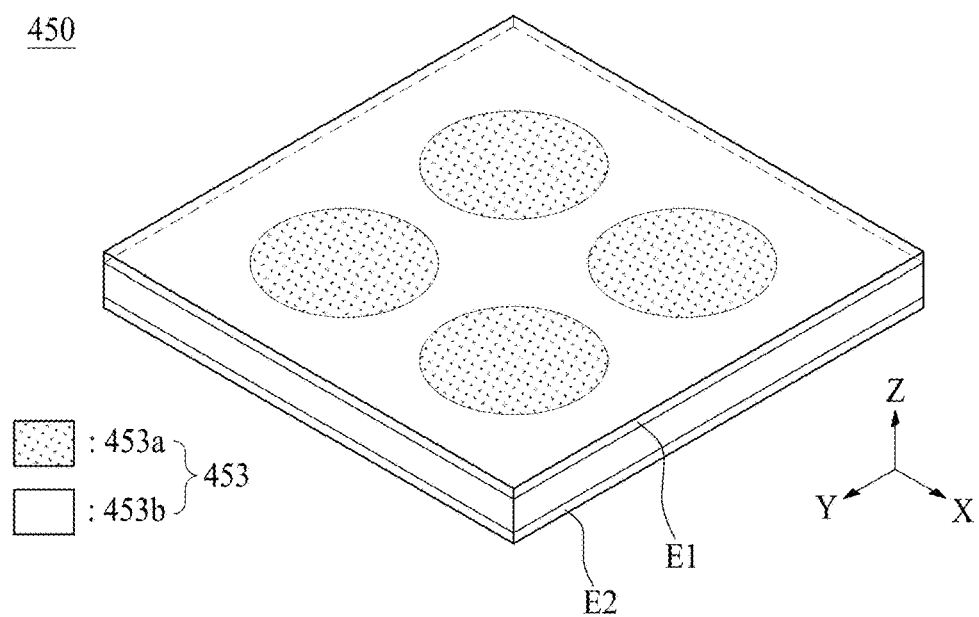
FIG. 17 illustrates a vibration device according to other embodiment of the present disclosure.

FIG. 17 illustrates a vibration device according to other embodiment of the present disclosure and illustrates an embodiment where the piezoelectric vibration portion illustrated in FIG. 14 is modified. Hereinafter, therefore, repetitive descriptions of elements other than the piezoelectric vibration portion may be omitted or will be briefly given.

With reference to FIG. 17, in the vibration device 450 according to another embodiment of the present disclosure, the piezoelectric vibration portion 453 according to an embodiment of the present disclosure may include a plurality of first portions 453a, which are spaced apart from one another along a first direction X and a second direction Y, and a second portion 453b disposed between the plurality of first portions 453a.

Each of the plurality of first portions 453a according to another embodiment of the present disclosure may have a flat structure of a circular shape. For example, each of the plurality of first portions 453a may have a circular plate shape, but embodiments of the present disclosure are not limited thereto. For example, each of the plurality of first portions 453a may have a dot shape including an oval shape, a polygonal shape, or a donut shape.

The second portion 453b may be disposed between the plurality of first portions 453a along each of the first direction X and the second direction Y. The second portion 453b may be configured to surround each of the plurality of first portions 453a, and thus, may be connected to or attached on a side surface of each of the plurality of first portions 453a. The plurality of first portions 453a and the second portion 453b may be disposed (or arranged) in parallel on the same plane (or the same layer).

In the piezoelectric vibration portion 453 of the vibration device 450 according to another embodiment of the present disclosure, each of the plurality of first portions 453a may have a flat structure of a triangular shape instead of a flat structure of a circular shape. For example, each of the plurality of first portions 453a may have a triangular plate shape.

According to an embodiment of the present disclosure, four adjacent first portions 453a among the plurality of first portions 453a may be adjacent to one another to form a tetragonal or quadrilateral shape (or a square shape). Vertices of the four adjacent first portions 453a forming a tetragonal shape may be adjacent to one another in a center portion (or a central portion) of the tetragonal shape.

According to another embodiment of the present disclosure, six adjacent first portions 453a among the plurality of first portions 453a may be adjacent to one another to form a hexagonal shape (or a regularly hexagonal shape). Vertices of the six adjacent first portions 453a forming a hexagonal shape may be adjacent to one another in a center portion (or a central portion) of the hexagonal shape.

Figure 18:
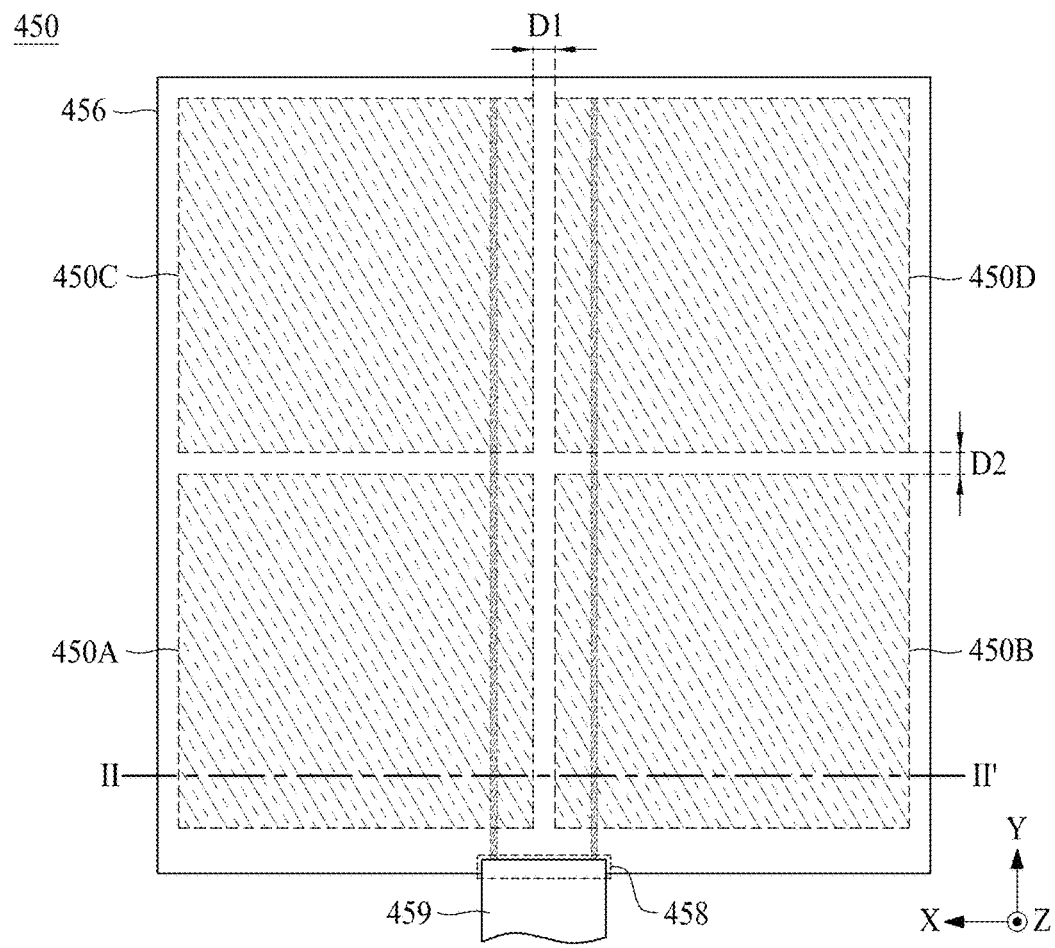
FIG. 18 illustrates a vibration device according to other embodiment of the present disclosure.
Figure 19:
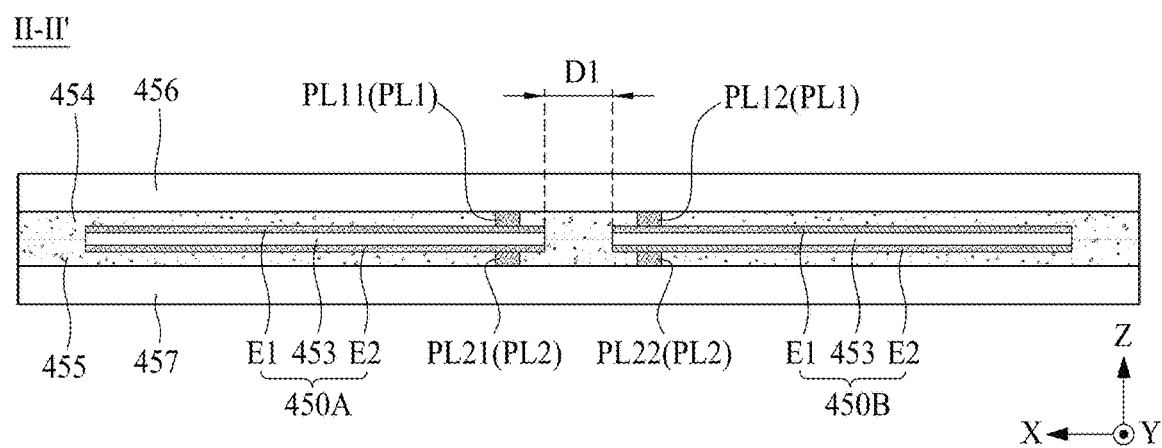
FIG. 19 is a cross-sectional view taken along line II-II' illustrated in FIG. 18.

FIG. 18 illustrates a vibration device according to other embodiment of the present disclosure, FIG. 19 is a cross-sectional view taken along line II-II' illustrated in FIG. 18.

With reference to FIGS. 18 and 19, a vibration device 450 according to other embodiment of the present disclosure may include at least one or more vibration generator 350A to 350D or a plurality of vibration devices 350A to 350D. FIGS. 18 and 19 illustrate an example including four vibration generators, and the vibration device 450 according to the embodiment of the present disclosure may be configured with two or more vibration generator.

The plurality of vibration generators 450A to 450D may be electrically separated and disposed while being spaced apart from each other along each of a first direction X and a second direction Y.

Each of the plurality of vibration generators 450A to 450D may alternately and/or repeatedly contract and expand based on a piezoelectric effect to vibrate. For example, each of the plurality of vibration generators 450A to 450D may be arranged or tiled at a certain interval (or distance) along each of the first direction X and the second direction Y. For example, the vibration device 450 in which the plurality of vibration generators 450A to 450D are arranged or tiled may be referred to as a sound generator, a vibration array, a vibration array portion, a vibration generating array portion, a vibration array structure, a tiling vibration array, a tiling vibration array module, or a tiling vibration film, but embodiments of the present disclosure are not limited thereto.

Each of the plurality of vibration generators 450A to 450D according to an embodiment of the present disclosure may have a tetragonal shape. For example, each of the plurality of vibration generators 450A to 450D according to an embodiment of the present disclosure may have a tetragonal shape having a width of about 5 cm or more, but embodiments of the present disclosure are not limited thereto. For example, each of the plurality of vibration generators 450A to 450D may have a square shape having a size of 5 cm×5 cm or more, but embodiments of the present disclosure are not limited thereto.

Each of the plurality of vibration generators 450A to 450D may be arranged or tiled at a certain interval (or distance), and thus, may be implemented as one vibration generator (or a single vibration generator) which is driven as one complete single-body without being independently driven.

According to an embodiment of the present disclosure, with respect to the first direction X, a first separation distance (or first distance or first interval) D1 between the plurality of vibration generators 450A to 450D may be 0.1 mm or more and smaller than 3 cm, but embodiments of the present disclosure are not limited thereto. Also, with respect to the second direction Y, a second separation distance (or second distance or second interval) D2 between the plurality of vibration generators 450A to 450D may be 0.1 mm or more and less than 3 cm, but embodiments of the present disclosure are not limited thereto. For example, the first separation distance D1 may be the same as the second separation distance D2 within a process error range.

According to an embodiment of the present disclosure, each of the plurality of vibration generators 450A to 450D may be arranged or tiled to have the separation distances (or intervals) D1 and D2 of 0.1 mm or more and less than 3 cm, and thus, may be driven as one vibration generator, thereby increasing a reproduction band and a sound pressure level characteristic of a sound which is generated based on a single-body vibration of the plurality of vibration generators 450A to 450D. For example, the plurality of vibration generators 450A to 450D may be arranged at an interval of 0.1 mm or more and less than 5 mm, in order to increase a reproduction band of a sound generated based on a single-body vibration of the plurality of vibration generators 450A to 450D and to increase a sound of a low-pitched sound band (for example, a sound pressure level characteristic in 500 Hz or less).

According to an embodiment of the present disclosure, when the plurality of vibration generators 450A to 450D are arranged at the intervals D1 and D2 of less than 0.1 mm or without the intervals D1 and D2, the reliability of the vibration generators 450A to 450D or the vibration device 450 may be reduced due to damage or a crack caused by a physical contact therebetween which occurs when each of the vibration generators 450A to 450D vibrates.

According to an embodiment of the present disclosure, when the plurality of vibration generators 450A to 450D are arranged at the intervals D1 and D2 of 3 cm or more, the plurality of vibration generators 450A to 450D may not be driven as one vibration generator due to an independent vibration of each of the plurality of vibration generators 450A to 450D. Therefore, a reproduction band and a sound pressure level characteristic of a sound which is generated based on vibrations of the plurality of vibration generators 450A to 450D may be reduced. For example, when the plurality of vibration generators 450A to 450D are arranged at the intervals D1 and D2 of 3 cm or more, a sound characteristic and a sound pressure level characteristic of the low-pitched sound band (for example, in 500 Hz or less) may each be reduced.

According to an embodiment of the present disclosure, when the plurality of vibration generators 450A to 450D are arranged at an interval of 5 mm, each of the plurality of vibration generators 450A to 450D may not be perfectly driven as one vibration generator, and thus, a sound characteristic and a sound pressure level characteristic of the low-pitched sound band (for example, in 200 Hz or less) may each be reduced.

According to another embodiment of the present disclosure, when the plurality of vibration generators 450A to 450D are arranged at an interval of 1 mm, each of the plurality of vibration generators 450A to 450D may be driven as one vibration generator, and thus, a reproduction band of a sound may increase and a sound of the low-pitched sound band (for example, a sound pressure level characteristic in 500 Hz or less) may increase. For example, when the plurality of vibration generators 450A to 450D are arranged at an interval of 1 mm, the vibration device 450 may be implemented as a large-area vibrator which is enlarged based on optimization of a separation distance between the plurality of vibration generators 450A to 450D. Therefore, the vibration device 450 may be driven as a large-area vibrator based on a single-body vibration of the plurality of vibration generators 450A to 450D, and thus, a sound characteristic and a sound pressure level characteristic may each increase in the low-pitched sound band and a reproduction band of a sound generated based on a large-area vibration of the vibration device 450.

Therefore, to implement a single-body vibration (or one vibration generator) of the plurality of vibration generators 450A to 450D, a separation distance between the plurality of vibration generators 450A to 450D may be adjusted to 0.1 mm or more and less than 3 cm. Also, to implement a single-body vibration (or one vibration generator) of the plurality of vibration generators 450A to 450D and to increase a sound pressure level characteristic of a sound of the low-pitched sound band, the separation distance between the plurality of vibration generators 450A to 450D may be adjusted to 0.1 mm or more and less than 5 mm.

The vibration device 450 according to an embodiment of the present disclosure may include first to fourth vibration generators 450A to 450D which are electrically disconnected (or separated) and/or structurally separated from one another and are disposed spaced apart from one another along each of the first direction X and the second direction Y. For example, the first to fourth vibration generators 450A to 450D may be arranged or tiled in 2×2 form.

According to an embodiment of the present disclosure, the first and second vibration generators 450A and 450B may be spaced apart from each other along the first direction X. The third and fourth vibration generators 450C and 450D may be spaced apart from each other in the first direction X and may be spaced apart from each of the first and second vibration generators 450A and 450B along the second direction Y. The first and third vibration generators 450A and 450C may be spaced apart from each other along the second direction Y to face each other. The second and fourth vibration generators 450B and 450D may be spaced apart from each other along the second direction Y to face each other.

Each of the first to fourth vibration generators 450A to 450D according to an embodiment of the present disclosure may include a piezoelectric vibration portion 453, a first electrode portion E1, and a second electrode portion E2.

The piezoelectric vibration portion 453 may include a ceramic-based material capable of realizing a relatively high vibration. For example, the piezoelectric vibration portion 453 may include a 1-3 composite structure having a piezoelectric characteristic of a 1-3 vibration mode or a 2-2 composite structure having a piezoelectric characteristic of a 2-2 vibration mode. For example, the piezoelectric vibration portion 453 may include the first portions 453a and the second portion 453b similar to the piezoelectric vibration portion 453 described above with reference to FIGS. 14 to 17, and thus, like reference numerals refer to like elements and their repetitive descriptions may be omitted.

The first electrode portion E1 may be disposed at a first surface of the piezoelectric vibration portion 453 and may be electrically connected to the first surface of the piezoelectric vibration portion 453. For example, the first electrode portion E1 may be substantially the same as the first electrode portion E1 described above with reference to FIGS. 14 to 17, and thus, like reference numerals refer to like elements and their repetitive descriptions may be omitted.

The second electrode portion E2 may be disposed at a second surface of the piezoelectric vibration portion 453, and may be electrically connected to the second surface of the piezoelectric vibration portion 453. For example, the second electrode portion E2 may be substantially the same as the second electrode portion E2 described above with reference to FIGS. 14 to 17, and thus, like reference numerals refer to like elements and their repetitive descriptions may be omitted.

The piezoelectric vibration portion 453 according to an embodiment of the present disclosure, as described above with reference to FIG. 14, may be formed of a transparent, semitransparent, or opaque piezoelectric and may be transparent, semitransparent, or opaque.

The vibration device 450 according to another embodiment of the present disclosure may further include a first protection member 456 and a second protection member 457.

The first protection member 456 may be disposed on the first surface of the vibration device 450. For example, the first protection member 456 may cover the first electrode portion E1 disposed on a first surface of each of the plurality of vibration generators 450A to 450D. Thus, the first protection member 456 may be connected to the first surface of each of the plurality of vibration generators 450A to 450D in common or may support the first surface of each of the plurality of vibration generators 450A to 450D in common. Accordingly, the first protection member 456 may protect the first surface of each of the plurality of vibration generators 450A to 450D or the first electrode portion E1.

According to an embodiment of the present disclosure, a first adhesive layer 454 may be disposed between the first protection member 456 and each of the plurality of vibration generators 450A to 450D. For example, the first protection member 456 may be disposed at the first surface of each of the plurality of vibration generators 450A to 450D by the first adhesive layer 454. For example, the first protection member 456 may be directly disposed at the first surface of each of the plurality of vibration generators 450A to 450D by a film laminating process using the first adhesive layer 454. Accordingly, the plurality of vibration generators 450A to 450D may be integrated (or disposed) or tiled with the first protection member 456 to have the certain intervals D1 and D2.

The second protection member 457 may be disposed on the second surface of the vibration device 450. For example, the second protection member 457 may cover the second electrode portion E2 disposed on a second surface of each of the plurality of vibration generators 450A to 450D. Thus, the second protection member 457 may be connected to the second surface of each of the plurality of vibration generators 450A to 450D in common or may support the second surface of each of the plurality of vibration generators 450A to 450D in common. Accordingly, the second protection member 457 may protect the second surface of each of the plurality of vibration generators 450A to 450D or the second electrode portion E2.

According to an embodiment of the present disclosure, a second adhesive layer 455 may be disposed between the second protection member 457 and each of the plurality of vibration generators 450A to 450D. For example, the second protection member 457 may be disposed at the second surface of each of the plurality of vibration generators 450A to 450D by the second adhesive layer 455. For example, the second protection member 457 may be directly disposed at the second surface of each of the plurality of vibration generators 450A to 450D by a film laminating process by the second adhesive layer 455. Accordingly, the plurality of vibration generators 450A to 450D may be integrated (or disposed) or tiled with the second protection member 457 to have the certain intervals D1 and D2.

Each of the first protection member 456 and the second protection member 457 according to an embodiment of the present disclosure may include a plastic material, a fiber material, or a wood material. Any one of the first protection member 456 and the second protection member 457 may be attached or coupled to the display device by an adhesive member.

The first adhesive layer 454 may be disposed at the first surface of each of the plurality of vibration generators 450A to 450D, and between the plurality of vibration generators 450A to 450D. For example, the first adhesive layer 454 may be formed at a rear surface (or an inner surface) of the first protection member 456 facing the first surface of the vibration device 450, disposed at the first surface of each of the plurality of vibration generators 450A to 450D, and filled between the plurality of vibration generators 450A to 450D.

The second adhesive layer 455 may be disposed at the second surface of each of the plurality of vibration generators 450A to 450D, and between the plurality of vibration generators 450A to 450D. For example, the second adhesive layer 455 may be formed at a front surface (or an inner surface) of the second protection member 457 facing the second surface of the vibration device 450, disposed at the second surface of each of the plurality of vibration generators 450A to 450D, and filled between the plurality of vibration generators 450A to 450D.

The first and second adhesive layers 454 and 455 may be connected or coupled to each other between the plurality of vibration generators 450A to 450D. Therefore, each of the plurality of vibration generators 450A to 450D may be surrounded by the first and second adhesive layers 454 and 455. For example, the first and second adhesive layers 454 and 455 may entirely surround the whole plurality of vibration generators 450A to 450D. For example, the plurality of vibration generators 450A to 450D may be embedded between the first and second adhesive layers 454 and 455.

For example, the first and second adhesive layers 454 and 455 may be referred to as a cover member, but embodiments of the present disclosure are not limited thereto. When each of the first and second adhesive layers 454 and 455 is a cover member, the first protection member 456 may be disposed at a first surface of the cover member, and the second protection member 457 may be disposed at a second surface of the cover member.

Each of the first and second adhesive layers 454 and 455 according to an embodiment of the present disclosure may include an electric insulating material which has adhesiveness and is capable of compression and decompression. For example, each of the first and second adhesive layers 454 and 455 may include an epoxy resin, an acryl resin, a silicone resin, or a urethane resin, but embodiments of the present disclosure are not limited thereto. For example, each of the first and second adhesive layers 454 and 455 may be configured to be transparent, semitransparent, or opaque according to the location of the vehicle where the vibration device 450 is disposed.

The vibration device 450 according to another embodiment of the present disclosure may further include a first power supply line PL1 disposed at the first protection member 456, a second power supply line PL2 disposed at the second protection member 457, and a pad part 458 electrically connected to the first power supply line PL1 and the second power supply line PL2.

The first power supply line PL1 may be disposed at a rear surface of the first protection member 456 facing the first surface of the vibration device 450. The first power supply line PL1 may be electrically connected to the first electrode portion E1 of each of the plurality of vibration generators 450A to 450D. For example, the first power supply line PL1 may be directly and electrically connected to the first electrode portion E1 of each of the plurality of vibration generators 450A to 450D. For example, the first power supply line PL1 may be electrically connected to the first electrode portion E1 of each of the plurality of vibration generators 450A to 450D by an anisotropic conductive film. As another example of the present disclosure, the first power supply line PL1 may be electrically connected to the first electrode portion E1 of each of the plurality of vibration generators 450A to 450D by a conductive material (or particle) included in the first adhesive layer 454.

The first power supply line PL1 according to an embodiment of the present disclosure may include first and second upper power lines PL11 and PL12 disposed along a second direction Y. For example, the first upper power line PL11 may be electrically connected to the first electrode portion E1 of each of the first and third vibration generators 450A and 450C (or a first module group or a first group) arranged at a first column parallel to the second direction Y among the plurality of vibration generators 450A to 450D. The second upper power line PL12 may be electrically connected to the first electrode portion E1 of each of the second and fourth vibration generators 450B and 450D (or a second module group or a second group) arranged at a second column parallel to the second direction Y among the plurality of vibration generators 450A to 450D.

The second power supply line PL2 may be disposed at a front surface of the second protection member 457 facing the second surface of the vibration device 450. The second power supply line PL2 may be electrically connected to the second electrode portion E2 of each of the plurality of vibration generators 450A to 450D. For example, the second power supply line PL2 may be directly and electrically connected to the second electrode portion E2 of each of the plurality of vibration generators 450A to 450D. For example, the second power supply line PL2 may be electrically connected to the second electrode portion E2 of each of the plurality of vibration generators 450A to 450D by an anisotropic conductive film. As another example, the second power supply line PL2 may be electrically connected to the second electrode portion E2 of each of the plurality of vibration generators 450A to 450D by a conductive material (or particle) included in the second adhesive layer 455.

The second power supply line PL2 according to an embodiment of the present disclosure may include first and second lower power lines PL21 and PL22 disposed along a second direction Y. For example, the first lower power line PL21 may be electrically connected to the second electrode portion E2 of each of the first and third vibration generators 450A and 450C (or a first module group or a first group) arranged at the first column parallel to the second direction Y among the plurality of vibration generators 450A to 450D. The second lower power line PL22 may be electrically connected to the second electrode portion E2 of each of the second and fourth vibration generators 450B and 450D (or a second module group or a second group) arranged at the second column parallel to the second direction Y among the plurality of vibration generators 450A to 450D.

The pad part 458 may be disposed at the vibration device 450 so as to be electrically connected to one portion (or one end or one side) of at least one or more among the first power supply line PL1 and the second power supply line PL2. The pad part 458 according to an embodiment of the present disclosure may include a first pad electrode electrically connected to one portion of the first power supply line PL1 and a second pad electrode electrically connected to one portion of the second power supply line PL2.

The first pad electrode may be connected to one portion of each of the first and second upper power lines PL11 and PL12 of the first power supply line PL1. For example, the one portion of each of the first and second upper power lines PL11 and PL12 may branch from the first pad electrode.

The second pad electrode may be connected to one portion of each of the first and second lower power lines PL21 and PL22 of the second power supply line PL2. For example, the one portion of each of the first and second lower power lines PL21 and PL22 may branch from the second pad electrode.

According to an embodiment of the present disclosure, each of the first power supply line PL1, the second power supply line PL2, and the pad part 358 may be configured to be a transparent conductive material, a semitransparent conductive material, or an opaque conductive material so as to be transparent, translucent, or opaque.

The vibration device 450 according to another embodiment of the present disclosure may further include a flexible cable 459.

The flexible cable 459 may be electrically connected to the pad part 458 disposed at the vibration device 450 and may supply the vibration device 450 with one or more vibration driving signals (or a sound signal) provided from a sound processing circuit. The flexible cable 459 according to an embodiment of the present disclosure may include a first terminal electrically connected to the first pad electrode of the pad part 458 and a second terminal electrically connected to the second pad electrode of the pad part 458. For example, the flexible cable 459 may be a flexible printed circuit cable or a flexible flat cable, but embodiments of the present disclosure are not limited thereto.

The sound processing circuit may generate an alternating current (AC) vibration driving signal including a first vibration driving signal and a second vibration driving signal based on a sound source. The first vibration driving signal may be one of a positive (+) vibration driving signal and a negative (−) vibration driving signal, and the second vibration driving signal may be one of a positive (+) vibration driving signal and a negative (−) vibration driving signal. For example, the first vibration driving signal may be supplied to the first electrode portion E1 of each of the plurality of vibration generators 450A to 450D through a first terminal of the flexible cable 459, the first pad electrode of the pad part 458, and the first power supply line PL1. The second vibration driving signal may be supplied to the second electrode portion E2 of each of the plurality of vibration generators 450A to 450D through a second terminal of the flexible cable 459, the second pad electrode of the pad part 458, and the second power supply line PL2.

Therefore, the vibration device 450 according to an embodiment of the present disclosure may include the plurality of vibration generators 450A to 450D which are arranged (or tiled) at a certain interval D1 and D2 so as to be implemented as a single vibrator without being independently driven, and thus, may be driven as a large-area vibrator based on a single-body vibration of the plurality of vibration generators 450A to 450D. Accordingly, a large area of display device may vibrate or vibrate by itself in a large-area, thereby increasing or enhancing a sound characteristic and a sound pressure level characteristic in the low-pitched sound band and a reproduction band of a sound output from the display device.

Figure 20:
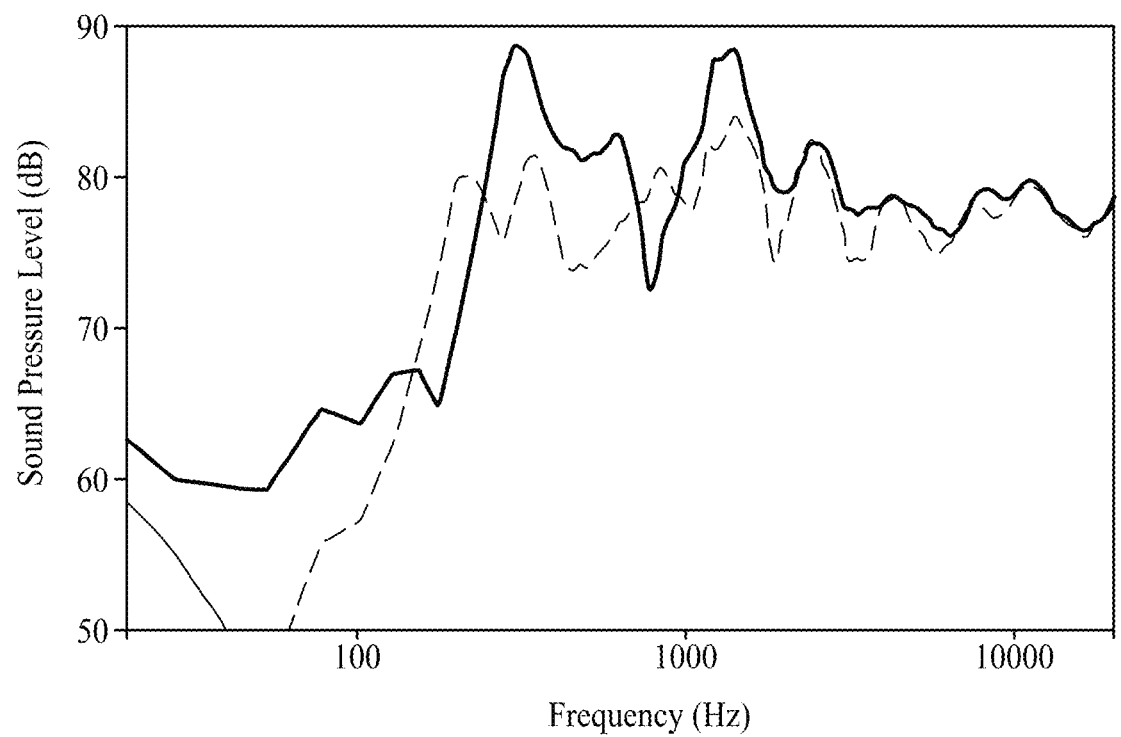
FIG. 20 is a diagram showing a sound output characteristic according to an embodiment of the present disclosure.

FIG. 20 is a diagram showing a sound output characteristic according to an embodiment of the present disclosure.

FIG. 20 shows the sound output characteristic of FIG. 10A, a dotted line represents a sound output characteristic when a size of a partition is 250 mm×250 mm, and a solid line represents a sound output characteristic when a size of a partition is 300 mm×300 mm. In FIG. 20, the abscissa axis represents a frequency (Hz), and the ordinate axis represents a sound pressure level (SPL) (dB). A sound output characteristic may be measured by BnK equipment which is a sound analysis apparatus. The sound analysis apparatus may include a sound card which transmits or receives a sound to or from a control personal computer (PC), an amplifier which amplifies a signal generated from the sound card and transfers the amplified signal to a vibration device, and a microphone which collects a sound generated by the vibration device in a display panel. The sound collected through the microphone may be input to the control PC through the sound card, and a control program may check the input sound to analyze the sounds of the vibration device.

With reference to FIG. 20, in a case where partitions having different sizes are applied, it may be seen that a sound pressure level is enhanced in a total frequency range. For example, in the dotted line, it may be seen that a sound pressure level in 180 Hz or more increases more than the solid line. For example, in the dotted line, it may be seen that a sound pressure level in 180 Hz or more increases by about 10 dB more than the solid line. Partitions near a vibration device may be configured to have different sizes, and thus, a sound band of a total frequency may be output by compensating for a sound band. Accordingly, according to an embodiment of the present disclosure, partitions near a vibration device may be configured to have different sizes, thereby providing a display apparatus including a vibration device for outputting a sound band of 180 Hz or more and/or a sound band of a full range.

A vibration device according to an embodiment of the present disclosure may be applied to a vibration device disposed at a display apparatus. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, electronic organizers, electronic books, portable multimedia players (PMPs), personal digital assistants (PDAs), MP3 players, mobile medical apparatuses, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, home appliances, etc. Also, the vibration device according to the present disclosure may be applied to organic light emitting lighting apparatuses or inorganic light emitting lighting apparatuses. When the vibration device of the present disclosure is applied to lighting apparatuses, the vibration device may act as lighting and a speaker. Also, when the display apparatus of the present disclosure is applied to a mobile device, the vibration device may act as one or more of a speaker, a receiver, and a haptic, but embodiments of the present disclosure are not limited thereto.

A display apparatus according to an embodiment of the present disclosure will be described below.

A display apparatus according to an embodiment of the present disclosure may include a display device including a display panel configured to display an image and include first to eleventh regions, at least one first to third vibration devices at each of the first to third regions, at least one fourth to eighth vibration devices at each of the fourth to eighth regions, at least one ninth to eleventh vibration devices at each of the ninth to eleventh regions; a first partition between the first region and the third region, a second partition between the second region and the third region, a third partition between the fourth region and the seventh region, a fourth partition between the fourth region and the eighth region, a fifth partition between the sixth region and the seventh region, and a sixth partition between the sixth region and the eighth region. A length of one or more among the first partition and the second partition may differ from a length of one or more among the third to sixth partitions. A length of one or more among the first partition and the second partition at one side of any of the at least one first to third vibration devices may differ from a length of one or more among the third to sixth partitions at one side of any of the at least one fourth to eighth vibration devices.

According to some embodiments of the present disclosure, a size of one or more among the first to third regions may differ from that of one or more among the fourth to eighth regions.

According to some embodiments of the present disclosure, the first to third vibration devices and the ninth to eleventh vibration devices may be configured to output a sound band of 300 Hz or more, and the fourth to eighth vibration devices may be configured to output a sound band of a full range.

According to some embodiments of the present disclosure, a length of one or more among the first partition and the second partition may be greater than a length of one or more among the third to sixth partitions. According to some embodiments of the present disclosure, a length of one or more among the first partition and the second partition at one side of any of the at least one first to third vibration devices may be greater than a length of one or more among the third to sixth partitions at one side of any of the at least one fourth to eighth vibration devices.

According to some embodiments of the present disclosure, the at least one first to third vibration devices may be the same vibration devices.

According to some embodiments of the present disclosure, one or more among the at least one or more first to third vibration devices may be configured with a coil type vibration device or a film type vibration device.

According to some embodiments of the present disclosure, the at least one fourth to eighth vibration devices may be the same vibration devices.

According to some embodiments of the present disclosure, one or more among the at least one or more fourth to eighth vibration devices may be configured with a coil type vibration device or a woofer-integrated vibration device.

According to some embodiments of the present disclosure, the woofer-integrated vibration device may comprise a first vibration generating part disposed at a rear surface of the display panel and a second vibration generating part spaced apart from the rear surface of the display panel.

According to some embodiments of the present disclosure, the first vibration generating part may be configured to output a sound of a middle-high-pitched sound band to a forward region, and the second vibration generating part may be configured to output a sound of a low-pitched sound band to a forward region and a rearward region.

According to some embodiments of the present disclosure, one or more among the at least one or more ninth to eleventh vibration devices may be configured with a coil type vibration device or a film type vibration device.

According to some embodiments of the present disclosure, one or more among the at least one first to third vibration devices and the at least one ninth to eleventh vibration devices may be configured with a vibration device which differs from one or more among the at least one fourth to eighth vibration devices.

According to some embodiments of the present disclosure, one or more among the at least one first to third vibration devices and the at least one ninth to eleventh vibration devices may be configured with a coil type vibration device or a film type vibration device, and one or more among the at least one fourth to eighth vibration devices may be configured with a coil type vibration device or a woofer-integrated vibration device.

According to some embodiments of the present disclosure, the display apparatus may further include one or more among one or more pad portions and one or more bent portions. The one or more among the one or more pad portions and the one or more bent portions may be disposed at sides of one or more among the first to sixth partitions toward one or more among the at least one first to eleventh vibration devices.

According to some embodiments of the present disclosure, the display apparatus may further include one or more pad portions. The one or more pad portions may be disposed at sides facing sides of one or more among the first to sixth partitions toward the at least one first to eleventh vibration devices.

According to some embodiments of the present disclosure, the display apparatus may further include a seventh partition between the ninth region and the eleventh region, and an eighth partition between the tenth region and the eleventh region.

According to some embodiments of the present disclosure, a size of one or more among the third to sixth partitions may differ from or equal to that of one or more among the seventh partition and the eighth partition. According to some embodiments of the present disclosure, a size of one or more among the third to sixth partitions at one side of any of the at least one fourth to eighth vibration devices may differ from or equal to that of one or more among the seventh partition and the eighth partition at one side of any of the at least one ninth to eleventh vibration devices.

According to some embodiments of the present disclosure, the display apparatus may further include one or more among one or more pad portions and one or more bent portions. One or more among the one or more pad portions and the one or more bent portions may be disposed at sides of one or more among the seventh and eighth partitions toward the at least one ninth to eleventh vibration devices.

According to some embodiments of the present disclosure, a length of one or more among the seventh partition and the eighth partition may be smaller than or equal to a length of one or more among the first partition and the second partition. According to some embodiments of the present disclosure, a length of one or more among the seventh partition and the eighth partition at one side of any of the at least one ninth to eleventh vibration devices may be smaller than or equal to a length of one or more among the first partition and the second partition at one side of any of the at least one first to third vibration devices.

According to some embodiments of the present disclosure, a length of one or more among the seventh partition and the eighth partition may be smaller than or equal to a length of one or more among the third to sixth partitions. According to some embodiments of the present disclosure, a length of one or more among the seventh partition and the eighth partition at one side of any of the at least one ninth to eleventh vibration devices may be smaller than or equal to a length of one or more among the third to sixth partitions at one side of any of the at least one fourth to eighth vibration devices.

According to some embodiments of the present disclosure, a length of one or more among the seventh partition and the eighth partition may be greater than a length of one or more among the third to sixth partitions. According to some embodiments of the present disclosure, a length of one or more among the seventh partition and the eighth partition at one side of any of the at least one ninth to eleventh vibration devices may be greater than a length of one or more among the third to sixth partitions at one side of any of the at least one fourth to eighth vibration devices.

According to some embodiments of the present disclosure, each of the first to eleventh vibration devices may be configured to be independently driven and vibrate the display device to generate a vibration.

According to some embodiments of the present disclosure, the display apparatus may further include an eleventh partition between a lower portion of the first to third regions and an upper portion of the fourth to eighth regions, a twelfth partition between a lower portion of the fourth to eighth regions and an upper portion of the ninth to eleventh regions, and a thirteenth partition in a lower portion of the ninth to eleventh regions.

According to some embodiments of the present disclosure, the display apparatus may further include one or more among one or more pad portions and one or more bent portions. One or more among the one or more pad portions and the one or more bent portions may be disposed at sides of one or more among the eleventh to thirteenth partitions toward one or more among the at least one first to eleventh vibration devices.

According to some embodiments of the present disclosure, the display apparatus may further include an eleventh partition between a lower portion of the first to third regions and an upper portion of the fourth to eighth regions, a twelfth partition between a lower portion of the fourth to eighth regions and an upper portion of the ninth to eleventh regions, and a fourteenth partition configured to surround a periphery of the display device.

According to some embodiments of the present disclosure, the display apparatus may further include a fifteenth partition provided near the first vibration device, a sixteenth partition provided near the second vibration device, and a seventeenth partition provided near the third vibration device.

According to some embodiments of the present disclosure, the display apparatus may further include an eighteenth partition provided near the ninth vibration device, a nineteenth partition provided near the tenth vibration device, and a twentieth partition provided near the eleventh vibration device.

According to some embodiments of the present disclosure, the display apparatus may further include one or more among one or more pad portions and one or more bent portions. One or more among the one or more pad portions and the one or more bent portions may be disposed at sides of one or more among the eleventh partition, the twelfth partition, and the fourteenth partition toward one or more among the at least one first to eleventh vibration devices.

According to some embodiments of the present disclosure, the display apparatus may further include a heat dissipation member at a rear surface of the display device, and an adhesive member between the display device and the heat dissipation member.

According to some embodiments of the present disclosure, one or more among the at least one first to eleventh vibration devices may be configured with a coil type vibration device, the coil type vibration device including a magnet on a plate, a bobbin near the magnet, and a coil around the bobbin. The display apparatus may further include a heat dissipation member at a rear surface of the display device, a first adhesive member between the display device and the heat dissipation member, and a second adhesive member between the heat dissipation member and the bobbin.

According to some embodiments of the present disclosure, the coil type vibration device may further include a bobbin ring disposed at a front surface of the bobbin. The bobbin ring may be configured to transfer vibration of the bobbin to the rear surface of the display device.

According to some embodiments of the present disclosure, one or more among the at least one first to eleventh vibration devices may be configured with a coil type vibration device, the coil type vibration device including a magnet on a plate, a bobbin near the magnet, and a coil around the bobbin. The display apparatus may further include a supporting member at a rear surface of the display device, and a structure at a front surface of the supporting member. One or more among the at least one first to eleventh vibration devices may be disposed at the structure.

According to some embodiments of the present disclosure, the supporting member may include a first supporting member disposed at the rear surface of the display device and spaced apart from the rear surface of the display device with a gap space therebetween, and a second supporting member disposed at a rear surface of the first supporting member and covering the rear surface of the first supporting member.

According to some embodiments of the present disclosure, the display apparatus may further comprise a middle frame disposed between a rear periphery of the display device and a front periphery of the supporting member.

According to some embodiments of the present disclosure, one or more among the at least one first to eleventh vibration devices may be configured with a film type vibration device. The film type vibration device may include a plurality of inorganic material portions having a piezoelectric characteristic, and an organic material portion between the plurality of inorganic material portions.

According to some embodiments of the present disclosure, the display apparatus may further comprise a functional film attached on the display panel using a transparent adhesive member.

According to some embodiments of the present disclosure, the functional film may include an anti-reflection layer for preventing reflection of external light or a light path control layer for controlling a path of light output from pixel array layers of the display panel to the outside.

According to some embodiments of the present disclosure, the display apparatus may further include a vibration transfer member connected to a vibration device and configured to vibrate based on a vibration of the vibration device to transfer the vibration of the vibration device to the display device.

According to some embodiments of the present disclosure, the second vibration device, the fifth vibration device, and the tenth vibration device may be provided close to the periphery of the display device.

According to some embodiments of the present disclosure, the display apparatus may include a twelfth region between the ninth region and the eleventh region, a thirteenth region between the tenth region and the eleventh region, a ninth partition between the eleventh region and the twelfth region, and a tenth partition between the eleventh region and the thirteenth region.

A display apparatus according to an embodiment of the present disclosure may include a display device including a display panel configured to display an image and include first to eleventh regions, at least one first to third vibration devices at each of the first to third regions, at least one fourth to eighth vibration devices at each of the fourth to eighth regions, at least one ninth to eleventh vibration devices at each of the ninth to eleventh regions, a first partition at one or more sides of the at least one first vibration device, a second partition at one or more sides of the at least one second vibration device, a third partition at one or more sides of the at least one third vibration device, a fourth partition at one or more sides of the at least one fourth vibration device, a fifth partition at one or more sides of the at least one fifth vibration device, and a sixth partition at one or more sides of the at least one sixth vibration device. A size of one or more among the first partition and the second partition may differ from a size of one or more among the third to sixth partitions. A size of one or more among the first partition and the second partition at one side of any of the at least one first to third vibration devices may differ from a size of one or more among the third to sixth partitions at one side of any of the at least one fourth to eighth vibration devices.

According to some embodiments of the present disclosure, a size of one or more among the first to third regions may differ from that of one or more among the fourth to eighth regions.

According to some embodiments of the present disclosure, the first to third vibration devices and the ninth to eleventh vibration devices may be configured to output a sound band of 300 Hz or more, and the fourth to eighth vibration devices may be configured to output a sound band of a full range.

According to some embodiments of the present disclosure, a size of one or more among the first partition and the second partition may be greater than a size of one or more among the third to sixth partitions. According to some embodiments of the present disclosure, a size of one or more among the first partition and the second partition at one side of any of the at least one first to third vibration devices may be greater than a size of one or more among the third to sixth partitions at one side of any of the at least one fourth to eighth vibration devices.

According to some embodiments of the present disclosure, the display apparatus may further include one or more among one or more pad portions and one or more bent portions. One or more among the one or more pad portions and the one or more bent portions may be disposed at sides of one or more among the first to sixth partitions toward one or more among the at least one first to eleventh vibration devices.

According to some embodiments of the present disclosure, the display apparatus may further include one or more pad portions. The one or more pad portions may be disposed on sides facing sides of one or more among the first to sixth partitions toward one or more among the at least one first to eleventh vibration devices.

According to some embodiments of the present disclosure, the display apparatus may further include an eleventh partition at sides of one or more of the first to third vibration devices, a twelfth partition at sides of one or more of the fourth to eighth vibration devices, and a thirteenth partition disposed at sides of one or more of the ninth to eleventh vibration devices. A size of the eleventh partition may differ from a size of one or more among the twelfth partition and the thirteenth partition. A size of the eleventh partition at one side of any of the first to third vibration devices may differ from a size of one or more among the twelfth partition and the thirteenth partition at one side of any of the fourth to eleventh vibration devices.

According to some embodiments of the present disclosure, a size of the eleventh partition may be greater than a size of the twelfth partition. According to some embodiments of the present disclosure, a size of the eleventh partition at one side of any of the first to third vibration devices may be greater than a size of the twelfth partition at one side of one of the fourth to eighth vibration devices.

According to some embodiments of the present disclosure, a size of the eleventh partition may be greater than or equal to a size of the thirteenth partition. According to some embodiments of the present disclosure, a size of the eleventh partition at one side of any of the first to third vibration devices may be greater than or equal to a size of the thirteenth partition at one side of any of the ninth to eleventh vibration devices.

According to some embodiments of the present disclosure, the display apparatus may further include one or more among one or more pad portions and one or more bent portions. One or more among the one or more pad portions and the one or more bent portions may be disposed at one or more sides of the eleventh to thirteenth partitions toward the at least one first to eleventh vibration devices.

According to some embodiments of the present disclosure, the display apparatus may further include a seventh partition at one or more sides of the at least one ninth vibration device, and an eighth partition at one or more sides of the at least one tenth vibration device.

According to some embodiments of the present disclosure, a size of one or more among the third to sixth partitions may differ from or equal to that of one or more among the seventh partition and the eighth partition. According to some embodiments of the present disclosure, a size of one or more among the third to sixth partitions at one side of any of the fourth to eighth vibration devices may differ from or equal to that of one or more among the seventh partition and the eighth partition at one side of any of the ninth to eleventh vibration devices.

According to some embodiments of the present disclosure, the display apparatus may further include one or more among one or more pad portions and one or more bent portions. One or more among the one or more pad portions and the one or more bent portions may be disposed at sides of one or more among the seventh and eighth partitions toward the at least one ninth to eleventh vibration devices.

According to some embodiments of the present disclosure, a size of one or more among the seventh partition and the eighth partition may be smaller than or equal to a size of one or more among the first partition and the second partition. According to some embodiments of the present disclosure, a size of one or more among the seventh partition and the eighth partition at one side of any of the ninth to eleventh vibration devices may be smaller than or equal to a size of one or more among the first partition and the second partition at one side of any of the first to third vibration devices.

According to some embodiments of the present disclosure, a size of one or more among the seventh partition and the eighth partition may be smaller than or equal to a length of one or more among the third to sixth partitions. According to some embodiments of the present disclosure, a size of one or more among the seventh partition and the eighth partition at one side of any of the ninth to eleventh vibration devices may be smaller than or equal to a length of one or more among the third to sixth partitions at one side of any of the fourth to eighth vibration devices.

According to some embodiments of the present disclosure, a size of one or more among the seventh partition and the eighth partition may be greater than a size of one or more among the third to sixth partitions. According to some embodiments of the present disclosure, a size of one or more among the seventh partition and the eighth partition at one side of any of the ninth to eleventh vibration devices may be greater than a size of one or more among the third to sixth partitions at one side of any of the fourth to eighth vibration devices.

According to some embodiments of the present disclosure, the display apparatus may further include a twelfth region between the ninth region and the eleventh region, a thirteenth region between the tenth region and the eleventh region, a ninth partition between the eleventh region and the twelfth region, and a tenth partition between the eleventh region and the thirteenth region.

According to some embodiments of the present disclosure, the display apparatus may further comprise a supporting member at a rear surface of the display device and a structure at a front surface of the supporting member. One or more among the at least one first to eleventh vibration devices may be disposed at the structure.

According to some embodiments of the present disclosure, the one or more among the first to eleventh vibration devices disposed at the structure may be provided as a single-body structure with the structure.

According to some embodiments of the present disclosure, the one or more among the first to eleventh vibration devices disposed at the structure may be asymmetrically disposed with respect to the structure.

According to some embodiments of the present disclosure, the supporting member may include a first supporting member disposed at the rear surface of the display device and spaced apart from the rear surface of the display device with a gap space therebetween, and a second supporting member disposed at a rear surface of the first supporting member and covering the rear surface of the first supporting member.

According to some embodiments of the present disclosure, the display apparatus may further comprise a middle frame disposed between a rear periphery of the display device and a front periphery of the supporting member.

According to some embodiments of the present disclosure, the display apparatus may further comprise a functional film attached on the display panel using a transparent adhesive member.

According to some embodiments of the present disclosure, the functional film may include an anti-reflection layer for preventing reflection of external light or a light path control layer for controlling a path of light output from pixel array layers of the display panel to the outside.

According to some embodiments of the present disclosure, the display apparatus may further include a vibration transfer member connected to a vibration device and configured to vibrate based on a vibration of the vibration device to transfer the vibration of the vibration device to the display device.

According to some embodiments of the present disclosure, the second vibration device, the fifth vibration device, and the tenth vibration device may be provided close to the periphery of the display device.

A display apparatus according to an embodiment of the present disclosure may include a display device including a display panel configured to display an image; a first vibration device, a second vibration device, and a third vibration device at an upper region of the display device, the first to third vibration devices including three channels; a fourth vibration device, a fifth vibration device, a sixth vibration device, a seventh vibration device, and an eighth vibration device at a center region of the display device, the fourth to eighth vibration devices including five channels; and a ninth vibration device, a tenth vibration device, and an eleventh vibration device at a lower region of the display device, the ninth to eleventh vibration devices including three channels.

According to some embodiments of the present disclosure, one or more among the first to third vibration devices and the ninth to eleventh vibration devices may be configured with a coil type vibration device or a film type vibration device.

According to some embodiments of the present disclosure, one or more among the fourth to eighth vibration devices may be configured with a coil type vibration device or a woofer-integrated vibration device.

According to some embodiments of the present disclosure, the first vibration device, the fourth vibration device, and the ninth vibration device may be disposed on the same plane in a lengthwise direction of the display device.

According to some embodiments of the present disclosure, the second vibration device, the fifth vibration device, and the tenth vibration device may be disposed on the same plane in a lengthwise direction of the display device.

According to some embodiments of the present disclosure, each of the first to eleventh vibration devices may be configured to be independently driven and vibrate the display device to generate a vibration.

According to some embodiments of the present disclosure, a vibration device may comprise a piezoelectric vibration portion including a piezoelectric material having a piezoelectric effect, a first electrode portion disposed at a first surface of the piezoelectric vibration portion and electrically connected to the first surface of the piezoelectric vibration portion, and a second electrode portion disposed at a second surface, which is opposite to the first surface, of the piezoelectric vibration portion and electrically connected to the second surface of the piezoelectric vibration portion.

According to some embodiments of the present disclosure, the piezoelectric vibration portion may be formed of a ceramic-based material for generating a relatively high vibration or formed of piezoelectric ceramic having a perovskite-based crystalline structure.

According to some embodiments of the present disclosure, the vibration device may further comprise a first protection member disposed at the first electrode portion and configured to protect the first electrode portion, and a second protection member disposed at the second electrode portion and configured to protect the second electrode portion.

According to some embodiments of the present disclosure, the piezoelectric vibration portion may comprise a plurality of first portions and a plurality of second portions alternately and repeatedly arranged in a widthwise direction of the piezoelectric vibration portion.

According to some embodiments of the present disclosure, a width of each of the plurality of second portions may progressively decrease in a direction from a center portion to both peripheries of the piezoelectric vibration portion.

According to some embodiments of the present disclosure, each of the plurality of second portions may have modulus and viscoelasticity that are lower than those of each of the plurality of first portions.

According to some embodiments of the present disclosure, the piezoelectric vibration portion may comprise a plurality of first portions, which may be spaced apart from one another along a widthwise direction and a lengthwise direction of the piezoelectric vibration portion, and a second portion disposed between the plurality of first portions.

According to some embodiments of the present disclosure, each of the plurality of first portions may have a hexahedral shape or a circular plate shape having the same size and may be disposed in a lattice shape.

According to some embodiments of the present disclosure, a vibration apparatus may comprise a plurality of vibration devices described above. The plurality of vibration devices may be electrically separated and may be disposed to be spaced apart from each other along each of a widthwise direction and a lengthwise direction of the vibration apparatus.

According to some embodiments of the present disclosure, a first separation interval between the plurality of vibration generators along the widthwise direction may be 0.1 mm or more and smaller than 3 cm, and a second separation interval between the plurality of vibration generators along the lengthwise direction may be 0.1 mm or more and smaller than 3 cm.

It will be apparent to those skilled in the art that various modifications and variations can be made in the present disclosure without departing from the technical idea or scope of the disclosures. Thus, it may be intended that embodiments of the present disclosure cover the modifications and variations of the disclosure provided they come within the scope of the appended claims and their equivalents.

What is claimed is:

1. A display apparatus, comprising:
a display device including a display panel configured to display an image and include first to eleventh regions;
a first partition between the first region and the third region;
a second partition between the second region and the third region;
a third partition between the fourth region and the seventh region;
a fourth partition between the fifth region and the eighth region;
a fifth partition between the sixth region and the seventh region;
a sixth partition between the sixth region and the eighth region; and
at least one first to eleventh vibration devices respectively at the first to eleventh regions,
wherein the at least one fourth to eighth vibration devices are at a center region of the display device and configure a main channel,
wherein the at least one first to third vibration devices are at an upper region of the display device and configure a first secondary channel,
wherein the at least one ninth to eleventh vibration devices are at a lower region of the display device and configure a second secondary channel, and
wherein one or more among the at least one first to eleventh vibration devices are configured with a coil type vibration device, a film type vibration device, or a woofer-integrated vibration device.

2. The display apparatus of claim 1, wherein a length of one or more among the first partition and the second partition differs from a length of one or more among the third to sixth partitions.

3. The display apparatus of claim 1, wherein a size of one or more among the first to third regions differs from a size of one or more among the fourth to eighth regions.

4. The display apparatus of claim 1, wherein:
the at least one first to third vibration devices and the at least one ninth to eleventh vibration devices are configured to output a sound band of 300 Hz or more, and
the at least one fourth to eighth vibration devices are configured to output a sound band of 180 Hz or more.

5. The display apparatus of claim 1, wherein a length of one or more among the first partition and the second partition is greater than a length of one or more among the third to sixth partitions.

6. The display apparatus of claim 1, wherein the at least one first to third vibration devices are configured with the same vibration devices.

7. The display apparatus of claim 1, wherein one or more among the at least one first to third vibration devices are configured with the coil type vibration device or the film type vibration device.

8. The display apparatus of claim 1, wherein the at least one fourth to eighth vibration devices are configured with the same vibration devices.

9. The display apparatus of claim 1, wherein one or more among the at least one fourth to eighth vibration devices are configured with the coil type vibration device or the woofer-integrated vibration device.

10. The display apparatus of claim 9, wherein the woofer-integrated vibration device comprises a first vibration generating part disposed at a rear surface of the display panel and a second vibration generating part spaced apart from the rear surface of the display panel.

11. The display apparatus of claim 10, wherein:
the first vibration generating part is configured to output a sound of a middle-high-pitched sound band to a forward region, and
the second vibration generating part is configured to output a sound of a low-pitched sound band to the forward region and a rearward region.

12. The display apparatus of claim 1, wherein one or more among the at least one ninth to eleventh vibration devices are configured with the coil type vibration device or the film type vibration device.

13. The display apparatus of claim 1, wherein one or more among the at least one first to third vibration devices and the at least one ninth to eleventh vibration devices are configured with a vibration device which differs from one or more among the at least one fourth to eighth vibration devices.

14. The display apparatus of claim 1, wherein:
one or more among the at least one first to third vibration devices and the at least one ninth to eleventh vibration devices are configured with the coil type vibration device or the film type vibration device; and
one or more among the at least one fourth to eighth vibration devices are configured with the coil type vibration device or the woofer-integrated vibration device.

15. The display apparatus of claim 1, further comprising one or more among at least one pad portion and at least one bent portion,
wherein the one or more among the at least one pad portion and the at least one bent portion are disposed at sides of one or more among the first to sixth partitions toward one or more among the at least one first to eleventh vibration devices.

16. The display apparatus of claim 1, further comprising one or more pad portions,
wherein the one or more pad portions are disposed at sides facing sides of one or more among the first to sixth partitions toward the at least one first to eleventh vibration devices.

17. The display apparatus of claim 1, further comprising:
a seventh partition between the ninth region and the eleventh region; and
an eighth partition between the tenth region and the eleventh region.

18. The display apparatus of claim 17, wherein a size of one or more among the third to sixth partitions differs from or equal to one or more among the seventh partition and the eighth partition.

19. The display apparatus of claim 17, further comprising one or more among at least one pad portion and at least one bent portion,
wherein the one or more among the at least one pad portion and the at least one bent portion are disposed at sides of one or more among the seventh and eighth partitions toward the at least one ninth to eleventh vibration devices.

20. The display apparatus of claim 17, wherein a length of one or more among the seventh partition and the eighth partition is smaller than or equal to a length of one or more among the first partition and the second partition.

21. The display apparatus of claim 17, wherein a length of one or more among the seventh partition and the eighth partition is smaller than or equal to a length of one or more among the third to sixth partitions.

22. The display apparatus of claim 17, wherein a length of one or more among the seventh partition and the eighth partition is greater than a length of one or more among the third to sixth partitions.

23. The display apparatus of claim 1, further comprising:
an eleventh partition between a lower portion of the first to third regions and an upper portion of the fourth to eighth regions;
a twelfth partition between a lower portion of the fourth to eighth regions and an upper portion of ninth to eleventh regions; and
a thirteenth partition in a lower portion of the ninth to eleventh regions.

24. The display apparatus of claim 23, further comprising one or more among at least one pad portion and at least one bent portion,
wherein the one or more among the at least one pad portion and the at least one bent portion are disposed at sides of one or more among the eleventh to thirteenth partitions toward one or more among the at least one first to eleventh vibration devices.

25. The display apparatus of claim 1, further comprising:
an eleventh partition between a lower portion of the first to third regions and an upper portion of the fourth to eighth regions;
a twelfth partition between a lower portion of the fourth to eighth regions and an upper portion of ninth to eleventh regions; and
a fourteenth partition configured to surround a periphery of the display device.

26. The display apparatus of claim 25, further comprising:
a fifteenth partition near the at least one first vibration device;
a sixteenth partition near the at least one second vibration device; and
a seventeenth partition near the at least one third vibration device.

27. The display apparatus of claim 26, further comprising:
an eighteenth partition near the at least one ninth vibration device;
a nineteenth partition near the at least one tenth vibration device; and
a twentieth partition near the at least one eleventh vibration device.

28. The display apparatus of claim 25, further comprising one or more among at least one pad portion and at least one bent portion,
wherein the one or more among the at least one pad portion and the at least one bent portion are disposed at sides of one or more among the eleventh partition, the twelfth partition, and the fourteenth partition toward one or more among the at least one first to eleventh vibration devices.

29. The display apparatus of claim 1, further comprising:
a twelfth region between the ninth region and the eleventh region;
a thirteenth region between the tenth region and the eleventh region;
a ninth partition between the eleventh region and the twelfth region; and
a tenth partition between the eleventh region and the thirteenth region.

30. A display apparatus, comprising:
a display device including a display panel configured to display an image and include an upper region, a center region, and a lower region;
a main channel configured to include at least one fourth to eighth vibration devices at the center region of the display device;
a first secondary channel configured to include at least one first to third vibration devices at the upper region of the display device; and
a second secondary channel configured to include at least one ninth to eleventh vibration devices at the lower region of the display device,
wherein one or more among the at least one first to eleventh vibration devices are configured with a coil type vibration device, a film type vibration device, or a woofer-integrated vibration device.

31. The display apparatus of claim 30, wherein the at least one first vibration device, the at least one fourth vibration device, and the at least one ninth vibration device are disposed on the same line in a lengthwise direction of the display device.

32. The display apparatus of claim 30, wherein the at least one second vibration device, the at least one fifth vibration device, and the at least one tenth vibration device are disposed on the same line in a lengthwise direction of the display device.

33. The display apparatus of claim 30, further comprising:
a heat dissipation member at a rear surface of the display device; and
an adhesive member between the display device and the heat dissipation member.

34. The display apparatus of claim 30, further comprising:
a heat dissipation member at a rear surface of the display device;
a first adhesive member between the display device and the heat dissipation member; and
a second adhesive member between the heat dissipation member and the coil type vibration device,
wherein the coil type vibration device includes a magnet on a plate, a bobbin near the magnet, and a coil around the bobbin, and
wherein the second adhesive member is between the heat dissipation member and the bobbin.

35. The display apparatus of claim 30, further comprising:
a supporting member at a rear surface of the display device; and
a structure at a front surface of the supporting member,
wherein the coil type vibration device comprises a magnet on a plate, a bobbin near the magnet, and a coil around the bobbin, and
wherein one or more among the at least one first to eleventh vibration devices are configured at the structure.

36. The display apparatus of claim 35, wherein the one or more among the at least one first to eleventh vibration devices disposed at the structure are configured as a single-body structure with the structure.

37. The display apparatus of claim 35, wherein the one or more among the at least one first to eleventh vibration devices disposed at the structure are disposed at a position being off the center of the structure.

38. The display apparatus of claim 30, wherein each of the at least one first to eleventh vibration devices is configured to be independently driven and vibrate the display device to generate a vibration.

39. The display apparatus of claim 30, wherein the film type vibration device comprises:
a plurality of inorganic material portions having a piezoelectric characteristic; and an organic material portion between the plurality of inorganic material portions.

40. The display apparatus of claim 30, further comprising:
a vibration transfer member connected or coupled to the one or more of the at least one first to eleventh vibration devices and configured to vibrate based on a vibration of the one or more of the at least one first to eleventh vibration devices to transfer the vibration of the one or more of the at least one first to eleventh vibration devices to the display device.

41. The display apparatus of claim 30, wherein the at least one second vibration device, the at least one fifth vibration device, and the at least one tenth vibration device are provided close to the periphery of the display device.

* * * * *